US008732083B2

(12) United States Patent
Seubert et al.

(10) Patent No.: US 8,732,083 B2
(45) Date of Patent: May 20, 2014

(54) MANAGING CONSISTENT INTERFACES FOR NUMBER RANGE, NUMBER RANGE PROFILE, PAYMENT CARD PAYMENT AUTHORISATION, AND PRODUCT TEMPLATE TEMPLATE BUSINESS OBJECTS ACROSS HETEROGENEOUS SYSTEMS

(75) Inventors: Michael Seubert, Sinsheim (DE); Ashwin Reddy Yeddula, Walldorf (DE); Andreas Huppert, Neulussheim (DE); Mohit V Gadkari, Bangalore (IN); Muttanna Sarashetti, Karnataka (IN); Dagmar Schultze, Heidelberg (DE)

(73) Assignee: SAP AG, Walldorf (DE)

( * ) Notice: Subject to any disclaimer, the term of this patent is extended or adjusted under 35 U.S.C. 154(b) by 457 days.

(21) Appl. No.: 12/823,996

(22) Filed: Jun. 25, 2010

(65) Prior Publication Data

US 2011/0307348 A1 Dec. 15, 2011

Related U.S. Application Data

(60) Provisional application No. 61/355,063, filed on Jun. 15, 2010.

(51) Int. Cl.
*G06Q 40/00* (2012.01)

(52) U.S. Cl.
USPC ........... 705/44; 705/26.1; 705/26.35; 705/35; 705/39; 705/40; 705/50; 705/64; 705/75; 705/77

(58) Field of Classification Search
USPC ............ 705/26.1–27.2, 35–4, 50, 64, 75–774
See application file for complete search history.

(56) References Cited

U.S. PATENT DOCUMENTS

| | | | |
|---|---|---|---|
| 3,223,321 | A | 12/1965 | Baumgartner |
| 5,126,936 | A | 6/1992 | Champion et al. |
| 5,210,686 | A | 5/1993 | Jernigan |
| 5,247,575 | A | 9/1993 | Sprague et al. |
| 5,255,181 | A | 10/1993 | Chapman et al. |
| 5,321,605 | A | 6/1994 | Chapman et al. |
| 5,463,555 | A | 10/1995 | Ward et al. |

(Continued)

FOREIGN PATENT DOCUMENTS

| | | |
|---|---|---|
| CN | 1501296 | 6/2004 |
| CN | 1609866 | 4/2005 |

(Continued)

OTHER PUBLICATIONS

SAP Structured Entity Relationship Model (SAP-SERM) for R/3 System Release 4.0 Introduction and Index; Dec. 1998; 26 pages.

(Continued)

*Primary Examiner* — Michael Misiaszek
(74) *Attorney, Agent, or Firm* — Fish & Richardson P.C.

(57) ABSTRACT

A business object model, which reflects data that is used during a given business transaction, is utilized to generate interfaces. This business object model facilitates commercial transactions by providing consistent interfaces that are suitable for use across industries, across businesses, and across different departments within a business during a business transaction. In some operations, software creates, updates, or otherwise processes information related to a number range, a number range profile, a payment card payment authorization, and/or a product template template business object.

5 Claims, 214 Drawing Sheets

(56) References Cited

U.S. PATENT DOCUMENTS 5,627,764 A 5/1997 Schutzman et al.
5,717,925 A 2/1998 Harper et al.
5,787,237 A 7/1998 Reilly
5,812,987 A 9/1998 Luskin et al.
5,966,695 A 10/1999 Melchione et al.
5,970,465 A 10/1999 Dietrich et al.
5,970,475 A 10/1999 Barnes et al.
5,983,284 A 11/1999 Argade
6,047,264 A 4/2000 Fisher et al.
6,058,378 A 5/2000 Clark et al.
6,073,137 A 6/2000 Brown et al.
6,092,196 A 7/2000 Reiche
6,104,393 A 8/2000 Santos-Gomez
6,115,690 A 9/2000 Wong
6,125,391 A 9/2000 Meltzer et al.
6,138,118 A 10/2000 Koppstein et al.
6,154,732 A 11/2000 Tarbox
6,222,533 B1 4/2001 Notani et al.
6,226,675 B1 5/2001 Meltzer et al.
6,229,551 B1 5/2001 Huang
6,311,165 B1 10/2001 Coutts et al.
6,327,700 B1 12/2001 Chen et al.
6,331,972 B1 12/2001 Harris et al.
6,332,163 B1 12/2001 Bowman-Amuah
6,374,252 B1 4/2002 Althoff et al.
6,401,101 B1 6/2002 Britton et al.
6,424,979 B1 7/2002 Livingston et al.
6,434,159 B1 8/2002 Woodward et al.
6,438,594 B1 8/2002 Bowman-Amuah
6,442,620 B1 8/2002 Thatte et al.
6,446,136 B1 9/2002 Pohlmann et al.
6,513,019 B2 1/2003 Lewis
6,523,027 B1 2/2003 Underwood
6,542,912 B2 4/2003 Meltzer et al.
6,591,260 B1 7/2003 Schwartzhoff et al.
6,643,660 B1 11/2003 Miller et al.
6,725,122 B2 4/2004 Mori et al.
6,738,747 B1 5/2004 Tanaka et al.
6,745,229 B1 6/2004 Gobin et al.
6,763,353 B2 7/2004 Li et al.
6,775,647 B1 8/2004 Evans et al.
6,868,370 B1 3/2005 Burbridge et al.
6,937,992 B1 8/2005 Benda et al.
6,970,844 B1 11/2005 Bierenbaum
7,020,594 B1 3/2006 Chacon
7,039,606 B2 5/2006 Hoffman et al.
7,055,132 B2 5/2006 Bogdan et al.
7,069,278 B2 6/2006 Telkowski
7,076,449 B2 7/2006 Tsunenari et al.
7,131,069 B1 10/2006 Rush et al.
7,206,768 B1 4/2007 deGroeve et al.
7,249,157 B2 7/2007 Stewart et al.
7,249,195 B2 7/2007 Panec et al.
7,269,569 B2 9/2007 Spira et al.
7,292,965 B1 11/2007 Mehta et al.
7,321,864 B1 1/2008 Gendler
7,363,271 B2 4/2008 Morimoto
7,379,931 B2 5/2008 Morinville
7,383,990 B2 6/2008 Veit
7,406,358 B2 7/2008 Preiss
7,426,520 B2 9/2008 Gorelik et al.
7,451,177 B1 11/2008 Johnson et al.
7,454,362 B1 11/2008 Hayes et al.
7,481,367 B2 1/2009 Fees et al.
7,509,278 B2 3/2009 Jones
7,515,697 B2 4/2009 Eng et al.
7,516,088 B2 4/2009 Johnson et al.
7,523,466 B2 4/2009 DeAngelis
7,536,697 B2 5/2009 Wiseman et al.
7,574,383 B1 8/2009 Parasnis et al.
7,617,128 B2 11/2009 Greak
7,617,328 B2 11/2009 Lewis et al.
7,627,504 B2 12/2009 Brady et al.
7,634,482 B2 12/2009 Mukherjee et al.
7,657,466 B2 2/2010 Klingenberg et al.
7,689,711 B2 3/2010 Brouk et al.
7,788,319 B2 8/2010 Schmidt et al.
7,797,204 B2 9/2010 Balent
7,805,383 B2 9/2010 Veit et al.
7,853,491 B2 12/2010 Wittmer et al.
7,865,426 B2 1/2011 Volpert
7,873,965 B2 1/2011 Hayton et al.
7,895,209 B2 2/2011 Spence et al.
7,941,236 B2 5/2011 Spearman
7,962,385 B2 6/2011 Falk et al.
8,082,243 B2 12/2011 Gorelik et al.
8,127,035 B1 2/2012 Hood et al.
8,150,798 B2 4/2012 Ma et al.
8,185,430 B2 5/2012 Edwards et al.
8,326,795 B2 12/2012 Markovic
RE43,905 E 1/2013 Bierenbaum
8,370,272 B2 2/2013 Wickel et al.
2001/0042032 A1 11/2001 Crawshaw et al.
2001/0047372 A1 11/2001 Gorelik et al.
2002/0013721 A1 1/2002 Dabbiere et al.
2002/0026394 A1 2/2002 Savage et al.
2002/0046053 A1 4/2002 Hare et al.
2002/0052754 A1 5/2002 Joyce et al.
2002/0065680 A1 5/2002 Kojima et al.
2002/0072988 A1 6/2002 Aram
2002/0087481 A1 7/2002 Harif
2002/0087483 A1 7/2002 Harif
2002/0099634 A1 7/2002 Coutts et al.
2002/0107765 A1 8/2002 Walker
2002/0112171 A1 8/2002 Ginter et al.
2002/0138318 A1 9/2002 Ellis et al.
2002/0147668 A1 10/2002 Smith et al.
2002/0152104 A1 10/2002 Ojha et al.
2002/0152145 A1 10/2002 Wanta et al.
2002/0156693 A1 10/2002 Stewart et al.
2002/0156930 A1 10/2002 Velasquez
2002/0157017 A1 10/2002 Mi et al.
2002/0169657 A1 11/2002 Singh et al.
2002/0184070 A1 12/2002 Chen et al.
2002/0186876 A1 12/2002 Jones et al.
2002/0194045 A1 12/2002 Shay et al.
2003/0004799 A1 1/2003 Kish
2003/0041178 A1 2/2003 Brouk et al.
2003/0046639 A1 3/2003 Fai et al.
2003/0069648 A1 4/2003 Douglas et al.
2003/0083910 A1 5/2003 Sayal et al.
2003/0084428 A1 5/2003 Agostini et al.
2003/0086594 A1 5/2003 Gross
2003/0097287 A1 5/2003 Franz et al.
2003/0120502 A1 6/2003 Robb et al.
2003/0120665 A1 6/2003 Fox et al.
2003/0126077 A1 7/2003 Kantor et al.
2003/0167193 A1 9/2003 Jones et al.
2003/0171962 A1 9/2003 Hirth et al.
2003/0172007 A1 9/2003 Helmolt et al.
2003/0172135 A1 9/2003 Bobick et al.
2003/0172343 A1 9/2003 Leymaster et al.
2003/0195815 A1 10/2003 Li et al.
2003/0204452 A1 10/2003 Wheeler
2003/0204637 A1 10/2003 Chong
2003/0208389 A1 11/2003 Kurihara et al.
2003/0212614 A1 11/2003 Chu et al.
2003/0216978 A1 11/2003 Sweeney et al.
2003/0220875 A1 11/2003 Lam et al.
2003/0229522 A1 12/2003 Thompson et al.
2003/0229550 A1 12/2003 DiPrima et al.
2003/0233295 A1 12/2003 Tozawa et al.
2003/0236748 A1 12/2003 Gressel et al.
2004/0002883 A1 1/2004 Andrews et al.
2004/0006653 A1 1/2004 Kamen et al.
2004/0015366 A1 1/2004 Wiseman et al.
2004/0024662 A1 2/2004 Gray et al.
2004/0024862 A1 2/2004 Wall et al.
2004/0034577 A1 2/2004 Van Hoose et al.
2004/0039665 A1 2/2004 Ouchi
2004/0073510 A1 4/2004 Logan
2004/0083201 A1 4/2004 Sholl et al.
2004/0083233 A1 4/2004 Willoughby
2004/0122730 A1 6/2004 Tucciarone et al.

(56) References Cited

U.S. PATENT DOCUMENTS

| | | | |
|---|---|---|---|
| 2004/0133445 | A1 | 7/2004 | Rajan et al. |
| 2004/0138942 | A1 | 7/2004 | Pearson et al. |
| 2004/0148227 | A1 | 7/2004 | Tabuchi et al. |
| 2004/0167894 | A1 | 8/2004 | Ziv |
| 2004/0172360 | A1 | 9/2004 | Mabrey et al. |
| 2004/0186891 | A1 | 9/2004 | Panec et al. |
| 2004/0187140 | A1 | 9/2004 | Aigner et al. |
| 2004/0220910 | A1 | 11/2004 | Zang et al. |
| 2004/0254945 | A1 | 12/2004 | Schmidt et al. |
| 2004/0267597 | A1 | 12/2004 | Kobrosly et al. |
| 2004/0267714 | A1 | 12/2004 | Frid et al. |
| 2005/0015273 | A1 | 1/2005 | Iyer |
| 2005/0021366 | A1 | 1/2005 | Pool et al. |
| 2005/0033588 | A1 | 2/2005 | Ruiz et al. |
| 2005/0038718 | A1 | 2/2005 | Barnes et al. |
| 2005/0038744 | A1 | 2/2005 | Viijoen |
| 2005/0049903 | A1 | 3/2005 | Raja |
| 2005/0055369 | A1 | 3/2005 | Gorelik et al. |
| 2005/0065987 | A1 | 3/2005 | Telkowski et al. |
| 2005/0066240 | A1 | 3/2005 | Sykes et al. |
| 2005/0071262 | A1 | 3/2005 | Kobeh et al. |
| 2005/0080640 | A1 | 4/2005 | Bhaskaran et al. |
| 2005/0108085 | A1 | 5/2005 | Dakar et al. |
| 2005/0108276 | A1 | 5/2005 | Sriram |
| 2005/0131947 | A1 | 6/2005 | Laub et al. |
| 2005/0159997 | A1 | 7/2005 | John |
| 2005/0171833 | A1 | 8/2005 | Jost et al. |
| 2005/0182639 | A1 | 8/2005 | Dale |
| 2005/0187797 | A1 | 8/2005 | Johnson |
| 2005/0187866 | A1 | 8/2005 | Lee |
| 2005/0194431 | A1 | 9/2005 | Fees et al. |
| 2005/0194439 | A1 | 9/2005 | Zuerl et al. |
| 2005/0197849 | A1 | 9/2005 | Fotteler et al. |
| 2005/0197851 | A1 | 9/2005 | Veit |
| 2005/0197878 | A1 | 9/2005 | Fotteler et al. |
| 2005/0197881 | A1 | 9/2005 | Fotteler et al. |
| 2005/0197882 | A1 | 9/2005 | Fotteler et al. |
| 2005/0197886 | A1 | 9/2005 | Veit |
| 2005/0197887 | A1 | 9/2005 | Zuerl et al. |
| 2005/0197896 | A1 | 9/2005 | Veit et al. |
| 2005/0197897 | A1 | 9/2005 | Veit et al. |
| 2005/0197898 | A1 | 9/2005 | Veit et al. |
| 2005/0197899 | A1 | 9/2005 | Veit et al. |
| 2005/0197900 | A1 | 9/2005 | Veit |
| 2005/0197901 | A1 | 9/2005 | Veit et al. |
| 2005/0197902 | A1 | 9/2005 | Veit |
| 2005/0197928 | A1 | 9/2005 | Fotteler et al. |
| 2005/0197941 | A1 | 9/2005 | Veit |
| 2005/0209732 | A1 | 9/2005 | Audimoolam et al. |
| 2005/0210406 | A1 | 9/2005 | Biwer et al. |
| 2005/0216321 | A1 | 9/2005 | Veit |
| 2005/0216371 | A1 | 9/2005 | Fotteler et al. |
| 2005/0216421 | A1 | 9/2005 | Barry et al. |
| 2005/0222888 | A1 | 10/2005 | Hosoda et al. |
| 2005/0222896 | A1 | 10/2005 | Rhyne et al. |
| 2005/0222945 | A1 | 10/2005 | Pannicke et al. |
| 2005/0228821 | A1 | 10/2005 | Gold |
| 2005/0234754 | A1 | 10/2005 | Veit |
| 2005/0246240 | A1 | 11/2005 | Padilla |
| 2005/0256753 | A1 | 11/2005 | Veit et al. |
| 2005/0278693 | A1 | 12/2005 | Brunell et al. |
| 2006/0004934 | A1 | 1/2006 | Guldner et al. |
| 2006/0005098 | A1 | 1/2006 | Lotz et al. |
| 2006/0020515 | A1 | 1/2006 | Lee et al. |
| 2006/0026552 | A1 | 2/2006 | Mazzitelli et al. |
| 2006/0026586 | A1 | 2/2006 | Remmel et al. |
| 2006/0036941 | A1 | 2/2006 | Neil |
| 2006/0047574 | A1 | 3/2006 | Sundaram et al. |
| 2006/0047598 | A1 | 3/2006 | Hansen |
| 2006/0059005 | A1 | 3/2006 | Horn et al. |
| 2006/0059059 | A1 | 3/2006 | Horn et al. |
| 2006/0059060 | A1 | 3/2006 | Horn et al. |
| 2006/0069598 | A1 | 3/2006 | Schweitzer et al. |
| 2006/0069629 | A1 | 3/2006 | Schweitzer et al. |
| 2006/0069632 | A1 | 3/2006 | Kahn et al. |
| 2006/0074728 | A1 | 4/2006 | Schweitzer et al. |
| 2006/0080338 | A1 | 4/2006 | Seubert et al. |
| 2006/0085336 | A1 | 4/2006 | Seubert et al. |
| 2006/0085412 | A1 | 4/2006 | Johnson et al. |
| 2006/0085450 | A1 | 4/2006 | Seubert et al. |
| 2006/0089885 | A1 | 4/2006 | Finke et al. |
| 2006/0095373 | A1 | 5/2006 | Venkatasubramanian et al. |
| 2006/0106824 | A1 | 5/2006 | Stuhec |
| 2006/0184435 | A1 | 8/2006 | Mostowfi |
| 2006/0212376 | A1 | 9/2006 | Snyder et al. |
| 2006/0280302 | A1 | 12/2006 | Baumann et al. |
| 2006/0282360 | A1 | 12/2006 | Kahn et al. |
| 2007/0027742 | A1 | 2/2007 | Emuchay et al. |
| 2007/0043583 | A1 | 2/2007 | Davulcu et al. |
| 2007/0055688 | A1 | 3/2007 | Blattner |
| 2007/0061154 | A1 | 3/2007 | Markvoort et al. |
| 2007/0067411 | A1 | 3/2007 | Angelov |
| 2007/0067753 | A1 | 3/2007 | Pocklington et al. |
| 2007/0078799 | A1 | 4/2007 | Huber-Buschbeck et al. |
| 2007/0112574 | A1 | 5/2007 | Greene |
| 2007/0118391 | A1 | 5/2007 | Malaney et al. |
| 2007/0124227 | A1 | 5/2007 | Dembo et al. |
| 2007/0129978 | A1 | 6/2007 | Shirasu et al. |
| 2007/0132585 | A1 | 6/2007 | Llorca et al. |
| 2007/0150387 | A1 | 6/2007 | Seubert et al. |
| 2007/0150836 | A1 | 6/2007 | Deggelmann et al. |
| 2007/0156428 | A1 | 7/2007 | Brecht-Tillinger et al. |
| 2007/0156545 | A1 | 7/2007 | Lin |
| 2007/0156552 | A1 | 7/2007 | Manganiello |
| 2007/0156690 | A1 | 7/2007 | Moser et al. |
| 2007/0165622 | A1 | 7/2007 | O'Rourke et al. |
| 2007/0174811 | A1 | 7/2007 | Kaetker et al. |
| 2007/0214065 | A1 | 9/2007 | Kahlon et al. |
| 2007/0219864 | A1 | 9/2007 | Vollrath et al. |
| 2007/0225949 | A1 | 9/2007 | Sundararajan et al. |
| 2007/0226066 | A1 | 9/2007 | Brunner et al. |
| 2007/0226090 | A1 | 9/2007 | Stratton |
| 2007/0255639 | A1 | 11/2007 | Seifert |
| 2007/0265860 | A1 | 11/2007 | Herrmann et al. |
| 2007/0265862 | A1 | 11/2007 | Freund et al. |
| 2007/0288250 | A1 | 12/2007 | Lemcke et al. |
| 2007/0294159 | A1 | 12/2007 | Cottle |
| 2007/0295803 | A1 | 12/2007 | Levine et al. |
| 2008/0005012 | A1 | 1/2008 | Deneef |
| 2008/0016242 | A1 | 1/2008 | Panec et al. |
| 2008/0021754 | A1 | 1/2008 | Horn et al. |
| 2008/0040243 | A1 | 2/2008 | Chang et al. |
| 2008/0046104 | A1 | 2/2008 | Van Camp et al. |
| 2008/0046421 | A1 | 2/2008 | Bhatia et al. |
| 2008/0065443 | A1 | 3/2008 | Gorur et al. |
| 2008/0120129 | A1 | 5/2008 | Seubert et al. |
| 2008/0120190 | A1 | 5/2008 | Joao et al. |
| 2008/0120204 | A1 | 5/2008 | Conner et al. |
| 2008/0120313 | A1 | 5/2008 | O'Brien et al. |
| 2008/0133303 | A1 | 6/2008 | Singh et al. |
| 2008/0144791 | A1 | 6/2008 | Harifi et al. |
| 2008/0154969 | A1 | 6/2008 | DeBie |
| 2008/0162266 | A1 | 7/2008 | Griessmann et al. |
| 2008/0184265 | A1 | 7/2008 | Kasi et al. |
| 2008/0196108 | A1 | 8/2008 | Dent et al. |
| 2008/0215354 | A1 | 9/2008 | Halverson et al. |
| 2008/0243578 | A1 | 10/2008 | Veit |
| 2008/0288317 | A1 | 11/2008 | Kakar |
| 2008/0300962 | A1 | 12/2008 | Cawston et al. |
| 2009/0006203 | A1 | 1/2009 | Fordyce et al. |
| 2009/0063287 | A1 | 3/2009 | Tribout et al. |
| 2009/0077074 | A1 | 3/2009 | Hosokawa |
| 2009/0089198 | A1 | 4/2009 | Kroutik |
| 2009/0094274 | A1 | 4/2009 | Gorelik et al. |
| 2009/0164497 | A1 | 6/2009 | Steinmaier et al. |
| 2009/0192926 | A1 | 7/2009 | Tarapata |
| 2009/0193432 | A1 | 7/2009 | McKegney et al. |
| 2009/0222360 | A1 | 9/2009 | Schmitt et al. |
| 2009/0248429 | A1 | 10/2009 | Doenig et al. |
| 2009/0248430 | A1 | 10/2009 | Hubert et al. |
| 2009/0248431 | A1 | 10/2009 | Schoknecht et al. |
| 2009/0248463 | A1 | 10/2009 | Piochon et al. |
| 2009/0248473 | A1 | 10/2009 | Doenig et al. |
| 2009/0248487 | A1 | 10/2009 | Santoso et al. |

(56) References Cited

U.S. PATENT DOCUMENTS

| | | | | |
|---|---|---|---|---|
| 2009/0248547 | A1 | 10/2009 | Doenig et al. | |
| 2009/0248558 | A1 | 10/2009 | Hollberg et al. | |
| 2009/0248586 | A1 | 10/2009 | Kaisermayr et al. | |
| 2009/0248698 | A1 | 10/2009 | Rehmann | |
| 2009/0249358 | A1 | 10/2009 | Schuette | |
| 2009/0249362 | A1 | 10/2009 | Lindemann et al. | |
| 2009/0254971 | A1 | 10/2009 | Herz et al. | |
| 2009/0271245 | A1 | 10/2009 | Joshi et al. | |
| 2009/0276338 | A1 | 11/2009 | Masermann et al. | |
| 2009/0300578 | A1 | 12/2009 | Neil | |
| 2009/0326988 | A1 | 12/2009 | Barth et al. | |
| 2009/0327009 | A1 | 12/2009 | Schmitt et al. | |
| 2009/0327105 | A1 | 12/2009 | Moussa et al. | |
| 2009/0327106 | A1 | 12/2009 | Bartelt et al. | |
| 2010/0001834 | A1 | 1/2010 | Brunswig et al. | |
| 2010/0014510 | A1 | 1/2010 | Boreli et al. | |
| 2010/0070391 | A1 | 3/2010 | Storr et al. | |
| 2010/0070395 | A1 | 3/2010 | Elkeles et al. | |
| 2010/0106555 | A1 | 4/2010 | Mneimneh et al. | |
| 2010/0131379 | A1 | 5/2010 | Dorais et al. | |
| 2010/0131394 | A1 | 5/2010 | Rutsch et al. | |
| 2010/0153297 | A1 | 6/2010 | Haaf et al. | |
| 2010/0161366 | A1 | 6/2010 | Clemens et al. | |
| 2010/0161425 | A1 | 6/2010 | Sideman | |
| 2010/0169888 | A1 | 7/2010 | Hare et al. | |
| 2010/0198631 | A1 | 8/2010 | Edwards et al. | |
| 2010/0217645 | A1 | 8/2010 | Jin et al. | |
| 2010/0217820 | A1 | 8/2010 | Brouk et al. | |
| 2010/0218245 | A1 | 8/2010 | Brouk et al. | |
| 2010/0241729 | A1 | 9/2010 | Angelov | |
| 2010/0306536 | A1 | 12/2010 | Brouk et al. | |
| 2011/0046775 | A1 | 2/2011 | Bailey et al. | |
| 2011/0077999 | A1 | 3/2011 | Becker et al. | |
| 2011/0078048 | A1 | 3/2011 | Becker et al. | |
| 2011/0088000 | A1 | 4/2011 | Mackay | |
| 2011/0153767 | A1 | 6/2011 | Coldicott et al. | |
| 2011/0276636 | A1 | 11/2011 | Cheng et al. | |
| 2011/0307353 | A1 | 12/2011 | Ringl et al. | |
| 2012/0118983 | A1* | 5/2012 | Harris | 235/494 |

FOREIGN PATENT DOCUMENTS

| | | |
|---|---|---|
| CN | 1632806 | 6/2005 |
| CN | 1765138 | 4/2006 |
| CN | 1767537 | 5/2006 |
| CN | 101174957 | 5/2008 |
| CN | 101288092 | 10/2008 |
| WO | WO 2008/005102 | 1/2008 |

OTHER PUBLICATIONS

Sap Structured Entity Relationship Model (SAP-SERM) for R/3 System Release 4.0 (Part 1); Dec. 1998; 5954 pages.

SAP Structured Entity Relationship Model (SAP-SERM) for R/3 System Release 4.0 (Part 2); Dec. 1998; 7838 pages Zencke, Peter; "Engineering a Business Platform"; SAP AG 2005; Engineering BPP; [Online] previously available at URL www.sap.com/community/pub/webcast/2006_01_16_Analyst_Summit_Vegas/2006_01_16_Analyst_Summit_Vegas_009.pdf ; 36 pages.

"UML in the .com Enterprise: Modeling CORBA, Components, XML/XMI and Metadata Workshop"; <http://www.omg.org/news/meetings/workshops/uml_presentations.htm> retrieved on Mar. 17, 2005.

Medjahed, Brahim et al; "Business-to-Business Interactions: Issues and Enabling Technologies"; The VLDB Journal; vol. 12, No. 1; Apr. 3, 2003; pp. 59-89.

Medjahed, Brahim et al.; "Composing Web Services on the Semantic Web"; The VLDB Journal; vol. 12, No. 4, Sep. 23, 2003; pp. 333-351.

Born, Marc et al.; "Customizing UML for Component Design"; www.dot-profile.de; UML Workshop, Palm Springs, CA; Nov. 2000.

Kappel, Gerti et al.; "A Framework for Workflow Management Systems Based on Objects, Rules, and Roles"; ACM Computing Surveys; ACM Press; vol. 32; Mar. 2000; 5 pages.

Skonnard, Aaron et al.; "BizTalk Server 2000: Architecture and Tools for Trading Partner Integration"; MSDn Magazine; 2000; ms-help://ms.msdnqtr.2003apr.1033/dnmag00/htmal/biztalk.htm; 7 pages.

Microsoft; "Creating an XML Web Service Proxy"; 2001; mshelp://ms.msdnqtr.2003apr.1033/cpguide/html/cpconcreatingwebserviceproxy.htm; 3 pages.

Proceedings of OMG Workshops; http://www.omg.org/news/meetings/workshops/proceedings.htm; pp. 1-3. Retrieved on Mar. 17, 2005.

Meltzer, Bart et al.; "XML and Electronic Commerce: Enabling the Network Economy"; SIGMOD Record; ACM Press; vol. 27, No. 4; Dec. 1998; pp. 21-24.

Huhns, Michael N. et al.; "Automating Supply-Chain Mangement"; Jul. 15-19, 2002; pp. 1017-1024.

Soederstroem, Eva; "Standardising the Business Vocabulary of Standards"; SAC, Madrid, Spain; 2002; pp. 1048-1052.

Bastide, Remi et al.; "Formal Specification of CORBA Services: Experience and Lessons Learned"; 2000; pp. 105-117.

Glushko, Robert J. et al.; "An XML Framework for Agent-Based E-Commerce"; Communications of the ACM; vol. 42, No. 3; Mar. 1999; pp. 106-114.

Coen-Porisini, Alberto et al.; "A Formal Approach for Designing CORBA-Based Applications"; ACM Transactions on Software Engineering and Methodology; vol. 12, No. 2; Apr. 2003; pp. 107-151.

Yang, J. et al.; "Service Deployment for Virtual Enterprises"; IEEE; 2001; pp. 107-115.

Karp, Alan H.; "E-speak E-xplained"; Communications of the ACM; vol. 46, No. 7; Jul. 2003; pp. 113-118.

Gillibrand, David; "Essential Business Object Design"; Communications of the ACM; vol. 43, No. 2; Feb. 2000; pp. 117-119.

Cole, James et al.; "Extending Support for Contracts in ebXML"; IEEE; 2001; pp. 119-127.

DiNitto, Elisabetta et al.; "Deriving Executable Process Descriptions from UML"; ICSE '02; May 19-25, 2002; pp. 155-165.

Stumptner, Markus et al.; "On the Road to Behavior-Based Integration"; First Asia-Pacific Conferences on Conceptual Modelling; Dunedin, New Zealand; Jan. 2004; pp. 15-22.

Gosain, Sanjay et al.; "The Impact of Common E-Business Interfaces"; Communications of the ACM; vol. 46, No. 2; Dec. 2003; pp. 186-195.

Damodaran, Suresh; "B2B Integration over the Internet with XML—RosettaNet Successes and Challenges"; WWW2004; May 17-22, 2004; pp. 188-195.

Schulze, Wolfgang et al.; "Standardising on Workflow-Management—The OMG Workflow Management Facility"; SIGGROUP Bulletin; vol. 19, No. 1; Apr. 1998; pp. 24-30.

Sutherland, Jeff; "Business Objects in Corporate Information Systems"; ACM Computing Surveys; vol. 27, No. 2; Jun. 1995; pp. 274-276.

Arsanjani, Ali; "Developing and Integrating Enterprise Components and Services"; Communications of the ACM; vol. 45, No. 10; Oct. 2002; pp. 31-34.

Kim, Dan Jong et al.; "A Comparison of B2B E-Service Solutions"; Communications of the ACM; vol. 46, No. 12; Dec. 2003; pp. 317-324.

Hasselbring, Wilhelm; "Information System Integration"; Communications of the ACM; vol. 43, No. 6; Jun. 2000; pp. 33-38.

Khosravi, Navid et al.; "An Approach to Building Model Driven Enterprise Systems in Nebras Enterprise Framework"; OOPSLA '02: Companion of the 17th Annual ACM SIGPLAN Conference on Object-Oriented Programming, Systems, Languages, and Applications; Nov. 4-8, 2002; pp. 32-33.

Hogg, K. et al.; "An Evaluation of Web Services in the Design of a B2B Application"; 27th Australasian Computer Science Conference; Dunedin, New Zealand; 2004; pp. 331-340.

Gruhn, Volker et al.; "Workflow Management Based on Process Model Repositories"; IEEE 1998; pp. 379-388.

Kim, HyoungDo; "Conceptual Modeling and Specification Generation for B2B Business Processes Based on ebXML"; SIGMOD Record; vol. 31, No. 1; Mar. 2002; pp. 37-42.

(56) References Cited

OTHER PUBLICATIONS

Siegel, Jon; "OMG Overview: CORBA and the OMA in Enterprise Computing"; Communications of the ACM; vol. 41, No. 10; Oct. 1998; pp. 37-43.
Yang, Jian et al.; "Interoperation Support for Electronic Business"; Communications of the ACM; vol. 43, No. 6; Jun. 2000; pp. 39-47.
Levi, Keith et al.; "A Goal-Driven Approach to Enterprise Component Identification and Specification"; Communications of the ACM; vol. 45, No. 10; Oct. 2002; pp. 45-52.
Terai, Koichi et al.; "Coordinating Web Services Based on Business Models"; 2003; pp. 473-478.
Aversano, Lerina et al.; "Introducing eServices in Business Process Models"; SEKE '02; Ischia Italy; Jul. 15-19, 2002; pp. 481-488.
Quix, Christoph et al.; "Business Data Management for Business-to-Business Electronic Commerce"; SIGMOD Record; vol. 31, No. 1; Mar. 2002; pp. 49-54.
Sutherland, Jeff; "Why I Love the OMG: Emergence of a Business Object Component Architecture"; StandardView; vol. 6, No. 1; Mar. 1998; pp. 4-13.
Dogac, Asuman et al.; "An ebXML Infrastructure Implementation through UDDI Registries and RosettaNet PIPs"; ACM SIGMOD; Madison, Wisconsin; Jun. 4-6, 2002; pp. 512-523.
Lee, Jinyoul et al.; "Enterprise Integration with ERP and EAI"; Communications of the ACM; vol. 46, No. 2; Feb. 2003; pp. 54-60.
Bratthall, Lars G. et al.; "Integrating Hundreds of Products through One Architecture—The Industrial IT Architecture"; ICSE '02; Orlando, Florida; May 19-25, 2002; pp. 604-614.
Fingar, Peter; "Component-Based Frameworks for E-Commerce"; Communications of the ACM; vol. 43, No. 10; Oct. 2000; pp. 61-66.
Sprott, David; "Componentizing the Enterprise Application Packages"; Communications of the ACM; vol. 43, No. 4; Apr. 2000; pp. 63-69.
Gokhale, Aniruddha et al.; "Applying Model-Integrated Computing to Component Middleware and Enterprise Applications"; Communications of the ACM; vol. 45, No. 10; Oct. 2002; pp. 65-70.
Bussler, Christoph; "The Role of B2B Engines in B2B Integration Architectures"; SIGMOD Record; vol. 31, No. 1; Mar. 2002; pp. 67-72.
Fremantle, Paul et al.; "Enterprise Services"; Communications of the ACM; vol. 45, No. 10; Oct. 2002; pp. 77-79.
Trastour, David et al.; "Semantic Web Support for the Business-to-Business E-Commerce Lifecycle"; WWW2002, Honolulu, Hawaii; May 7-11, 2002; pp. 89-98.
Jaeger, Dirk et al.; "Using UML for Software Process Modeling"; 1999; pp. 91-108.
Han, Zaw Z. et al.; "Interoperability from Electronic Commerce to Litigation Using XML Rules"; 2003; pp. 93-94.
Carlson, David A.; "Designing XML Vocabularies with UML"; OOPSLA 2000 Companion; Minneapolis, Minnesota; 2000; pp. 95-96.
Stonebraker, Michael; "Too Much Middleware"; SIGMOD Record; vol. 31, No. 1; Mar. 2002; pp. 97-106.
Maamar, Zakaria et al.; "Toward Intelligent Business Objects"; Communications of the ACM; vol. 43, No. 10; Oct. 2000; pp. 99-101.
Tenenbaum, Jay M. et al.; "Eco System: An Internet Commerce Architecture"; IEEE; May 1997; pp. 48-55.
Eyal, Anat et al.; "Integrating and Customizing Heterogeneous E-Commerce Applications"; The VLDB Journal; Aug. 2001; pp. 16-38.
He, Ning et al.; "B2B Contract Implementation Using Windows DNS"; 2001; pp. 71-79.
FSML-Financial Services Markup Language (Jul. 14, 1999) http://xml.coverpages.org/FSML-v1500a.pdf; pp. 1-159 (2 parts).
Webster's Revised Unabridged Dictionary (1913+1828); Def. "merchandise"; <http://machaut.uchicago.edu/?resource=Webster%27s&word=merchandise&use1913=on&u>. Retrieved on Sep. 1, 2009.
Statement in Accordance with the Notice from the European Patent Office dated Oct. 1, 2007 Concerning Business Methods—EPC; Official Journal of the European Patent Office; Munich; Nov. 1, 2007; pp. 592-593.
Lynn, Chris; "Sony Enters Brand Asset Management Market"; The Seybold Report; Analyzing Publishing Technologies; Aug. 4, 2004; <www.Seybold365.com>; 3 pages.
"Header", Newton's Telecom Dictionary; 12th Edition, 2004; pp. 389-390.
Newton's Telecom Dictionary; 18th Edition; 2002; pp. 347, 454.
Baker, Stacy; "Benefits of Assortment Planning"; Assortment Planning for Apparel Retailers—2005 Management Briefing; Just Style; Jun. 2005; 3 pages.
"Visual and Quantitative Assortment Planning Applications Drive Partnership and Profit"; PR Newswire; Jan. 12, 2006; 3 pages.
"DOTS Inc. Selects Compass Software's smartmerchandising for Merchandise Planning and Assortment Planning"; PR Newswire; Dec. 11, 2002; 2 pages.
SAP; "BC-Central Maintenance and Transport Objects"; Release 4.6C; Apr. 200; 15 pages.
Annevelink et al.; "Heterogeneous Database Intergration in a Physician Workstation"; 1992; 5 pages.
Ketabchi et al.; "Object-Oriented Database Management Support for Software Maintenance and Reverse Engineering"; Department of Electrical Engineering and Computer Science, Santa Clara University; 1989; 4 pages.
Diehl et al.; "Service Architecture for an Object-Oriented Next Generation Profile Register"; date unknown; 8 pages.
International Search Report and Written Opinion of the International Searching Authority issued in International Application No. PCT/US2007/011378 on Apr. 30, 2008; 17 pages.
International Preliminary Report on Patentability under Chapter I issued in International Application No. PCT/US2007/011378 on Nov. 17, 2008; 11 pages.
International Search Report and Written Opinion of the International Searching Authority issued in International Application No. PCT/IB2006/001401 on Aug. 27, 2008; 8 pages.
International Search Report and Written Opinion of the International Searching Authority issued in International Application No. PCT/US2005/019961 on Sep. 22, 2005; 8 pages.
International Preliminary Report on Patentability under Chapter I issued in International Application No. PCT/US2005/019961 on Dec. 4, 2006; 6 pages.
International Search Report and Written Opinion of the International Searching Authority issued in International Application No. PCT/US2005/021481 on Apr. 11, 2006; 7 pages.
International Search Report and Written Opinion of the International Searching Authority issued in International Application No. PCT/US2005/021481 on May 29, 2007; 6 pages.
International Preliminary Report on Patentability under Chapter I issued in International Application No. PCT/US2005/021481 on Dec. 20, 2006; 6 pages.
International Preliminary Report on Patentability under Chapter I issued in International Application No. PCT/US2005/021481 on Jul. 15, 2008; 5 pages.
International Search Report and Written Opinion of the International Searching Authority issued in International Application No. PCT/US2005/022137 on Sep. 23, 2005; 7 pages.
International Search Report and Written Opinion of the International Searching Authority issued in International Application No. PCT/US2005/022137 on May 12, 2006; 7 pages.
International Preliminary Report on Patentability under Chapter I issued in International Application No. PCT/US2005/022137 on Dec. 28, 2006; 5 pages.
International Search Report and Written Opinion of the International Searching Authority issued in International Application No. PCT/CN2010/073856 on Mar. 17, 2011; 8 pages.
International Search Report and Written Opinion of the International Searching Authority issued in International Application No. PCT/CN2010/073864 on Mar. 3, 2011; 8 pages.
International Search Report and Written Opinion of the International Searching Authority issued in International Application No. PCT/CN2010/073868 on Mar. 17, 2011; 10 pages.
Communication Pursuant to Rules 70(2) and 70a(2) EPC issued in related European Application No. 07835755.5 on Feb. 28, 2011; 6 pages.

(56) References Cited

OTHER PUBLICATIONS

Communication Pursuant to Article 94(3) EPC issued in related European Application No. 05757432.9 on Jan. 26, 2009; 4 pages.
Communication Pursuant to Article 94(3) issued in European Application No. 05757432.9 on Apr. 12, 2011; 5 pages.
Supplementary European Search Report issued in related European Application No. 05823434.5 on Sep. 28, 2009; 3 pages.
Supplementary European Search Report issued in related European Application No. 05766672.9 on Oct. 6, 2009; 3 pages.
Notice of Allowance issued in related U.S. Appl. No. 12/147,395 on Oct. 26, 2010; 10 pages.
Notice of Allowance issued in U.S. Appl. No. 12/147,395 on May 4, 2011; 10 pages.
Notice of Allowance issued in related U.S. Appl. No. 12/147,449 on Apr. 28, 2011; 9 pages.
Office Action issued in related U.S. Appl. No. 12/147,399 on Jan. 26, 2011; 16 pages.
Office Action issued in related U.S. Appl. No. 12/334,175 on May 27, 2011; 12 pages.
Office Action issued in related U.S. Appl. No. 11/640,422 on Apr. 2, 2009; 13 pages.
Office Action issued in related U.S. Appl. No. 11/640,422 on Dec. 30, 2009; 9 pages.
Office Action issued in U.S. Appl. No. 11/640,422 on May 14, 2010; 12 pages.
Office Action issued in related U.S. Appl. No. 11/731,857 on May 15, 2009; 11 pages.
Office Action issued in related U.S. Appl. No. 11/731,857 on Feb. 4, 2010; 22 pages.
Notice of Allowance issued in related U.S. Appl. No. 11/731,857 on Nov. 29, 2010; 4 pages.
Notice of Allowance issued in related U.S. Appl. No. 11/731,857 on Apr. 11, 2011; 8 pages.
Office Action issued in U.S. Appl. No. 12/147,414 on Apr. 14, 2011; 30 pages.
Office Action issued in U.S. Appl. No. 12/147,378 on Jun. 17, 2011; 10 pages.
Notice of Allowance issued in U.S. Appl. No. 12/323,139 on Mar. 4, 2011; 13 pages.
Office Action issued in related U.S. Appl. No. 12/059,971 on Nov. 4, 2010; 20 pages.
Office Action issued in related U.S. Appl. No. 12/059,971 on May 18, 2011; 13 pages.
Office Action issued in related U.S. Appl. No. 12/060,054 on Jun. 29, 2011; 15 pages.
Office Action issued in U.S. Appl. No. 12/060,144 on Jun. 23, 2011; 16 pages.
Office Action issued in related U.S. Appl. No. 12/059,804 on Apr. 28, 2011; 14 pages.
Office Action issued in related U.S. Appl. No. 12/059,867 on Aug. 18, 2009; 37 pages.
Office Action issued in related U.S. Appl. No. 12/059,867 on Feb. 22, 2010; 24 pages.
Office Action issued in related U.S. Appl. No. 12/060,149 on Aug. 26, 2010; 15 pages.
Office Action issued in related U.S. Appl. No. 12/060,149 on Feb. 4, 2011; 19 pages.
Office Action issued in related U.S. Appl. No. 12/060,192 on Apr. 14, 2011; 18 pages.
Office Action issued in related U.S. Appl. No. 12/060,178 on Dec. 7, 2009; 6 pages.
Office Action issued in related U.S. Appl. 12/060,178 on May 25, 2010; 19 pages.
Notice of Allowance issued in related U.S. Appl. 12/060,178 on Dec. 6, 2010; 4 pages.
Office Action issued in related U.S. Appl. No. 12/060,062 on Jul. 13, 2011; 16 pages.
Office Action issued in related U.S. Appl. No. 12/060,155 on May 10, 2011; 8 pages.
Office Action issued in related U.S. Appl. No. 12/060,171 on Aug. 11, 2009; 11 pages.
Office Action issued in related U.S. Appl. No. 12/060,171 on Mar. 19, 2010; 10 pages.
Office Action issued in related U.S. Appl. No. 12/060,171 on Jul. 1, 2010; 19 pages.
Office Action issued in related U.S. Appl. No. 12/060,171 on Jan. 26, 2011; 17 pages.
Office Action issued in related U.S. Appl. No. 11/145,464 on Aug. 5, 2009; 31 pages.
Office Action issued in related U.S. Appl. No. 11/145,464 on Jan. 22, 2009; 30 pages.
Office Action issued in related U.S. Appl. No. 11/145,464 on Feb. 5, 2010; 57 pages.
Notice of Allowance issued in related U.S. Appl. No. 11/145,464 on Nov. 1, 2010; 4 pages.
Notice of Allowance issued in related U.S. Appl. No. 11/145,464 on Feb. 23, 2011; 7 pages.
Office Action issued in related U.S. Appl. No. 11/155,368 on May 14, 2009; 6 pages.
Office Action issued in related U.S. Appl. No. 11/155,368 on Dec. 10, 2009; 43 pages.
Advisory Action issued in U.S. Appl. No. 11/155,368 on Mar. 31, 2010; 3 pages.
Notice of Allowance issued in U.S. Appl. No. 11/155,368 on Oct. 7, 2010; 4 pages.
Notice of Allowance issued in U.S. Appl. No. 11/155,368 on Mar. 14, 2011; 7 pages.
Office Action issued in related U.S. Appl. No. 11/166,065 on Jun. 24, 2009; 6 pages.
Office Action issued in related U.S. Appl. No. 11/166,065 on Mar. 3, 2010; 25 pages.
Notice of Allowance issued in related U.S. Appl. No. 11/166,065 on Sep. 20, 2010; 6 pages.
Notice of Allowance issued in U.S. Appl. No. 11/166,065 on Mar. 8, 2011; 5 pages.
Office Action issued in related U.S. Appl. No. 11/864,866 on Feb. 3, 2011; 20 pages.
Notice of Allowance issued in related U.S. Appl. No. 11/864,866 on Jul. 22, 2011; 6 pages.
Office Action issued in related U.S. Appl. No. 11/775,821 on Jan. 22, 2010; 16 pages.
Notice of Allowance issued in related U.S. Appl. No. 11/775,821 on Jul. 16, 2010; 4 pages.
Notice of Allowance issued in related U.S. Appl. No. 11/775,821 on Oct. 22, 2010; 4 pages.
Notice of Allowance issued in related U.S. Appl. No. 11/775,821 on Feb. 4, 2011; 4 pages.
Office Action issued in related U.S. Appl. No. 11/364,538 on Aug. 4, 2009; 5 pages.
Office Action issued in related U.S. Appl. No. 11/364,538 on Mar. 4, 2010; 40 pages.
Notice of Allowance issued in related U.S. Appl. No. 11/364,538 on Dec. 13, 2010; 5 pages.
Notice of Allowance issued in related U.S. Appl. No. 11/364,538 on Jul. 26, 2011; 6 pages.
Office Action issued in U.S. Appl. No. 11/864,811 on Mar. 18, 2011; 10 pages.
Office Action issued in U.S. Appl. No. 11/864,811 on Jul. 26, 2011; 7 pages.
Office Action issued in related U.S. Appl. No. 11/864,786 on Jun. 22, 2009; 7 pages.
Office Action issued in related U.S. Appl. No. 11/864,786 on Mar. 3, 2010; 12 pages.
Office Action issued in related U.S. Appl. No. 11/864,832 on Sep. 18, 2009; 14 pages.
Notice of Allowance issued in related U.S. Appl. No. 11/864,832 on Mar. 24, 2010; 11 pages.
Notice of Allowance issued in related U.S. Appl. No. 11/864,832 on Aug. 23, 2010; 4 pages.
Notice of Allowance issued in related U.S. Appl. No. 11/864,832 on Dec. 3, 2010; 9 pages.

(56) References Cited

OTHER PUBLICATIONS

Notice of Allowance issued in related U.S. Appl. No. 11/864,832 on Jul. 7, 2011;11 pages.
Office Action issued in related U.S. Appl. No. 11/864,863 on Jul. 21, 2011; 29 pages.
Office Action issued in related U.S. Appl. No. 11/864,871 on Apr. 21, 2010; 20 pages.
Office Action issued in related U.S. Appl. No. 11/864,871 on Oct. 1, 2010; 30 pages.
Office Action issued in related U.S. Appl. No. 11/803,178 on Jun. 29, 2009; 5 pages.
Office Action issued in related U.S. Appl. No. 11/803,178 on Mar. 4, 2010; 43 pages.
Notice of Allowance issued in related U.S. Appl. No. 11/803,178 on May 17, 2011; 13 pages.
Altintas et al.; "Aurora Software Product Line"; Cybersoft Information Technologies Co.; 2005; pp. 1-8.
Boetterweck, Goetz; "A Model-Driven Approach to the Engineering of Multiple User Interfaces"; Lecture Notes in Computer Science; 2007; vol. 4364/2007; pp. 106-115.
Business Object DTF, Common Business Objects, Ver 1.5; OMG Document bom; Framingham Corporate Center, Framingham, MA; 20 pages; Dec. 4, 1997.
Chou et al. "Web Services for Service-Oriented Communication", International Conference on Collaborative Computing: Networking, Applications and Worksharing, CollaborateCom 2006, pp. 1-8, 2006.
Gable, Julie; "Enterprise Application Integration"; Information Management Journal; Mar./Apr. 2002; pp. 48-52.
Himoff et al.; "MAGENTA Technology: Multi-Agent Systems for Industrial Logistics"; AAMAS'05; Jul. 25-29, 2005; 2005 ACM; pp. 60-66:1-7).
Lockemann et al.; "Flexibility through Multi-Agent Systems: Solutions or Illusions"; SOFSEM 2004; pp. 41-56.
Mascolo et al.; "An Analytical Method for Performance Evaluation of Kanban Controlled Production Systems"; Operations Research; vol. 44, No. 1; 1996; pp. 50-64.
Nemuraite, Lina; "Business Object Modeling Framework for Distributed Enterprise", Kaunas University of Technology, Launas, Lithuania, Jan. 1999; pp. 189-202.
Oracle Application Integration Architecture Enterprise Business Objects (EBO) Concepts—Concepts, Structure, Terminologies and Design Rules, An Oracle White Paper; 29 pages; Aug. 2009.
SAP 2008 Annual Report; 256 pages.
"SAP Labs and HP Team to Advance Internet-Based Supply Chain Collaboration"; Business Editors and Technology Writers; Business Wire; New York; Feb. 3, 2000; 4 pages.
Shi, Min-Hua et al.; "MQML-Message Queuing Markup Language"; Proceedings of the 4th IEEE International Workshop on Advanced Issues of E-Commerce and Web-Based Information Systems (WECWIS 2002); 2002; 8 pages.
Communication Pursuant to Article 94(3) EPC issued in European Application No. 07835755.5 on Feb. 22, 2012; 7 pages.
Communication Pursuant to Article 94(3) issued in European Application No. 05766672.9 on Jul. 14, 2011; 4 pages.
International Search Report and Written Opinion issued in International Application No. PCT/CN2011/001238 on May 3, 2012; 9 pages.
Notice of Allowance issued in related U.S. Appl. No. 11/864,866 on Mar. 13, 2012; 7 pages.
Notice of Allowance issued in related U.S. Appl. No. 11/864,866 on Jan. 25, 2013; 7 pages.
Notice of Allowance issued in related U.S. Appl. No. 12/060,178 on Sep. 2, 2011; 9 pages.
Notice of Allowance issued in related U.S. Appl. No. 12/060,178 on Feb. 14, 2013; 7 pages.
Notice of Allowance issued in related U.S. Appl. No. 11/145,464 on Feb. 6, 2012; 7 pages.
Notice of Allowance issued in related U.S. Appl. No. 11/166,065 on Oct. 9, 2012; 10 pages.
Notice of Allowance issued in related U.S. Appl. No. 11/364,538 on Jul. 23, 2012; 7 pages.
Notice of Allowance issued in related U.S. Appl. No. 11/731,857 on Dec. 14, 2011; 7 pages.
Notice of Allowance issued in related U.S. Appl. No. 11/731,857 on Oct. 9, 2012; 7 pages.
Notice of Allowance issued in related U.S. Appl. No. 11/775,821 on Nov. 2, 2012; 5 pages.
Notice of Allowance issued in related U.S. Appl. No. 11/803,178 on Jul. 17, 2012; 15 pages.
Notice of Allowance issued in related U.S. Appl. No. 11/864,832 on Jan. 9, 2012;12 pages.
Notice of Allowance issued in related U.S. Appl. No. 11/864,832 on Jul. 30, 2012;12 pages.
Notice of Allowance issued in related U.S. Appl. No. 12/147,395 on Dec. 24, 2012; 11 pages.
Notice of Allowance issued in U.S. Appl. No. 11/155,368 on Jul. 23, 2012; 7 pages.
Notice of Allowance issued in U.S. Appl. No. 11/155,368 on Nov. 8, 2011; 7 pages.
Notice of Allowance issued in U.S. Appl. No. 11/166,065 on Feb. 15, 2012; 7 pages.
Notice of Allowance issued in U.S. Appl. No. 11/640,422 on May 22, 2012; 7 pages.
Notice of Allowance issued in U.S. Appl. No. 11/640,422 on Sep. 29, 2011; 7 pages.
Notice of Allowance issued in U.S. Appl. No. 11/775,821 on Dec. 30, 2011; 5 pages.
Notice of Allowance issued in U.S. Appl. No. 11/775,821 on Sep. 21, 2011; 5 pages.
Notice of Allowance issued in U.S. Appl. No. 11/864,786 on Nov. 7, 2012; 7 pages.
Notice of Allowance issued in U.S. Appl. No. 11/864,811 on Mar. 2, 2012; 8 pages.
Notice of Allowance issued in U.S. Appl. No. 11/864,811 on Nov. 14, 2011; 8 pages.
Notice of Allowance issued in U.S. Appl. No. 11/864,811 on Sep. 10, 2012; 10 pages.
Notice of Allowance issued in U.S. Appl. No. 12/059,971 on Jun. 28, 2012; 12 pages.
Notice of Allowance issued in U.S. Appl. No. 12/060,062 on Mar. 20, 2012; 16 pages.
Notice of Allowance issued in U.S. Appl. No. 12/060,062 on Nov. 9, 2012; 7 pages.
Notice of Allowance issued in U.S. Appl. No. 12/060,155 on Jan. 11, 2013; 5 pages.
Notice of Allowance issued in U.S. Appl. No. 12/060,155 on Apr. 24, 2012; 15 pages.
Notice of Allowance issued in U.S. Appl. No. 12/060,171 on Oct. 3, 2012; 10 pages.
Notice of Allowance issued in U.S. Appl. No. 12/060,192 on Mar. 2, 2012; 18 pages.
Notice of Allowance issued in U.S. Appl. No. 12/060,192 on Oct. 29, 2012; 12 pages.
Notice of Allowance issued in U.S. Appl. No. 12/147,378 on Aug. 31, 2012; 9 pages.
Notice of Allowance issued in U.S. Appl. No. 12/147,378 on Nov. 9, 2011; 16 pages.
Notice of Allowance issued in U.S. Appl. No. 12/323,116 on Jun. 11, 2012; 10 pages.
Notice of Allowance issued in U.S. Appl. No. 12/323,139 on Feb. 8, 2013; 9 pages.
Notice of Allowance issued in U.S. Appl. No. 12/323,139 on Mar. 14, 2012; 10 pages.
Notice of Allowance issued in U.S. Appl. No. 12/571,140 on Mar. 20, 2012; 16 pages.
Notice of Allowance issued in U.S. Appl. No. 12/571,140 on Nov. 9, 2012; 8 pages.
Notice of Allowance issued in U.S. Appl. No. 12/815,618 on May 10, 2012; 7 pages.
Notice of Allowance issued in U.S. Appl. No. 12/815,639 on Sep. 24, 2012; 9 pages.

(56) References Cited

OTHER PUBLICATIONS

Notice of Allowance issued in U.S. Appl. No. 12/815,802 on Nov. 27, 2012; 9 pages.
Notice of Allowance issued in U.S. Appl. No. 12/816,293 on Sep. 19, 2012; 7 pages.
Office Action issued in related U.S. Appl. No. 11/864,863 on Dec. 22, 2011; 20 pages.
Office Action issued in related U.S. Appl. No. 12/059,860 on Aug. 3, 2011; 15 pages.
Office Action issued in related U.S. Appl. No. 12/059,860 on Jan. 23, 2012; 16 pages.
Office Action issued in related U.S. Appl. No. 12/060,054 on Dec. 7, 2011; 15 pages.
Office Action issued in related U.S. Appl. No. 12/060,155 on Oct. 31, 2011; 15 pages.
Office Action issued in related U.S. Appl. No. 12/060,171 on Mar. 1, 2012; 19 pages.
Office Action issued in related U.S. Appl. No. 12/060,192 on Sep. 6, 2011; 18 pages.
Office Action issued in U.S. Appl. No. 11/864,786 on Mar. 30, 2012; 12 pages.
Office Action issued in U.S. Appl. No. 12/059,804 on Nov. 14, 2011; 15 pages.
Office Action issued in U.S. Appl. No. 12/060,144 on Dec. 8, 2011; 18 pages.
Office Action issued in U.S. Appl. No. 12/147,414 on Oct. 26, 2011; 27 pages.
Office Action issued in U.S. Appl. No. 12/323,116 on Jan. 27, 2012; 7 pages.
Office Action issued in U.S. Appl. No. 12/323,116 on Sep. 6, 2011; 8 pages.
Office Action issued in U.S. Appl. No. 12/571,140 on Sep. 26, 2011; 14 pages.
Office Action issued in U.S. Appl. No. 12/571,154 on Apr. 2, 2012; 13 pages.
Office Action issued in U.S. Appl. No. 12/571,154 on Aug. 15, 2012; 15 pages.
Office Action issued in U.S. Appl. No. 12/815,576 on Feb. 15, 2013; 13 pages.
Office Action issued in U.S. Appl. No. 12/815,576 on Oct. 12, 2012; 11 pages.
Office Action issued in U.S. Appl. No. 12/815,618 on Dec. 22, 2011; 8 pages.
Office Action issued in U.S. Appl. No. 12/815,639 on May 24, 2012; 7 pages.
Office Action issued in U.S. Appl. No. 12/815,698 on Jan. 20, 2012; 10 pages.
Office Action issued in U.S. Appl. No. 12/815,698 on Jul. 20, 2012; 13 pages.
Office Action issued in U.S. Appl. No. 12/815,750 on Feb. 21, 2013; 67 pages.
Office Action issued in U.S. Appl. No. 12/815,750 on Sep. 28, 2012; 66 pages.
Office Action issued in U.S. Appl. No. 12/815,802 on Jul. 20, 2012; 16 pages.
Office Action issued in U.S. Appl. No. 12/815,869 on Feb. 15, 2013; 27 pages.
Office Action issued in U.S. Appl. No. 12/815,911 on Feb. 25, 2013; 15 pages.
Office Action issued in U.S. Appl. No. 12/815,911 on Sep. 26, 2012; 14 pages.
Office Action issued in U.S. Appl. No. 12/816,083 on May 9, 2012; 20 pages.
Office Action issued in U.S. Appl. No. 12/816,083 on Sep. 21, 2012; 22 pages.
Office Action issued in U.S. Appl. No. 12/816,170 on Jul. 24, 2012; 9 pages.
Office Action issued in U.S. Appl. No. 12/816,268 on Oct. 11, 2012; 11 pages.
Office Action issued in U.S. Appl. No. 12/816,293 on Apr. 25, 2012; 10 pages.
Office Action issued in U.S. Appl. No. 13/186,361 on Feb. 26, 2013, 10 pages.
Office Action issued in U.S. Appl. No. 13/192,543 on Aug. 28, 2012; 14 pages.
Office Action issued in U.S. Appl. No. 13/192,543 on Dec. 13, 2012; 26 pages.
Office Action issued in U.S. Appl. No. 13/192,553 on Feb. 11, 2013, 23 pages.
Office Action issued in U.S. Appl. No. 13/192,555 on Mar. 1, 2013; 11 pages.
Office Action issued in U.S. Appl. No. 13/192,555 on Jul. 20, 2012; 7 pages.
Office Action issued in U.S. Appl. No. 13/192,574 on Oct. 24, 2012; 6 pages.
Office Action issued in U.S. Appl. No. 13/192,612 on Oct. 4, 2012; 12 pages.
Office Action issued in U.S. Appl. No. 13/349,477 on Jun. 29, 2012; 13 pages.
Office Action issued in U.S. Appl. No. 13/349,477 on Nov. 15, 2012; 15 pages.
Office Action issued in U.S. Appl. No. 13/535,667 on Dec. 26, 2012; 9 pages.
Office Action issued in U.S. Appl. No. 13/535,881 on Dec. 21, 2012; 7 pages.
Intersystems, Evaluating Integration Software, Ensemble White Paper, 2007, http://www.intersystems.com/ensemble/whitepapers/pdf/evaluating-integration-software.pdf.
Notice of Allowance issued in U.S. Appl. No. 11/640,422 on Apr. 23, 2012; 8 pages.
Notice of Allowance issued in U.S. Appl. No. 11/864,811 on Mar. 19, 2013; 9 pages.
Notice of Allowance issued in U.S. Appl. No. 12/060,144 on Mar. 20, 2013; 12 pages.
Notice of Allowance issued in U.S. Appl. No. 12/815,618 on May 7, 2013; 8 pages.
Office Action issued in U.S. Appl. No. 13/192,599 on Mar. 21, 2013; 29 pages.
Office Action issued in U.S. Appl. No. 13/218,876 on Apr. 5, 2013; 10 pages.
Office Action issued in U.S. Appl. No. 13/535,433 on Mar. 4, 2013; 11 pages.
Office Action issued in U.S. Appl. No. 13/535,521 on Apr. 16, 2013; 16 pages.

* cited by examiner

FIG. 38-1

| Package | | | Level 1 | Level 2 | Level 3 | Level 4 | Level 5 | Cardinality | Data Type Name |
|---|---|---|---|---|---|---|---|---|---|
| Payment-CardPayment-Authorisa-tionConfirma-tion 38000 | | | PaymentCard-PaymentAuthori-sationConfirma-tion 38002 | | | | | | PaymentCardPaymen-tAuthorisationConfirma-tionMessage 38004 |
| | Message-Header 38006 | | | Message-Header 38008 | | | | 1 38010 | BusinessDocument-MessageHeader 38012 |
| | | | | | ID 38014 | | | 0..1 38016 | BusinessDocument-MessageID 38018 |
| | | | | | UUID 38020 | | | 0..1 38022 | UUID 38024 |
| | | | | | ReferenceID 38026 | | | 0..1 38028 | BusinessDocument-MessageID 38030 |

FIG. 38-2

| Package | | | Level 1 | Level 2 | Level 3 | Level 4 | Level 5 | Cardinality | Data Type Name |
|---|---|---|---|---|---|---|---|---|---|
| | | | | | ReferenceUUID 38032 | | | 0..1 38034 | UUID 38036 |
| | | | | | Creation-DateTime 38038 | | | 1 38040 | GLOBAL_DateTime 38042 |
| | | | | | TestDataIndica-tor 38044 | | | 0..1 38046 | Indicator 38048 |
| | | | | | ReconciliationIn-dicator 38050 | | | 0..1 38052 | Indicator 38054 |
| | | | | | SenderBusi-nessSystemID 38056 | | | 0..1 38058 | BusinessSystemID 38060 |

FIG. 38-3

| Package | | | Level 1 | Level 2 | Level 3 | Level 4 | Level 5 | Cardinality | Data Type Name |
|---|---|---|---|---|---|---|---|---|---|
| | | | | | RecipientBusinessSystemID 38062 | | | 0..1 38064 | BusinessSystemID 38066 |
| | | Party 38068 | | | SenderParty 38070 | | | 0..1 38072 | BusinessDocumentMessageHeaderParty 38074 |
| | | | | | | InternalID 38076 | | 0..1 38078 | PartyInternalID 38080 |
| | | | | | | StandardID 38082 | | 0..N 38084 | PartyStandardID 38086 |
| | | | | | | ContactPerson 38088 | | 0..1 38090 | BusinessDocumentMessageHeaderPartyContactPerson 38092 |

FIG. 38-4

| Package | | | Level 1 | Level 2 | Level 3 | Level 4 | Level 5 | Cardinality | Data Type Name |
|---|---|---|---|---|---|---|---|---|---|
| | | | | | | | InternalID 38094 | 0..1 38096 | ContactPersonInternalID 38098 |
| | | | | | | | OrganisationFormattedName 38100 | 0..N 38102 | LANGUAGEINDEPENDENT_MEDIUM_Name 38104 |
| | | | | | | | PersonFormattedName 38106 | 0..N 38108 | LANGUAGEINDEPENDENT_LONG_Name 38110 |
| | | | | | | | PhoneNumber 38112 | 0..N 38114 | PhoneNumber 38116 |
| | | | | | | | FaxNumber 38118 | 0..N 38120 | PhoneNumber 38122 |
| | | | | | | | EmailURI 38124 | 0..N 38126 | EmailURI 38128 |

FIG. 38-5

| Package | | | Level 1 | Level 2 | Level 3 | Level 4 | Level 5 | Cardinality | Data Type Name |
|---|---|---|---|---|---|---|---|---|---|
| | | | | | RecipientParty 38130 | | | 0..N 38132 | BusinessDocument-MessageHeaderParty 38134 |
| | | | | | | InternalID 38136 | | 0..1 38138 | PartyInternalID 38140 |
| | | | | | | StandardID 38142 | | 0..N 38144 | PartyStandardID 38146 |
| | | | | | | ContactPer-son 38148 | | 0..1 38150 | BusinessDocument-MessageHeaderParty-ContactPerson 38152 |
| | | | | | | | InternalID 38154 | 0..1 38156 | ContactPersonInter-nalID 38158 |

FIG. 38-6

| Package | | | Level 1 | Level 2 | Level 3 | Level 4 | Level 5 | Cardinality | Data Type Name |
|---|---|---|---|---|---|---|---|---|---|
| | | | | | | | Organisation-Formatted-Name 38160 | 0..N 38162 | LANGUAGEINDEPENDENT_MEDIUM_Name 38164 |
| | | | | | | | PersonFormattedName 38166 | 0..N 38168 | LANGUAGEINDEPENDENT_LONG_Name 38170 |
| | | | | | | | PhoneNumber 38172 | 0..N 38174 | PhoneNumber 38176 |
| | | | | | | | FaxNumber 38178 | 0..N 38180 | PhoneNumber 38182 |
| | | | | | | | EmailURI 38184 | 0..N 38186 | EmailURI 38188 |
| | | BusinessS-cope 38190 | | | BusinessScope 38192 | | | 0..N 38194 | BusinessScope 38196 |

FIG. 38-7

| Package | | | Level 1 | Level 2 | Level 3 | Level 4 | Level 5 | Cardinality | Data Type Name |
|---|---|---|---|---|---|---|---|---|---|
| | PaymentCardPaymentAuthorisationConfirmation 38198 | | | PaymentCardPaymentAuthorisationConfirmation 38200 | | | | 1 38202 | PaymentCardPaymentAuthorisationConfirmation 38204 |
| | | | | | ID 38206 | | | 1 38208 | BusinessTransactionDocumentID 38210 |
| | | | | | PaymentCardPaymentAuthorisationRequestorID 38212 | | | 0..1 38214 | PaymentCardPaymentAuthorisationPartyID_V1 38216 |
| | | | | | PaymentCardPaymentAuthorisationProviderID 38218 | | | 0..1 38220 | PaymentCardPaymentAuthorisationPartyID_V1 38222 |

FIG. 38-8

| Package | Level 1 | Level 2 | Level 3 | Level 4 | Level 5 | Cardinality | Data Type Name |
|---|---|---|---|---|---|---|---|
| | | | PaymentCard-PaymentAuthorisationClearing-HouseID 38224 | | | 0..1 38226 | PaymentCardPaymentAuthorisation-PartyID_V1 38228 |
| | | | AuthorisationResultCode 38230 | | | 1 38232 | AuthorisationResult-Code 38234 |
| | | | PaymentCard-VerificationResultCode 38236 | | | 1 38238 | PaymentCardVerificationResultCode 38240 |
| | | | PaymentCard-VerificationValueVerification-ResultCode 38242 | | | 0..1 38244 | PaymentCardVerificationValueVerification-ResultCode 38246 |

FIG. 38-9

| Package | | | Level 1 | Level 2 | Level 3 | Level 4 | Level 5 | Cardinality | Data Type Name |
|---|---|---|---|---|---|---|---|---|---|
| | | | | | PaymentCardAddressVerificationResultCode 38248 | | | 0..1 38250 | PaymentCardAddressVerificationResultCode 38252 |
| | | | | | PaymentAuthorisationDateTime 38254 | | | 1 38256 | GLOBAL_DateTime 38258 |
| | | | | | AuthorisedPaymentAmount 38260 | | | 0..1 38262 | Amount 38264 |
| | | | | | AuthorisationResultDescription 38266 | | | 0..1 38268 | SHORT_Description 38270 |
| | | | | | AuthorisationExpirationDateTime 38272 | | | 0..1 38274 | GLOBAL_DateTime 38276 |

FIG. 39-1

| Package | Level 1 | Level 2 | Level 3 | Cardinality | Data Type Name |
|---|---|---|---|---|---|
| PaymentCardPaymentAuthorisationConfirmationMessage 39000 | PaymentCardPaymentAuthorisation-Confirmation 39002 | | | | PaymentCardPaymentAuthorisation-ConfirmationMessage 39004 |
| MessageHeader 39006 | | MessageHeader 39008 | | 1 39010 | BusinessDocumentMessageHeader 39012 |
| PaymentCardPaymentConfirmation 39014 | | PaymentCardPaymentAuthorisationConfirmation 39016 | | 1 39018 | ... |
| | | | ID 39020 | 1 39022 | BusinessTransactionDocumentID 39024 |
| | | | PaymentCardPaymentAuthorisation-RequestorID 39026 | 1 39028 | PaymentCardPaymentAuthorisation-PartyID 39030 |

FIG. 39-2

| Package | Level 1 | Level 2 | Level 3 | Cardinality | Data Type Name |
|---|---|---|---|---|---|
| | | | PaymentCardPaymentAuthorisation-ClearingHouseID 39032 | 0..1 39034 | PaymentCardPaymentAuthorisation-PartyID 39036 |
| | | | AuthorisationResultCode 39038 | 1 39040 | AuthorisationResultCode 39042 |
| | | | PaymentCardVerificationResultCode 39044 | 1 39046 | PaymentCardVerificationResultCode 39048 |
| | | | PaymentCardVerificationValueVerifi-cationResultCode 39050 | 0..1 39052 | PaymentCardVerificationValueVerifica-tionResultCode 39054 |
| | | | PaymentCardAddressVerificationRe-sultCode 39056 | 0..1 39058 | PaymentCardAddressVerificationRe-sultCode 39060 |
| | | | PaymentAuthorisationDateTime 39062 | 1 39064 | DateTime 39066 |

FIG. 39-3

| Package | Level 1 | Level 2 | Level 3 | Cardinality | Data Type Name |
|---|---|---|---|---|---|
| | | | AuthorisedPaymentAmount 39068 | 0..1 39070 | Amount 39072 |
| | | | AuthorisationResultDescription 39074 | 0..1 39076 | Short_Description 39078 |
| | | | AuthorisationExpirationDateTime 39080 | 0..1 39082 | DateTime 39084 |

FIG. 41-1

| Package | | Level 1 | Level 2 | Level 3 | Level 4 | Level 5 | Level 6 | Level 7 | Level 8 | Cardinality | Data Type Name |
|---|---|---|---|---|---|---|---|---|---|---|---|
| Payment Card Payment Authorisation Request 410000 | | Payment Card Payment Authorisation Request 410002 | | | | | | | | | PaymentCardPaymentAuthorisationRequestMessage 410004 |
| | MessageHeader 410006 | | MessageHeader 410008 | | | | | | | 1 410010 | BusinessDocumentMessageHeader 410012 |
| | | | | ID 410014 | | | | | | 0..1 410016 | BusinessDocumentMessageID 410018 |
| | | | | UUID 410020 | | | | | | 0..1 410022 | UUID 410024 |
| | | | | ReferenceID 410026 | | | | | | 0..1 410028 | BusinessDocumentMessageID 410030 |

FIG. 41-2

| Package | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|
| | | | | | ReferenceUUID 410032 | | | | | | 0..1 410034 | UUID 410036 |
| | | | | | CreationDateTime 410038 | | | | | | 1 410040 | GLOBAL_DateTime 410042 |
| | | | | | TestDataIndicator 410044 | | | | | | 0..1 410046 | Indicator 410048 |
| | | | | | ReconciliationIndicator 410050 | | | | | | 0..1 410052 | Indicator 410054 |
| | | | | | SenderBusinessSystemID 410056 | | | | | | 0..1 410058 | BusinessSystemID 410060 |

FIG. 41-3

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | RecipientBusinessSystemID 410062 | | | | | | 0..1 410064 | BusinessSystemID 410066 |
| Party 410068 | | | SenderParty 410070 | | | | | | 0..1 410072 | BusinessDocumentMessageHeaderParty 410074 |
| | | | | InternalID 410076 | | | | | 0..1 410078 | PartyInternalID 410080 |
| | | | | StandardID 410082 | | | | | 0..N 410084 | PartyStandardID 410086 |
| | | | | ContactPerson 410088 | | | | | 0..1 410090 | BusinessDocumentMessageHeaderPartyContactPerson 410092 |

FIG. 41-4

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | InternalID 410094 | | | | 0..1 410096 | ContactPersonInternalID 410098 |
| | | | | | OrganisationFormattedName 410100 | | | | 0..N 410102 | LANGUAGEINDEPENDENT_MEDIUM_Name 410104 |
| | | | | | PersonFormattedName 410106 | | | | 0..N 410108 | LANGUAGEINDEPENDENT_LONG_Name 410110 |
| | | | | | PhoneNumber 410114 | | | | 0..N 410116 | PhoneNumber 410118 |
| | | | | | FaxNumber 410122 | | | | 0..N 410124 | PhoneNumber 410126 |

FIG. 41-5

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | EmailURI 410128 | | | | 0..N 410130 | EmailURI 410132 |
| | | | RecipientParty 410136 | | | | | | 0..N 410138 | BusinessDocumentMessageHeaderParty 410140 |
| | | | | InternalID 410142 | | | | | 0..1 410144 | PartyInternalID 410146 |
| | | | | StandardID 410148 | | | | | 0..N 410150 | PartyStandardID 410152 |
| | | | | ContactPerson 410154 | | | | | 0..1 410156 | BusinessDocumentMessageHeaderPartyContactPerson 410158 |
| | | | | | InternalID 410160 | | | | 0..1 410162 | ContactPersonInternalID 410164 |

FIG. 41-6

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | OrganisationFormattedName 410166 | | | | 0..N 410168 | LANGUAGEINDEPENDENT_MEDIUM_Name 410170 |
| | | | | | PersonFormattedName 410172 | | | | 0..N 410174 | LANGUAGEINDEPENDENT_LONG_Name 410176 |
| | | | | | PhoneNumber 410180 | | | | 0..N 410182 | PhoneNumber 410184 |
| | | | | | FaxNumber 410188 | | | | 0..N 410190 | PhoneNumber 410192 |
| | | | | | EmailURI 410194 | | | | 0..N 410196 | EmailURI 410198 |

FIG. 41-7

| Package | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|
| | | Business Scope 410200 | | | | Business Scope 410202 | | | | | | 0..N 410204 | BusinessScope 410206 |
| | PaymentCard PaymentAuthorisation Request 410208 | | | | PaymentCardPaymentAuthorisationRequest 410210 | | | | | | | 1 410212 | PaymentCardPaymentAuthorisation Request 410214 |
| | | | | | | ID 410216 | | | | | | 1 410218 | BusinessTransactionDocumentID 410220 |
| | | | | | | DeviceID 410222 | | | | | | 0..1 410224 | DeviceID 410226 |

FIG. 41-8

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | PaymentCardHolderAuthenticationID 410228 | | | | | | 0..1 410230 | PaymentCardHolderAuthenticationID 410232 |
| | | | PaymentCardHolderAuthenticationResultCode 410234 | | | | | | 0..1 410236 | PaymentCardHolderAuthenticationResultCode 410238 |
| | | | PaymentCardHolderAuthenticationTokenText 410240 | | | | | | 0..1 410242 | PaymentCardHolderAuthenticationTokenText 410244 |

FIG. 41-9

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | PaymentCardDataOriginTypeCode 410246 | | | | | | 0..1 410248 | PaymentCardDataOriginTypeCode 410250 |
| | | | PaymentCardVerificationValueAvailabilityCode 410252 | | | | | | 0..1 410254 | PaymentCardVerificationValueAvailabilityCode 410256 |
| | | | PaymentCardVerificationValueCheckRequiredIndicator 410258 | | | | | | 1 410260 | Indicator 410262 |

FIG. 41-10

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | PaymentCardVerificationValueText 410264 | | | | | | 0..1 410266 | PaymentCardVerificationValueText 410268 |
| | | | Payment Amount 410270 | | | | | | 1 410272 | Amount 410274 |
| | | | Payment Card 410276 | | | | | | 1 410278 | PaymentCard 410280 |

FIG. 41-11

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | PaymentCardChargedBusinessTransactionDocumentBankAccount 410282 | | | | | | 0..1 410284 | BusinessTransactionDocumentBankAccount 410286 |
| | | | | ID 410288 | | | | | 0..1 410290 | BankAccountID 410292 |
| | | | | IDCheckDigitValue 410294 | | | | | 0..1 410296 | BankAccountIDCheckDigitValue 410298 |
| | | | | InternalID 410300 | | | | | 0..1 410302 | BankAccountInternalID 410304 |

FIG. 41-12

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | StandardID 410306 | | | | | 0..1 410308 | BankAccountStandardID 410310 |
| | | | | TypeCode 410312 | | | | | 0..1 410314 | BankAccountTypeCode 410316 |
| | | | | CurrencyCode 410318 | | | | | 0..1 410320 | CurrencyCode 410322 |
| | | | | HolderName 410324 | | | | | 0..1 410326 | BankAccountHolderName 410328 |
| | | | | Description 410330 | | | | | 0..1 410332 | Description 410334 |
| Bank 410336 | | | | Bank 410338 | | | | | 0..1 410340 | Bank 410342 |
| | | | | | InternalID 410344 | | | | 0..1 410346 | BankInternalID 410348 |

FIG. 41-13

| Package | | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|---|
| | | | | | | | | | StandardID 410350 | | | | 0..1 410352 | BankStandardID 410354 |
| | | | | | | | | | RoutingID 410356 | | | | 0..1 410358 | BankRoutingID 410360 |
| | | | | | | | | | RoutingIDTypeCode 410362 | | | | 0..1 410364 | BankRoutingIDTypeCode 410366 |
| | | | | | | | | | CountryCode 410368 | | | | 0..1 410370 | CountryCode 410372 |
| | | | | Address 410374 | | | | | Address 410376 | | | | 0..1 410378 | Address 410380 |
| | | | | | | | | | | OrganisationFormOfAddress 410382 | | | 0..1 410384 | FormOfAddress 410386 |

FIG. 41-14

| Package | | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|---|
| | | | | | | | | | | OrganisationFormattedName 410388 | | | 0..N 410390 | LANGUAGEINDEPENDENT_MEDIUM_Name 410392 |
| | | | | | | | | | | PersonName 410394 | | | 0..1 410396 | PersonName 410398 |
| | | | | | | | | | | FunctionalTitleName 410400 | | | 0..1 410402 | LANGUAGEINDEPENDENT_MEDIUM_Name 410404 |
| | | | | | | | | | | DepartmentName 410406 | | | 0..1 410408 | LANGUAGEINDEPENDENT_MEDIUM_Name 410410 |
| | | | | | | | | | | Office 410414 | | | 0..1 410416 | Office 410418 |

FIG. 41-15

| Package | | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|---|
| | | | | | | | | | | Physical Address 410422 | | | 0..1 410424 | PhysicalAddress 410426 |
| | | | | | | | | | | | Country Code 410428 | | 0..1 410430 | CountryCode 410432 |
| | | | | | | | | | | | Country Name 410434 | | 0..1 410436 | MEDIUM_Name 410438 |
| | | | | | | | | | | | RegionC ode 410440 | | 0..1 410442 | RegionCode 410444 |
| | | | | | | | | | | | RegionN ame 410446 | | 0..1 410448 | LANGUAGEINDE PENDENT_MEDIU M_Name 410450 |
| | | | | | | | | | | | StreetPo stalCode 410452 | | 0..1 410454 | PostalCode 410456 |

FIG. 41-16

| Package | | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|---|
| | | | | | | | | | | | POBoxPostalCode 410458 | | 0..1 410460 | PostalCode 410462 |
| | | | | | | | | | | | CompanyPostalCode 410464 | | 0..1 410466 | PostalCode 410468 |
| | | | | | | | | | | | CityName 410470 | | 0..1 410472 | LANGUAGEINDEPENDENT_MEDIUM_Name 410474 |
| | | | | | | | | | | | AdditionalCityName 410476 | | 0..1 410478 | LANGUAGEINDEPENDENT_MEDIUM_Name 410480 |
| | | | | | | | | | | | DistrictName 410482 | | 0..1 410484 | LANGUAGEINDEPENDENT_MEDIUM_Name 410486 |

FIG. 41-17

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | POBoxID 410488 | | 0..1 410490 | POBoxID 410492 |
| | | | | | | | POBoxIndicator 410494 | | 0..1 410496 | Indicator 410498 |
| | | | | | | | POBoxCountryCode 410500 | | 0..1 410502 | CountryCode 410504 |
| | | | | | | | POBoxCountryName 410506 | | 0..1 410508 | MEDIUM_Name 410510 |
| | | | | | | | POBoxRegionCode 410512 | | 0..1 410514 | RegionCode 410516 |

FIG. 41-18

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | POBoxRegionName 410518 | | 0..1 410520 | LANGUAGEINDEPENDENT_MEDIUM_Name 410522 |
| | | | | | | | POBoxCityName 410524 | | 0..1 410526 | LANGUAGEINDEPENDENT_MEDIUM_Name 410528 |
| | | | | | | | StreetName 410530 | | 0..1 410532 | StreetName 410534 |
| | | | | | | | StreetPrefixName 410536 | | 0..N 410538 | LANGUAGEINDEPENDENT_MEDIUM_Name 410540 |
| | | | | | | | StreetSuffixName 410542 | | 0..N 410544 | LANGUAGEINDEPENDENT_MEDIUM_Name 410546 |

FIG. 41-19

| Package | | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|---|
| | | | | | | | | | | | HouseID 410548 | | 0..1 410550 | HouseID 410552 |
| | | | | | | | | | | | AdditionalHouseID 410554 | | 0..1 410556 | HouseID 410558 |
| | | | | | | | | | | | BuildingID 410560 | | 0..1 410562 | BuildingID 410564 |
| | | | | | | | | | | | FloorID 410566 | | 0..1 410568 | FloorID 410570 |
| | | | | | | | | | | | RoomID 410572 | | 0..1 410574 | RoomID 410576 |
| | | | | | | | | | | | CareOfName 410578 | | 0..1 410580 | LANGUAGEINDEPENDENT_MEDIUM_Name 410582 |

FIG. 41-20

| Package | | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|---|
| | | | | | | | | | | | Description 410584 | | 0..N 410586 | Description 410588 |
| | | | | | | | | | | TaxJurisdictionCode 410590 | | | 0..1 410592 | TaxJurisdictionCode 410594 |
| | | | | | | | | | | TimeZoneDifferenceValue 410596 | | | 0..1 410598 | TimeZoneDifferenceValue 410600 |
| | | | | | | | | | | GeoCoordinates 410602 | | | 0..1 410604 | GeoCoordinates 410606 |
| | | | | | | | | | | Communication 410610 | | | 0..1 410612 | Communication 410614 |

FIG. 41-21

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | CorrespondenceLanguageCode 410616 | | 0..1 410618 | LanguageCode 410620 |
| | | | | | | | CorrespondenceLanguageName 410622 | | 0..1 410624 | MEDIUM_Name 410626 |
| | | | | | | | Telephone 410628 | | 0..N 410630 | Telephone 410632 |
| | | | | | | | | Number 410634 | 1 410636 | PhoneNumber 410638 |
| | | | | | | | | SMSEnabledIndicator 410640 | 0..1 410642 | Indicator 410644 |

FIG. 41-22

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | | NumberDefaultIndicator 410646 | 1 410648 | Indicator 410650 |
| | | | | | | | | NumberDescription 410652 | 0..N 410654 | Description 410656 |
| | | | | | | | | NumberUsageDenialIndicator 410658 | 1 410660 | Indicator 410662 |
| | | | | | | | MobilePhone 410664 | | 0..N 410666 | Telephone 410668 |
| | | | | | | | | Number 410670 | 1 410672 | PhoneNumber 410674 |

FIG. 41-23

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | | SMSEnabledIndicator 410676 | 0..1 410678 | Indicator 410680 |
| | | | | | | | | NumberDefaultIndicator 410682 | 1 410684 | Indicator 410686 |
| | | | | | | | | NumberDescription 410688 | 0..N 410690 | Description 410692 |
| | | | | | | | | NumberUsageDenialIndicator 410694 | 1 410696 | Indicator 410698 |
| | | | | | | | Facsimile 410700 | | 0..N 410702 | Facsimile 410704 |

FIG. 41-24

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | | Number 410706 | 1 410708 | PhoneNumber 410710 |
| | | | | | | | | NumberDefaultIndicator 410712 | 1 410714 | Indicator 410716 |
| | | | | | | | | NumberDescription 410718 | 0..N 410720 | Description 410722 |
| | | | | | | | | NumberUsageDenialIndicator 410724 | 1 410726 | Indicator 410728 |
| | | | | | | | Email 410730 | | 0..N 410732 | Email 410734 |
| | | | | | | | | URI 410736 | 1 410738 | EmailURI 410740 |

FIG. 41-25

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | | URIDefaultIndicator 410742 | 1 410744 | Indicator 410746 |
| | | | | | | | | URIDescription 410748 | 0..N 410750 | Description 410752 |
| | | | | | | | | URIUsageDenialIndicator 410754 | 1 410756 | Indicator 410758 |
| | | | | | | | Web 410760 | | 0..N 410762 | Web 410764 |
| | | | | | | | | URI 410766 | 1 410768 | WebURI 410770 |
| | | | | | | | | URIDefaultIndicator 410772 | 1 410774 | Indicator 410776 |

FIG. 41-26

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | | URIDescription 410778 | 0..N 410780 | Description 410782 |
| | | | | | BranchAddress 410786 | | | | 0..N 410788 | Address 410790 |
| | | | | | | OrganisationFormOfAddress 410792 | | | 0..1 410794 | FormOfAddress 410796 |
| | | | | | | OrganisationFormattedName 410798 | | | 0..N 410800 | LANGUAGEINDEPENDENT_MEDIUM_Name 410802 |
| | | | | | | PersonName 410804 | | | 0..1 410806 | PersonName 410808 |

FIG. 41-27

| Package | | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|---|
| | | | | | | | | | | FunctionalTitleName 410810 | | | 0..1 410812 | LANGUAGEINDEPENDENT_MEDIUM_Name 410814 |
| | | | | | | | | | | DepartmentName 410816 | | | 0..1 410818 | LANGUAGEINDEPENDENT_MEDIUM_Name 410820 |
| | | | | | | | | | | Office 410824 | | | 0..1 410826 | Office 410828 |
| | | | | | | | | | | Physical Address 410832 | | | 0..1 410834 | PhysicalAddress 410836 |
| | | | | | | | | | | | Country Code 410838 | | 0..1 410840 | CountryCode 410842 |
| | | | | | | | | | | | Country Name 410844 | | 0..1 410846 | MEDIUM_Name 410848 |

FIG. 41-28

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | RegionCode 410850 | | 0..1 410852 | RegionCode 410854 |
| | | | | | | | RegionName 410856 | | 0..1 410858 | LANGUAGEINDEPENDENT_MEDIUM_Name 410860 |
| | | | | | | | StreetPostalCode 410862 | | 0..1 410864 | PostalCode 410866 |
| | | | | | | | POBoxPostalCode 410868 | | 0..1 410870 | PostalCode 410872 |
| | | | | | | | CompanyPostalCode 410874 | | 0..1 410876 | PostalCode 410878 |

FIG. 41-29

| Package | | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|---|
| | | | | | | | | | | | CityName 410880 | | 0..1 410882 | LANGUAGEINDEPENDENT_MEDIUM_Name 410884 |
| | | | | | | | | | | | AdditionalCityName 410886 | | 0..1 410888 | LANGUAGEINDEPENDENT_MEDIUM_Name 410890 |
| | | | | | | | | | | | DistrictName 410892 | | 0..1 410894 | LANGUAGEINDEPENDENT_MEDIUM_Name 410896 |
| | | | | | | | | | | | POBoxID 410898 | | 0..1 410900 | POBoxID 410902 |
| | | | | | | | | | | | POBoxIndicator 410904 | | 0..1 410906 | Indicator 410908 |

FIG. 41-30

| Package | | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|---|
| | | | | | | | | | | | POBoxCountryCode 410910 | | 0..1 410912 | CountryCode 410914 |
| | | | | | | | | | | | POBoxCountryName 410916 | | 0..1 410918 | MEDIUM_Name 410920 |
| | | | | | | | | | | | POBoxRegionCode 410922 | | 0..1 410924 | RegionCode 410926 |
| | | | | | | | | | | | POBoxRegionName 410928 | | 0..1 410930 | LANGUAGEINDEPENDENT_MEDIUM_Name 410932 |
| | | | | | | | | | | | POBoxCityName 410934 | | 0..1 410936 | LANGUAGEINDEPENDENT_MEDIUM_Name 410938 |

FIG. 41-31

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | StreetName 410940 | | 0..1 410942 | StreetName 410944 |
| | | | | | | | StreetPrefixName 410946 | | 0..N 410948 | LANGUAGEINDEPENDENT_MEDIUM_Name 410950 |
| | | | | | | | StreetSuffixName 410952 | | 0..N 410954 | LANGUAGEINDEPENDENT_MEDIUM_Name 410956 |
| | | | | | | | HouseID 410958 | | 0..1 410960 | HouseID 410962 |
| | | | | | | | AdditionalHouseID 410964 | | 0..1 410966 | HouseID 410968 |
| | | | | | | | BuildingID 410970 | | 0..1 410972 | BuildingID 410974 |

FIG. 41-32

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | FloorID 410976 | | 0..1 410978 | FloorID 410980 |
| | | | | | | | RoomID 410982 | | 0..1 410984 | RoomID 410986 |
| | | | | | | | CareOfName 410988 | | 0..1 410990 | LANGUAGEINDEPENDENT_MEDIUM_Name 410992 |
| | | | | | | | Description 410994 | | 0..N 410996 | Description 410998 |
| | | | | | | TaxJurisdictionCode 411000 | | | 0..1 411002 | TaxJurisdictionCode 411004 |
| | | | | | | TimeZoneDifferenceValue 411006 | | | 0..1 411008 | TimeZoneDifferenceValue 411010 |

FIG. 41-33

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | GeoCoordinates 411012 | | | 0..1 411014 | GeoCoordinates 411016 |
| | | | | | | Communication 411020 | | | 0..1 411022 | Communication 411024 |
| | | | | | | | CorrespondenceLanguageCode 411026 | | 0..1 411028 | LanguageCode 411030 |
| | | | | | | | CorrespondenceLanguageName 411032 | | 0..1 411034 | MEDIUM_Name 411036 |
| | | | | | | | Telephone 411038 | | 0..N 411040 | Telephone 411042 |

FIG. 41-34

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | | Number 411044 | 1 411046 | PhoneNumber 411048 |
| | | | | | | | | SMSEnabledIndicator 411050 | 0..1 411052 | Indicator 411054 |
| | | | | | | | | NumberDefaultIndicator 411056 | 1 411058 | Indicator 411060 |
| | | | | | | | | NumberDescription 411062 | 0..N 411064 | Description 411066 |
| | | | | | | | | NumberUsageDenialIndicator 411068 | 1 411070 | Indicator 411072 |

FIG. 41-35

| Package | | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|---|
| | | | | | | | | | | | MobilePhone 411074 | | 0..N 411076 | Telephone 411078 |
| | | | | | | | | | | | | Number 411080 | 1 411082 | PhoneNumber 411084 |
| | | | | | | | | | | | | SMSEnabledIndicator 411086 | 0..1 411088 | Indicator 411090 |
| | | | | | | | | | | | | NumberDefaultIndicator 411092 | 1 411094 | Indicator 411096 |
| | | | | | | | | | | | | NumberDescription 411098 | 0..N 411100 | Description 411102 |

FIG. 41-36

| Package | | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|---|
| | | | | | | | | | | | | NumberUsageDenialIndicator 411104 | 1 411106 | Indicator 411108 |
| | | | | | | | | | | | Facsimile 411110 | | 0..N 411112 | Facsimile 411114 |
| | | | | | | | | | | | | Number 411116 | 1 411118 | PhoneNumber 411120 |
| | | | | | | | | | | | | NumberDefaultIndicator 411122 | 1 411124 | Indicator 411126 |
| | | | | | | | | | | | | NumberDescription 411128 | 0..N 411130 | Description 411132 |

FIG. 41-37

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | | NumberUsageDenialIndicator 411134 | 1 411136 | Indicator 411138 |
| | | | | | | | Email 411140 | | 0..N 411142 | Email 411144 |
| | | | | | | | | URI 411146 | 1 411148 | EmailURI 411150 |
| | | | | | | | | URIDefaultIndicator 411152 | 1 411154 | Indicator 411156 |
| | | | | | | | | URIDescription 411158 | 0..N 411160 | Description 411162 |
| | | | | | | | | URIUsageDenialIndicator 411164 | 1 411166 | Indicator 411168 |

FIG. 41-38

| Package | | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|---|
| | | | | | | | | | | | Web 411170 | | 0..N 411172 | Web 411174 |
| | | | | | | | | | | | | URI 411176 | 1 411178 | WebURI 411180 |
| | | | | | | | | | | | | URIDefaultIndicator 411182 | 1 411184 | Indicator 411186 |
| | | | | | | | | | | | | URIDescription 411188 | 0..N 411190 | Description 411192 |
| | | | | | | | Location 411194 | | | | | | 0..1 411196 | BusinessTransactionDocumentLocation 411198 |
| | | | | | | | | InternalID 411200 | | | | | 0..1 411202 | LocationInternalID 411204 |

FIG. 41-39

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | StandardID 411206 | | | | | 0..N 411208 | LocationStandardID 411210 |
| | | | | BuyerID 411212 | | | | | 0..1 411214 | LocationPartyID 411216 |
| | | | | SellerID 411218 | | | | | 0..1 411220 | LocationPartyID 411222 |
| | | | | ProductRecipientID 411224 | | | | | 0..1 411226 | LocationPartyID 411228 |
| | | | | VendorID 411230 | | | | | 0..1 411232 | LocationPartyID 411234 |
| | | | | BillToID 411236 | | | | | 0..1 411238 | LocationPartyID 411240 |
| | | | | BillFromID 411242 | | | | | 0..1 411244 | LocationPartyID 411246 |

FIG. 41-40

| Package | | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|---|
| | | | | | | | | BidderID<br>411248 | | | | | 0..1<br>411250 | LocationPartyID<br>411252 |
| | | | | | | | | DeterminationMethodCode<br>411254 | | | | | 0..1<br>411256 | LocationDeterminationMethodCode<br>411258 |
| | | | | | | | | AddressReference<br>411260 | | | | | 0..1<br>411262 | LocationAddressReference<br>411264 |
| | | | Address<br>411266 | | | | | Address<br>411268 | | | | | 0..1<br>411270 | Address<br>411272 |
| | | | | | | | | | OrganisationFormOfAddress<br>411274 | | | | 0..1<br>411276 | FormOfAddress<br>411278 |

FIG. 41-41

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | OrganisationFormattedName 411280 | | | | 0..N 411282 | LANGUAGEINDEPENDENT_MEDIUM_Name 411284 |
| | | | | | PersonName 411286 | | | | 0..1 411288 | PersonName 411290 |
| | | | | | FunctionalTitleName 411292 | | | | 0..1 411294 | LANGUAGEINDEPENDENT_MEDIUM_Name 411296 |
| | | | | | DepartmentName 411298 | | | | 0..1 411300 | LANGUAGEINDEPENDENT_MEDIUM_Name 411302 |
| | | | | | Office 411306 | | | | 0..1 411308 | Office 411310 |

FIG. 41-42

| Package | | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|---|
| | | | | | | | | | Physical Address 411314 | | | | 0..1 411316 | PhysicalAddress 411318 |
| | | | | | | | | | | Country Code 411320 | | | 0..1 411322 | CountryCode 411324 |
| | | | | | | | | | | Country Name 411326 | | | 0..1 411328 | MEDIUM_Name 411330 |
| | | | | | | | | | | RegionCode 411332 | | | 0..1 411334 | RegionCode 411336 |
| | | | | | | | | | | RegionName 411338 | | | 0..1 411340 | LANGUAGEINDEPENDENT_MEDIUM_Name 411342 |
| | | | | | | | | | | StreetPostalCode 411344 | | | 0..1 411346 | PostalCode 411348 |

FIG. 41-43

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | POBoxPostalCode 411350 | | | 0..1 411352 | PostalCode 411354 |
| | | | | | | CompanyPostalCode 411356 | | | 0..1 411358 | PostalCode 411360 |
| | | | | | | CityName 411362 | | | 0..1 411364 | LANGUAGEINDEPENDENT_MEDIUM_Name 411366 |
| | | | | | | AdditionalCityName 411368 | | | 0..1 411370 | LANGUAGEINDEPENDENT_MEDIUM_Name 411372 |
| | | | | | | DistrictName 411374 | | | 0..1 411376 | LANGUAGEINDEPENDENT_MEDIUM_Name 411378 |

FIG. 41-44

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | POBoxID 411380 | | | 0..1 411382 | POBoxID 411384 |
| | | | | | | POBoxIndicator 411386 | | | 0..1 411388 | Indicator 411390 |
| | | | | | | POBoxCountryCode 411392 | | | 0..1 411394 | CountryCode 411396 |
| | | | | | | POBoxCountryName 411398 | | | 0..1 411400 | MEDIUM_Name 411402 |
| | | | | | | POBoxRegionCode 411404 | | | 0..1 411406 | RegionCode 411408 |

FIG. 41-45

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | POBoxRegionName 411410 | | | 0..1 411412 | LANGUAGEINDEPENDENT_MEDIUM_Name 411414 |
| | | | | | | POBoxCityName 411416 | | | 0..1 411418 | LANGUAGEINDEPENDENT_MEDIUM_Name 411420 |
| | | | | | | StreetName 411422 | | | 0..1 411424 | StreetName 411426 |
| | | | | | | StreetPrefixName 411428 | | | 0..N 411430 | LANGUAGEINDEPENDENT_MEDIUM_Name 411432 |
| | | | | | | StreetSuffixName 411434 | | | 0..N 411436 | LANGUAGEINDEPENDENT_MEDIUM_Name 411438 |

FIG. 41-46

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | HouseID 411440 | | | 0..1 411442 | HouseID 411444 |
| | | | | | | AdditionalHouseID 411446 | | | 0..1 411448 | HouseID 411450 |
| | | | | | | BuildingID 411452 | | | 0..1 411454 | BuildingID 411456 |
| | | | | | | FloorID 411458 | | | 0..1 411460 | FloorID 411462 |
| | | | | | | RoomID 411464 | | | 0..1 411466 | RoomID 411468 |
| | | | | | | CareOfName 411470 | | | 0..1 411472 | LANGUAGEINDEPENDENT_MEDIUM_Name 411474 |

FIG. 41-47

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | Description 411476 | | | 0..N 411478 | Description 411480 |
| | | | | | TaxJurisdictionCode 411482 | | | | 0..1 411484 | TaxJurisdictionCode 411486 |
| | | | | | TimeZoneDifferenceValue 411488 | | | | 0..1 411490 | TimeZoneDifferenceValue 411492 |
| | | | | | GeoCoordinates 411494 | | | | 0..1 411496 | GeoCoordinates 411498 |
| | | | | | Communication 411502 | | | | 0..1 411504 | Communication 411506 |

FIG. 41-48

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | CorrespondenceLanguageCode 411508 | | | 0..1 411510 | LanguageCode 411512 |
| | | | | | | CorrespondenceLanguageName 411514 | | | 0..1 411516 | MEDIUM_Name 411518 |
| | | | | | | Telephone 411520 | | | 0..N 411522 | Telephone 411524 |
| | | | | | | | Number 411526 | | 1 411528 | PhoneNumber 411530 |
| | | | | | | | SMSEnabledIndicator 411532 | | 0..1 411534 | Indicator 411536 |

FIG. 41-49

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | NumberDefaultIndicator 411538 | | 1 411540 | Indicator 411542 |
| | | | | | | | NumberDescription 411544 | | 0..N 411546 | Description 411548 |
| | | | | | | | NumberUsageDenialIndicator 411550 | | 1 411552 | Indicator 411554 |
| | | | | | | MobilePhone 411556 | | | 0..N 411558 | Telephone 411560 |
| | | | | | | | Number 411562 | | 1 411564 | PhoneNumber 411566 |

FIG. 41-50

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | SMSEnabledIndicator 411568 | | 0..1 411570 | Indicator 411572 |
| | | | | | | | Number DefaultIndicator 411574 | | 1 411576 | Indicator 411578 |
| | | | | | | | Number Description 411580 | | 0..N 411582 | Description 411584 |
| | | | | | | | Number UsageDenialIndicator 411586 | | 1 411588 | Indicator 411590 |
| | | | | | | Facsimile 411592 | | | 0..N 411594 | Facsimile 411596 |

FIG. 41-51

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | Number 411598 | | 1 411600 | PhoneNumber 411602 |
| | | | | | | | NumberDefaultIndicator 411604 | | 1 411606 | Indicator 411608 |
| | | | | | | | NumberDescription 411610 | | 0..N 411612 | Description 411614 |
| | | | | | | | NumberUsageDenialIndicator 411616 | | 1 411618 | Indicator 411620 |
| | | | | | | Email 411622 | | | 0..N 411624 | Email 411626 |
| | | | | | | | URI 411628 | | 1 411630 | EmailURI 411632 |

FIG. 41-52

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | URIDefaultIndicator 411634 | | 1 411636 | Indicator 411638 |
| | | | | | | | URIDescription 411640 | | 0..N 411642 | Description 411644 |
| | | | | | | | URIUsageDenialIndicator 411646 | | 1 411648 | Indicator 411650 |
| | | | | | | Web 411652 | | | 0..N 411654 | Web 411656 |
| | | | | | | | URI 411658 | | 1 411660 | WebURI 411662 |
| | | | | | | | URIDefaultIndicator 411664 | | 1 411666 | Indicator 411668 |

FIG. 41-53

| Package | | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|---|
| | | | | | | | | | | | URIDescription 411670 | | 0..N 411672 | Description 411674 |
| | | | | | | | | Note 411676 | | | | | 0..1 411678 | Note 411680 |
| | | | | | | | RequestorID 411682 | | | | | | 0..1 411684 | PaymentCardPaymentAuthorisationPartyID_V1 411686 |
| | | Party 411688 | | | | | PayeeParty 411690 | | | | | | 0..1 411692 | BusinessTransactionDocumentParty 411694 |
| | | | | | | | | InternalID 411696 | | | | | 0..1 411698 | PartyInternalID 411700 |
| | | | | | | | | StandardID 411702 | | | | | 0..N 411704 | PartyStandardID 411706 |

FIG. 41-54

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | BuyerID 411708 | | | | | 0..1 411710 | PartyPartyID 411712 |
| | | | | SellerID 411714 | | | | | 0..1 411716 | PartyPartyID 411718 |
| | | | | Product RecipientID 411720 | | | | | 0..1 411722 | PartyPartyID 411724 |
| | | | | VendorID 411726 | | | | | 0..1 411728 | PartyPartyID 411730 |
| | | | | BillToID 411732 | | | | | 0..1 411734 | PartyPartyID 411736 |
| | | | | BillFromID 411738 | | | | | 0..1 411740 | PartyPartyID 411742 |
| | | | | BidderID 411744 | | | | | 0..1 411746 | PartyPartyID 411748 |

FIG. 41-55

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | PaymentTransactionInitiatorID 411750 | | | | | 0..1 411752 | PartyPartyID 411754 |
| | | | | PaymentTransactionDestinatedID 411756 | | | | | 0..1 411758 | PartyPartyID 411760 |
| | | | | TaxID 411762 | | | | | 0..1 411764 | PartyTaxID 411766 |
| | | | | ClearingHouseID 411768 | | | | | 0..1 411770 | PartyPartyID 411772 |
| | | | | TypeCode 411774 | | | | | 0..1 411776 | BusinessObjectTypeCode 411778 |

FIG. 41-56

| Package | | | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|---|---|
| | | | | | | | | | DeterminationMethodCode 411780 | | | | | 0..1 411782 | PartyDeterminationMethodCode 411784 |
| | | | | | | | | | AddressReference 411786 | | | | | 0..1 411788 | PartyAddressReference 411790 |
| | | | Address 411792 | | | | | | Address 411794 | | | | | 0..1 411796 | Address 411798 |
| | | | | | | | | | | OrganisationFormOfAddress 411800 | | | | 0..1 411802 | FormOfAddress 411804 |
| | | | | | | | | | | OrganisationFormattedName 411806 | | | | 0..N 411808 | LANGUAGEINDEPENDENT_MEDIUM_Name 411810 |

FIG. 41-57

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | PersonName 411812 | | | | 0..1 411814 | PersonName 411816 |
| | | | | | FunctionalTitleName 411818 | | | | 0..1 411820 | LANGUAGEINDEPENDENT_MEDIUM_Name 411822 |
| | | | | | DepartmentName 411824 | | | | 0..1 411826 | LANGUAGEINDEPENDENT_MEDIUM_Name 411828 |
| | | | | | Office 411832 | | | | 0..1 411834 | Office 411836 |
| | | | | | Physical Address 411840 | | | | 0..1 411842 | PhysicalAddress 411844 |
| | | | | | | Country Code 411846 | | | 0..1 411848 | CountryCode 411850 |

FIG. 41-58

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | Country Name 411852 | | | 0..1 411854 | MEDIUM_Name 411856 |
| | | | | | | RegionCode 411858 | | | 0..1 411860 | RegionCode 411862 |
| | | | | | | RegionName 411864 | | | 0..1 411866 | LANGUAGEINDEPENDENT_MEDIUM_Name 411868 |
| | | | | | | StreetPostalCode 411870 | | | 0..1 411872 | PostalCode 411874 |
| | | | | | | POBoxPostalCode 411876 | | | 0..1 411878 | PostalCode 411880 |

FIG. 41-59

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | CompanyPostalCode 411882 | | | 0..1 411884 | PostalCode 411886 |
| | | | | | | CityName 411888 | | | 0..1 411890 | LANGUAGEINDEPENDENT_MEDIUM_Name 411892 |
| | | | | | | AdditionalCityName 411894 | | | 0..1 411896 | LANGUAGEINDEPENDENT_MEDIUM_Name 411898 |
| | | | | | | DistrictName 411900 | | | 0..1 411902 | LANGUAGEINDEPENDENT_MEDIUM_Name 411904 |
| | | | | | | POBoxID 411906 | | | 0..1 411908 | POBoxID 411910 |

FIG. 41-60

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | POBoxIndicator 411912 | | | 0..1 411914 | Indicator 411916 |
| | | | | | | POBoxCountryCode 411918 | | | 0..1 411920 | CountryCode 411922 |
| | | | | | | POBoxCountryName 411924 | | | 0..1 411926 | MEDIUM_Name 411928 |
| | | | | | | POBoxRegionCode 411930 | | | 0..1 411932 | RegionCode 411934 |
| | | | | | | POBoxRegionName 411936 | | | 0..1 411938 | LANGUAGEINDEPENDENT_MEDIUM_Name 411940 |

FIG. 41-61

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | POBoxCityName 411942 | | | 0..1 411944 | LANGUAGEINDEPENDENT_MEDIUM_Name 411946 |
| | | | | | | StreetName 411948 | | | 0..1 411950 | StreetName 411952 |
| | | | | | | StreetPrefixName 411954 | | | 0..N 411956 | LANGUAGEINDEPENDENT_MEDIUM_Name 411958 |
| | | | | | | StreetSuffixName 411960 | | | 0..N 411962 | LANGUAGEINDEPENDENT_MEDIUM_Name 411964 |
| | | | | | | HouseID 411966 | | | 0..1 411968 | HouseID 411970 |

FIG. 41-62

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | AdditionalHouseID 411972 | | | 0..1 411974 | HouseID 411976 |
| | | | | | | BuildingID 411978 | | | 0..1 411980 | BuildingID 411982 |
| | | | | | | FloorID 411984 | | | 0..1 411986 | FloorID 411988 |
| | | | | | | RoomID 411990 | | | 0..1 411992 | RoomID 411994 |
| | | | | | | CareOfName 411996 | | | 0..1 411998 | LANGUAGEINDEPENDENT_MEDIUM_Name 412000 |
| | | | | | | Description 412002 | | | 0..N 412004 | Description 412006 |

FIG. 41-63

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | TaxJurisdictionCode 412008 | | | | 0..1 412010 | TaxJurisdictionCode 412012 |
| | | | | | TimeZoneDifferenceValue 412014 | | | | 0..1 412016 | TimeZoneDifferenceValue 412018 |
| | | | | | GeoCoordinates 412020 | | | | 0..1 412022 | GeoCoordinates 412024 |
| | | | | | Communication 412028 | | | | 0..1 412030 | Communication 412032 |
| | | | | | | CorrespondenceLanguageCode 412034 | | | 0..1 412036 | LanguageCode 412038 |

FIG. 41-64

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | CorrespondenceLanguageName 412040 | | | 0..1 412042 | MEDIUM_Name 412044 |
| | | | | | | Telephone 412046 | | | 0..N 412048 | Telephone 412050 |
| | | | | | | | Number 412052 | | 1 412054 | PhoneNumber 412056 |
| | | | | | | | SMSEnabledIndicator 412058 | | 0..1 412060 | Indicator 412062 |
| | | | | | | | NumberDefaultIndicator 412064 | | 1 412066 | Indicator 412068 |

FIG. 41-65

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | NumberDescription 412070 | | 0..N 412072 | Description 412074 |
| | | | | | | | NumberUsageDenialIndicator 412076 | | 1 412078 | Indicator 412080 |
| | | | | | | MobilePhone 412082 | | | 0..N 412084 | Telephone 412086 |
| | | | | | | | Number 412088 | | 1 412090 | PhoneNumber 412092 |
| | | | | | | | SMSEnabledIndicator 412094 | | 0..1 412096 | Indicator 412098 |

FIG. 41-66

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | NumberDefaultIndicator 412100 | | 1 412102 | Indicator 412104 |
| | | | | | | | NumberDescription 412106 | | 0..N 412108 | Description 412110 |
| | | | | | | | NumberUsageDenialIndicator 412112 | | 1 412114 | Indicator 412116 |
| | | | | | | Facsimile 412118 | | | 0..N 412120 | Facsimile 412122 |
| | | | | | | | Number 412124 | | 1 412126 | PhoneNumber 412128 |

FIG. 41-67

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | Number DefaultIndicator 412130 | | 1 412132 | Indicator 412134 |
| | | | | | | | Number Description 412136 | | 0..N 412138 | Description 412140 |
| | | | | | | | Number UsageDenialIndicator 412142 | | 1 412144 | Indicator 412146 |
| | | | | | | Email 412148 | | | 0..N 412150 | Email 412152 |
| | | | | | | | URI 412154 | | 1 412156 | EmailURI 412158 |
| | | | | | | | URIDefaultIndicator 412160 | | 1 412162 | Indicator 412164 |

FIG. 41-68

| Package | | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|---|
| | | | | | | | | | | | URIDescription 412166 | | 0..N 412168 | Description 412170 |
| | | | | | | | | | | | URIUsageDenialIndicator 412172 | | 1 412174 | Indicator 412176 |
| | | | | | | | | | | Web 412178 | | | 0..N 412180 | Web 412182 |
| | | | | | | | | | | | URI 412184 | | 1 412186 | WebURI 412188 |
| | | | | | | | | | | | URIDefaultIndicator 412190 | | 1 412192 | Indicator 412194 |
| | | | | | | | | | | | URIDescription 412196 | | 0..N 412198 | Description 412200 |

FIG. 41-69

| Package | | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|---|
| | | | ContactPerson 412202 | | | | | ContactPerson 412204 | | | | | 0..N 412206 | ContactPerson 412208 |
| | | | | | | | | | InternalID 412210 | | | | 0..1 412212 | ContactPersonInternalID 412214 |
| | | | | | | | | | BuyerID 412216 | | | | 0..1 412218 | ContactPersonPartyID 412220 |
| | | | | | | | | | SellerID 412222 | | | | 0..1 412224 | ContactPersonPartyID 412226 |
| | | | | | | | | | ProductRecipientID 412228 | | | | 0..1 412230 | ContactPersonPartyID 412232 |
| | | | | | | | | | VendorID 412234 | | | | 0..1 412236 | ContactPersonPartyID 412238 |

FIG. 41-70

| Package | | | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|---|---|
| | | | | | | | | | | BillToID 412240 | | | | 0..1 412242 | ContactPersonPartyID 412244 |
| | | | | | | | | | | BillFromID 412246 | | | | 0..1 412248 | ContactPersonPartyID 412250 |
| | | | | | | | | | | BidderID 412252 | | | | 0..1 412254 | ContactPersonPartyID 412256 |
| | | | | | | | | | | AddressReference 412258 | | | | 0..1 412260 | PartyAddressReference 412262 |
| | | | | Address 412264 | | | | | | Address 412266 | | | | 0..1 412268 | Address 412270 |
| | | | | | | | | | | | OrganisationFormOfAddress 412272 | | | 0..1 412274 | FormOfAddress 412276 |

FIG. 41-71

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | OrganisationFormattedName 412278 | | | 0..N 412280 | LANGUAGEINDEPENDENT_MEDIUM_Name 412282 |
| | | | | | | PersonName 412284 | | | 0..1 412286 | PersonName 412288 |
| | | | | | | FunctionalTitleName 412290 | | | 0..1 412292 | LANGUAGEINDEPENDENT_MEDIUM_Name 412294 |
| | | | | | | DepartmentName 412296 | | | 0..1 412298 | LANGUAGEINDEPENDENT_MEDIUM_Name 412300 |
| | | | | | | Office 412304 | | | 0..1 412306 | Office 412308 |

FIG. 41-72

| Package | | | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|---|---|
| | | | | | | | | | | | Physical Address 412312 | | | 0..1 412314 | PhysicalAddress 412316 |
| | | | | | | | | | | | | Country Code 412318 | | 0..1 412320 | CountryCode 412322 |
| | | | | | | | | | | | | Country Name 412324 | | 0..1 412326 | MEDIUM_Name 412328 |
| | | | | | | | | | | | | RegionC ode 412330 | | 0..1 412332 | RegionCode 412334 |
| | | | | | | | | | | | | RegionN ame 412336 | | 0..1 412338 | LANGUAGEINDE PENDENT_MEDIU M_Name 412340 |
| | | | | | | | | | | | | StreetPo stalCode 412342 | | 0..1 412344 | PostalCode 412346 |

FIG. 41-73

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | POBoxPostalCode 412348 | | 0..1 412350 | PostalCode 412352 |
| | | | | | | | CompanyPostalCode 412354 | | 0..1 412356 | PostalCode 412358 |
| | | | | | | | CityName 412360 | | 0..1 412362 | LANGUAGEINDEPENDENT_MEDIUM_Name 412364 |
| | | | | | | | AdditionalCityName 412366 | | 0..1 412368 | LANGUAGEINDEPENDENT_MEDIUM_Name 412370 |
| | | | | | | | DistrictName 412372 | | 0..1 412374 | LANGUAGEINDEPENDENT_MEDIUM_Name 412376 |

FIG. 41-74

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | POBoxID 412378 | | 0..1 412380 | POBoxID 412382 |
| | | | | | | | POBoxIndicator 412384 | | 0..1 412386 | Indicator 412388 |
| | | | | | | | POBoxCountryCode 412390 | | 0..1 412392 | CountryCode 412394 |
| | | | | | | | POBoxCountryName 412396 | | 0..1 412398 | MEDIUM_Name 412400 |
| | | | | | | | POBoxRegionCode 412402 | | 0..1 412404 | RegionCode 412406 |

FIG. 41-75

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | POBoxRegionName 412408 | | 0..1 412410 | LANGUAGEINDEPENDENT_MEDIUM_Name 412412 |
| | | | | | | | POBoxCityName 412414 | | 0..1 412416 | LANGUAGEINDEPENDENT_MEDIUM_Name 412418 |
| | | | | | | | StreetName 412420 | | 0..1 412422 | StreetName 412424 |
| | | | | | | | StreetPrefixName 412426 | | 0..N 412428 | LANGUAGEINDEPENDENT_MEDIUM_Name 412430 |
| | | | | | | | StreetSuffixName 412432 | | 0..N 412434 | LANGUAGEINDEPENDENT_MEDIUM_Name 412436 |

FIG. 41-76

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | HouseID 412438 | | 0..1 412440 | HouseID 412442 |
| | | | | | | | AdditionalHouseID 412444 | | 0..1 412446 | HouseID 412448 |
| | | | | | | | BuildingID 412450 | | 0..1 412452 | BuildingID 412454 |
| | | | | | | | FloorID 412456 | | 0..1 412458 | FloorID 412460 |
| | | | | | | | RoomID 412462 | | 0..1 412464 | RoomID 412466 |
| | | | | | | | CareOfName 412468 | | 0..1 412470 | LANGUAGEINDEPENDENT_MEDIUM_Name 412472 |

FIG. 41-77

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | Description 412474 | | 0..N 412476 | Description 412478 |
| | | | | | | TaxJurisdictionCode 412480 | | | 0..1 412482 | TaxJurisdictionCode 412484 |
| | | | | | | TimeZoneDifferenceValue 412486 | | | 0..1 412488 | TimeZoneDifferenceValue 412490 |
| | | | | | | GeoCoordinates 412492 | | | 0..1 412494 | GeoCoordinates 412496 |
| | | | | | | Communication 412500 | | | 0..1 412502 | Communication 412504 |

FIG. 41-78

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | CorrespondenceLanguageCode 412506 | | 0..1 412508 | LanguageCode 412510 |
| | | | | | | | CorrespondenceLanguageName 412512 | | 0..1 412514 | MEDIUM_Name 412516 |
| | | | | | | | Telephone 412518 | | 0..N 412520 | Telephone 412522 |
| | | | | | | | | Number 412524 | 1 412526 | PhoneNumber 412528 |
| | | | | | | | | SMSEnabledIndicator 412530 | 0..1 412532 | Indicator 412534 |

FIG. 41-79

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | | Number DefaultIndicator 412536 | 1 412538 | Indicator 412540 |
| | | | | | | | | Number Description 412542 | 0..N 412544 | Description 412546 |
| | | | | | | | | Number UsageDenialIndicator 412548 | 1 412550 | Indicator 412552 |
| | | | | | | | MobilePhone 412554 | | 0..N 412556 | Telephone 412558 |
| | | | | | | | | Number 412560 | 1 412562 | PhoneNumber 412564 |

FIG. 41-80

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | | SMSEnabledIndicator 412566 | 0..1 412568 | Indicator 412570 |
| | | | | | | | | NumberDefaultIndicator 412572 | 1 412574 | Indicator 412576 |
| | | | | | | | | NumberDescription 412578 | 0..N 412580 | Description 412582 |
| | | | | | | | | NumberUsageDenialIndicator 412584 | 1 412586 | Indicator 412588 |
| | | | | | | | Facsimile 412590 | | 0..N 412592 | Facsimile 412594 |

FIG. 41-81

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | | Number 412596 | 1 412598 | PhoneNumber 412600 |
| | | | | | | | | NumberDefaultIndicator 412602 | 1 412604 | Indicator 412606 |
| | | | | | | | | NumberDescription 412608 | 0..N 412610 | Description 412612 |
| | | | | | | | | NumberUsageDenialIndicator 412614 | 1 412616 | Indicator 412618 |
| | | | | | | | Email 412620 | | 0..N 412622 | Email 412624 |
| | | | | | | | | URI 412626 | 1 412628 | EmailURI 412630 |

FIG. 41-82

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | | URIDefaultIndicator 412632 | 1 412634 | Indicator 412636 |
| | | | | | | | | URIDescription 412638 | 0..N 412640 | Description 412642 |
| | | | | | | | | URIUsageDenialIndicator 412644 | 1 412646 | Indicator 412648 |
| | | | | | | | Web 412650 | | 0..N 412652 | Web 412654 |
| | | | | | | | | URI 412656 | 1 412658 | WebURI 412660 |
| | | | | | | | | URIDefaultIndicator 412662 | 1 412664 | Indicator 412666 |

FIG. 41-83

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | | URIDescription 412668 | 0..N 412670 | Description 412672 |
| | | | PayerParty 412676 | | | | | | 0..1 412678 | BusinessTransactionDocumentParty 412680 |
| | | | | InternalID 412682 | | | | | 0..1 412684 | PartyInternalID 412686 |
| | | | | StandardID 412688 | | | | | 0..N 412690 | PartyStandardID 412692 |
| | | | | BuyerID 412694 | | | | | 0..1 412696 | PartyPartyID 412698 |
| | | | | SellerID 412700 | | | | | 0..1 412702 | PartyPartyID 412704 |

FIG. 41-84

| Package | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|
| | | | | | | | ProductRecipientID 412706 | | | | | 0..1 412708 | PartyPartyID 412710 |
| | | | | | | | VendorID 412712 | | | | | 0..1 412714 | PartyPartyID 412716 |
| | | | | | | | BillToID 412718 | | | | | 0..1 412720 | PartyPartyID 412722 |
| | | | | | | | BillFromID 412724 | | | | | 0..1 412726 | PartyPartyID 412728 |
| | | | | | | | BidderID 412730 | | | | | 0..1 412732 | PartyPartyID 412734 |
| | | | | | | | PaymentTransactionInitiatorID 412736 | | | | | 0..1 412738 | PartyPartyID 412740 |

FIG. 41-85

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | PaymentTransactionDestinatedID 412742 | | | | | 0..1 412744 | PartyPartyID 412746 |
| | | | | TaxID 412748 | | | | | 0..1 412750 | PartyTaxID 412752 |
| | | | | ClearingHouseID 412754 | | | | | 0..1 412756 | PartyPartyID 412758 |
| | | | | TypeCode 412760 | | | | | 0..1 412762 | BusinessObjectTypeCode 412764 |
| | | | | DeterminationMethodCode 412766 | | | | | 0..1 412768 | PartyDeterminationMethodCode 412770 |

FIG. 41-86

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | AddressReference 412772 | | | | | 0..1 412774 | PartyAddressReference 412776 |
| Address 412778 | | | | Address 412780 | | | | | 0..1 412782 | Address 412784 |
| | | | | | OrganisationFormOfAddress 412786 | | | | 0..1 412788 | FormOfAddress 412790 |
| | | | | | OrganisationFormattedName 412792 | | | | 0..N 412794 | LANGUAGEINDEPENDENT_MEDIUM_Name 412796 |
| | | | | | PersonName 412798 | | | | 0..1 412800 | PersonName 412802 |

FIG. 41-87

| Package | | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|---|
| | | | | | | | | | FunctionalTitleName 412804 | | | | 0..1 412806 | LANGUAGEINDEPENDENT_MEDIUM_Name 412808 |
| | | | | | | | | | DepartmentName 412810 | | | | 0..1 412812 | LANGUAGEINDEPENDENT_MEDIUM_Name 412814 |
| | | | | | | | | | Office 412818 | | | | 0..1 412820 | Office 412822 |
| | | | | | | | | | Physical Address 412826 | | | | 0..1 412828 | PhysicalAddress 412830 |
| | | | | | | | | | | Country Code 412832 | | | 0..1 412834 | CountryCode 412836 |
| | | | | | | | | | | Country Name 412838 | | | 0..1 412840 | MEDIUM_Name 412842 |

FIG. 41-88

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | RegionCode 412844 | | | 0..1 412846 | RegionCode 412848 |
| | | | | | | RegionName 412850 | | | 0..1 412852 | LANGUAGEINDEPENDENT_MEDIUM_Name 412854 |
| | | | | | | StreetPostalCode 412856 | | | 0..1 412858 | PostalCode 412860 |
| | | | | | | POBoxPostalCode 412862 | | | 0..1 412864 | PostalCode 412866 |
| | | | | | | CompanyPostalCode 412868 | | | 0..1 412870 | PostalCode 412872 |

FIG. 41-89

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | CityName 412874 | | | 0..1 412876 | LANGUAGEINDEPENDENT_MEDIUM_Name 412878 |
| | | | | | | AdditionalCityName 412880 | | | 0..1 412882 | LANGUAGEINDEPENDENT_MEDIUM_Name 412884 |
| | | | | | | DistrictName 412886 | | | 0..1 412888 | LANGUAGEINDEPENDENT_MEDIUM_Name 412890 |
| | | | | | | POBoxID 412892 | | | 0..1 412894 | POBoxID 412896 |
| | | | | | | POBoxIndicator 412898 | | | 0..1 412900 | Indicator 412902 |

FIG. 41-90

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | POBoxCountryCode 412904 | | | 0..1 412906 | CountryCode 412908 |
| | | | | | | POBoxCountryName 412910 | | | 0..1 412912 | MEDIUM_Name 412914 |
| | | | | | | POBoxRegionCode 412916 | | | 0..1 412918 | RegionCode 412920 |
| | | | | | | POBoxRegionName 412922 | | | 0..1 412924 | LANGUAGEINDEPENDENT_MEDIUM_Name 412926 |
| | | | | | | POBoxCityName 412928 | | | 0..1 412930 | LANGUAGEINDEPENDENT_MEDIUM_Name 412932 |

FIG. 41-91

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | StreetName 412934 | | | 0..1 412936 | StreetName 412938 |
| | | | | | | StreetPrefixName 412940 | | | 0..N 412942 | LANGUAGEINDEPENDENT_MEDIUM_Name 412944 |
| | | | | | | StreetSuffixName 412946 | | | 0..N 412948 | LANGUAGEINDEPENDENT_MEDIUM_Name 412950 |
| | | | | | | HouseID 412952 | | | 0..1 412954 | HouseID 412956 |
| | | | | | | AdditionalHouseID 412958 | | | 0..1 412960 | HouseID 412962 |
| | | | | | | BuildingID 412964 | | | 0..1 412966 | BuildingID 412968 |

FIG. 41-92

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | FloorID 412970 | | | 0..1 412972 | FloorID 412974 |
| | | | | | | RoomID 412976 | | | 0..1 412978 | RoomID 412980 |
| | | | | | | CareOfName 412982 | | | 0..1 412984 | LANGUAGEINDEPENDENT_MEDIUM_Name 412986 |
| | | | | | | Description 412988 | | | 0..N 412990 | Description 412992 |
| | | | | | TaxJurisdictionCode 412994 | | | | 0..1 412996 | TaxJurisdictionCode 412998 |
| | | | | | TimeZoneDifferenceValue 413000 | | | | 0..1 413002 | TimeZoneDifferenceValue 413004 |

FIG. 41-93

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | GeoCoordinates 413006 | | | | 0..1 413008 | GeoCoordinates 413010 |
| | | | | | Communication 413014 | | | | 0..1 413016 | Communication 413018 |
| | | | | | | CorrespondenceLanguageCode 413020 | | | 0..1 413022 | LanguageCode 413024 |
| | | | | | | CorrespondenceLanguageName 413026 | | | 0..1 413028 | MEDIUM_Name 413030 |
| | | | | | | Telephone 413032 | | | 0..N 413034 | Telephone 413036 |

FIG. 41-94

| Package | | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|---|
| | | | | | | | | | | | Number 413038 | | 1 413040 | PhoneNumber 413042 |
| | | | | | | | | | | | SMSEnabledIndicator 413044 | | 0..1 413046 | Indicator 413048 |
| | | | | | | | | | | | NumberDefaultIndicator 413050 | | 1 413052 | Indicator 413054 |
| | | | | | | | | | | | NumberDescription 413056 | | 0..N 413058 | Description 413060 |
| | | | | | | | | | | | NumberUsageDenialIndicator 413062 | | 1 413064 | Indicator 413066 |

FIG. 41-95

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | MobilePhone 413068 | | | 0..N 413070 | Telephone 413072 |
| | | | | | | | Number 413074 | | 1 413076 | PhoneNumber 413078 |
| | | | | | | | SMSEnabledIndicator 413080 | | 0..1 413082 | Indicator 413084 |
| | | | | | | | Number DefaultIndicator 413086 | | 1 413088 | Indicator 413090 |
| | | | | | | | Number Description 413092 | | 0..N 413094 | Description 413096 |

FIG. 41-96

| Package | | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|---|
| | | | | | | | | | | | NumberUsageDenialIndicator 413098 | | 1 413100 | Indicator 413102 |
| | | | | | | | | | | Facsimile 413104 | | | 0..N 413106 | Facsimile 413108 |
| | | | | | | | | | | | Number 413110 | | 1 413112 | PhoneNumber 413114 |
| | | | | | | | | | | | NumberDefaultIndicator 413116 | | 1 413118 | Indicator 413120 |
| | | | | | | | | | | | NumberDescription 413122 | | 0..N 413124 | Description 413126 |

FIG. 41-97

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | NumberUsageDenialIndicator 413128 | | 1 413130 | Indicator 413132 |
| | | | | | | Email 413134 | | | 0..N 413136 | Email 413138 |
| | | | | | | | URI 413140 | | 1 413142 | EmailURI 413144 |
| | | | | | | | URIDefaultIndicator 413146 | | 1 413148 | Indicator 413150 |
| | | | | | | | URIDescription 413152 | | 0..N 413154 | Description 413156 |
| | | | | | | | URIUsageDenialIndicator 413158 | | 1 413160 | Indicator 413162 |

FIG. 41-98

| Package | | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|---|
| | | | | | | | | | | Web 413164 | | | 0..N 413166 | Web 413168 |
| | | | | | | | | | | | URI 413170 | | 1 413172 | WebURI 413174 |
| | | | | | | | | | | | URIDefaultIndicator 413176 | | 1 413178 | Indicator 413180 |
| | | | | | | | | | | | URIDescription 413182 | | 0..N 413184 | Description 413186 |
| | | | ContactPerson 413188 | | | | | ContactPerson 413190 | | | | | 0..N 413192 | ContactPerson 413194 |
| | | | | | | | | | InternalID 413196 | | | | 0..1 413198 | ContactPersonInternalID 413200 |
| | | | | | | | | | BuyerID 413202 | | | | 0..1 413204 | ContactPersonPartyID 413206 |

FIG. 41-99

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | SellerID 413208 | | | | 0..1 413210 | ContactPersonPartyID 413212 |
| | | | | | ProductRecipientID 413214 | | | | 0..1 413216 | ContactPersonPartyID 413218 |
| | | | | | VendorID 413220 | | | | 0..1 413222 | ContactPersonPartyID 413224 |
| | | | | | BillToID 413226 | | | | 0..1 413228 | ContactPersonPartyID 413230 |
| | | | | | BillFromID 413232 | | | | 0..1 413234 | ContactPersonPartyID 413236 |
| | | | | | BidderID 413238 | | | | 0..1 413240 | ContactPersonPartyID 413242 |

FIG. 41-100

| Package | | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|---|
| | | | | | | | | | AddressReference 413244 | | | | 0..1 413246 | PartyAddressReference 413248 |
| | | | | Address 413250 | | | | | Address 413252 | | | | 0..1 413254 | Address 413256 |
| | | | | | | | | | | OrganisationFormOfAddress 413258 | | | 0..1 413260 | FormOfAddress 413262 |
| | | | | | | | | | | OrganisationFormattedName 413264 | | | 0..N 413266 | LANGUAGEINDEPENDENT_MEDIUM_Name 413268 |
| | | | | | | | | | | PersonName 413270 | | | 0..1 413272 | PersonName 413274 |

FIG. 41-101

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | FunctionalTitleName 413276 | | | 0..1 413278 | LANGUAGEINDEPENDENT_MEDIUM_Name 413280 |
| | | | | | | DepartmentName 413282 | | | 0..1 413284 | LANGUAGEINDEPENDENT_MEDIUM_Name 413286 |
| | | | | | | Office 413290 | | | 0..1 413292 | Office 413294 |
| | | | | | | Physical Address 413298 | | | 0..1 413300 | PhysicalAddress 413302 |
| | | | | | | | Country Code 413304 | | 0..1 413306 | CountryCode 413308 |
| | | | | | | | Country Name 413310 | | 0..1 413312 | MEDIUM_Name 413314 |

FIG. 41-102

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | RegionCode 413316 | | 0..1 413318 | RegionCode 413320 |
| | | | | | | | RegionName 413322 | | 0..1 413324 | LANGUAGEINDEPENDENT_MEDIUM_Name 413326 |
| | | | | | | | StreetPostalCode 413328 | | 0..1 413330 | PostalCode 413332 |
| | | | | | | | POBoxPostalCode 413334 | | 0..1 413336 | PostalCode 413338 |
| | | | | | | | CompanyPostalCode 413340 | | 0..1 413342 | PostalCode 413344 |

FIG. 41-103

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | CityName 413346 | | 0..1 413348 | LANGUAGEINDEPENDENT_MEDIUM_Name 413350 |
| | | | | | | | AdditionalCityName 413352 | | 0..1 413354 | LANGUAGEINDEPENDENT_MEDIUM_Name 413356 |
| | | | | | | | DistrictName 413358 | | 0..1 413360 | LANGUAGEINDEPENDENT_MEDIUM_Name 413362 |
| | | | | | | | POBoxID 413364 | | 0..1 413366 | POBoxID 413368 |
| | | | | | | | POBoxIndicator 413370 | | 0..1 413372 | Indicator 413374 |

FIG. 41-104

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | POBoxCountryCode 413376 | | 0..1 413378 | CountryCode 413380 |
| | | | | | | | POBoxCountryName 413382 | | 0..1 413384 | MEDIUM_Name 413386 |
| | | | | | | | POBoxRegionCode 413388 | | 0..1 413390 | RegionCode 413392 |
| | | | | | | | POBoxRegionName 413394 | | 0..1 413396 | LANGUAGEINDEPENDENT_MEDIUM_Name 413398 |
| | | | | | | | POBoxCityName 413400 | | 0..1 413402 | LANGUAGEINDEPENDENT_MEDIUM_Name 413404 |

FIG. 41-105

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | StreetName 413406 | | 0..1 413408 | StreetName 413410 |
| | | | | | | | StreetPrefixName 413412 | | 0..N 413414 | LANGUAGEINDEPENDENT_MEDIUM_Name 413416 |
| | | | | | | | StreetSuffixName 413418 | | 0..N 413420 | LANGUAGEINDEPENDENT_MEDIUM_Name 413422 |
| | | | | | | | HouseID 413424 | | 0..1 413426 | HouseID 413428 |
| | | | | | | | AdditionalHouseID 413430 | | 0..1 413432 | HouseID 413434 |
| | | | | | | | BuildingID 413436 | | 0..1 413438 | BuildingID 413440 |

FIG. 41-106

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | FloorID 413442 | | 0..1 413444 | FloorID 413446 |
| | | | | | | | RoomID 413448 | | 0..1 413450 | RoomID 413452 |
| | | | | | | | CareOfName 413454 | | 0..1 413456 | LANGUAGEINDEPENDENT_MEDIUM_Name 413458 |
| | | | | | | | Description 413460 | | 0..N 413462 | Description 413464 |
| | | | | | | TaxJurisdictionCode 413466 | | | 0..1 413468 | TaxJurisdictionCode 413470 |
| | | | | | | TimeZoneDifferenceValue 413472 | | | 0..1 413474 | TimeZoneDifferenceValue 413476 |

FIG. 41-107

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | GeoCoordinates 413478 | | | 0..1 413480 | GeoCoordinates 413482 |
| | | | | | | Communication 413486 | | | 0..1 413488 | Communication 413490 |
| | | | | | | | CorrespondenceLanguageCode 413492 | | 0..1 413494 | LanguageCode 413496 |
| | | | | | | | CorrespondenceLanguageName 413498 | | 0..1 413500 | MEDIUM_Name 413502 |
| | | | | | | | Telephone 413504 | | 0..N 413506 | Telephone 413508 |

FIG. 41-108

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | | Number 413510 | 1 413512 | PhoneNumber 413514 |
| | | | | | | | | SMSEnabledIndicator 413516 | 0..1 413518 | Indicator 413520 |
| | | | | | | | | NumberDefaultIndicator 413522 | 1 413524 | Indicator 413526 |
| | | | | | | | | NumberDescription 413528 | 0..N 413530 | Description 413532 |
| | | | | | | | | NumberUsageDenialIndicator 413534 | 1 413536 | Indicator 413538 |

FIG. 41-109

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | MobilePhone 413540 | | 0..N 413542 | Telephone 413544 |
| | | | | | | | | Number 413546 | 1 413548 | PhoneNumber 413550 |
| | | | | | | | | SMSEnabledIndicator 413552 | 0..1 413554 | Indicator 413556 |
| | | | | | | | | NumberDefaultIndicator 413558 | 1 413560 | Indicator 413562 |
| | | | | | | | | NumberDescription 413564 | 0..N 413566 | Description 413568 |

FIG. 41-110

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | | NumberUsageDenialIndicator 413570 | 1 413572 | Indicator 413574 |
| | | | | | | | Facsimile 413576 | | 0..N 413578 | Facsimile 413580 |
| | | | | | | | | Number 413582 | 1 413584 | PhoneNumber 413586 |
| | | | | | | | | NumberDefaultIndicator 413588 | 1 413590 | Indicator 413592 |
| | | | | | | | | NumberDescription 413594 | 0..N 413596 | Description 413598 |

FIG. 41-111

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | | NumberUsageDenialIndicator 413600 | 1 413602 | Indicator 413604 |
| | | | | | | | Email 413606 | | 0..N 413608 | Email 413610 |
| | | | | | | | | URI 413612 | 1 413614 | EmailURI 413616 |
| | | | | | | | | URIDefaultIndicator 413618 | 1 413620 | Indicator 413622 |
| | | | | | | | | URIDescription 413624 | 0..N 413626 | Description 413628 |
| | | | | | | | | URIUsageDenialIndicator 413630 | 1 413632 | Indicator 413634 |

FIG. 41-112

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | Web 413636 | | 0..N 413638 | Web 413640 |
| | | | | | | | | URI 413642 | 1 413644 | WebURI 413646 |
| | | | | | | | | URIDefaultIndicator 413648 | 1 413650 | Indicator 413652 |
| | | | | | | | | URIDescription 413654 | 0..N 413656 | Description 413658 |
| | | | ClearingHouseParty 413662 | | | | | | 0..1 413664 | BusinessTransactionDocumentParty 413666 |
| | | | | InternalID 413668 | | | | | 0..1 413670 | PartyInternalID 413672 |

FIG. 41-113

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | StandardID 413674 | | | | | 0..N 413676 | PartyStandardID 413678 |
| | | | | BuyerID 413680 | | | | | 0..1 413682 | PartyPartyID 413684 |
| | | | | SellerID 413686 | | | | | 0..1 413688 | PartyPartyID 413690 |
| | | | | ProductRecipientID 413692 | | | | | 0..1 413694 | PartyPartyID 413696 |
| | | | | VendorID 413698 | | | | | 0..1 413700 | PartyPartyID 413702 |
| | | | | BillToID 413704 | | | | | 0..1 413706 | PartyPartyID 413708 |
| | | | | BillFromID 413710 | | | | | 0..1 413712 | PartyPartyID 413714 |

FIG. 41-114

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | BidderID 413716 | | | | | 0..1 413718 | PartyPartyID 413720 |
| | | | | PaymentTransactionInitiatorID 413722 | | | | | 0..1 413724 | PartyPartyID 413726 |
| | | | | PaymentTransactionDestinatedID 413728 | | | | | 0..1 413730 | PartyPartyID 413732 |
| | | | | TaxID 413734 | | | | | 0..1 413736 | PartyTaxID 413738 |
| | | | | ClearingHouseID 413740 | | | | | 0..1 413742 | PartyPartyID 413744 |

FIG. 41-115

| Package | | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|---|
| | | | | | | | | TypeCode 413746 | | | | | 0..1 413748 | BusinessObjectTypeCode 413750 |
| | | | | | | | | DeterminationMethodCode 413752 | | | | | 0..1 413754 | PartyDeterminationMethodCode 413756 |
| | | | | | | | | AddressReference 413758 | | | | | 0..1 413760 | PartyAddressReference 413762 |
| | | | Address 413764 | | | | | Address 413766 | | | | | 0..1 413768 | Address 413770 |
| | | | | | | | | | OrganisationFormOfAddress 413772 | | | | 0..1 413774 | FormOfAddress 413776 |

FIG. 41-116

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | OrganisationFormattedName 413778 | | | | 0..N 413780 | LANGUAGEINDEPENDENT_MEDIUM_Name 413782 |
| | | | | | PersonName 413784 | | | | 0..1 413786 | PersonName 413788 |
| | | | | | FunctionalTitleName 413790 | | | | 0..1 413792 | LANGUAGEINDEPENDENT_MEDIUM_Name 413794 |
| | | | | | DepartmentName 413796 | | | | 0..1 413798 | LANGUAGEINDEPENDENT_MEDIUM_Name 413800 |
| | | | | | Office 413804 | | | | 0..1 413806 | Office 413808 |

FIG. 41-117

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | Physical Address 413812 | | | | 0..1 413814 | PhysicalAddress 413816 |
| | | | | | | Country Code 413818 | | | 0..1 413820 | CountryCode 413822 |
| | | | | | | Country Name 413824 | | | 0..1 413826 | MEDIUM_Name 413828 |
| | | | | | | RegionCode 413830 | | | 0..1 413832 | RegionCode 413834 |
| | | | | | | RegionName 413836 | | | 0..1 413838 | LANGUAGEINDEPENDENT_MEDIUM_Name 413840 |
| | | | | | | StreetPostalCode 413842 | | | 0..1 413844 | PostalCode 413846 |

FIG. 41-118

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | POBoxPostalCode 413848 | | | 0..1 413850 | PostalCode 413852 |
| | | | | | | CompanyPostalCode 413854 | | | 0..1 413856 | PostalCode 413858 |
| | | | | | | CityName 413860 | | | 0..1 413862 | LANGUAGEINDEPENDENT_MEDIUM_Name 413864 |
| | | | | | | AdditionalCityName 413866 | | | 0..1 413868 | LANGUAGEINDEPENDENT_MEDIUM_Name 413870 |
| | | | | | | DistrictName 413872 | | | 0..1 413874 | LANGUAGEINDEPENDENT_MEDIUM_Name 413876 |

FIG. 41-119

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | POBoxID 413878 | | | 0..1 413880 | POBoxID 413882 |
| | | | | | | POBoxIndicator 413884 | | | 0..1 413886 | Indicator 413888 |
| | | | | | | POBoxCountryCode 413890 | | | 0..1 413892 | CountryCode 413894 |
| | | | | | | POBoxCountryName 413896 | | | 0..1 413898 | MEDIUM_Name 413900 |
| | | | | | | POBoxRegionCode 413902 | | | 0..1 413904 | RegionCode 413906 |

FIG. 41-120

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | POBoxRegionName 413908 | | | 0..1 413910 | LANGUAGEINDEPENDENT_MEDIUM_Name 413912 |
| | | | | | | POBoxCityName 413914 | | | 0..1 413916 | LANGUAGEINDEPENDENT_MEDIUM_Name 413918 |
| | | | | | | StreetName 413920 | | | 0..1 413922 | StreetName 413924 |
| | | | | | | StreetPrefixName 413926 | | | 0..N 413928 | LANGUAGEINDEPENDENT_MEDIUM_Name 413930 |
| | | | | | | StreetSuffixName 413932 | | | 0..N 413934 | LANGUAGEINDEPENDENT_MEDIUM_Name 413936 |

FIG. 41-121

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | HouseID 413938 | | | 0..1 413940 | HouseID 413942 |
| | | | | | | AdditionalHouseID 413944 | | | 0..1 413946 | HouseID 413948 |
| | | | | | | BuildingID 413950 | | | 0..1 413952 | BuildingID 413954 |
| | | | | | | FloorID 413956 | | | 0..1 413958 | FloorID 413960 |
| | | | | | | RoomID 413962 | | | 0..1 413964 | RoomID 413966 |
| | | | | | | CareOfName 413968 | | | 0..1 413970 | LANGUAGEINDEPENDENT_MEDIUM_Name 413972 |

FIG. 41-122

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | Description 413974 | | | 0..N 413976 | Description 413978 |
| | | | | | TaxJurisdictionCode 413980 | | | | 0..1 413982 | TaxJurisdictionCode 413984 |
| | | | | | TimeZoneDifferenceValue 413986 | | | | 0..1 413988 | TimeZoneDifferenceValue 413990 |
| | | | | | GeoCoordinates 413992 | | | | 0..1 413994 | GeoCoordinates 413996 |
| | | | | | Communication 414000 | | | | 0..1 414002 | Communication 414004 |

FIG. 41-123

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | CorrespondenceLanguageCode 414006 | | | 0..1 414008 | LanguageCode 414010 |
| | | | | | | CorrespondenceLanguageName 414012 | | | 0..1 414014 | MEDIUM_Name 414016 |
| | | | | | | Telephone 414018 | | | 0..N 414020 | Telephone 414022 |
| | | | | | | | Number 414024 | | 1 414026 | PhoneNumber 414028 |
| | | | | | | | SMSEnabledIndicator 414030 | | 0..1 414032 | Indicator 414034 |

FIG. 41-124

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | NumberDefaultIndicator 414036 | | 1 414038 | Indicator 414040 |
| | | | | | | | NumberDescription 414042 | | 0..N 414044 | Description 414046 |
| | | | | | | | NumberUsageDenialIndicator 414048 | | 1 414050 | Indicator 414052 |
| | | | | | | MobilePhone 414054 | | | 0..N 414056 | Telephone 414058 |
| | | | | | | | Number 414060 | | 1 414062 | PhoneNumber 414064 |

FIG. 41-125

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | SMSEnabledIndicator 414066 | | 0..1 414068 | Indicator 414070 |
| | | | | | | | NumberDefaultIndicator 414072 | | 1 414074 | Indicator 414076 |
| | | | | | | | NumberDescription 414078 | | 0..N 414080 | Description 414082 |
| | | | | | | | NumberUsageDenialIndicator 414084 | | 1 414086 | Indicator 414088 |
| | | | | | | Facsimile 414090 | | | 0..N 414092 | Facsimile 414094 |

FIG. 41-126

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | Number 414096 | | 1 414098 | PhoneNumber 414100 |
| | | | | | | | Number DefaultIn dicator 414102 | | 1 414104 | Indicator 414106 |
| | | | | | | | Number Descripti on 414108 | | 0..N 414110 | Description 414112 |
| | | | | | | | Number UsageD enialIndi cator 414114 | | 1 414116 | Indicator 414118 |
| | | | | | | Email 414120 | | | 0..N 414122 | Email 414124 |
| | | | | | | | URI 414126 | | 1 414128 | EmailURI 414130 |

FIG. 41-127

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | URIDefaultIndicator 414132 | | 1 414134 | Indicator 414136 |
| | | | | | | | URIDescription 414138 | | 0..N 414140 | Description 414142 |
| | | | | | | | URIUsageDeniallndicator 414144 | | 1 414146 | Indicator 414148 |
| | | | | | | Web 414150 | | | 0..N 414152 | Web 414154 |
| | | | | | | | URI 414156 | | 1 414158 | WebURI 414160 |
| | | | | | | | URIDefaultIndicator 414162 | | 1 414164 | Indicator 414166 |

FIG. 41-128

| Package | | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|---|
| | | | | | | | | | | | URIDescription 414168 | | 0..N 414170 | Description 414172 |
| | | | ContactPerson 414174 | | | | | ContactPerson 414176 | | | | | 0..N 414178 | ContactPerson 414180 |
| | | | | | | | | | InternalID 414182 | | | | 0..1 414184 | ContactPersonInternalID 414186 |
| | | | | | | | | | BuyerID 414188 | | | | 0..1 414190 | ContactPersonPartyID 414192 |
| | | | | | | | | | SellerID 414194 | | | | 0..1 414196 | ContactPersonPartyID 414198 |
| | | | | | | | | | ProductRecipientID 414200 | | | | 0..1 414202 | ContactPersonPartyID 414204 |

FIG. 41-129

| Package | | | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|---|---|
| | | | | | | | | | | VendorID 414206 | | | | 0..1 414208 | ContactPersonPartyID 414210 |
| | | | | | | | | | | BillToID 414212 | | | | 0..1 414214 | ContactPersonPartyID 414216 |
| | | | | | | | | | | BillFromID 414218 | | | | 0..1 414220 | ContactPersonPartyID 414222 |
| | | | | | | | | | | BidderID 414224 | | | | 0..1 414226 | ContactPersonPartyID 414228 |
| | | | | | | | | | | AddressReference 414230 | | | | 0..1 414232 | PartyAddressReference 414234 |
| | | | | Address 414236 | | | | | | Address 414238 | | | | 0..1 414240 | Address 414242 |

FIG. 41-130

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | OrganisationFormOfAddress 414244 | | | 0..1 414246 | FormOfAddress 414248 |
| | | | | | | OrganisationFormattedName 414250 | | | 0..N 414252 | LANGUAGEINDEPENDENT_MEDIUM_Name 414254 |
| | | | | | | PersonName 414256 | | | 0..1 414258 | PersonName 414260 |
| | | | | | | FunctionalTitleName 414262 | | | 0..1 414264 | LANGUAGEINDEPENDENT_MEDIUM_Name 414266 |
| | | | | | | DepartmentName 414268 | | | 0..1 414270 | LANGUAGEINDEPENDENT_MEDIUM_Name 414272 |

FIG. 41-131

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | Office 414276 | | | 0..1 414278 | Office 414280 |
| | | | | | | Physical Address 414284 | | | 0..1 414286 | PhysicalAddress 414288 |
| | | | | | | | Country Code 414290 | | 0..1 414292 | CountryCode 414294 |
| | | | | | | | Country Name 414296 | | 0..1 414298 | MEDIUM_Name 414300 |
| | | | | | | | RegionC ode 414302 | | 0..1 414304 | RegionCode 414306 |
| | | | | | | | RegionN ame 414308 | | 0..1 414310 | LANGUAGEINDE PENDENT_MEDIU M_Name 414312 |

FIG. 41-132

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | StreetPostalCode 414314 | | 0..1 414316 | PostalCode 414318 |
| | | | | | | | POBoxPostalCode 414320 | | 0..1 414322 | PostalCode 414324 |
| | | | | | | | CompanyPostalCode 414326 | | 0..1 414328 | PostalCode 414330 |
| | | | | | | | CityName 414332 | | 0..1 414334 | LANGUAGEINDEPENDENT_MEDIUM_Name 414336 |
| | | | | | | | AdditionalCityName 414338 | | 0..1 414340 | LANGUAGEINDEPENDENT_MEDIUM_Name 414342 |

FIG. 41-133

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | DistrictName 414344 | | 0..1 414346 | LANGUAGEINDEPENDENT_MEDIUM_Name 414348 |
| | | | | | | | POBoxID 414350 | | 0..1 414352 | POBoxID 414354 |
| | | | | | | | POBoxIndicator 414356 | | 0..1 414358 | Indicator 414360 |
| | | | | | | | POBoxCountryCode 414362 | | 0..1 414364 | CountryCode 414366 |
| | | | | | | | POBoxCountryName 414368 | | 0..1 414370 | MEDIUM_Name 414372 |

FIG. 41-134

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | POBoxRegionCode 414374 | | 0..1 414376 | RegionCode 414378 |
| | | | | | | | POBoxRegionName 414380 | | 0..1 414382 | LANGUAGEINDEPENDENT_MEDIUM_Name 414384 |
| | | | | | | | POBoxCityName 414386 | | 0..1 414388 | LANGUAGEINDEPENDENT_MEDIUM_Name 414390 |
| | | | | | | | StreetName 414392 | | 0..1 414394 | StreetName 414396 |
| | | | | | | | StreetPrefixName 414398 | | 0..N 414400 | LANGUAGEINDEPENDENT_MEDIUM_Name 414402 |

FIG. 41-135

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | StreetSuffixName 414404 | | 0..N 414406 | LANGUAGEINDEPENDENT_MEDIUM_Name 414408 |
| | | | | | | | HouseID 414410 | | 0..1 414412 | HouseID 414414 |
| | | | | | | | AdditionalHouseID 414416 | | 0..1 414418 | HouseID 414420 |
| | | | | | | | BuildingID 414422 | | 0..1 414424 | BuildingID 414426 |
| | | | | | | | FloorID 414428 | | 0..1 414430 | FloorID 414432 |
| | | | | | | | RoomID 414434 | | 0..1 414436 | RoomID 414438 |

FIG. 41-136

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | CareOfName 414440 | | 0..1 414442 | LANGUAGEINDEPENDENT_MEDIUM_Name 414444 |
| | | | | | | | Description 414446 | | 0..N 414448 | Description 414450 |
| | | | | | | TaxJurisdictionCode 414452 | | | 0..1 414454 | TaxJurisdictionCode 414456 |
| | | | | | | TimeZoneDifferenceValue 414458 | | | 0..1 414460 | TimeZoneDifferenceValue 414462 |
| | | | | | | GeoCoordinates 414464 | | | 0..1 414466 | GeoCoordinates 414468 |

FIG. 41-137

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | Communication 414472 | | | 0..1 414474 | Communication 414476 |
| | | | | | | | CorrespondenceLanguageCode 414478 | | 0..1 414480 | LanguageCode 414482 |
| | | | | | | | CorrespondenceLanguageName 414484 | | 0..1 414486 | MEDIUM_Name 414488 |
| | | | | | | | Telephone 414490 | | 0..N 414492 | Telephone 414494 |
| | | | | | | | | Number 414496 | 1 414498 | PhoneNumber 414500 |

FIG. 41-138

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | | SMSEnabledIndicator 414502 | 0..1 414504 | Indicator 414506 |
| | | | | | | | | NumberDefaultIndicator 414508 | 1 414510 | Indicator 414512 |
| | | | | | | | | NumberDescription 414514 | 0..N 414516 | Description 414518 |
| | | | | | | | | NumberUsageDenialIndicator 414520 | 1 414522 | Indicator 414524 |
| | | | | | | | MobilePhone 414526 | | 0..N 414528 | Telephone 414530 |

FIG. 41-139

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | | Number 414532 | 1 414534 | PhoneNumber 414536 |
| | | | | | | | | SMSEnabledIndicator 414538 | 0..1 414540 | Indicator 414542 |
| | | | | | | | | NumberDefaultIndicator 414544 | 1 414546 | Indicator 414548 |
| | | | | | | | | NumberDescription 414550 | 0..N 414552 | Description 414554 |
| | | | | | | | | NumberUsageDenialIndicator 414556 | 1 414558 | Indicator 414560 |

FIG. 41-140

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | Facsimile 414562 | | 0..N 414564 | Facsimile 414566 |
| | | | | | | | | Number 414568 | 1 414570 | PhoneNumber 414572 |
| | | | | | | | | NumberDefaultIndicator 414574 | 1 414576 | Indicator 414578 |
| | | | | | | | | NumberDescription 414580 | 0..N 414582 | Description 414584 |
| | | | | | | | | NumberUsageDenialIndicator 414586 | 1 414588 | Indicator 414590 |
| | | | | | | | Email 414592 | | 0..N 414594 | Email 414596 |

FIG. 41-141

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | | | URI 414598 | 1 414600 | EmailURI 414602 |
| | | | | | | | | URIDefaultIndicator 414604 | 1 414606 | Indicator 414608 |
| | | | | | | | | URIDescription 414610 | 0..N 414612 | Description 414614 |
| | | | | | | | | URIUsageDenialIndicator 414616 | 1 414618 | Indicator 414620 |
| | | | | | | | Web 414622 | | 0..N 414624 | Web 414626 |
| | | | | | | | | URI 414628 | 1 414630 | WebURI 414632 |

FIG. 41-142

| Package | | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|---|
| | | | | | | | | | | | | URIDefaultIndicator 414634 | 1 414636 | Indicator 414638 |
| | | | | | | | | | | | | URIDescription 414640 | 0..N 414642 | Description 414644 |
| | | PaymentExplanationItem 414646 | | | | | PaymentExplanationItem 414648 | | | | | | 0..N 414650 | PaymentCardPaymentAuthorisationRequestPaymentExplanationItem 414652 |
| | | | | | | | | BusinessTransactionDocumentReference 414654 | | | | | 1 414656 | BusinessTransactionDocumentReference 414658 |

FIG. 41-143

| Package | | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|---|
| | | | | | | | | CreationDateTime 414660 | | | | | 0..1 414662 | GLOBAL_DateTime 414664 |
| | | | | | | | | RequestedQuantity 414666 | | | | | 0..1 414668 | Quantity 414670 |
| | | | Product 414672 | | | | | Product 414674 | | | | | 0..1 414676 | PaymentCardPaymentAuthorisationRequestPaymentExplanationItemProduct 414678 |
| | | | | | | | | | BusinessTransactionDocumentProduct 414680 | | | | 0..1 414682 | BusinessTransactionDocumentProduct 414684 |

FIG. 41-144

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | InternalID 414686 | | | 0..1 414688 | ProductInternalID 414690 |
| | | | | | | StandardID 414692 | | | 0..N 414694 | ProductStandardID 414696 |
| | | | | | | BuyerID 414698 | | | 0..1 414700 | ProductPartyID 414702 |
| | | | | | | SellerID 414704 | | | 0..1 414706 | ProductPartyID 414708 |
| | | | | | | ProductRecipientID 414710 | | | 0..1 414712 | ProductPartyID 414714 |
| | | | | | | VendorID 414716 | | | 0..1 414718 | ProductPartyID 414720 |
| | | | | | | ManufacturerID 414722 | | | 0..1 414724 | ProductPartyID 414726 |

FIG. 41-145

| Package | Level 1 | Level 2 | Level 3 | Level 4 | Level 5 | Level 6 | Level 7 | Level 8 | Cardinality | Data Type Name |
|---|---|---|---|---|---|---|---|---|---|---|
| | | | | | | BillToID 414728 | | | 0..1 414730 | ProductPartyID 414732 |
| | | | | | | BillFromID 414734 | | | 0..1 414736 | ProductPartyID 414738 |
| | | | | | | BidderID 414740 | | | 0..1 414742 | ProductPartyID 414744 |
| | | | | | | TypeCode 414746 | | | 0..1 414748 | ProductTypeCode 414750 |
| | | | | | | Note 414752 | | | 0..1 414754 | Note 414756 |
| | | | | | | ChangeID 414758 | | | 0..1 414760 | ProductChangeID 414762 |
| | | | | | | DiscontinuationIndicator 414764 | | | 0..1 414766 | Indicator 414768 |

FIG. 41-146

| Package | | | | | Level 1 | Level 2 | Level 3 | Level 4 | Level 5 | Level 6 | Level 7 | Level 8 | Cardinality | Data Type Name |
|---|---|---|---|---|---|---|---|---|---|---|---|---|---|---|
| | | | | | | | | | | Package Quantity 414770 | | | 0..1 414772 | Quantity 414774 |

MANAGING CONSISTENT INTERFACES FOR NUMBER RANGE, NUMBER RANGE PROFILE, PAYMENT CARD PAYMENT AUTHORISATION, AND PRODUCT TEMPLATE TEMPLATE BUSINESS OBJECTS ACROSS HETEROGENEOUS SYSTEMS

CLAIM OF PRIORITY

This application claims priority under 35 USC §119(e) to U.S. Patent Application Ser. No. 61/355,063, filed on Jun. 15, 2010, the entire contents of which are hereby incorporated by reference.

TECHNICAL FIELD

The subject matter described herein relates generally to the generation and use of consistent interfaces (or services) derived from a business object model. More particularly, the present disclosure relates to the generation and use of consistent interfaces or services that are suitable for use across industries, across businesses, and across different departments within a business.

BACKGROUND

Transactions are common among businesses and between business departments within a particular business. During any given transaction, these business entities exchange information. For example, during a sales transaction, numerous business entities may be involved, such as a sales entity that sells merchandise to a customer, a financial institution that handles the financial transaction, and a warehouse that sends the merchandise to the customer. The end-to-end business transaction may require a significant amount of information to be exchanged between the various business entities involved. For example, the customer may send a request for the merchandise as well as some form of payment authorization for the merchandise to the sales entity, and the sales entity may send the financial institution a request for a transfer of funds from the customer's account to the sales entity's account.

Exchanging information between different business entities is not a simple task. This is particularly true because the information used by different business entities is usually tightly tied to the business entity itself. Each business entity may have its own program for handling its part of the transaction. These programs differ from each other because they typically are created for different purposes and because each business entity may use semantics that differ from the other business entities. For example, one program may relate to accounting, another program may relate to manufacturing, and a third program may relate to inventory control. Similarly, one program may identify merchandise using the name of the product while another program may identify the same merchandise using its model number. Further, one business entity may use U.S. dollars to represent its currency while another business entity may use Japanese Yen. A simple difference in formatting, e.g., the use of upper-case lettering rather than lower-case or title-case, makes the exchange of information between businesses a difficult task. Unless the individual businesses agree upon particular semantics, human interaction typically is required to facilitate transactions between these businesses. Because these "heterogeneous" programs are used by different companies or by different business areas within a given company, a need exists for a consistent way to exchange information and perform a business transaction between the different business entities.

Currently, many standards exist that offer a variety of interfaces used to exchange business information. Most of these interfaces, however, apply to only one specific industry and are not consistent between the different standards. Moreover, a number of these interfaces are not consistent within an individual standard.

SUMMARY

In one aspect, a tangible computer readable medium includes program code for providing a message-based interface for providing a range of numbers used for identification, delimited by an upper boundary and a lower boundary, the medium includes program code for receiving via a message-based interface derived from a common business object model. The common business object model includes business objects having relationships that enable derivation of message-based interfaces and message packages, the message-based interface exposing at least one service as defined in a service registry and from a heterogeneous application executing in an environment of computer systems providing message-based services, a first message for providing the range of numbers used for identification, that includes a first message package derived from the common business object model and hierarchically organized in memory as: a number range request message entity and a number range package that includes a number range entity. The number range entity includes an interval code, a profile code, a type code, an interval lower boundary text, and an interval upper boundary text. The medium further includes program code for processing the first message according to the hierarchical organization of the first message package. Processing the first message includes unpacking the first message package based on the common business object model. The medium further includes program code for sending a second message to the heterogeneous application responsive to the first message. The second message includes a second message package derived from the common business object model to provide consistent semantics with the first message package.

Implementations can include any, all, or none of the following features. The number range entity further includes at least one of the following: a year, a characteristic text, a current ordinal number value, and an automatic indicator.

In another aspect, a distributed system operating in a landscape of computer systems providing message-based services defined in a service registry, the system includes a graphical user interface includes computer readable instructions, embedded on tangible media, for providing a range of numbers used for identification using a request. The system further includes a first memory storing a user interface controller for processing the request and involving a message includes a message package derived from a common business object model. The common business object model includes business objects having relationships that enable derivation of message-based service interfaces and message packages, the message package hierarchically organized as: a number range request message entity. The system further includes a number range package includes a number range entity. The number range entity includes an interval code, a profile code, a type code, an interval lower boundary text, and an interval upper boundary text. The system further includes a second memory, remote from the graphical user interface, storing a plurality of message-based service interfaces derived from the common business object model to provide consistent semantics with messages derived from the common business object model.

One of the message-based service interfaces processes the message according to the hierarchical organization of the message package. Processing the message includes unpacking the first message package based on the common business object model.

Implementations can include any, all, or none of the following features. The first memory is remote from the graphical user interface. The first memory is remote from the second memory.

In another aspect, a tangible computer readable medium includes program code for providing a message-based interface for exchanging number range profile information includes a number of predefined attributes that characterize one or more number ranges of an application, the medium includes program code for receiving via a message-based interface derived from a common business object model. The common business object model includes business objects having relationships that enable derivation of message-based interfaces and message packages, the message-based interface exposing at least one service as defined in a service registry and from a heterogeneous application executing in an environment of computer systems providing message-based services, a first message for requesting number range profile information that includes a first message package derived from the common business object model and hierarchically organized in memory as: a number range profile request message entity and a number range profile package that includes a number range profile entity. The number range profile entity includes a code. The medium further includes program code for processing the first message according to the hierarchical organization of the first message package. Processing the first message includes unpacking the first message package based on the common business object model. The medium further includes program code for sending a second message to the heterogeneous application responsive to the first message. The second message includes a second message package derived from the common business object model to provide consistent semantics with the first message package.

Implementations can include any, all, or none of the following features. The number range profile package further includes at least one of the following: a number range profile entity.

In another aspect, a distributed system operating in a landscape of computer systems providing message-based services defined in a service registry, the system includes a graphical user interface includes computer readable instructions, embedded on tangible media, for requesting number range profile information using a request. The system further includes a first memory storing a user interface controller for processing the request and involving a message includes a message package derived from a common business object model. The common business object model includes business objects having relationships that enable derivation of message-based service interfaces and message packages, the message package hierarchically organized as: a number range profile request message entity. The system further includes a number range profile package includes a number range profile entity. The number range profile entity includes a code. The system further includes a second memory, remote from the graphical user interface, storing a plurality of message-based service interfaces derived from the common business object model to provide consistent semantics with messages derived from the common business object model. One of the message-based service interfaces processes the message according to the hierarchical organization of the message package. Processing the message includes unpacking the first message package based on the common business object model.

Implementations can include any, all, or none of the following features. The first memory is remote from the graphical user interface. The first memory is remote from the second memory.

In another aspect, a tangible computer readable medium includes program code for providing a message-based interface for providing confirmations that indicate the success or failure of payment authorization requests, the medium includes program code for receiving via a message-based interface derived from a common business object model. The common business object model includes business objects having relationships that enable derivation of message-based interfaces and message packages, the message-based interface exposing at least one service as defined in a service registry and from a heterogeneous application executing in an environment of computer systems providing message-based services, a first message for providing a confirmation indicating the success or failure of a payment authorization request, that includes a first message package derived from the common business object model and hierarchically organized in memory as: a payment card payment authorization confirmation request message entity and a payment card payment authorization confirmation package that includes a payment card payment authorization confirmation entity. The payment card payment authorization confirmation entity includes a payment card payment authorization requestor identifier, a payment card payment authorization clearing house identifier, a payment card verification result code, and a payment authorization date time. The medium further includes program code for processing the first message according to the hierarchical organization of the first message package. Processing the first message includes unpacking the first message package based on the common business object model. The medium further includes program code for sending a second message to the heterogeneous application responsive to the first message. The second message includes a second message package derived from the common business object model to provide consistent semantics with the first message package.

Implementations can include any, all, or none of the following features. The payment card payment authorization confirmation entity further includes at least one of the following: an authorization result code, a payment card verification value verification result code and a payment card address verification result code, an authorized payment amount, an authorization result description, and an authorization expiration date time.

In another aspect, a distributed system operating in a landscape of computer systems providing message-based services defined in a service registry, the system includes a graphical user interface includes computer readable instructions, embedded on tangible media, for providing confirmation indicating the success or failure of a payment authorization request, using a request. The system further includes a first memory storing a user interface controller for processing the request and involving a message includes a message package derived from a common business object model. The common business object model includes business objects having relationships that enable derivation of message-based service interfaces and message packages, the message package hierarchically organized as: a payment card payment authorization confirmation request message entity. The system further includes a payment card payment authorization confirmation package includes a payment card payment authorization confirmation entity. The payment card payment authorization confirmation entity includes a payment card payment authorization requestor identifier, a payment card payment authorization clearing house identifier, a payment card verification result code, and a payment authorization date time. The system further includes a second memory, remote from the graphical user interface, storing a plurality of message-based service interfaces derived from the common business object model to provide consistent semantics with messages derived from the common business object model. One of the message-based service interfaces processes the message according to the hierarchical organization of the message package. Processing the message includes unpacking the first message package based on the common business object model.

Implementations can include any, all, or none of the following features. The first memory is remote from the graphical user interface. The first memory is remote from the second memory.

In another aspect, a tangible computer readable medium includes program code for providing a message-based interface for exchanging a template that defines a maximum possible set of nodes, relationships, elements, and service operations for material templates or service product templates that are projected from the template the medium includes program code for receiving via a message-based interface derived from a common business object model. The common business object model includes business objects having relationships that enable derivation of message-based interfaces and message packages, the message-based interface exposing at least one service as defined in a service registry and from a heterogeneous application executing in an environment of computer systems providing message-based services, a first message for requesting the template that defines a maximum possible set of nodes, relationships, elements, and service operations for material templates or service product templates that are projected from the template that includes a first message package derived from the common business object model and hierarchically organized in memory as: a product template request message entity and a product template package that includes a product template entity. The product template entity includes material template package includes a material template entity, a service product template package includes a service product template entity, and a product universally unique identifier. The medium further includes program code for processing the first message according to the hierarchical organization of the first message package. Processing the first message includes unpacking the first message package based on the common business object model. The medium further includes program code for sending a second message to the heterogeneous application responsive to the first message. The second message includes a second message package derived from the common business object model to provide consistent semantics with the first message package.

Implementations can include any, all, or none of the following features. The product template package further includes at least one of the following: a sales specification entity, a financials specification entity, and a supply planning specification entity.

In another aspect, a distributed system operating in a landscape of computer systems providing message-based services defined in a service registry, the system includes a graphical user interface includes computer readable instructions, embedded on tangible media, for requesting the template that defines a maximum possible set of nodes, relationships, elements, and service operations for material templates or service product templates that are projected from the template using a request. The system further includes a first memory storing a user interface controller for processing the request and involving a message includes a message package derived from a common business object model. The common business object model includes business objects having relationships that enable derivation of message-based service interfaces and message packages, the message package hierarchically organized as: a product template request message entity. The system further includes a product template package includes a product template entity. The product template entity includes material template package includes a material template entity, a service product template package includes a service product template entity, and a product universally unique identifier. The system further includes a second memory, remote from the graphical user interface, storing a plurality of message-based service interfaces derived from the common business object model to provide consistent semantics with messages derived from the common business object model. One of the message-based service interfaces processes the message according to the hierarchical organization of the message package. Processing the message includes unpacking the first message package based on the common business object model.

Implementations can include any, all, or none of the following features. The first memory is remote from the graphical user interface. The first memory is remote from the second memory.

BRIEF DESCRIPTION OF THE DRAWINGS

FIGS. 36-1 through 36-4 depict an example object model for a business object Payment Card Payment Authorisation.

FIGS. 38-1 through 38-9 show an example configuration of an Element Structure that includes a PaymentCardPaymentAuthorisationConfirmation package.

FIGS. 39-1 through 39-3 show an example configuration of an Element Structure that includes a PaymentCardPaymentAuthorisationConfirmationMessage package.

FIGS. 41-1 through 41-146 show an example configuration of an Element Structure that includes a PaymentCardPaymentAuthorisationRequest package.

FIGS. 42-1 through 42-10 depict an example object model for a business object Product Template Template.

DETAILED DESCRIPTION

A. Overview

Figure 1:
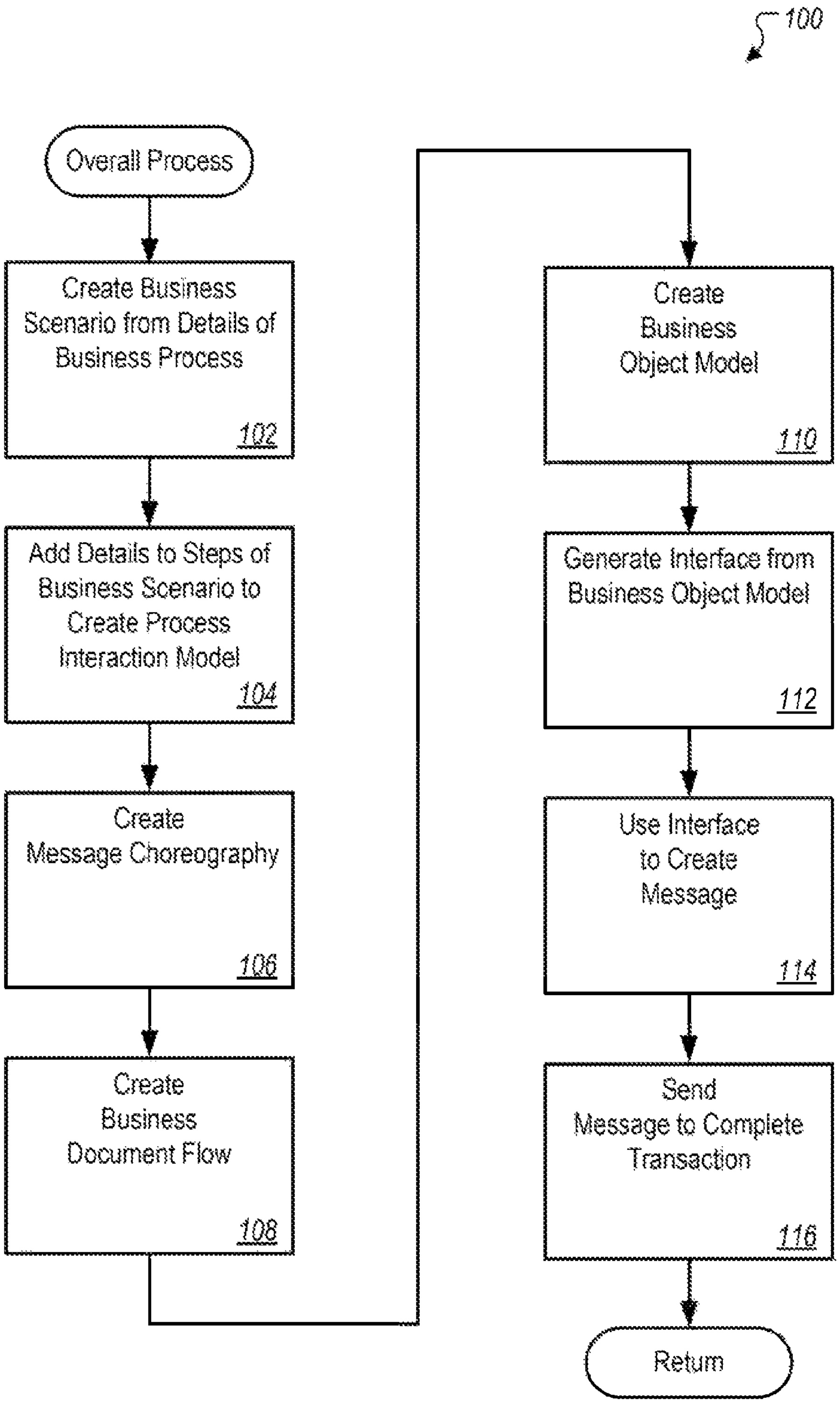
FIG. 1 depicts a flow diagram of the overall steps performed by methods and systems consistent with the subject matter described herein.

Methods and systems consistent with the subject matter described herein facilitate e-commerce by providing consistent interfaces that are suitable for use across industries, across businesses, and across different departments within a business during a business transaction. To generate consistent interfaces, methods and systems consistent with the subject matter described herein utilize a business object model, which reflects the data that will be used during a given business transaction. An example of a business transaction is the exchange of purchase orders and order confirmations between a buyer and a seller. The business object model is generated in a hierarchical manner to ensure that the same type of data is represented the same way throughout the business object model. This ensures the consistency of the information in the business object model. Consistency is also reflected in the semantic meaning of the various structural elements. That is, each structural element has a consistent business meaning. For example, the location entity, regardless of in which package it is located, refers to a location.

From this business object model, various interfaces are derived to accomplish the functionality of the business transaction. Interfaces provide an entry point for components to access the functionality of an application. For example, the interface for a Purchase Order Request provides an entry point for components to access the functionality of a Purchase Order, in particular, to transmit and/or receive a Purchase Order Request. One skilled in the art will recognize that each of these interfaces may be provided, sold, distributed, utilized, or marketed as a separate product or as a major component of a separate product. Alternatively, a group of related interfaces may be provided, sold, distributed, utilized, or marketed as a product or as a major component of a separate product. Because the interfaces are generated from the business object model, the information in the interfaces is consistent, and the interfaces are consistent among the business entities. Such consistency facilitates heterogeneous business entities in cooperating to accomplish the business transaction.

Generally, the business object is a representation of a type of a uniquely identifiable business entity (an object instance) described by a structural model. In the architecture, processes may typically operate on business objects. Business objects represent a specific view on some well-defined business content. In other words, business objects represent content, which a typical business user would expect and understand with little explanation. Business objects are further categorized as business process objects and master data objects. A master data object is an object that encapsulates master data (i.e., data that is valid for a period of time). A business process object, which is the kind of business object generally found in a process component, is an object that encapsulates transactional data (i.e., data that is valid for a point in time). The term business object will be used generically to refer to a business process object and a master data object, unless the context requires otherwise. Properly implemented, business objects are implemented free of redundancies.

The architectural elements also include the process component. The process component is a software package that realizes a business process and generally exposes its functionality as services. The functionality contains business transactions. In general, the process component contains one or more semantically related business objects. Often, a particular business object belongs to no more than one process component. Interactions between process component pairs involving their respective business objects, process agents, operations, interfaces, and messages are described as process component interactions, which generally determine the interactions of a pair of process components across a deployment unit boundary. Interactions between process components within a deployment unit are typically not constrained by the architectural design and can be implemented in any convenient fashion. Process components may be modular and context-independent. In other words, process components may not be specific to any particular application and as such, may be reusable. In some implementations, the process component is the smallest (most granular) element of reuse in the architecture. An external process component is generally used to represent the external system in describing interactions with the external system; however, this should be understood to require no more of the external system than that able to produce and receive messages as required by the process component that interacts with the external system. For example, process components may include multiple operations that may provide interaction with the external system. Each operation generally belongs to one type of process component in the architecture. Operations can be synchronous or asynchronous, corresponding to synchronous or asynchronous process agents, which will be described below. The operation is often the smallest, separately-callable function, described by a set of data types used as input, output, and fault parameters serving as a signature.

The architectural elements may also include the service interface, referred to simply as the interface. The interface is a named group of operations. The interface often belongs to one process component and process component might contain multiple interfaces. In one implementation, the service interface contains only inbound or outbound operations, but not a mixture of both. One interface can contain both synchronous and asynchronous operations. Normally, operations of the same type (either inbound or outbound) which belong to the same message choreography will belong to the same interface. Thus, generally, all outbound operations to the same other process component are in one interface.

The architectural elements also include the message. Operations transmit and receive messages. Any convenient messaging infrastructure can be used. A message is information conveyed from one process component instance to another, with the expectation that activity will ensue. Operation can use multiple message types for inbound, outbound, or error messages. When two process components are in different deployment units, invocation of an operation of one process component by the other process component is accomplished by the operation on the other process component sending a message to the first process component.

The architectural elements may also include the process agent. Process agents do business processing that involves the sending or receiving of messages. Each operation normally has at least one associated process agent. Each process agent can be associated with one or more operations. Process agents can be either inbound or outbound and either synchronous or asynchronous. Asynchronous outbound process agents are called after a business object changes such as after a "create", "update", or "delete" of a business object instance. Synchronous outbound process agents are generally triggered directly by business object. An outbound process agent will generally perform some processing of the data of the business object instance whose change triggered the event. The outbound agent triggers subsequent business process steps by sending messages using well-defined outbound services to another process component, which generally will be in another deployment unit, or to an external system. The outbound process agent is linked to the one business object that triggers the agent, but it is sent not to another business object but rather to another process component. Thus, the outbound process agent can be implemented without knowledge of the exact business object design of the recipient process component. Alternatively, the process agent may be inbound. For example, inbound process agents may be used for the inbound part of a message-based communication. Inbound process agents are called after a message has been received. The inbound process agent starts the execution of the business process step requested in a message by creating or updating one or multiple business object instances. Inbound process agent is not generally the agent of business object but of its process component. Inbound process agent can act on multiple business objects in a process component. Regardless of whether the process agent is inbound or outbound, an agent may be synchronous if used when a process component requires a more or less immediate response from another process component, and is waiting for that response to continue its work.

The architectural elements also include the deployment unit. Each deployment unit may include one or more process components that are generally deployed together on a single computer system platform. Conversely, separate deployment units can be deployed on separate physical computing systems. The process components of one deployment unit can interact with those of another deployment unit using messages passed through one or more data communication networks or other suitable communication channels. Thus, a deployment unit deployed on a platform belonging to one business can interact with a deployment unit software entity deployed on a separate platform belonging to a different and unrelated business, allowing for business-to-business communication. More than one instance of a given deployment unit can execute at the same time, on the same computing system or on separate physical computing systems. This arrangement allows the functionality offered by the deployment unit to be scaled to meet demand by creating as many instances as needed.

Since interaction between deployment units is through process component operations, one deployment unit can be replaced by other another deployment unit as long as the new deployment unit supports the operations depended upon by other deployment units as appropriate. Thus, while deployment units can depend on the external interfaces of process components in other deployment units, deployment units are not dependent on process component interaction within other deployment units. Similarly, process components that interact with other process components or external systems only through messages, e.g., as sent and received by operations, can also be replaced as long as the replacement generally supports the operations of the original.

Services (or interfaces) may be provided in a flexible architecture to support varying criteria between services and systems. The flexible architecture may generally be provided by a service delivery business object. The system may be able to schedule a service asynchronously as necessary, or on a regular basis. Services may be planned according to a schedule manually or automatically. For example, a follow-up service may be scheduled automatically upon completing an initial service. In addition, flexible execution periods may be possible (e.g. hourly, daily, every three months, etc.). Each customer may plan the services on demand or reschedule service execution upon request.

FIG. 1 depicts a flow diagram 100 showing an example technique, perhaps implemented by systems similar to those disclosed herein. Initially, to generate the business object model, design engineers study the details of a business process, and model the business process using a "business scenario" (step 102). The business scenario identifies the steps performed by the different business entities during a business process. Thus, the business scenario is a complete representation of a clearly defined business process.

After creating the business scenario, the developers add details to each step of the business scenario (step 104). In particular, for each step of the business scenario, the developers identify the complete process steps performed by each business entity. A discrete portion of the business scenario reflects a "business transaction," and each business entity is referred to as a "component" of the business transaction. The developers also identify the messages that are transmitted between the components. A "process interaction model" represents the complete process steps between two components.

After creating the process interaction model, the developers create a "message choreography" (step 106), which depicts the messages transmitted between the two components in the process interaction model. The developers then represent the transmission of the messages between the components during a business process in a "business document flow" (step 108). Thus, the business document flow illustrates the flow of information between the business entities during a business process.

Figure 2:
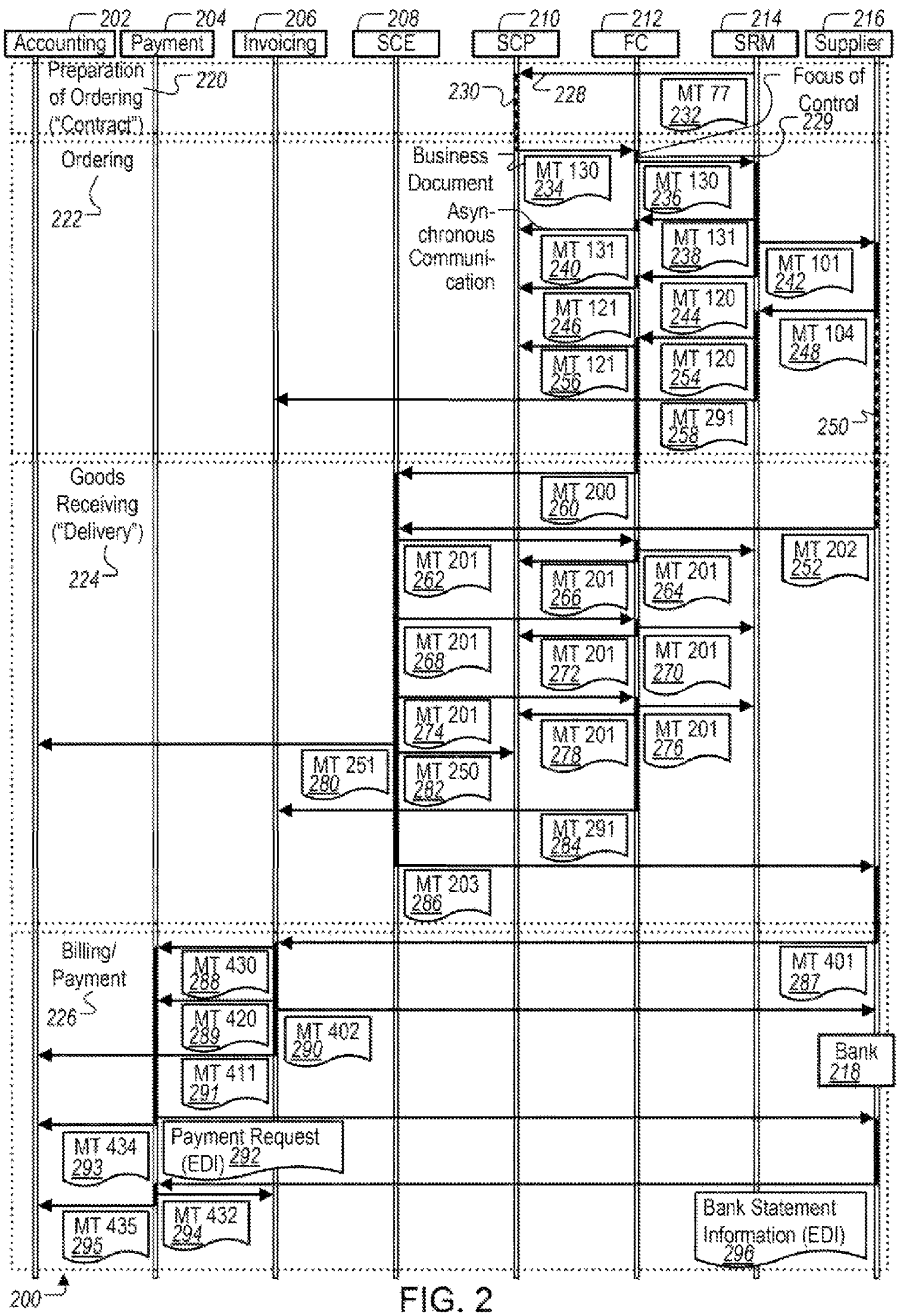
FIG. 2 depicts a business document flow for an invoice request in accordance with methods and systems consistent with the subject matter described herein.

FIG. 2 depicts an example business document flow 200 for the process of purchasing a product or service. The business entities involved with the illustrative purchase process include Accounting 202, Payment 204, Invoicing 206, Supply Chain Execution ("SCE") 208, Supply Chain Planning ("SCP") 210, Fulfillment Coordination ("FC") 212, Supply Relationship Management ("SRM") 214, Supplier 216, and Bank 218. The business document flow 200 is divided into four different transactions: Preparation of Ordering ("Contract") 220, Ordering 222, Goods Receiving ("Delivery") 224, and Billing/Payment 226. In the business document flow, arrows 228 represent the transmittal of documents. Each document reflects a message transmitted between entities. One of ordinary skill in the art will appreciate that the messages transferred may be considered to be a communications protocol. The process flow follows the focus of control, which is depicted as a solid vertical line (e.g., 229) when the step is required, and a dotted vertical line (e.g., 230) when the step is optional.

During the Contract transaction 220, the SRM 214 sends a Source of Supply Notification 232 to the SCP 210. This step is optional, as illustrated by the optional control line 230 coupling this step to the remainder of the business document flow 200. During the Ordering transaction 222, the SCP 210 sends a Purchase Requirement Request 234 to the FC 212, which forwards a Purchase Requirement Request 236 to the SRM 214. The SRM 214 then sends a Purchase Requirement Confirmation 238 to the FC 212, and the FC 212 sends a Purchase Requirement Confirmation 240 to the SCP 210. The SRM 214 also sends a Purchase Order Request 242 to the Supplier 216, and sends Purchase Order Information 244 to the FC 212. The FC 212 then sends a Purchase Order Planning Notification 246 to the SCP 210. The Supplier 216, after receiving the Purchase Order Request 242, sends a Purchase Order Confirmation 248 to the SRM 214, which sends a Purchase Order Information confirmation message 254 to the FC 212, which sends a message 256 confirming the Purchase Order Planning Notification to the SCP 210. The SRM 214 then sends an Invoice Due Notification 258 to Invoicing 206.

During the Delivery transaction 224, the FC 212 sends a Delivery Execution Request 260 to the SCE 208. The Supplier 216 could optionally (illustrated at control line 250) send a Dispatched Delivery Notification 252 to the SCE 208. The SCE 208 then sends a message 262 to the FC 212 notifying the FC 212 that the request for the Delivery Information was created. The FC 212 then sends a message 264 notifying the SRM 214 that the request for the Delivery Information was created. The FC 212 also sends a message 266 notifying the SCP 210 that the request for the Delivery Information was created. The SCE 208 sends a message 268 to the FC 212 when the goods have been set aside for delivery. The FC 212 sends a message 270 to the SRM 214 when the goods have been set aside for delivery. The FC 212 also sends a message 272 to the SCP 210 when the goods have been set aside for delivery.

The SCE 208 sends a message 274 to the FC 212 when the goods have been delivered. The FC 212 then sends a message 276 to the SRM 214 indicating that the goods have been delivered, and sends a message 278 to the SCP 210 indicating that the goods have been delivered. The SCE 208 then sends an Inventory Change Accounting Notification 280 to Accounting 202, and an Inventory Change Notification 282 to the SCP 210. The FC 212 sends an Invoice Due Notification 284 to Invoicing 206, and SCE 208 sends a Received Delivery Notification 286 to the Supplier 216.

During the Billing/Payment transaction 226, the Supplier 216 sends an Invoice Request 287 to Invoicing 206. Invoicing 206 then sends a Payment Due Notification 288 to Payment 204, a Tax Due Notification 289 to Payment 204, an Invoice Confirmation 290 to the Supplier 216, and an Invoice Accounting Notification 291 to Accounting 202. Payment 204 sends a Payment Request 292 to the Bank 218, and a Payment Requested Accounting Notification 293 to Accounting 202. Bank 218 sends a Bank Statement Information 296 to Payment 204. Payment 204 then sends a Payment Done Information 294 to Invoicing 206 and a Payment Done Accounting Notification 295 to Accounting 202.

Within a business document flow, business documents having the same or similar structures are marked. For example, in the business document flow 200 depicted in FIG. 2, Purchase Requirement Requests 234, 236 and Purchase Requirement Confirmations 238, 240 have the same structures. Thus, each of these business documents is marked with an "O6." Similarly, Purchase Order Request 242 and Purchase Order Confirmation 248 have the same structures. Thus, both documents are marked with an "O1." Each business document or message is based on a message type.

From the business document flow, the developers identify the business documents having identical or similar structures, and use these business documents to create the business object model (step 110). The business object model includes the objects contained within the business documents. These objects are reflected as packages containing related information, and are arranged in a hierarchical structure within the business object model, as discussed below.

Methods and systems consistent with the subject matter described herein then generate interfaces from the business object model (step 112). The heterogeneous programs use instantiations of these interfaces (called "business document objects" below) to create messages (step 114), which are sent to complete the business transaction (step 116). Business entities use these messages to exchange information with other business entities during an end-to-end business transaction. Since the business object model is shared by heterogeneous programs, the interfaces are consistent among these programs. The heterogeneous programs use these consistent interfaces to communicate in a consistent manner, thus facilitating the business transactions.

Standardized Business-to-Business ("B2B") messages are compliant with at least one of the e-business standards (i.e., they include the business-relevant fields of the standard). The e-business standards include, for example, RosettaNet for the high-tech industry, Chemical Industry Data Exchange ("CIDX"), Petroleum Industry Data Exchange ("PIDX") for the oil industry, UCCnet for trade, PapiNet for the paper industry, Odette for the automotive industry, HR-XML for human resources, and XML Common Business Library ("xCBL"). Thus, B2B messages enable simple integration of components in heterogeneous system landscapes. Application-to-Application ("A2A") messages often exceed the standards and thus may provide the benefit of the full functionality of application components. Although various steps of FIG. 1 were described as being performed manually, one skilled in the art will appreciate that such steps could be computer-assisted or performed entirely by a computer, including being performed by either hardware, software, or any other combination thereof.

B. Implementation Details

As discussed above, methods and systems consistent with the subject matter described herein create consistent interfaces by generating the interfaces from a business object model. Details regarding the creation of the business object model, the generation of an interface from the business object model, and the use of an interface generated from the business object model are provided below.

Figure 3A:
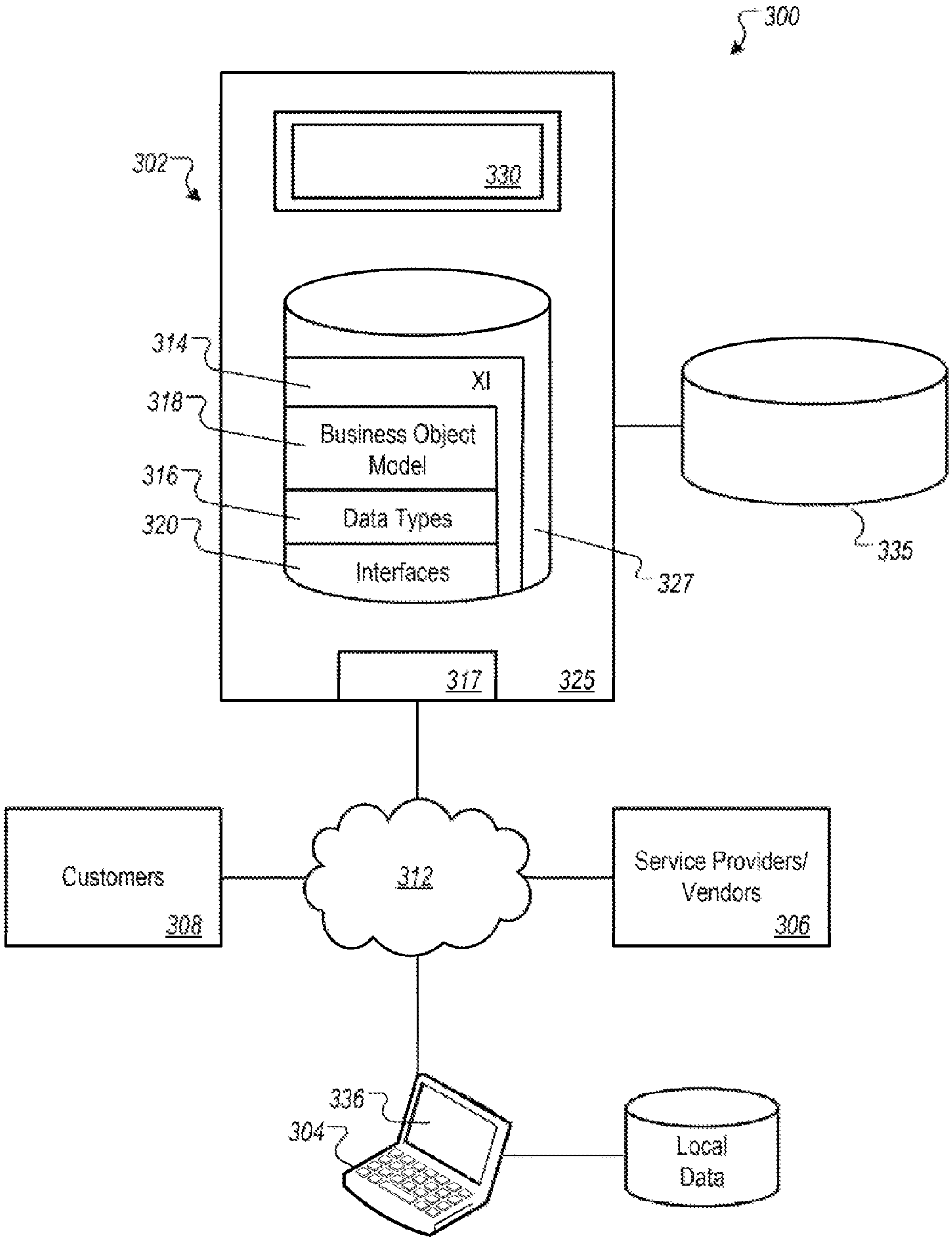
FIGS. 3A-B illustrate example environments implementing the transmission, receipt, and processing of data between heterogeneous applications in accordance with certain embodiments included in the present disclosure.

Turning to the illustrated embodiment in FIG. 3A, environment 300 includes or is communicably coupled (such as via a one-, bi- or multi-directional link or network) with server 302, one or more clients 304, one or more or vendors 306, one or more customers 308, at least some of which communicate across network 312. But, of course, this illustration is for example purposes only, and any distributed system or environment implementing one or more of the techniques described herein may be within the scope of this disclosure. Server 302 comprises an electronic computing device operable to receive, transmit, process and store data associated with environment 300. Generally, FIG. 3A provides merely one example of computers that may be used with the disclosure. Each computer is generally intended to encompass any suitable processing device. For example, although FIG. 3A illustrates one server 302 that may be used with the disclosure, environment 300 can be implemented using computers other than servers, as well as a server pool. Indeed, server 302 may be any computer or processing device such as, for example, a blade server, general-purpose personal computer (PC), Macintosh, workstation, Unix-based computer, or any other suitable device. In other words, the present disclosure contemplates computers other than general purpose computers as well as computers without conventional operating systems. Server 302 may be adapted to execute any operating system including Linux, UNIX, Windows Server, or any other suitable operating system. According to one embodiment, server 302 may also include or be communicably coupled with a web server and/or a mail server.

As illustrated (but not required), the server 302 is communicably coupled with a relatively remote repository 335 over a portion of the network 312. The repository 335 is any electronic storage facility, data processing center, or archive that may supplement or replace local memory (such as 327). The repository 335 may be a central database communicably coupled with the one or more servers 302 and the clients 304 via a virtual private network (VPN), SSH (Secure Shell) tunnel, or other secure network connection. The repository 335 may be physically or logically located at any appropriate location including in one of the example enterprises or off-shore, so long as it remains operable to store information associated with the environment 300 and communicate such data to the server 302 or at least a subset of plurality of the clients 304.

Illustrated server 302 includes local memory 327. Memory 327 may include any memory or database module and may take the form of volatile or non-volatile memory including, without limitation, magnetic media, optical media, random access memory (RAM), read-only memory (ROM), removable media, or any other suitable local or remote memory component. Illustrated memory 327 includes an exchange infrastructure ("XI") 314, which is an infrastructure that supports the technical interaction of business processes across heterogeneous system environments. XI 314 centralizes the communication between components within a business entity and between different business entities. When appropriate, XI 314 carries out the mapping between the messages. XI 314 integrates different versions of systems implemented on different platforms (e.g., Java and ABAP). XI 314 is based on an open architecture, and makes use of open standards, such as eXtensible Markup Language (XML)™ and Java environments. XI 314 offers services that are useful in a heterogeneous and complex system landscape. In particular, XI 314 offers a runtime infrastructure for message exchange, configuration options for managing business processes and message flow, and options for transforming message contents between sender and receiver systems.

XI 314 stores data types 316, a business object model 318, and interfaces 320. The details regarding the business object model are described below. Data types 316 are the building blocks for the business object model 318. The business object model 318 is used to derive consistent interfaces 320. XI 314 allows for the exchange of information from a first company having one computer system to a second company having a second computer system over network 312 by using the standardized interfaces 320.

While not illustrated, memory 327 may also include business objects and any other appropriate data such as services, interfaces, VPN applications or services, firewall policies, a security or access log, print or other reporting files, HTML files or templates, data classes or object interfaces, child software applications or sub-systems, and others. This stored data may be stored in one or more logical or physical repositories. In some embodiments, the stored data (or pointers thereto) may be stored in one or more tables in a relational database described in terms of SQL statements or scripts. In the same or other embodiments, the stored data may also be formatted, stored, or defined as various data structures in text files, XML documents, Virtual Storage Access Method (VSAM) files, flat files, Btrieve files, comma-separated-value (CSV) files, internal variables, or one or more libraries. For example, a particular data service record may merely be a pointer to a particular piece of third party software stored remotely. In another example, a particular data service may be an internally stored software object usable by authenticated customers or internal development. In short, the stored data may comprise one table or file or a plurality of tables or files stored on one computer or across a plurality of computers in any appropriate format. Indeed, some or all of the stored data may be local or remote without departing from the scope of this disclosure and store any type of appropriate data.

Server 302 also includes processor 325. Processor 325 executes instructions and manipulates data to perform the operations of server 302 such as, for example, a central processing unit (CPU), a blade, an application specific integrated circuit (ASIC), or a field-programmable gate array (FPGA). Although FIG. 3A illustrates a single processor 325 in server 302, multiple processors 325 may be used according to particular needs and reference to processor 325 is meant to include multiple processors 325 where applicable. In the illustrated embodiment, processor 325 executes at least business application 330.

Figure 4:
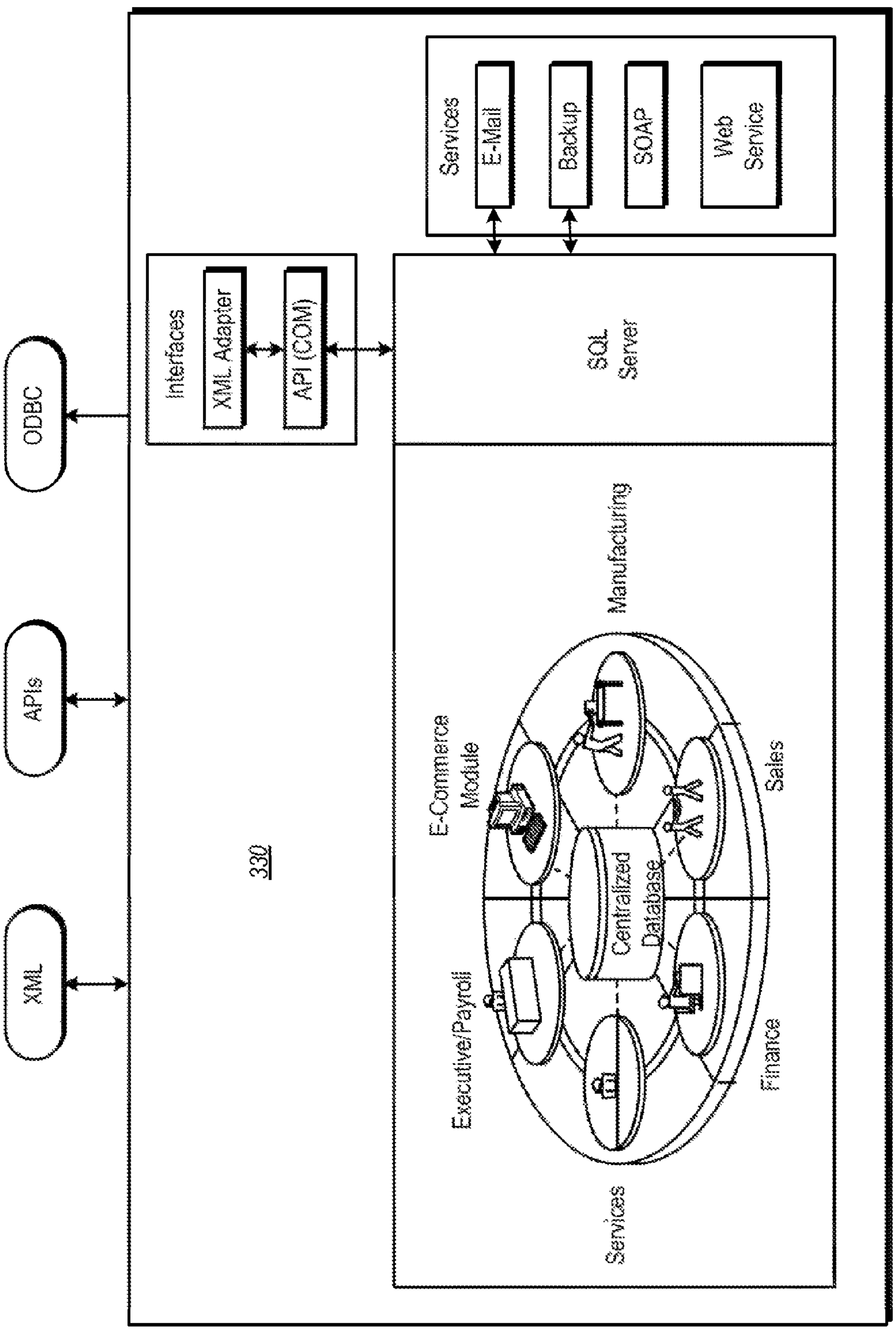
FIG. 4 illustrates an example application implementing certain techniques and components in accordance with one embodiment of the system of FIG. 1.

At a high level, business application 330 is any application, program, module, process, or other software that utilizes or facilitates the exchange of information via messages (or services) or the use of business objects. For example, application 330 may implement, utilize or otherwise leverage an enterprise service-oriented architecture (enterprise SOA), which may be considered a blueprint for an adaptable, flexible, and open IT architecture for developing services-based, enterprise-scale business solutions. This example enterprise service may be a series of web services combined with business logic that can be accessed and used repeatedly to support a particular business process. Aggregating web services into business-level enterprise services helps provide a more meaningful foundation for the task of automating enterprise-scale business scenarios Put simply, enterprise services help provide a holistic combination of actions that are semantically linked to complete the specific task, no matter how many cross-applications are involved. In certain cases, environment 300 may implement a composite application 330, as described below in FIG. 4. Regardless of the particular implementation, "software" may include software, firmware, wired or programmed hardware, or any combination thereof as appropriate. Indeed, application 330 may be written or described in any appropriate computer language including C, C++, Java, Visual Basic, assembler, Perl, any suitable version of 4GL, as well as others. For example, returning to the above mentioned composite application, the composite application portions may be implemented as Enterprise Java Beans (EJBs) or the design-time components may have the ability to generate run-time implementations into different platforms, such as J2EE (Java 2 Platform, Enterprise Edition), ABAP (Advanced Business Application Programming) objects, or Microsoft's .NET. It will be understood that while application 330 is illustrated in FIG. 4 as including various sub-modules, application 330 may include numerous other sub-modules or may instead be a single multi-tasked module that implements the various features and functionality through various objects, methods, or other processes. Further, while illustrated as internal to server 302, one or more processes associated with application 330 may be stored, referenced, or executed remotely. For example, a portion of application 330 may be a web service that is remotely called, while another portion of application 330 may be an interface object bundled for processing at remote client 304. Moreover, application 330 may be a child or sub-module of another software module or enterprise application (not illustrated) without departing from the scope of this disclosure. Indeed, application 330 may be a hosted solution that allows multiple related or third parties in different portions of the process to perform the respective processing.

More specifically, as illustrated in FIG. 4, application 330 may be a composite application, or an application built on other applications, that includes an object access layer (OAL) and a service layer. In this example, application 330 may execute or provide a number of application services, such as customer relationship management (CRM) systems, human resources management (HRM) systems, financial management (FM) systems, project management (PM) systems, knowledge management (KM) systems, and electronic file and mail systems. Such an object access layer is operable to exchange data with a plurality of enterprise base systems and to present the data to a composite application through a uniform interface. The example service layer is operable to provide services to the composite application. These layers may help the composite application to orchestrate a business process in synchronization with other existing processes (e.g., native processes of enterprise base systems) and leverage existing investments in the IT platform. Further, composite application 330 may run on a heterogeneous IT platform. In doing so, composite application may be cross-functional in that it may drive business processes across different applications, technologies, and organizations. Accordingly, composite application 330 may drive end-to-end business processes across heterogeneous systems or sub-systems. Application 330 may also include or be coupled with a persistence layer and one or more application system connectors. Such application system connectors enable data exchange and integration with enterprise sub-systems and may include an Enterprise Connector (EC) interface, an Internet Communication Manager/Internet Communication Framework (ICM/ICF) interface, an Encapsulated PostScript (EPS) interface, and/or other interfaces that provide Remote Function Call (RFC) capability. It will be understood that while this example describes a composite application 330, it may instead be a standalone or (relatively) simple software program. Regardless, application 330 may also perform processing automatically, which may indicate that the appropriate processing is substantially performed by at least one component of environment 300. It should be understood that automatically further contemplates any suitable administrator or other user interaction with application 330 or other components of environment 300 without departing from the scope of this disclosure.

Returning to FIG. 3A, illustrated server 302 may also include interface 317 for communicating with other computer systems, such as clients 304, over network 312 in a client-server or other distributed environment. In certain embodiments, server 302 receives data from internal or external senders through interface 317 for storage in memory 327, for storage in DB 335, and/or processing by processor 325. Generally, interface 317 comprises logic encoded in software and/or hardware in a suitable combination and operable to communicate with network 312. More specifically, interface 317 may comprise software supporting one or more communications protocols associated with communications network 312 or hardware operable to communicate physical signals.

Network 312 facilitates wireless or wireline communication between computer server 302 and any other local or remote computer, such as clients 304. Network 312 may be all or a portion of an enterprise or secured network. In another example, network 312 may be a VPN merely between server 302 and client 304 across wireline or wireless link. Such an example wireless link may be via 802.11a, 802.11b, 802.11g, 802.20, WiMax, and many others. While illustrated as a single or continuous network, network 312 may be logically divided into various sub-nets or virtual networks without departing from the scope of this disclosure, so long as at least portion of network 312 may facilitate communications between server 302 and at least one client 304. For example, server 302 may be communicably coupled to one or more "local" repositories through one sub-net while communicably coupled to a particular client 304 or "remote" repositories through another. In other words, network 312 encompasses any internal or external network, networks, sub-network, or combination thereof operable to facilitate communications between various computing components in environment 300. Network 312 may communicate, for example, Internet Protocol (IP) packets, Frame Relay frames, Asynchronous Transfer Mode (ATM) cells, voice, video, data, and other suitable information between network addresses. Network 312 may include one or more local area networks (LANs), radio access networks (RANs), metropolitan area networks (MANs), wide area networks (WANs), all or a portion of the global computer network known as the Internet, and/or any other communication system or systems at one or more locations. In certain embodiments, network 312 may be a secure network associated with the enterprise and certain local or remote vendors 306 and customers 308. As used in this disclosure, customer 308 is any person, department, organization, small business, enterprise, or any other entity that may use or request others to use environment 300. As described above, vendors 306 also may be local or remote to customer 308. Indeed, a particular vendor 306 may provide some content to business application 330, while receiving or purchasing other content (at the same or different times) as customer 308. As illustrated, customer 308 and vendor 306 each typically perform some processing (such as uploading or purchasing content) using a computer, such as client 304.

Client 304 is any computing device operable to connect or communicate with server 302 or network 312 using any communication link. For example, client 304 is intended to encompass a personal computer, touch screen terminal, workstation, network computer, kiosk, wireless data port, smart phone, personal data assistant (PDA), one or more processors within these or other devices, or any other suitable processing device used by or for the benefit of business 308, vendor 306, or some other user or entity. At a high level, each client 304 includes or executes at least GUI 336 and comprises an electronic computing device operable to receive, transmit, process and store any appropriate data associated with environment 300. It will be understood that there may be any number of clients 304 communicably coupled to server 302. Further, "client 304," "business," "business analyst," "end user," and "user" may be used interchangeably as appropriate without departing from the scope of this disclosure. Moreover, for ease of illustration, each client 304 is described in terms of being used by one user. But this disclosure contemplates that many users may use one computer or that one user may use multiple computers. For example, client 304 may be a PDA operable to wirelessly connect with external or unsecured network. In another example, client 304 may comprise a laptop that includes an input device, such as a keypad, touch screen, mouse, or other device that can accept information, and an output device that conveys information associated with the operation of server 302 or clients 304, including digital data, visual information, or GUI 336. Both the input device and output device may include fixed or removable storage media such as a magnetic computer disk, CD-ROM, or other suitable media to both receive input from and provide output to users of clients 304 through the display, namely the client portion of GUI or application interface 336.

GUI 336 comprises a graphical user interface operable to allow the user of client 304 to interface with at least a portion of environment 300 for any suitable purpose, such as viewing application or other transaction data. Generally, GUI 336 provides the particular user with an efficient and user-friendly presentation of data provided by or communicated within environment 300. For example, GUI 336 may present the user with the components and information that is relevant to their task, increase reuse of such components, and facilitate a sizable developer community around those components. GUI 336 may comprise a plurality of customizable frames or views having interactive fields, pull-down lists, and buttons operated by the user. For example, GUI 336 is operable to display data involving business objects and interfaces in a user-friendly form based on the user context and the displayed data. In another example, GUI 336 is operable to display different levels and types of information involving business objects and interfaces based on the identified or supplied user role. GUI 336 may also present a plurality of portals or dashboards. For example, GUI 336 may display a portal that allows users to view, create, and manage historical and real-time reports including role-based reporting and such. Of course, such reports may be in any appropriate output format including PDF, HTML, and printable text. Real-time dashboards often provide table and graph information on the current state of the data, which may be supplemented by business objects and interfaces. It should be understood that the term graphical user interface may be used in the singular or in the plural to describe one or more graphical user interfaces and each of the displays of a particular graphical user interface. Indeed, reference to GUI 336 may indicate a reference to the front-end or a component of business application 330, as well as the particular interface accessible via client 304, as appropriate, without departing from the scope of this disclosure. Therefore, GUI 336 contemplates any graphical user interface, such as a generic web browser or touchscreen, that processes information in environment 300 and efficiently presents the results to the user. Server 302 can accept data from client 304 via the web browser (e.g., Microsoft Internet Explorer or Netscape Navigator) and return the appropriate HTML or XML responses to the browser using network 312.

Figure 3B:
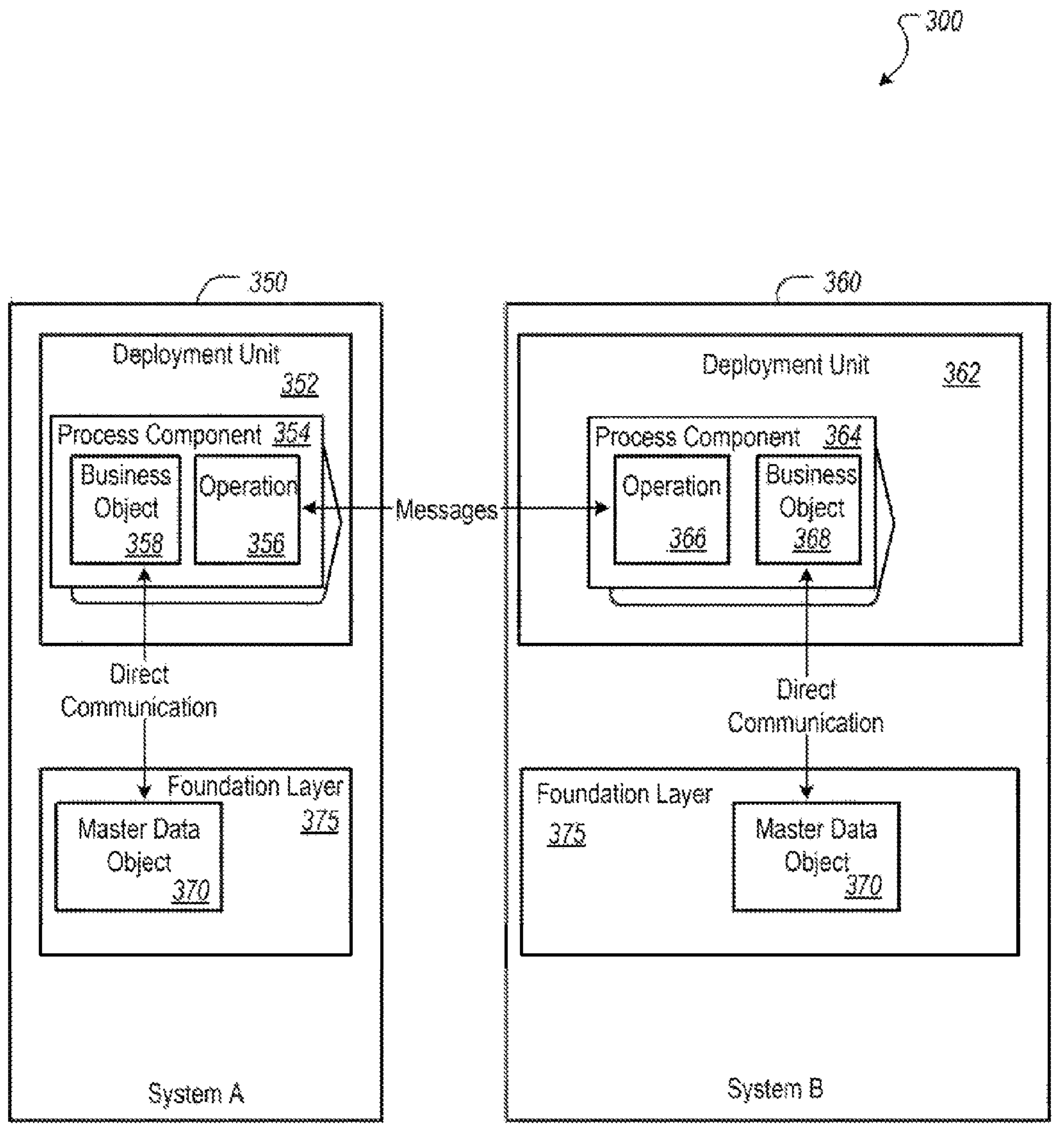

More generally in environment 300 as depicted in FIG. 3B, a Foundation Layer 375 can be deployed on multiple separate and distinct hardware platforms, e.g., System A 350 and System B 360, to support application software deployed as two or more deployment units distributed on the platforms, including deployment unit 352 deployed on System A and deployment unit 362 deployed on System B. In this example, the foundation layer can be used to support application software deployed in an application layer. In particular, the foundation layer can be used in connection with application software implemented in accordance with a software architecture that provides a suite of enterprise service operations having various application functionality. In some implementations, the application software is implemented to be deployed on an application platform that includes a foundation layer that contains all fundamental entities that can used from multiple deployment units. These entities can be process components, business objects, and reuse service components. A reuse service component is a piece of software that is reused in different transactions. A reuse service component is used by its defined interfaces, which can be, e.g., local APIs or service interfaces. As explained above, process components in separate deployment units interact through service operations, as illustrated by messages passing between service operations 356 and 366, which are implemented in process components 354 and 364, respectively, which are included in deployment units 352 and 362, respectively. As also explained above, some form of direct communication is generally the form of interaction used between a business object, e.g., business object 358 and 368, of an application deployment unit and a business object, such as master data object 370, of the Foundation Layer 375.

Various components of the present disclosure may be modeled using a model-driven environment. For example, the model-driven framework or environment may allow the developer to use simple drag-and-drop techniques to develop pattern-based or freestyle user interfaces and define the flow of data between them. The result could be an efficient, customized, visually rich online experience. In some cases, this model-driven development may accelerate the application development process and foster business-user self-service. It further enables business analysts or IT developers to compose visually rich applications that use analytic services, enterprise services, remote function calls (RFCs), APIs, and stored procedures. In addition, it may allow them to reuse existing applications and create content using a modeling process and a visual user interface instead of manual coding.

Figure 5A:
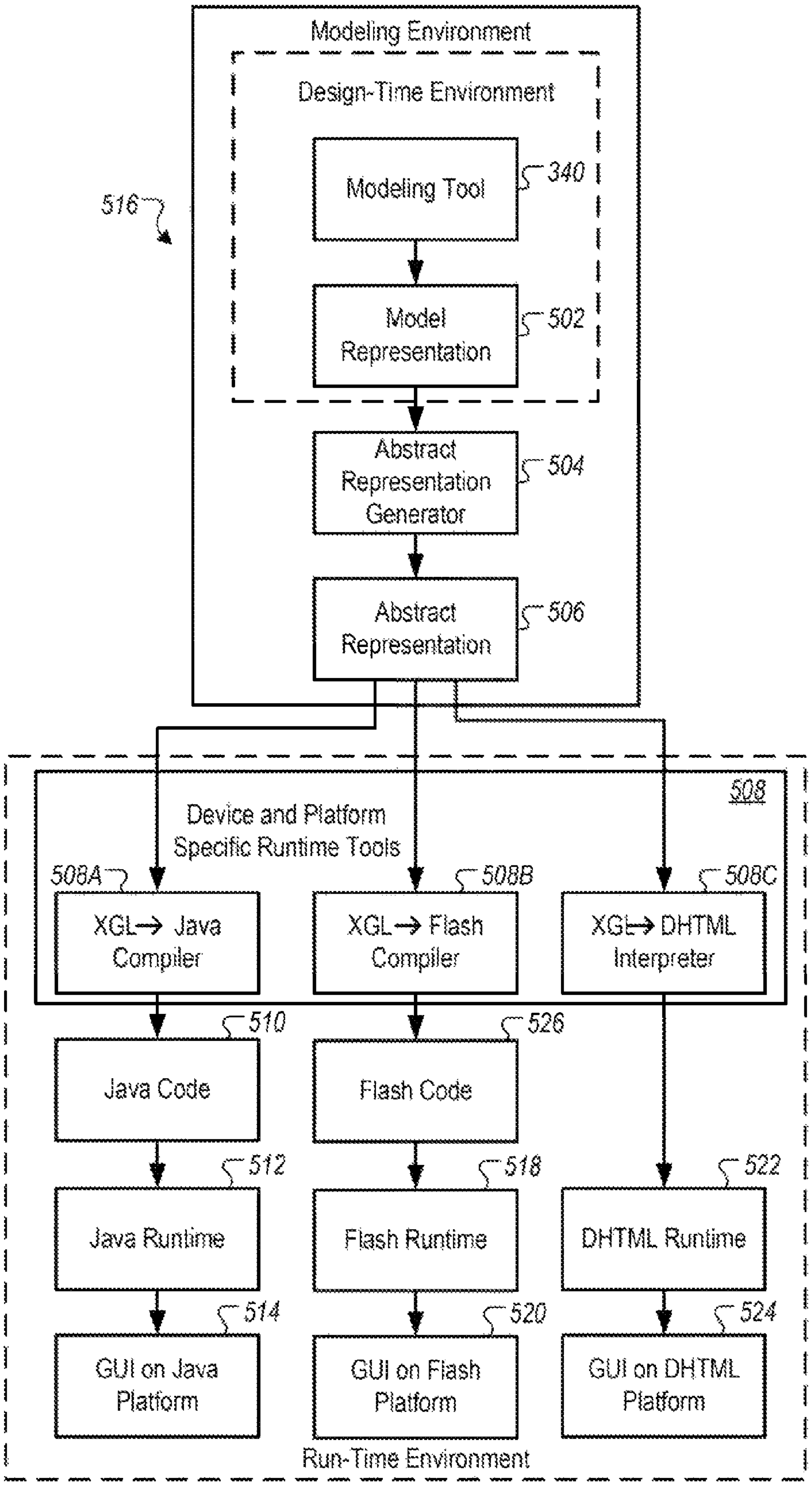
FIG. 5A depicts an example development environment in accordance with one embodiment of FIG. 1.

FIG. 5A depicts an example modeling environment 516, namely a modeling environment, in accordance with one embodiment of the present disclosure. Thus, as illustrated in FIG. 5A, such a modeling environment 516 may implement techniques for decoupling models created during design-time from the runtime environment. In other words, model representations for GUIs created in a design time environment are decoupled from the runtime environment in which the GUIs are executed. Often in these environments, a declarative and executable representation for GUIs for applications is provided that is independent of any particular runtime platform, GUI framework, device, or programming language.

According to some embodiments, a modeler (or other analyst) may use the model-driven modeling environment 516 to create pattern-based or freestyle user interfaces using simple drag-and-drop services. Because this development may be model-driven, the modeler can typically compose an application using models of business objects without having to write much, if any, code. In some cases, this example modeling environment 516 may provide a personalized, secure interface that helps unify enterprise applications, information, and processes into a coherent, role-based portal experience. Further, the modeling environment 516 may allow the developer to access and share information and applications in a collaborative environment. In this way, virtual collaboration rooms allow developers to work together efficiently, regardless of where they are located, and may enable powerful and immediate communication that crosses organizational boundaries while enforcing security requirements. Indeed, the modeling environment 516 may provide a shared set of services for finding, organizing, and accessing unstructured content stored in third-party repositories and content management systems across various networks 312. Classification tools may automate the organization of information, while subject-matter experts and content managers can publish information to distinct user audiences. Regardless of the particular implementation or architecture, this modeling environment 516 may allow the developer to easily model hosted business objects 140 using this model-driven approach.

In certain embodiments, the modeling environment 516 may implement or utilize a generic, declarative, and executable GUI language (generally described as XGL). This example XGL is generally independent of any particular GUI framework or runtime platform. Further, XGL is normally not dependent on characteristics of a target device on which the graphic user interface is to be displayed and may also be independent of any programming language. XGL is used to generate a generic representation (occasionally referred to as the XGL representation or XGL-compliant representation) for a design-time model representation. The XGL representation is thus typically a device-independent representation of a GUI. The XGL representation is declarative in that the representation does not depend on any particular GUI framework, runtime platform, device, or programming language. The XGL representation can be executable and therefore can unambiguously encapsulate execution semantics for the GUI described by a model representation. In short, models of different types can be transformed to XGL representations.

The XGL representation may be used for generating representations of various different GUIs and supports various GUI features including full windowing and componentization support, rich data visualizations and animations, rich modes of data entry and user interactions, and flexible connectivity to any complex application data services. While a specific embodiment of XGL is discussed, various other types of XGLs may also be used in alternative embodiments. In other words, it will be understood that XGL is used for example description only and may be read to include any abstract or modeling language that can be generic, declarative, and executable.

Turning to the illustrated embodiment in FIG. 5A, modeling tool 340 may be used by a GUI designer or business analyst during the application design phase to create a model representation 502 for a GUI application. It will be understood that modeling environment 516 may include or be compatible with various different modeling tools 340 used to generate model representation 502. This model representation 502 may be a machine-readable representation of an application or a domain specific model. Model representation 502 generally encapsulates various design parameters related to the GUI such as GUI components, dependencies between the GUI components, inputs and outputs, and the like. Put another way, model representation 502 provides a form in which the one or more models can be persisted and transported, and possibly handled by various tools such as code generators, runtime interpreters, analysis and validation tools, merge tools, and the like. In one embodiment, model representation 502 may be a collection of XML documents with a well-formed syntax.

Illustrated modeling environment 516 also includes an abstract representation generator (or XGL generator) 504 operable to generate an abstract representation (for example, XGL representation or XGL-compliant representation) 506 based upon model representation 502. Abstract representation generator 504 takes model representation 502 as input and outputs abstract representation 506 for the model representation. Model representation 502 may include multiple instances of various forms or types depending on the tool/language used for the modeling. In certain cases, these various different model representations may each be mapped to one or more abstract representations 506. Different types of model representations may be transformed or mapped to XGL representations. For each type of model representation, mapping rules may be provided for mapping the model representation to the XGL representation 506. Different mapping rules may be provided for mapping a model representation to an XGL representation.

This XGL representation 506 that is created from a model representation may then be used for processing in the runtime environment. For example, the XGL representation 506 may be used to generate a machine-executable runtime GUI (or some other runtime representation) that may be executed by a target device. As part of the runtime processing, the XGL representation 506 may be transformed into one or more runtime representations, which may indicate source code in a particular programming language, machine-executable code for a specific runtime environment, executable GUI, and so forth, which may be generated for specific runtime environments and devices. Since the XGL representation 506, rather than the design-time model representation, is used by the runtime environment, the design-time model representation is decoupled from the runtime environment. The XGL representation 506 can thus serve as the common ground or interface between design-time user interface modeling tools and a plurality of user interface runtime frameworks. It provides a self-contained, closed, and deterministic definition of all aspects of a graphical user interface in a device-independent and programming-language independent manner. Accordingly, abstract representation 506 generated for a model representation 502 is generally declarative and executable in that it provides a representation of the GUI of model representation 502 that is not dependent on any device or runtime platform, is not dependent on any programming language, and unambiguously encapsulates execution semantics for the GUI. The execution semantics may include, for example, identification of various components of the GUI, interpretation of connections between the various GUI components, information identifying the order of sequencing of events, rules governing dynamic behavior of the GUI, rules governing handling of values by the GUI, and the like. The abstract representation 506 is also not GUI runtime-platform specific. The abstract representation 506 provides a self-contained, closed, and deterministic definition of all aspects of a graphical user interface that is device independent and language independent.

Abstract representation 506 is such that the appearance and execution semantics of a GUI generated from the XGL representation work consistently on different target devices irrespective of the GUI capabilities of the target device and the target device platform. For example, the same XGL representation may be mapped to appropriate GUIs on devices of differing levels of GUI complexity (i.e., the same abstract representation may be used to generate a GUI for devices that support simple GUIs and for devices that can support complex GUIs), the GUI generated by the devices are consistent with each other in their appearance and behavior.

Abstract representation generator 504 may be configured to generate abstract representation 506 for models of different types, which may be created using different modeling tools 340. It will be understood that modeling environment 516 may include some, none, or other sub-modules or components as those shown in this example illustration. In other words, modeling environment 516 encompasses the design-time environment (with or without the abstract generator or the various representations), a modeling toolkit (such as 340) linked with a developer's space, or any other appropriate software operable to decouple models created during design-time from the runtime environment. Abstract representation 506 provides an interface between the design time environment and the runtime environment. As shown, this abstract representation 506 may then be used by runtime processing.

As part of runtime processing, modeling environment 516 may include various runtime tools 508 and may generate different types of runtime representations based upon the abstract representation 506. Examples of runtime representations include device or language-dependent (or specific) source code, runtime platform-specific machine-readable code, GUIs for a particular target device, and the like. The runtime tools 508 may include compilers, interpreters, source code generators, and other such tools that are configured to generate runtime platform-specific or target device-specific runtime representations of abstract representation 506. The runtime tool 508 may generate the runtime representation from abstract representation 506 using specific rules that map abstract representation 506 to a particular type of runtime representation. These mapping rules may be dependent on the type of runtime tool, characteristics of the target device to be used for displaying the GUI, runtime platform, and/or other factors. Accordingly, mapping rules may be provided for transforming the abstract representation 506 to any number of target runtime representations directed to one or more target GUI runtime platforms. For example, XGL-compliant code generators may conform to semantics of XGL, as described below. XGL-compliant code generators may ensure that the appearance and behavior of the generated user interfaces is preserved across a plurality of target GUI frameworks, while accommodating the differences in the intrinsic characteristics of each and also accommodating the different levels of capability of target devices.

For example, as depicted in example FIG. 5A, an XGL-to-Java compiler 508A may take abstract representation 506 as input and generate Java code 510 for execution by a target device comprising a Java runtime 512. Java runtime 512 may execute Java code 510 to generate or display a GUI 514 on a Java-platform target device. As another example, an XGL-to-Flash compiler 508B may take abstract representation 506 as input and generate Flash code 526 for execution by a target device comprising a Flash runtime 518. Flash runtime 518 may execute Flash code 516 to generate or display a GUI 520 on a target device comprising a Flash platform. As another example, an XGL-to-DHTML (dynamic HTML) interpreter 508C may take abstract representation 506 as input and generate DHTML statements (instructions) on the fly which are then interpreted by a DHTML runtime 522 to generate or display a GUI 524 on a target device comprising a DHTML platform.

It should be apparent that abstract representation 506 may be used to generate GUIs for Extensible Application Markup Language (XAML) or various other runtime platforms and devices. The same abstract representation 506 may be mapped to various runtime representations and device-specific and runtime platform-specific GUIs. In general, in the runtime environment, machine executable instructions specific to a runtime environment may be generated based upon the abstract representation 506 and executed to generate a GUI in the runtime environment. The same XGL representation may be used to generate machine executable instructions specific to different runtime environments and target devices.

According to certain embodiments, the process of mapping a model representation 502 to an abstract representation 506 and mapping an abstract representation 506 to some runtime representation may be automated. For example, design tools may automatically generate an abstract representation for the model representation using XGL and then use the XGL abstract representation to generate GUIs that are customized for specific runtime environments and devices. As previously indicated, mapping rules may be provided for mapping model representations to an XGL representation. Mapping rules may also be provided for mapping an XGL representation to a runtime platform-specific representation.

Since the runtime environment uses abstract representation 506 rather than model representation 502 for runtime processing, the model representation 502 that is created during design-time is decoupled from the runtime environment. Abstract representation 506 thus provides an interface between the modeling environment and the runtime environment. As a result, changes may be made to the design time environment, including changes to model representation 502 or changes that affect model representation 502, generally to not substantially affect or impact the runtime environment or tools used by the runtime environment. Likewise, changes may be made to the runtime environment generally to not substantially affect or impact the design time environment. A designer or other developer can thus concentrate on the design aspects and make changes to the design without having to worry about the runtime dependencies such as the target device platform or programming language dependencies.

Figure 5B:
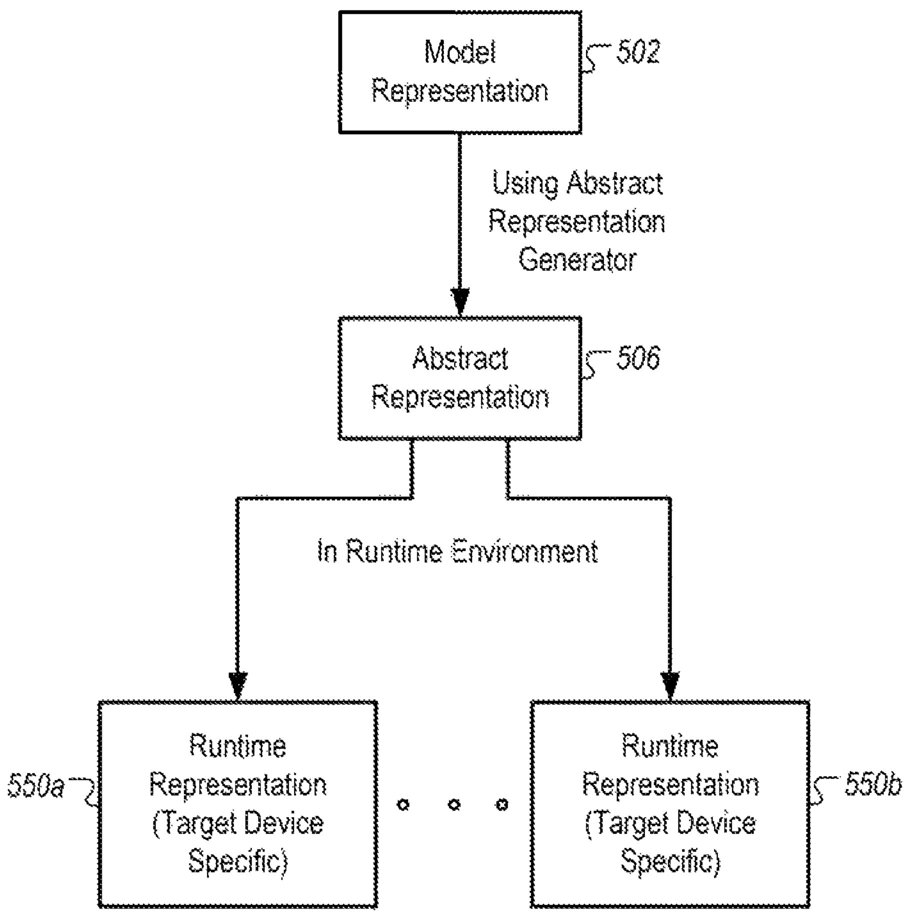
FIG. 5B depicts a simplified process for mapping a model representation to a runtime representation using the example development environment of FIG. 5A or some other development environment.

FIG. 5B depicts an example process for mapping a model representation 502 to a runtime representation using the example modeling environment 516 of FIG. 5A or some other modeling environment. Model representation 502 may comprise one or more model components and associated properties that describe a data object, such as hosted business objects and interfaces. As described above, at least one of these model components is based on or otherwise associated with these hosted business objects and interfaces. The abstract representation 506 is generated based upon model representation 502. Abstract representation 506 may be generated by the abstract representation generator 504. Abstract representation 506 comprises one or more abstract GUI components and properties associated with the abstract GUI components. As part of generation of abstract representation 506, the model GUI components and their associated properties from the model representation are mapped to abstract GUI components and properties associated with the abstract GUI components. Various mapping rules may be provided to facilitate the mapping. The abstract representation encapsulates both appearance and behavior of a GUI. Therefore, by mapping model components to abstract components, the abstract representation not only specifies the visual appearance of the GUI but also the behavior of the GUI, such as in response to events whether clicking/dragging or scrolling, interactions between GUI components and such.

One or more runtime representations 550*a*, including GUIs for specific runtime environment platforms, may be generated from abstract representation 506. A device-dependent runtime representation may be generated for a particular type of target device platform to be used for executing and displaying the GUI encapsulated by the abstract representation. The GUIs generated from abstract representation 506 may comprise various types of GUI elements such as buttons, windows, scrollbars, input boxes, etc. Rules may be provided for mapping an abstract representation to a particular runtime representation. Various mapping rules may be provided for different runtime environment platforms.

Methods and systems consistent with the subject matter described herein provide and use interfaces 320 derived from the business object model 318 suitable for use with more than one business area, for example different departments within a company such as finance, or marketing. Also, they are suitable across industries and across businesses. Interfaces 320 are used during an end-to-end business transaction to transfer business process information in an application-independent manner. For example the interfaces can be used for fulfilling a sales order.

1. Message Overview

To perform an end-to-end business transaction, consistent interfaces are used to create business documents that are sent within messages between heterogeneous programs or modules.

a) Message Categories

Figure 6:
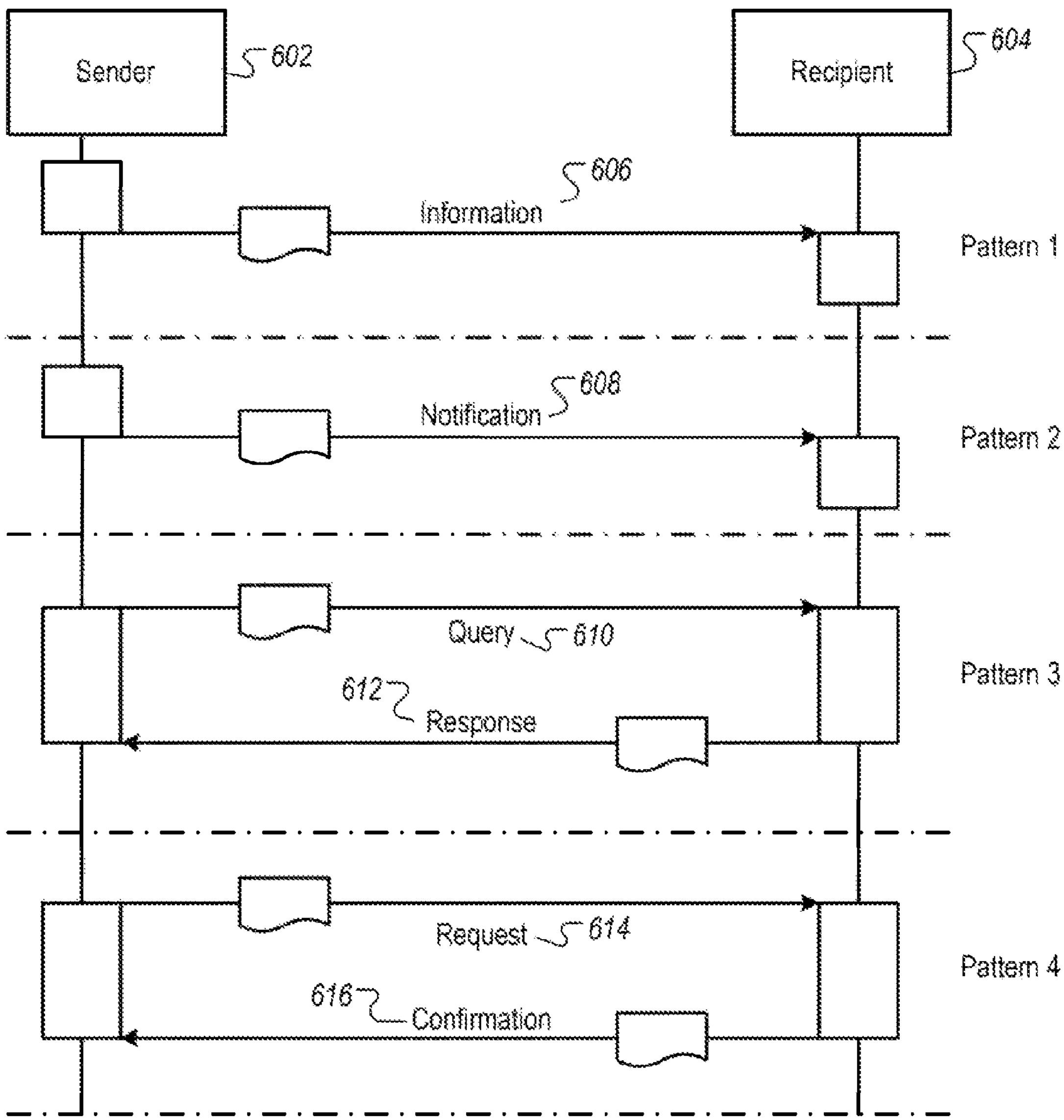
FIG. 6 depicts message categories in accordance with methods and systems consistent with the subject matter described herein.

As depicted in FIG. 6, the communication between a sender 602 and a recipient 604 can be broken down into basic categories that describe the type of the information exchanged and simultaneously suggest the anticipated reaction of the recipient 604. A message category is a general business classification for the messages. Communication is sender-driven. In other words, the meaning of the message categories is established or formulated from the perspective of the sender 602. The message categories include information 606, notification 608, query 610, response 612, request 614, and confirmation 616.

(1) Information

Information 606 is a message sent from a sender 602 to a recipient 604 concerning a condition or a statement of affairs. No reply to information is expected. Information 606 is sent to make business partners or business applications aware of a situation. Information 606 is not compiled to be application-specific. Examples of “information” are an announcement, advertising, a report, planning information, and a message to the business warehouse.

(2) Notification

A notification 608 is a notice or message that is geared to a service. A sender 602 sends the notification 608 to a recipient 604. No reply is expected for a notification. For example, a billing notification relates to the preparation of an invoice while a dispatched delivery notification relates to preparation for receipt of goods.

(3) Query

A query 610 is a question from a sender 602 to a recipient 604 to which a response 612 is expected. A query 610 implies no assurance or obligation on the part of the sender 602. Examples of a query 610 are whether space is available on a specific flight or whether a specific product is available. These queries do not express the desire for reserving the flight or purchasing the product.

(4) Response

A response 612 is a reply to a query 610. The recipient 604 sends the response 612 to the sender 602. A response 612 generally implies no assurance or obligation on the part of the recipient 604. The sender 602 is not expected to reply. Instead, the process is concluded with the response 612. Depending on the business scenario, a response 612 also may include a commitment, i.e., an assurance or obligation on the part of the recipient 604. Examples of responses 612 are a response stating that space is available on a specific flight or that a specific product is available. With these responses, no reservation was made.

(5) Request

A request 614 is a binding requisition or requirement from a sender 602 to a recipient 604. Depending on the business scenario, the recipient 604 can respond to a request 614 with a confirmation 616. The request 614 is binding on the sender 602. In making the request 614, the sender 602 assumes, for example, an obligation to accept the services rendered in the request 614 under the reported conditions. Examples of a request 614 are a parking ticket, a purchase order, an order for delivery and a job application.

(6) Confirmation

A confirmation 616 is a binding reply that is generally made to a request 614. The recipient 604 sends the confirmation 616 to the sender 602. The information indicated in a confirmation 616, such as deadlines, products, quantities and prices, can deviate from the information of the preceding request 614. A request 614 and confirmation 616 may be used in negotiating processes. A negotiating process can consist of a series of several request 614 and confirmation 616 messages. The confirmation 616 is binding on the recipient 604. For example, 100 units of X may be ordered in a purchase order request; however, only the delivery of 80 units is confirmed in the associated purchase order confirmation.

b) Message Choreography

A message choreography is a template that specifies the sequence of messages between business entities during a given transaction. The sequence with the messages contained in it describes in general the message "lifecycle" as it proceeds between the business entities. If messages from a choreography are used in a business transaction, they appear in the transaction in the sequence determined by the choreography. This illustrates the template character of a choreography, i.e., during an actual transaction, it is not necessary for all messages of the choreography to appear. Those messages that are contained in the transaction, however, follow the sequence within the choreography. A business transaction is thus a derivation of a message choreography. The choreography makes it possible to determine the structure of the individual message types more precisely and distinguish them from one another.

2. Components of the Business Object Model

The overall structure of the business object model ensures the consistency of the interfaces that are derived from the business object model. The derivation ensures that the same business-related subject matter or concept is represented and structured in the same way in all interfaces.

The business object model defines the business-related concepts at a central location for a number of business transactions. In other words, it reflects the decisions made about modeling the business entities of the real world acting in business transactions across industries and business areas. The business object model is defined by the business objects and their relationship to each other (the overall net structure).

Each business object is generally a capsule with an internal hierarchical structure, behavior offered by its operations, and integrity constraints. Business objects are semantically disjoint, i.e., the same business information is represented once. In the business object model, the business objects are arranged in an ordering framework. From left to right, they are arranged according to their existence dependency to each other. For example, the customizing elements may be arranged on the left side of the business object model, the strategic elements may be arranged in the center of the business object model, and the operative elements may be arranged on the right side of the business object model. Similarly, the business objects are arranged from the top to the bottom based on defined order of the business areas, e.g., finance could be arranged at the top of the business object model with CRM below finance and SRM below CRM.

To ensure the consistency of interfaces, the business object model may be built using standardized data types as well as packages to group related elements together, and package templates and entity templates to specify the arrangement of packages and entities within the structure.

a) Data Types

Data types are used to type object entities and interfaces with a structure. This typing can include business semantic. Such data types may include those generally described at pages 96 through 1642 (which are incorporated by reference herein) of U.S. patent application Ser. No. 11/803,178, filed on May 11, 2007 and entitled "Consistent Set Of Interfaces Derived From A Business Object Model". For example, the data type BusinessTransactionDocumentID is a unique identifier for a document in a business transaction. Also, as an example, Data type BusinessTransactionDocumentParty contains the information that is exchanged in business documents about a party involved in a business transaction, and includes the party's identity, the party's address, the party's contact person and the contact person's address. BusinessTransactionDocumentParty also includes the role of the party, e.g., a buyer, seller, product recipient, or vendor.

The data types are based on Core Component Types ("CCTs"), which themselves are based on the World Wide Web Consortium ("W3C") data types. "Global" data types represent a business situation that is described by a fixed structure. Global data types include both context-neutral generic data types ("GDTs") and context-based context data types ("CDTs"). GDTs contain business semantics, but are application-neutral, i.e., without context. CDTs, on the other hand, are based on GDTs and form either a use-specific view of the GDTs, or a context-specific assembly of GDTs or CDTs. A message is typically constructed with reference to a use and is thus a use-specific assembly of GDTs and CDTs. The data types can be aggregated to complex data types.

To achieve a harmonization across business objects and interfaces, the same subject matter is typed with the same data type. For example, the data type "GeoCoordinates" is built using the data type "Measure" so that the measures in a GeoCoordinate (i.e., the latitude measure and the longitude measure) are represented the same as other "Measures" that appear in the business object model.

b) Entities

Entities are discrete business elements that are used during a business transaction. Entities are not to be confused with business entities or the components that interact to perform a transaction. Rather, "entities" are one of the layers of the business object model and the interfaces. For example, a Catalogue entity is used in a Catalogue Publication Request and a Purchase Order is used in a Purchase Order Request. These entities are created using the data types defined above to ensure the consistent representation of data throughout the entities.

c) Packages

Packages group the entities in the business object model and the resulting interfaces into groups of semantically associated information. Packages also may include "sub"-packages, i.e., the packages may be nested.

Figure 7:
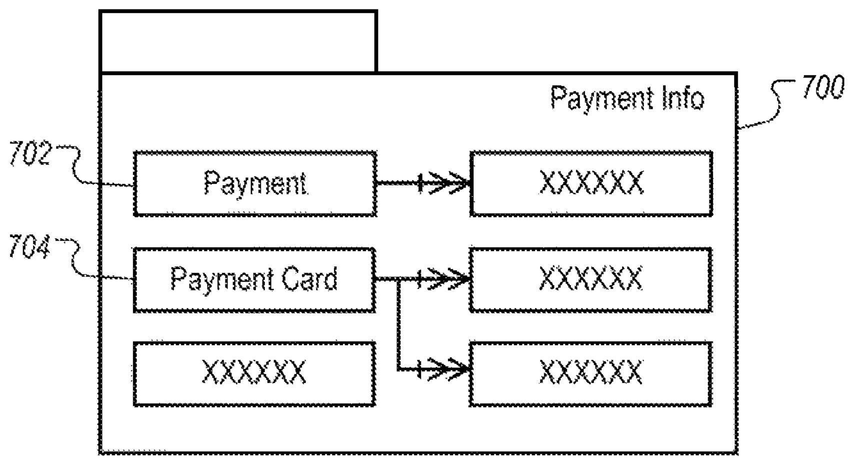
FIG. 7 depicts an example of a package in accordance with methods and systems consistent with the subject matter described herein.

Packages may group elements together based on different factors, such as elements that occur together as a rule with regard to a business-related aspect. For example, as depicted in FIG. 7, in a Purchase Order, different information regarding the purchase order, such as the type of payment 702, and payment card 704, are grouped together via the PaymentInformation package 700.

Figure 8:
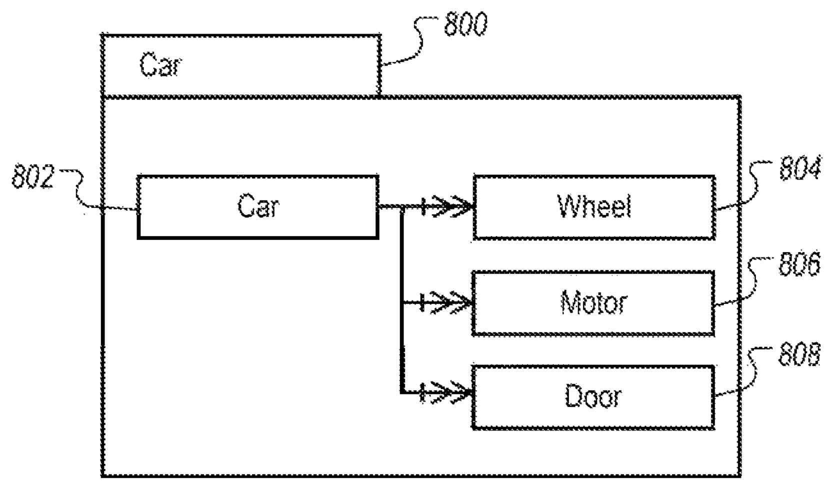
FIG. 8 depicts another example of a package in accordance with methods and systems consistent with the subject matter described herein.

Packages also may combine different components that result in a new object. For example, as depicted in FIG. 8, the components wheels 804, motor 806, and doors 808 are combined to form a composition "Car" 802. The "Car" package 800 includes the wheels, motor and doors as well as the composition "Car."

Figure 9:
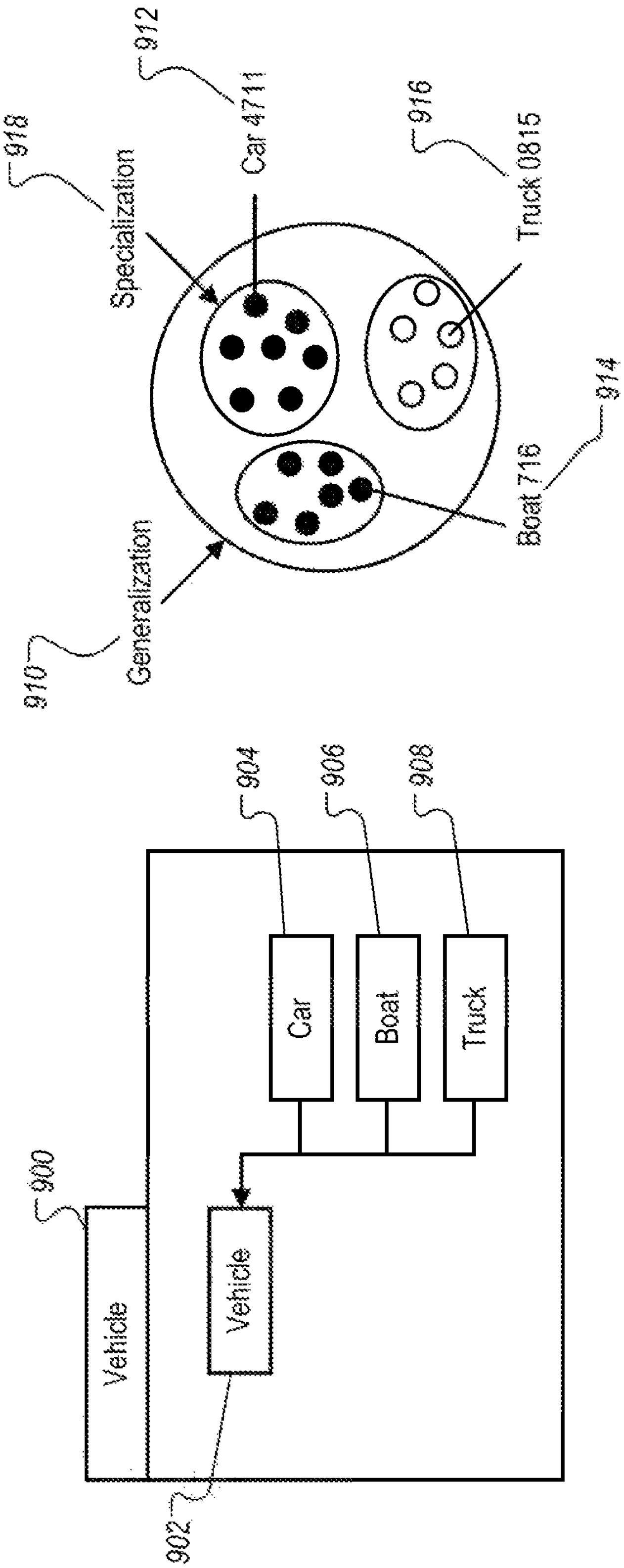
FIG. 9 depicts a third example of a package in accordance with methods and systems consistent with the subject matter described herein.

Another grouping within a package may be subtypes within a type. In these packages, the components are specialized forms of a generic package. For example, as depicted in FIG. 9, the components Car 904, Boat 906, and Truck 908 can be generalized by the generic term Vehicle 902 in Vehicle package 900. Vehicle in this case is the generic package 910, while Car 912, Boat 914, and Truck 916 are the specializations 918 of the generalized vehicle 910.

Figure 10:
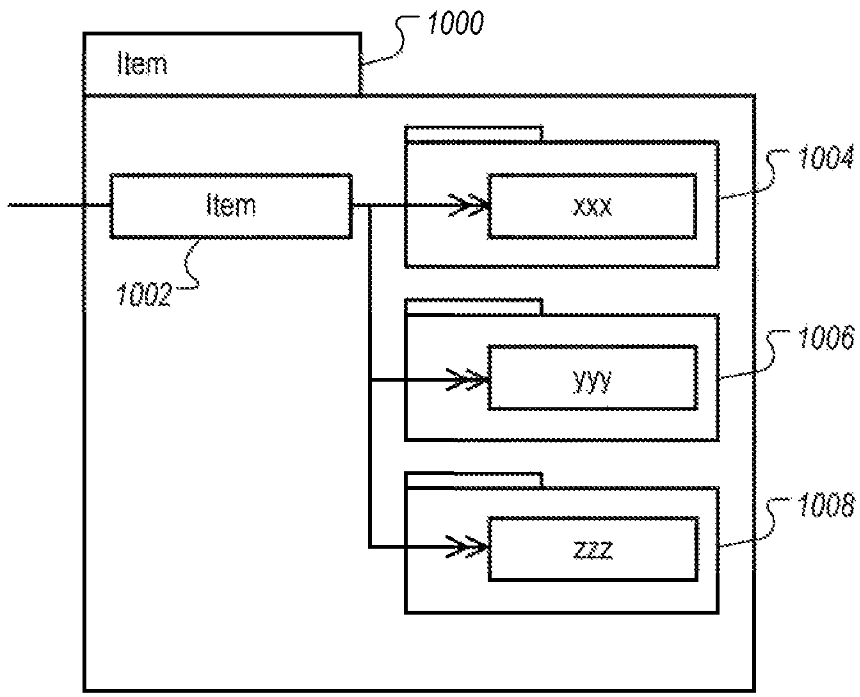
FIG. 10 depicts a fourth example of a package in accordance with methods and systems consistent with the subject matter described herein.

Packages also may be used to represent hierarchy levels. For example, as depicted in FIG. 10, the Item Package 1000 includes Item 1002 with subitem xxx 1004, subitem yyy 1006, and subitem zzz 1008.

Figure 11:
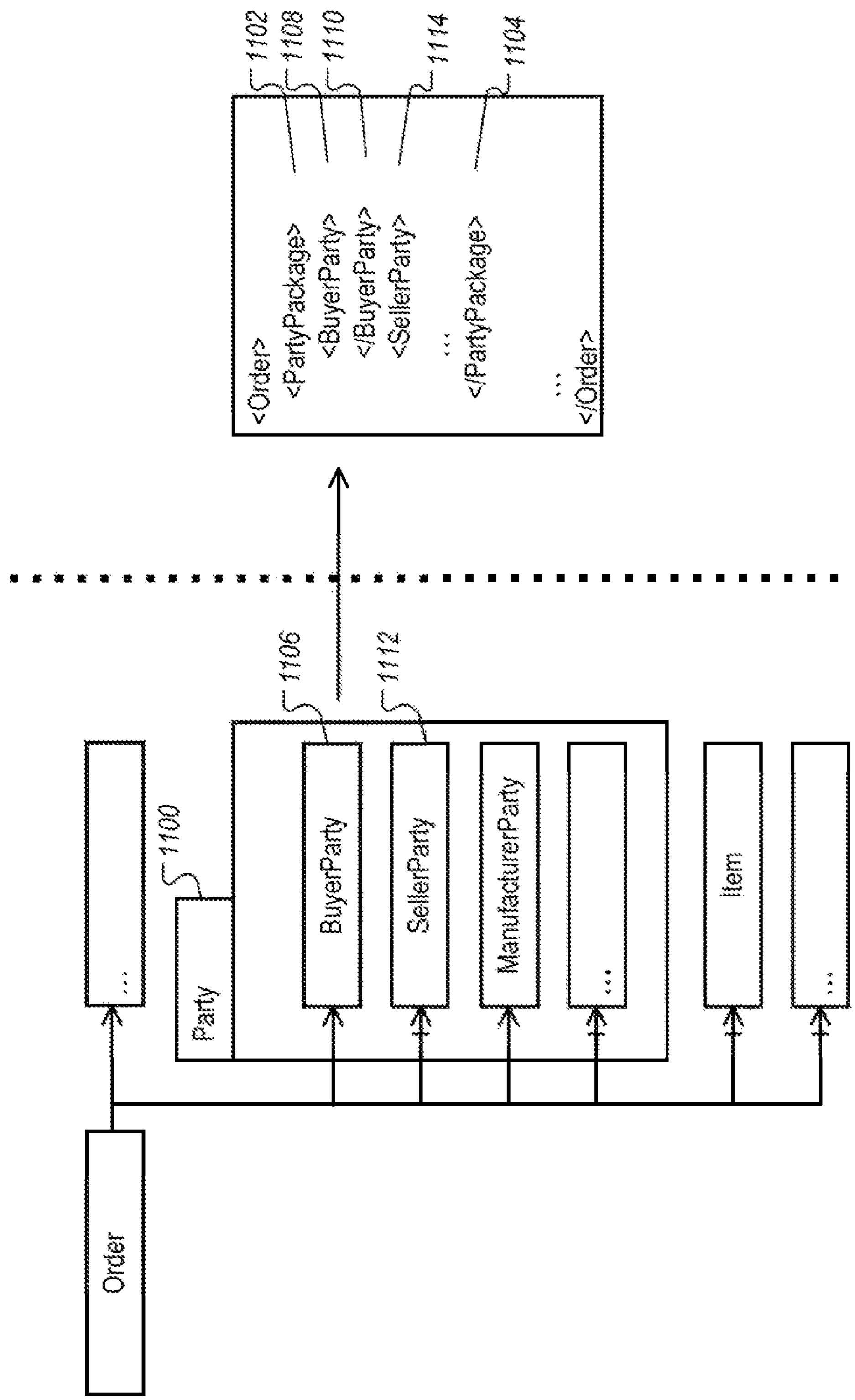
FIG. 11 depicts the representation of a package in the XML schema in accordance with methods and systems consistent with the subject matter described herein.

Packages can be represented in the XML schema as a comment. One advantage of this grouping is that the document structure is easier to read and is more understandable. The names of these packages are assigned by including the object name in brackets with the suffix "Package." For example, as depicted in FIG. 11, Party package 1100 is enclosed by <PartyPackage> 1102 and </PartyPackage> 1104. Party package 1100 illustratively includes a Buyer Party 1106, identified by <BuyerParty> 1108 and </BuyerParty> 1110, and a Seller Party 1112, identified by <SellerParty> 1114 and </SellerParty>, etc.

d) Relationships

Relationships describe the interdependencies of the entities in the business object model, and are thus an integral part of the business object model.

(1) Cardinality of Relationships

Figure 12:
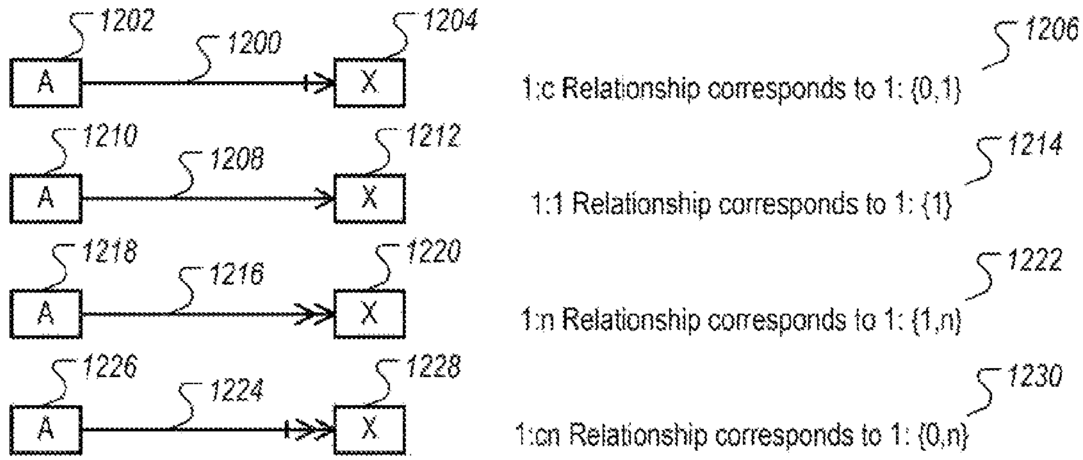
FIG. 12 depicts a graphical representation of cardinalities between two entities in accordance with methods and systems consistent with the subject matter described herein.

FIG. 12 depicts a graphical representation of the cardinalities between two entities. The cardinality between a first entity and a second entity identifies the number of second entities that could possibly exist for each first entity. Thus, a 1:c cardinality 1200 between entities A 1202 and X 1204 indicates that for each entity A 1202, there is either one or zero 1206 entity X 1204. A 1:1 cardinality 1208 between entities A 1210 and X 1212 indicates that for each entity A 1210, there is exactly one 1214 entity X 1212. A 1:n cardinality 1216 between entities A 1218 and X 1220 indicates that for each entity A 1218, there are one or more 1222 entity Xs 1220. A 1:cn cardinality 1224 between entities A 1226 and X 1228 indicates that for each entity A 1226, there are any number 1230 of entity Xs 1228 (i.e., 0 through n Xs for each A).

(2) Types of Relationships (a) Composition

Figure 13:
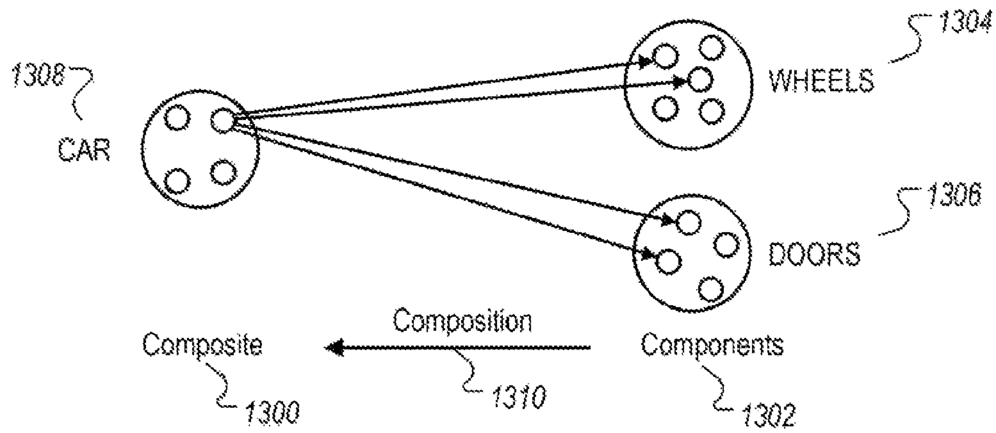
FIG. 13 depicts an example of a composition in accordance with methods and systems consistent with the subject matter described herein.
Figure 14:
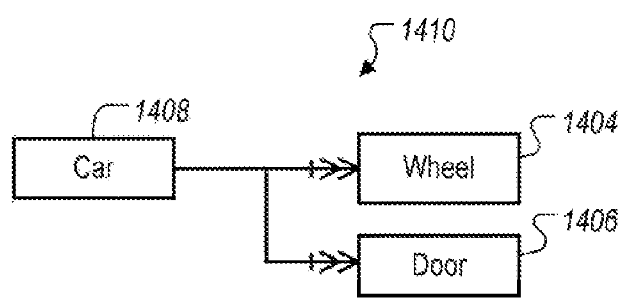
FIG. 14 depicts an example of a hierarchical relationship in accordance with methods and systems consistent with the subject matter described herein.

A composition or hierarchical relationship type is a strong whole-part relationship which is used to describe the structure within an object. The parts, or dependent entities, represent a semantic refinement or partition of the whole, or less dependent entity. For example, as depicted in FIG. 13, the components 1302, wheels 1304, and doors 1306 may be combined to form the composite 1300 "Car" 1308 using the composition 1310. FIG. 14 depicts a graphical representation of the composition 1410 between composite Car 1408 and components wheel 1404 and door 1406.

(b) Aggregation

Figure 15:
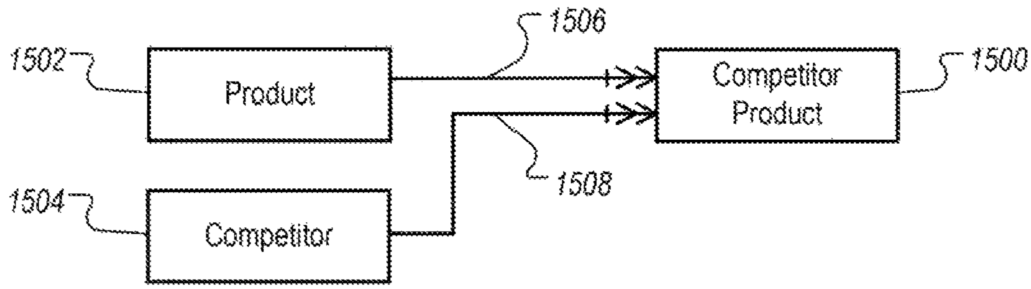
FIG. 15 depicts an example of an aggregating relationship in accordance with methods and systems consistent with the subject matter described herein.

An aggregation or an aggregating relationship type is a weak whole-part relationship between two objects. The dependent object is created by the combination of one or several less dependent objects. For example, as depicted in FIG. 15, the properties of a competitor product 1500 are determined by a product 1502 and a competitor 1504. A hierarchical relationship 1506 exists between the product 1502 and the competitor product 1500 because the competitor product 1500 is a component of the product 1502. Therefore, the values of the attributes of the competitor product 1500 are determined by the product 1502. An aggregating relationship 1508 exists between the competitor 1504 and the competitor product 1500 because the competitor product 1500 is differentiated by the competitor 1504. Therefore the values of the attributes of the competitor product 1500 are determined by the competitor 1504.

(c) Association

Figure 16:
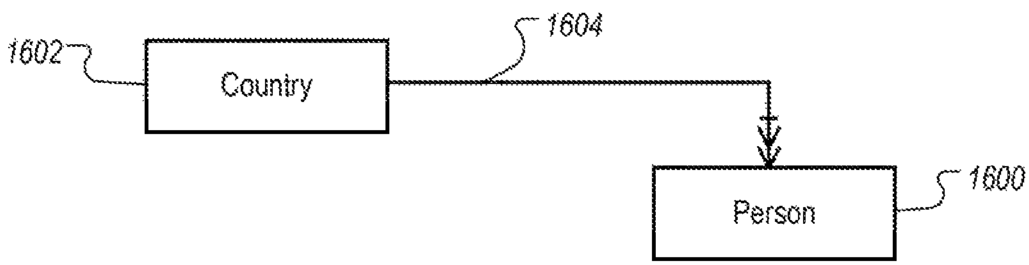
FIG. 16 depicts an example of an association in accordance with methods and systems consistent with the subject matter described herein.

An association or a referential relationship type describes a relationship between two objects in which the dependent object refers to the less dependent object. For example, as depicted in FIG. 16, a person 1600 has a nationality, and thus, has a reference to its country 1602 of origin. There is an association 1604 between the country 1602 and the person 1600. The values of the attributes of the person 1600 are not determined by the country 1602.

(3) Specialization

Figure 17:
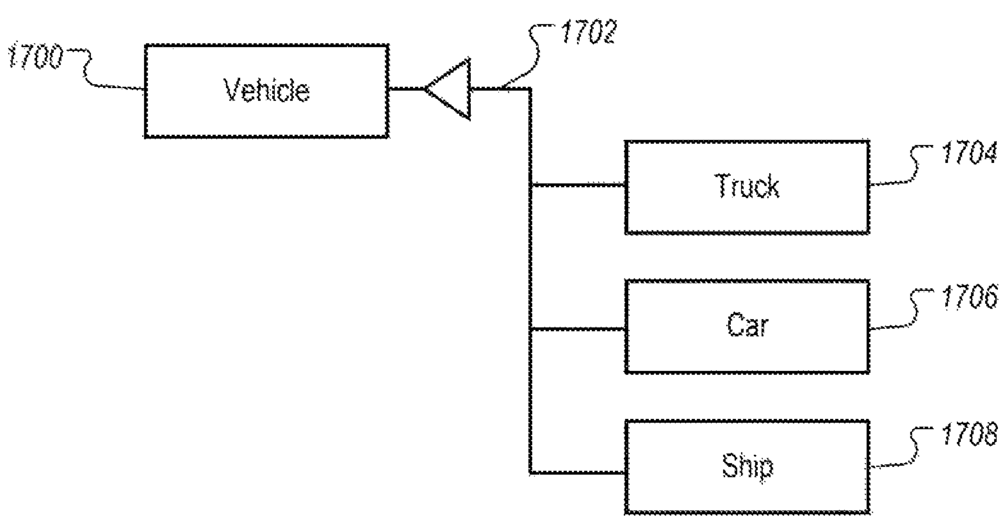
FIG. 17 depicts an example of a specialization in accordance with methods and systems consistent with the subject matter described herein.

Entity types may be divided into subtypes based on characteristics of the entity types. For example, FIG. 17 depicts an entity type "vehicle" 1700 specialized 1702 into subtypes "truck" 1704, "car" 1706, and "ship" 1708. These subtypes represent different aspects or the diversity of the entity type.

Subtypes may be defined based on related attributes. For example, although ships and cars are both vehicles, ships have an attribute, "draft," that is not found in cars. Subtypes also may be defined based on certain methods that can be applied to entities of this subtype and that modify such entities. For example, "drop anchor" can be applied to ships. If outgoing relationships to a specific object are restricted to a subset, then a subtype can be defined which reflects this subset.

Figure 18:
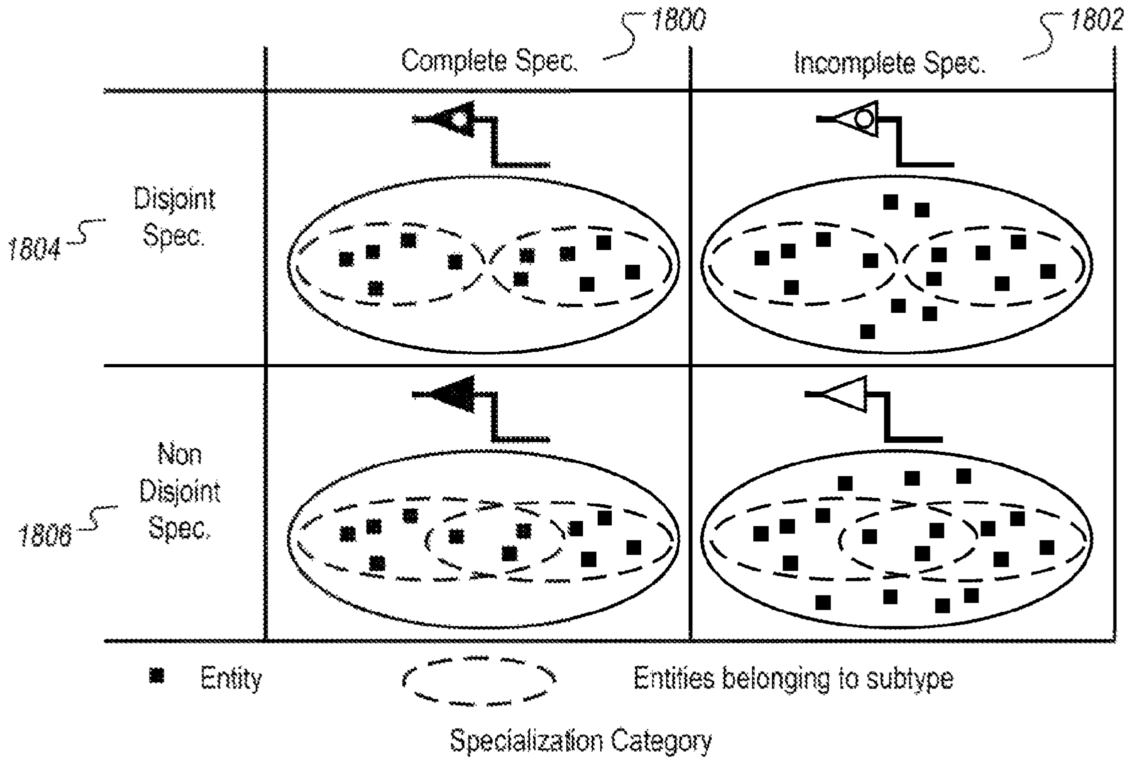
FIG. 18 depicts the categories of specializations in accordance with methods and systems consistent with the subject matter described herein.

As depicted in FIG. 18, specializations may further be characterized as complete specializations 1800 or incomplete specializations 1802. There is a complete specialization 1800 where each entity of the generalized type belongs to at least one subtype. With an incomplete specialization 1802, there is at least one entity that does not belong to a subtype. Specializations also may be disjoint 1804 or nondisjoint 1806. In a disjoint specialization 1804, each entity of the generalized type belongs to a maximum of one subtype. With a nondisjoint specialization 1806, one entity may belong to more than one subtype. As depicted in FIG. 18, four specialization categories result from the combination of the specialization characteristics.

e) Structural Patterns (1) Item

An item is an entity type which groups together features of another entity type. Thus, the features for the entity type chart of accounts are grouped together to form the entity type chart of accounts item. For example, a chart of accounts item is a category of values or value flows that can be recorded or represented in amounts of money in accounting, while a chart of accounts is a superordinate list of categories of values or value flows that is defined in accounting.

The cardinality between an entity type and its item is often either 1:n or 1:cn. For example, in the case of the entity type chart of accounts, there is a hierarchical relationship of the cardinality 1:n with the entity type chart of accounts item since a chart of accounts has at least one item in all cases.

(2) Hierarchy

Figure 19:
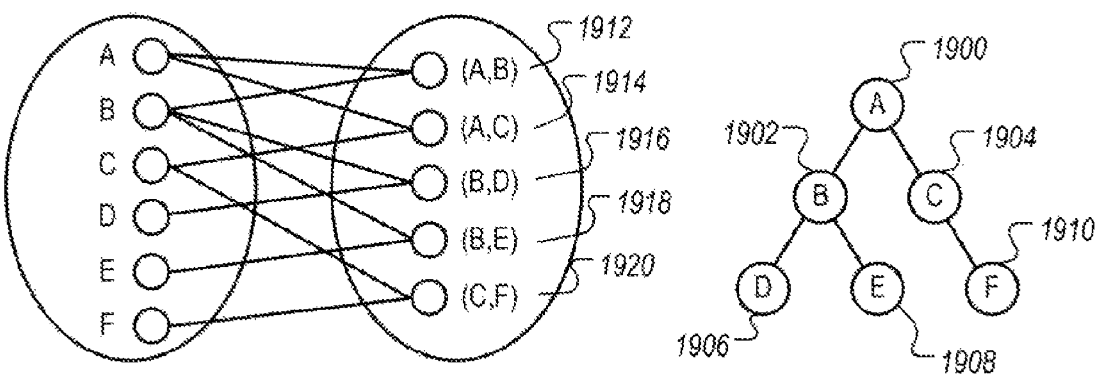
FIG. 19 depicts an example of a hierarchy in accordance with methods and systems consistent with the subject matter described herein.

A hierarchy describes the assignment of subordinate entities to superordinate entities and vice versa, where several entities of the same type are subordinate entities that have, at most, one directly superordinate entity. For example, in the hierarchy depicted in FIG. 19, entity B 1902 is subordinate to entity A 1900, resulting in the relationship (A,B) 1912. Similarly, entity C 1904 is subordinate to entity A 1900, resulting in the relationship (A,C) 1914. Entity D 1906 and entity E 1908 are subordinate to entity B 1902, resulting in the relationships (B,D) 1916 and (B,E) 1918, respectively. Entity F 1910 is subordinate to entity C 1904, resulting in the relationship (C,F) 1920.

Figure 20:
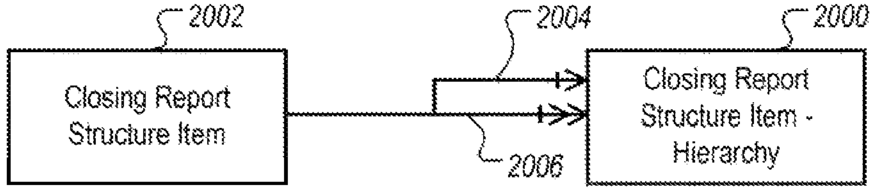
FIG. 20 depicts a graphical representation of a hierarchy in accordance with methods and systems consistent with the subject matter described herein.

Because each entity has at most one superordinate entity, the cardinality between a subordinate entity and its superordinate entity is 1:c. Similarly, each entity may have 0, 1 or many subordinate entities. Thus, the cardinality between a superordinate entity and its subordinate entity is 1:cn. FIG. 20 depicts a graphical representation of a Closing Report Structure Item hierarchy 2000 for a Closing Report Structure Item 2002. The hierarchy illustrates the 1:c cardinality 2004 between a subordinate entity and its superordinate entity, and the 1:cn cardinality 2006 between a superordinate entity and its subordinate entity.

3. Creation of the Business Object Model

Figure 21A:
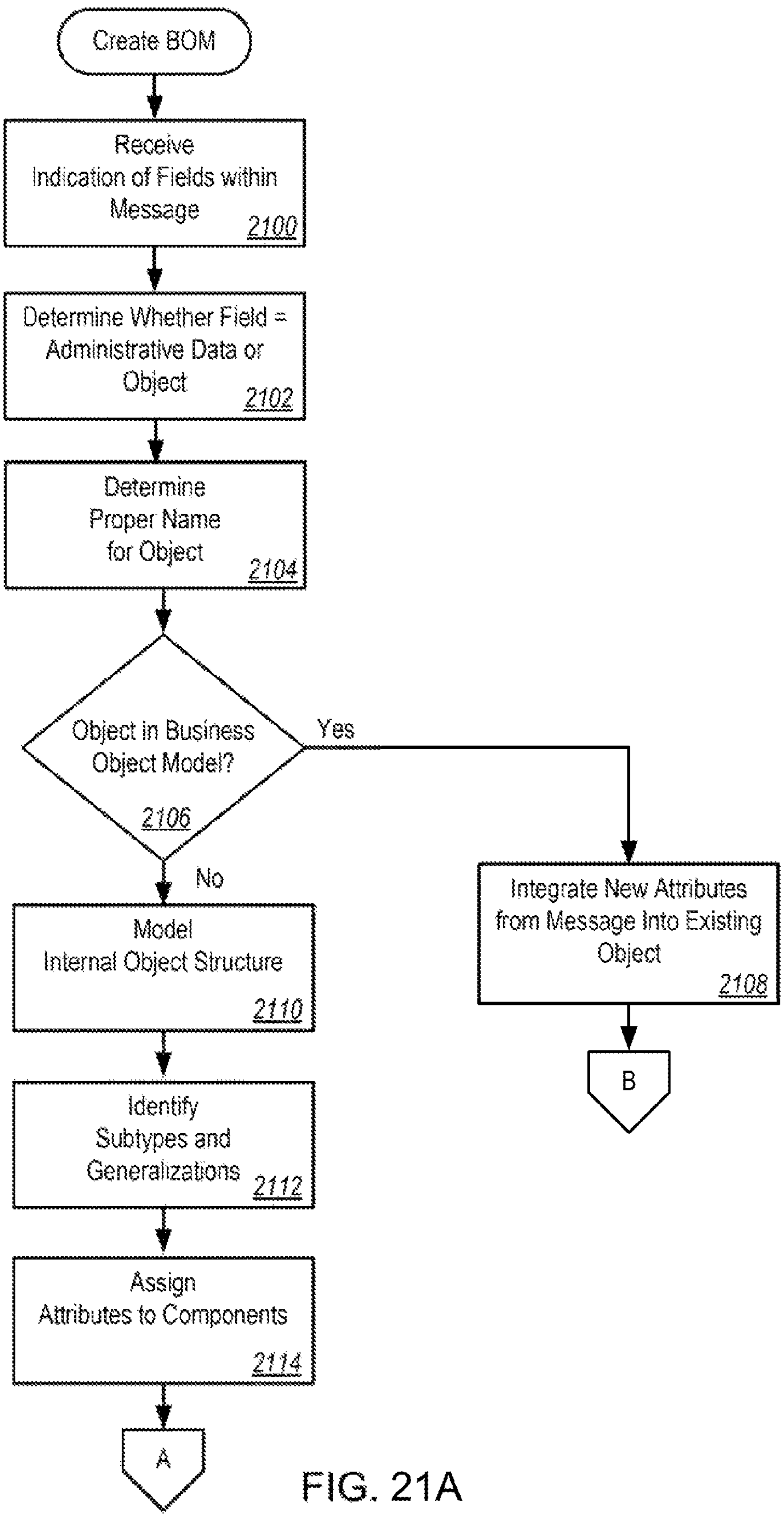
FIGS. 21A-B depict a flow diagram of the steps performed to create a business object model in accordance with methods and systems consistent with the subject matter described herein.
Figure 21B:
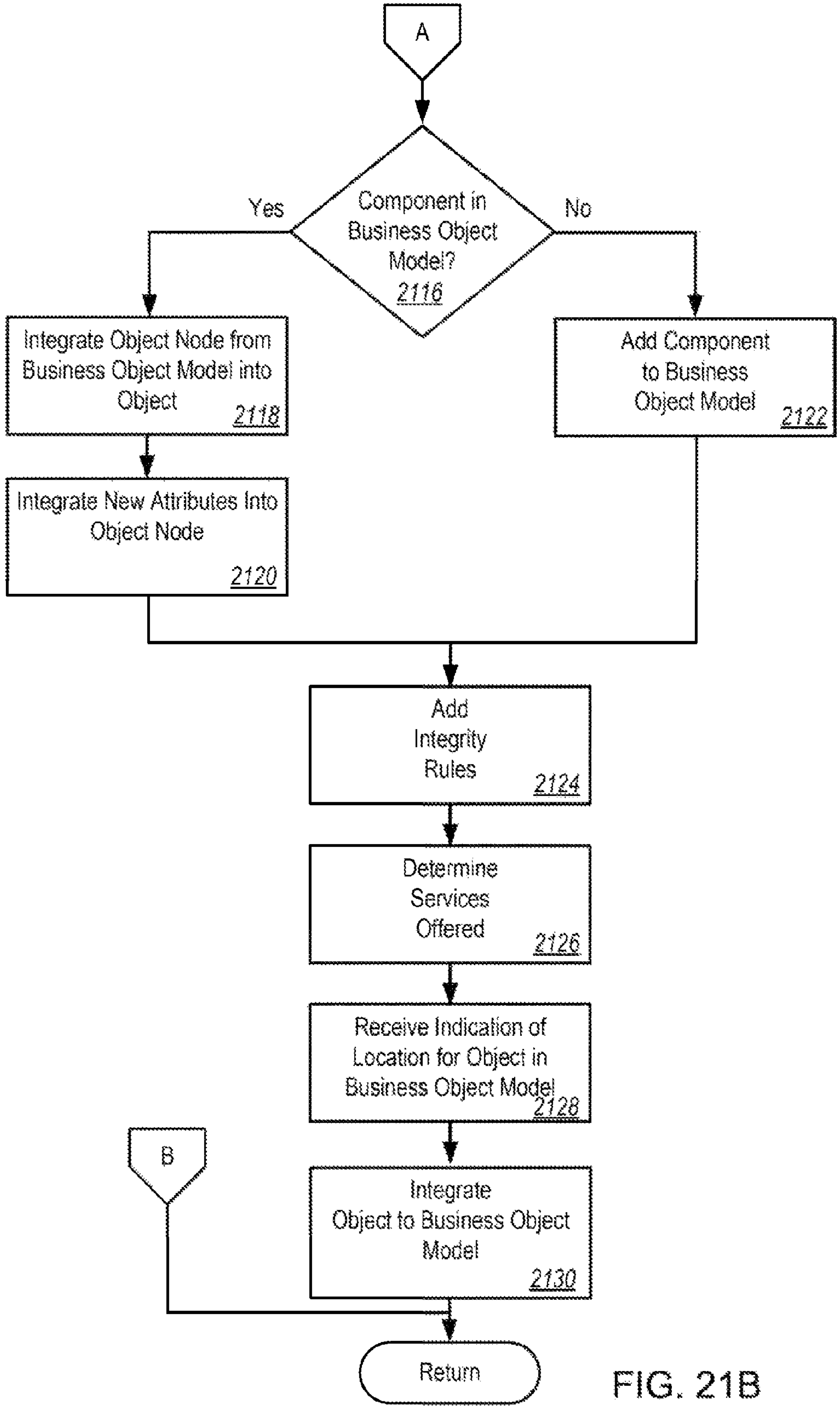

FIGS. 21A-B depict the steps performed using methods and systems consistent with the subject matter described herein to create a business object model. Although some steps are described as being performed by a computer, these steps may alternatively be performed manually, or computer-assisted, or any combination thereof. Likewise, although some steps are described as being performed by a computer, these steps may also be computer-assisted, or performed manually, or any combination thereof.

As discussed above, the designers create message choreographies that specify the sequence of messages between business entities during a transaction. After identifying the messages, the developers identify the fields contained in one of the messages (step 2100, FIG. 21A). The designers then determine whether each field relates to administrative data or is part of the object (step 2102). Thus, the first eleven fields identified below in the left column are related to administrative data, while the remaining fields are part of the object.

| | |
|---|---|
| MessageID | Admin |
| ReferenceID | |
| CreationDate | |
| SenderID | |
| AdditionalSenderID | |
| ContactPersonID | |
| SenderAddress | |
| RecipientID | |
| AdditionalRecipientID | |
| ContactPersonID | |
| RecipientAddress | |
| ID | Main Object |
| AdditionalID | |
| PostingDate | |
| LastChangeDate | |
| AcceptanceStatus | |
| Note | |
| CompleteTransmission Indicator | |
| Buyer | |
| BuyerOrganisationName | |
| Person Name | |
| FunctionalTitle | |
| DepartmentName | |
| CountryCode | |
| StreetPostalCode | |
| POBox Postal Code | |
| Company Postal Code | |
| City Name | |
| DistrictName | |
| PO Box ID | |
| PO Box Indicator | |
| PO Box Country Code | |
| PO Box Region Code | |
| PO Box City Name | |
| Street Name | |
| House ID | |
| Building ID | |
| Floor ID | |
| Room ID | |
| Care Of Name | |
| AddressDescription | |
| Telefonnumber | |
| MobileNumber | |
| Facsimile | |
| Email | |
| Seller | |

-continued

| | |
|---|---|
| SellerAddress | |
| Location | |
| LocationType | |
| DeliveryItemGroupID | |
| DeliveryPriority | |
| DeliveryCondition | |
| TransferLocation | |
| NumberofPartialDelivery | |
| QuantityTolerance | |
| MaximumLeadTime | |
| TransportServiceLevel | |
| TranportCondition | |
| TransportDescription | |
| CashDiscountTerms | |
| PaymentForm | |
| PaymentCardID | |
| PaymentCardReferenceID | |
| SequenceID | |
| Holder | |
| ExpirationDate | |
| AttachmentID | |
| AttachmentFilename | |
| DescriptionofMessage | |
| ConfirmationDescriptionof Message | |
| FollowUpActivity | |
| ItemID | |
| ParentItemID | |
| HierarchyType | |
| ProductID | |
| ProductType | |
| ProductNote | |
| ProductCategoryID | |
| Amount | |
| BaseQuantity | |
| ConfirmedAmount | |
| ConfirmedBaseQuantity | |
| ItemBuyer | |
| ItemBuyerOrganisationName | |
| Person Name | |
| FunctionalTitle | |
| DepartmentName | |
| CountryCode | |
| StreetPostalCode | |
| POBox Postal Code | |
| Company Postal Code | |
| City Name | |
| DistrictName | |
| PO Box ID | |
| PO Box Indicator | |
| PO Box Country Code | |
| PO Box Region Code | |
| PO Box City Name | |
| Street Name | |
| House ID | |
| Building ID | |
| Floor ID | |
| Room ID | |
| Care Of Name | |
| AddressDescription | |
| Telefonnumber | |
| MobilNumber | |
| Facsimile | |
| Email | |
| ItemSeller | |
| ItemSellerAddress | |
| ItemLocation | |
| ItemLocationType | |
| ItemDeliveryItemGroupID | |
| ItemDeliveryPriority | |
| ItemDeliveryCondition | |
| ItemTransferLocation | |
| ItemNumberofPartialDelivery | |
| ItemQuantityTolerance | |
| ItemMaximumLeadTime | |
| ItemTransportServiceLevel | |
| ItemTranportCondition | |
| ItemTransportDescription | |
| ContractReference | |
| QuoteReference | |
| CatalogueReference | |

-continued

| |
|---|
| ItemAttachmentID |
| ItemAttachmentFilename |
| ItemDescription |
| ScheduleLineID |
| DeliveryPeriod |
| Quantity |
| ConfirmedScheduleLineID |
| ConfirmedDeliveryPeriod |
| ConfirmedQuantity |

Next, the designers determine the proper name for the object according to the ISO 11179 naming standards (step 2104). In the example above, the proper name for the "Main Object" is "Purchase Order." After naming the object, the system that is creating the business object model determines whether the object already exists in the business object model (step 2106). If the object already exists, the system integrates new attributes from the message into the existing object (step 2108), and the process is complete.

If at step 2106 the system determines that the object does not exist in the business object model, the designers model the internal object structure (step 2110). To model the internal structure, the designers define the components. For the above example, the designers may define the components identified below.

| | | |
|---|---|---|
| ID | Purchase | |
| AdditionalID | Order | |
| PostingDate | | |
| LastChangeDate | | |
| AcceptanceStatus | | |
| Note | | |
| CompleteTransmission | | |
| Indicator | | |
| Buyer | | Buyer |
| BuyerOrganisationName | | |
| Person Name | | |
| FunctionalTitle | | |
| DepartmentName | | |
| CountryCode | | |
| StreetPostalCode | | |
| POBox Postal Code | | |
| Company Postal Code | | |
| City Name | | |
| DistrictName | | |
| PO Box ID | | |
| PO Box Indicator | | |
| PO Box Country Code | | |
| PO Box Region Code | | |
| PO Box City Name | | |
| Street Name | | |
| House ID | | |
| Building ID | | |
| Floor ID | | |
| Room ID | | |
| Care Of Name | | |
| AddressDescription | | |
| Telefonnumber | | |
| MobileNumber | | |
| Facsimile | | |
| Email | | |
| Seller | | Seller |
| SellerAddress | | |
| Location | | Location |
| LocationType | | |
| DeliveryItemGroupID | | Delivery- |
| DeliveryPriority | | Terms |
| DeliveryCondition | | |
| TransferLocation | | |
| NumberofPartialDelivery | | |
| QuantityTolerance | | |
| MaximumLeadTime | | |
| TransportServiceLevel | | |
| TranportCondition | | |
| TransportDescription | | |

-continued

| | | |
|---|---|---|
| CashDiscountTerms | | |
| PaymentForm | Payment | |
| PaymentCardID | | |
| PaymentCardReferenceID | | |
| SequenceID | | |
| Holder | | |
| ExpirationDate | | |
| AttachmentID | | |
| AttachmentFilename | | |
| DescriptionofMessage | | |
| ConfirmationDescriptionof | | |
| Message | | |
| FollowUpActivity | | |
| ItemID | Purchase | |
| ParentItemID | Order | |
| HierarchyType | Item | |
| ProductID | | Product |
| ProductType | | |
| ProductNote | | |
| ProductCategoryID | | ProductCategory |
| Amount | | |
| BaseQuantity | | |
| ConfirmedAmount | | |
| ConfirmedBaseQuantity | | |
| ItemBuyer | | Buyer |
| ItemBuyerOrganisation | | |
| Name | | |
| Person Name | | |
| FunctionalTitle | | |
| DepartmentName | | |
| CountryCode | | |
| StreetPostalCode | | |
| POBox Postal Code | | |
| Company Postal Code | | |
| City Name | | |
| DistrictName | | |
| PO Box ID | | |
| PO Box Indicator | | |
| PO Box Country Code | | |
| PO Box Region Code | | |
| PO Box City Name | | |
| Street Name | | |
| House ID | | |
| Building ID | | |
| Floor ID | | |
| Room ID | | |
| Care Of Name | | |
| AddressDescription | | |
| Telefonnumber | | |
| MobilNumber | | |
| Facsimile | | |
| Email | | |
| ItemSeller | | Seller |
| ItemSellerAddress | | |
| ItemLocation | | Location |
| ItemLocationType | | |
| ItemDeliveryItemGroupID | | |
| ItemDeliveryPriority | | |
| ItemDeliveryCondition | | |
| ItemTransferLocation | | |
| ItemNumberofPartial | | |
| Delivery | | |
| ItemQuantityTolerance | | |
| ItemMaximumLeadTime | | |
| ItemTransportServiceLevel | | |
| ItemTranportCondition | | |
| ItemTransportDescription | | |
| ContractReference | | Contract |
| QuoteReference | | Quote |
| CatalogueReference | | Catalogue |
| ItemAttachmentID | | |
| ItemAttachmentFilename | | |
| ItemDescription | | |
| ScheduleLineID | | |
| DeliveryPeriod | | |
| Quantity | | |
| ConfirmedScheduleLineID | | |
| ConfirmedDeliveryPeriod | | |
| ConfirmedQuantity | | |

During the step of modeling the internal structure, the designers also model the complete internal structure by identifying the compositions of the components and the corresponding cardinalities, as shown below.

| | | | | |
|---|---|---|---|---|
| PurchaseOrder | | | | 1 |
| | Buyer | | | 0 . . . 1 |
| | | Address | | 0 . . . 1 |
| | | ContactPerson | | 0 . . . 1 |
| | | | Address | 0 . . . 1 |
| | Seller | | | 0 . . . 1 |
| | Location | | | 0 . . . 1 |
| | | Address | | 0 . . . 1 |
| | DeliveryTerms | | | 0 . . . 1 |
| | | Incoterms | | 0 . . . 1 |
| | | PartialDelivery | | 0 . . . 1 |
| | | QuantityTolerance | | 0 . . . 1 |
| | | Transport | | 0 . . . 1 |
| | CashDiscount Terms | | | 0 . . . 1 |
| | | MaximumCashDiscount | | 0 . . . 1 |
| | | NormalCashDiscount | | 0 . . . 1 |
| | PaymentForm | | | 0 . . . 1 |
| | | PaymentCard | | 0 . . . 1 |
| | Attachment | | | 0 . . . n |
| | Description | | | 0 . . . 1 |
| | Confirmation Description | | | 0 . . . 1 |
| | Item | | | 0 . . . n |
| | | HierarchyRelationship | | 0 . . . 1 |
| | | Product | | 0 . . . 1 |
| | | ProductCategory | | 0 . . . 1 |
| | | Price | | 0 . . . 1 |
| | | | NetunitPrice | 0 . . . 1 |
| | | ConfirmedPrice | | 0 . . . 1 |
| | | | NetunitPrice | 0 . . . 1 |
| | | Buyer | | 0 . . . 1 |
| | | Seller | | 0 . . . 1 |
| | | Location | | 0 . . . 1 |
| | | DeliveryTerms | | 0 . . . 1 |
| | | Attachment | | 0 . . . n |
| | | Description | | 0 . . . 1 |
| | | ConfirmationDescription | | 0 . . . 1 |
| | | ScheduleLine | | 0 . . . n |
| | | | DeliveryPeriod | 1 |
| | | ConfirmedScheduleLine | | 0 . . . n |

After modeling the internal object structure, the developers identify the subtypes and generalizations for all objects and components (step 2112). For example, the Purchase Order may have subtypes Purchase Order Update, Purchase Order Cancellation and Purchase Order Information. Purchase Order Update may include Purchase Order Request, Purchase Order Change, and Purchase Order Confirmation. Moreover, Party may be identified as the generalization of Buyer and Seller. The subtypes and generalizations for the above example are shown below.

| | | | | | |
|---|---|---|---|---|---|
| Purchase Order | | | | | 1 |
| | PurchaseOrder Update | | | | |
| | | PurchaseOrder Request | | | |
| | | PurchaseOrder Change | | | |
| | | PurchaseOrder Confirmation | | | |
| | PurchaseOrder Cancellation | | | | |
| | PurchaseOrder Information | | | | |
| | Party | | | | |
| | | BuyerParty | | | 0 . . . 1 |
| | | | Address | | 0 . . . 1 |
| | | | ContactPerson | | 0 . . . 1 |
| | | | | Address | 0 . . . 1 |
| | | SellerParty | | | 0 . . . 1 |
| | Location | | | | |
| | | ShipToLocation | | | 0 . . . 1 |
| | | | Address | | 0 . . . 1 |

-continued

| | | | |
|---|---|---|---|
| | ShipFromLocation | | 0 . . . 1 |
| | | Address | 0 . . . 1 |
| DeliveryTerms | | | 0 . . . 1 |
| | Incoterms | | 0 . . . 1 |
| | PartialDelivery | | 0 . . . 1 |
| | QuantityTolerance | | 0 . . . 1 |
| | Transport | | 0 . . . 1 |
| CashDiscount Terms | | | 0 . . . 1 |
| | MaximumCash Discount | | 0 . . . 1 |
| | NormalCashDiscount | | 0 . . . 1 |
| PaymentForm | | | 0 . . . 1 |
| | PaymentCard | | 0 . . . 1 |
| Attachment | | | 0 . . . n |
| Description | | | 0 . . . 1 |
| Confirmation Description | | | 0 . . . 1 |
| Item | | | 0 . . . n |
| | HierarchyRelationship | | 0 . . . 1 |
| | Product | | 0 . . . 1 |
| | ProductCategory | | 0 . . . 1 |
| | Price | | 0 . . . 1 |
| | | NetunitPrice | 0 . . . 1 |
| | ConfirmedPrice | | 0 . . . 1 |
| | | NetunitPrice | 0 . . . 1 |
| | Party | | |
| | | BuyerParty | 0 . . . 1 |
| | | SellerParty | 0 . . . 1 |
| | Location | | |
| | | ShipTo Location | 0 . . . 1 |
| | | ShipFrom Location | 0 . . . 1 |
| | DeliveryTerms | | 0 . . . 1 |
| | Attachment | | 0 . . . n |
| | Description | | 0 . . . 1 |
| | Confirmation Description | | 0 . . . 1 |
| | ScheduleLine | | 0 . . . n |
| | | Delivery Period | 1 |
| | ConfirmedScheduleLine | | 0 . . . n |

After identifying the subtypes and generalizations, the developers assign the attributes to these components (step 2114). The attributes for a portion of the components are shown below.

| | | | |
|---|---|---|---|
| Purchase Order | | | 1 |
| | ID | | 1 |
| | SellerID | | 0 . . . 1 |
| | BuyerPosting DateTime | | 0 . . . 1 |
| | BuyerLast ChangeDate Time | | 0 . . . 1 |
| | SellerPosting DateTime | | 0 . . . 1 |
| | SellerLast ChangeDate Time | | 0 . . . 1 |
| | Acceptance StatusCode | | 0 . . . 1 |
| | Note | | 0 . . . 1 |
| | ItemList Complete Transmission Indicator | | 0 . . . 1 |
| | BuyerParty | | 0 . . . 1 |
| | | StandardID | 0 . . . n |
| | | BuyerID | 0 . . . 1 |
| | | SellerID | 0 . . . 1 |
| | | Address | 0 . . . 1 |
| | | ContactPerson | 0 . . . 1 |

-continued

| | | | |
|---|---|---|---|
| | | BuyerID | 0 . . . 1 |
| | | SellerID | 0 . . . 1 |
| | | Address | 0 . . . 1 |
| | SellerParty | | 0 . . . 1 |
| | Product | | 0 . . . 1 |
| | RecipientParty | | |
| | VendorParty | | 0 . . . 1 |
| | Manufacturer Party | | 0 . . . 1 |
| | BillToParty | | 0 . . . 1 |
| | PayerParty | | 0 . . . 1 |
| | CarrierParty | | 0 . . . 1 |
| | ShipTo Location | | 0 . . . 1 |
| | | StandardID | 0 . . . n |
| | | BuyerID | 0 . . . 1 |
| | | SellerID | 0 . . . 1 |
| | | Address | 0 . . . 1 |
| | ShipFrom Location | | 0 . . . 1 |

The system then determines whether the component is one of the object nodes in the business object model (step 2116, FIG. 21B). If the system determines that the component is one of the object nodes in the business object model, the system integrates a reference to the corresponding object node from the business object model into the object (step 2118). In the above example, the system integrates the reference to the Buyer party represented by an ID and the reference to the ShipToLocation represented by an into the object, as shown below. The attributes that were formerly located in the PurchaseOrder object are now assigned to the new found object party. Thus, the attributes are removed from the PurchaseOrder object.

| | | |
|---|---|---|
| PurchaseOrder | ID | |
| | SellerID | |
| | BuyerPostingDateTime | |
| | BuyerLastChangeDateTime | |
| | SellerPostingDateTime | |
| | SellerLastChangeDateTime | |
| | AcceptanceStatusCode | |
| | Note | |
| | ItemListComplete | |
| | TransmissionIndicator | |
| | BuyerParty | |
| | | ID |
| | SellerParty | |
| | ProductRecipientParty | |
| | VendorParty | |
| | ManufacturerParty | |
| | BillToParty | |
| | PayerParty | |
| | CarrierParty | |
| | ShipToLocation | |
| | | ID |
| | ShipFromLocation | |

During the integration step, the designers classify the relationship (i.e., aggregation or association) between the object node and the object being integrated into the business object model. The system also integrates the new attributes into the object node (step 2120). If at step 2116, the system determines that the component is not in the business object model, the system adds the component to the business object model (step 2122).

Regardless of whether the component was in the business object model at step 2116, the next step in creating the business object model is to add the integrity rules (step 2124). There are several levels of integrity rules and constraints which should be described. These levels include consistency rules between attributes, consistency rules between components, and consistency rules to other objects. Next, the designers determine the services offered, which can be accessed via interfaces (step 2126). The services offered in the example above include PurchaseOrderCreateRequest, PurchaseOrderCancellationRequest, and PurchaseOrderReleaseRequest. The system then receives an indication of the location for the object in the business object model (step 2128). After receiving the indication of the location, the system integrates the object into the business object model (step 2130).

4. Structure of the Business Object Model

The business object model, which serves as the basis for the process of generating consistent interfaces, includes the elements contained within the interfaces. These elements are arranged in a hierarchical structure within the business object model.

5. Interfaces Derived from Business Object Model

Figure 27A:
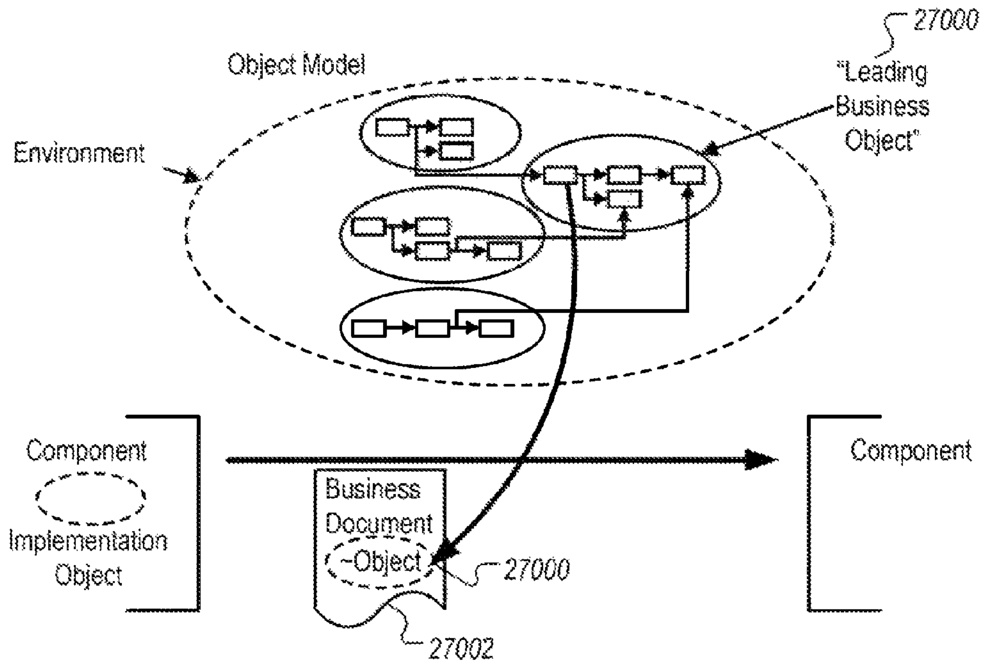
FIGS. 27A-E depict a hierarchization process in accordance with methods and systems consistent with the subject matter described herein.

Interfaces are the starting point of the communication between two business entities. The structure of each interface determines how one business entity communicates with another business entity. The business entities may act as a unified whole when, based on the business scenario, the business entities know what an interface contains from a business perspective and how to fill the individual elements or fields of the interface. As illustrated in FIG. 27A, communication between components takes place via messages that contain business documents (e.g., business document 27002). The business document 27002 ensures a holistic business-related understanding for the recipient of the message. The business documents are created and accepted or consumed by interfaces, specifically by inbound and outbound interfaces. The interface structure and, hence, the structure of the business document are derived by a mapping rule. This mapping rule is known as "hierarchization." An interface structure thus has a hierarchical structure created based on the leading business object 27000. The interface represents a usage-specific, hierarchical view of the underlying usage-neutral object model.

Figure 27B:
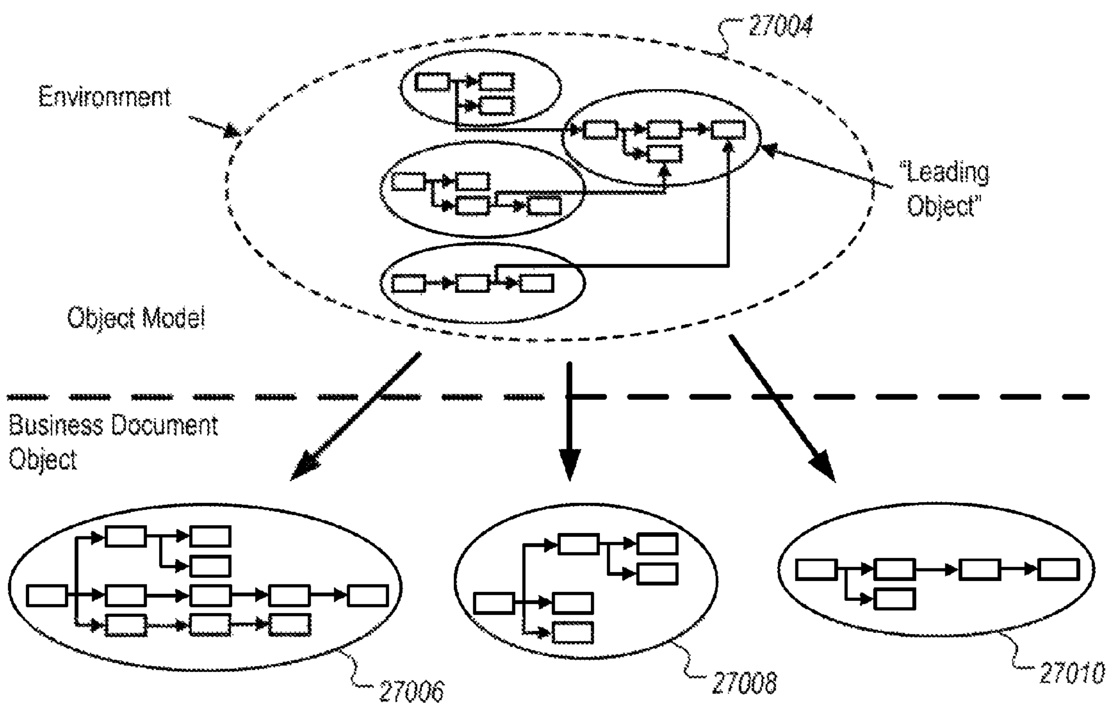

As illustrated in FIG. 27B, several business document objects 27006, 27008, and 27010 as overlapping views may be derived for a given leading object 27004. Each business document object results from the object model by hierarchization.

Figure 27C:
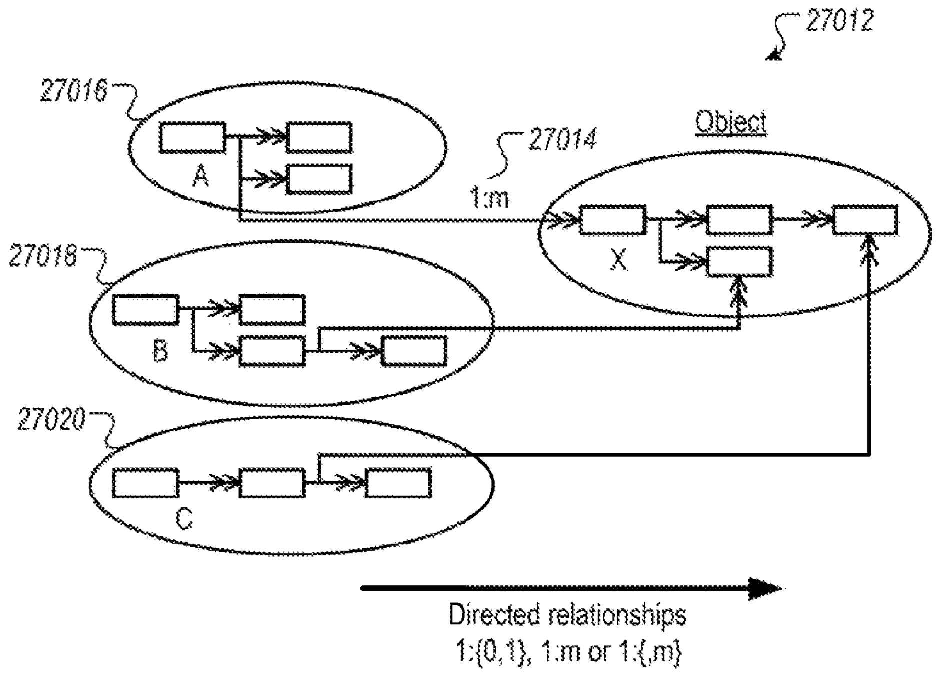

To illustrate the hierarchization process, FIG. 27C depicts an example of an object model 27012 (i.e., a portion of the business object model) that is used to derive a service operation signature (business document object structure). As depicted, leading object X 27014 in the object model 27012 is integrated in a net of object A 27016, object B 27018, and object C 27020. Initially, the parts of the leading object 27014 that are required for the business object document are adopted. In one variation, all parts required for a business document object are adopted from leading object 27014 (making such an operation a maximal service operation). Based on these parts, the relationships to the superordinate objects (i.e., objects A, B, and C from which object X depends) are inverted. In other words, these objects are adopted as dependent or subordinate objects in the new business document object.

For example, object A 27016, object B 27018, and object C 27020 have information that characterize object X. Because object A 27016, object B 27018, and object C 27020 are superordinate to leading object X 27014, the dependencies of these relationships change so that object A 27016, object B 27018, and object C 27020 become dependent and subordinate to leading object X 27014. This procedure is known as "derivation of the business document object by hierarchization."

Business-related objects generally have an internal structure (parts). This structure can be complex and reflect the individual parts of an object and their mutual dependency. When creating the operation signature, the internal structure of an object is strictly hierarchized. Thus, dependent parts keep their dependency structure, and relationships between the parts within the object that do not represent the hierarchical structure are resolved by prioritizing one of the relationships.

Relationships of object X to external objects that are referenced and whose information characterizes object X are added to the operation signature. Such a structure can be quite complex (see, for example, FIG. 27D). The cardinality to these referenced objects is adopted as 1:1 or 1:C, respectively. By this, the direction of the dependency changes. The required parts of this referenced object are adopted identically, both in their cardinality and in their dependency arrangement.

Figure 27D:
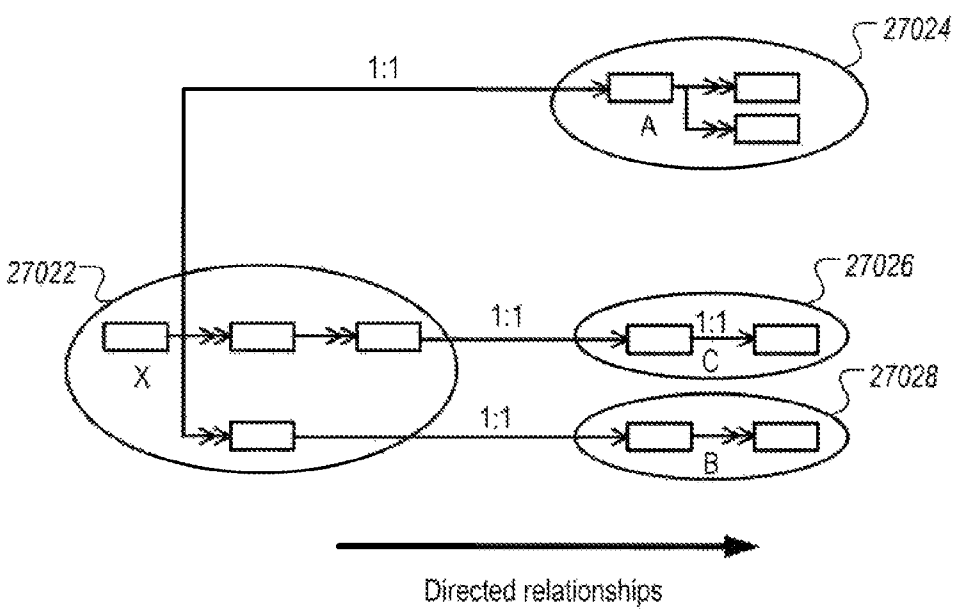

The newly created business document object contains all required information, including the incorporated master data information of the referenced objects. As depicted in FIG. 27D, components Xi in leading object X 27022 are adopted directly. The relationship of object X 27022 to object A 27024, object B 27028, and object C 27026 are inverted, and the parts required by these objects are added as objects that depend from object X 27022. As depicted, all of object A 27024 is adopted. B3 and B4 are adopted from object B

27028, but B1 is not adopted. From object C 27026, C2 and C1 are adopted, but C3 is not adopted.

Figure 27E:
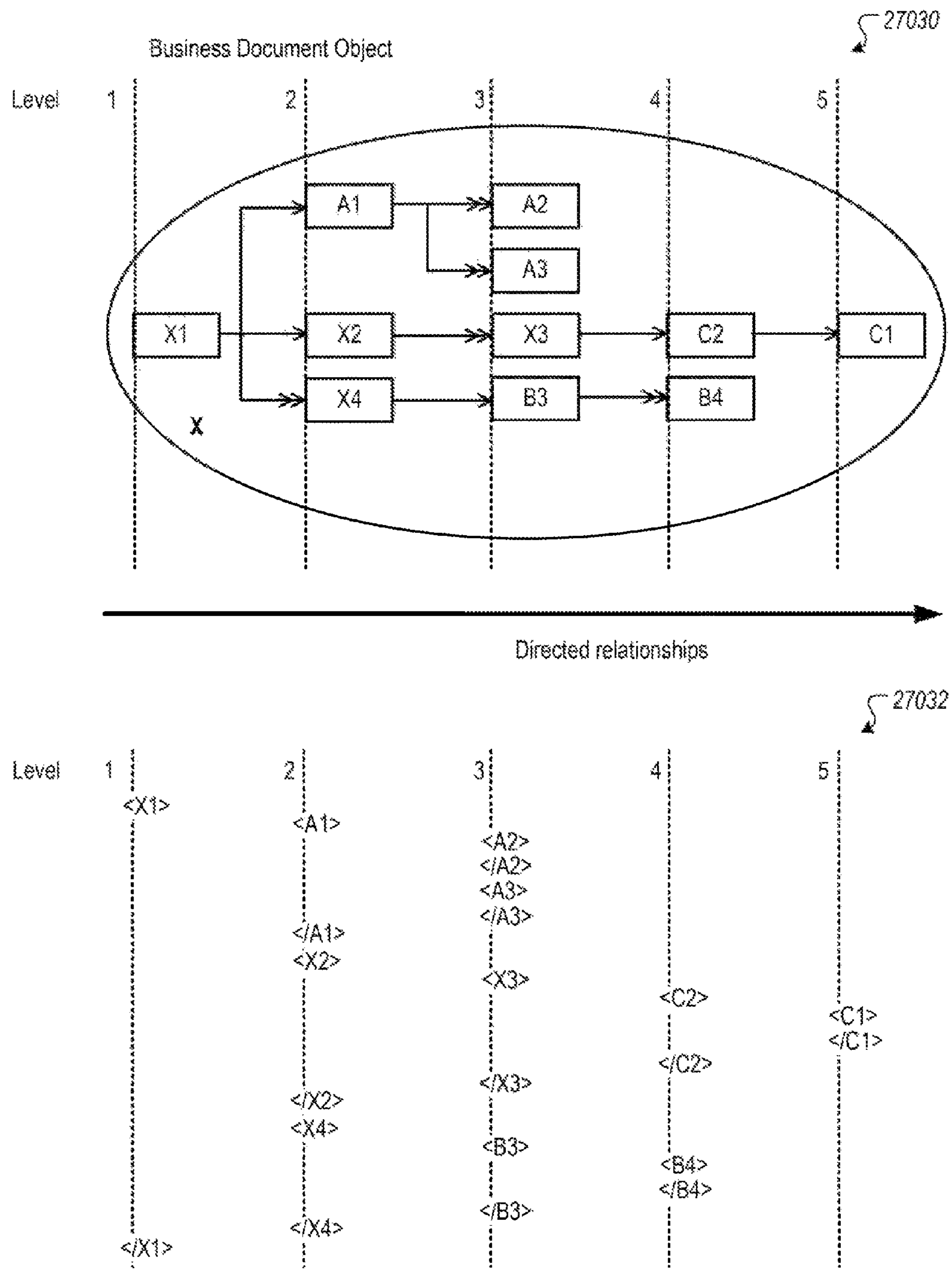

FIG. 27E depicts the business document object X 27030 created by this hierarchization process. As shown, the arrangement of the elements corresponds to their dependency levels, which directly leads to a corresponding representation as an XML structure 27032.

The following provides certain rules that can be adopted singly or in combination with regard to the hierarchization process. A business document object always refers to a leading business document object and is derived from this object. The name of the root entity in the business document entity is the name of the business object or the name of a specialization of the business object or the name of a service specific view onto the business object. The nodes and elements of the business object that are relevant (according to the semantics of the associated message type) are contained as entities and elements in the business document object.

The name of a business document entity is predefined by the name of the corresponding business object node. The name of the superordinate entity is not repeated in the name of the business document entity. The "full" semantic name results from the concatenation of the entity names along the hierarchical structure of the business document object.

The structure of the business document object is, except for deviations due to hierarchization, the same as the structure of the business object. The cardinalities of the business document object nodes and elements are adopted identically or more restrictively to the business document object. An object from which the leading business object is dependent can be adopted to the business document object. For this arrangement, the relationship is inverted, and the object (or its parts, respectively) are hierarchically subordinated in the business document object.

Nodes in the business object representing generalized business information can be adopted as explicit entities to the business document object (generally speaking, multiply TypeCodes out). When this adoption occurs, the entities are named according to their more specific semantic (name of TypeCode becomes prefix). Party nodes of the business object are modeled as explicit entities for each party role in the business document object. These nodes are given the name <Prefix><Party Role>Party, for example, BuyerParty, ItemBuyerParty. BTDReference nodes are modeled as separate entities for each reference type in the business document object. These nodes are given the name <Qualifier><BO><Node>Reference, for example SalesOrderReference, OriginSalesOrderReference, SalesOrderItemReference. A product node in the business object comprises all of the information on the Product, ProductCategory, and Batch. This information is modeled in the business document object as explicit entities for Product, ProductCategory, and Batch.

Entities which are connected by a 1:1 relationship as a result of hierarchization can be combined to a single entity, if they are semantically equivalent. Such a combination can often occurs if a node in the business document object that results from an assignment node is removed because it does not have any elements.

The message type structure is typed with data types. Elements are typed by GDTs according to their business objects. Aggregated levels are typed with message type specific data types (Intermediate Data Types), with their names being built according to the corresponding paths in the message type structure. The whole message type structured is typed by a message data type with its name being built according to the root entity with the suffix "Message". For the message type, the message category (e.g., information, notification, query, response, request, confirmation, etc.) is specified according to the suited transaction communication pattern.

In one variation, the derivation by hierarchization can be initiated by specifying a leading business object and a desired view relevant for a selected service operation. This view determines the business document object. The leading business object can be the source object, the target object, or a third object. Thereafter, the parts of the business object required for the view are determined. The parts are connected to the root node via a valid path along the hierarchy. Thereafter, one or more independent objects (object parts, respectively) referenced by the leading object which are relevant for the service may be determined (provided that a relationship exists between the leading object and the one or more independent objects).

Once the selection is finalized, relevant nodes of the leading object node that are structurally identical to the message type structure can then be adopted. If nodes are adopted from independent objects or object parts, the relationships to such independent objects or object parts are inverted. Linearization can occur such that a business object node containing certain TypeCodes is represented in the message type structure by explicit entities (an entity for each value of the TypeCode). The structure can be reduced by checking all 1:1 cardinalities in the message type structure. Entities can be combined if they are semantically equivalent, one of the entities carries no elements, or an entity solely results from an n:m assignment in the business object.

After the hierarchization is completed, information regarding transmission of the business document object (e.g., CompleteTransmissionIndicator, ActionCodes, message category, etc.) can be added. A standardized message header can be added to the message type structure and the message structure can be typed. Additionally, the message category for the message type can be designated.

Invoice Request and Invoice Confirmation are examples of interfaces. These invoice interfaces are used to exchange invoices and invoice confirmations between an invoicing party and an invoice recipient (such as between a seller and a buyer) in a B2B process. Companies can create invoices in electronic as well as in paper form. Traditional methods of communication, such as mail or fax, for invoicing are cost intensive, prone to error, and relatively slow, since the data is recorded manually. Electronic communication eliminates such problems. The motivating business scenarios for the Invoice Request and Invoice Confirmation interfaces are the Procure to Stock (PTS) and Sell from Stock (SFS) scenarios. In the PTS scenario, the parties use invoice interfaces to purchase and settle goods. In the SFS scenario, the parties use invoice interfaces to sell and invoice goods. The invoice interfaces directly integrate the applications implementing them and also form the basis for mapping data to widely-used XML standard formats such as RosettaNet, PIDX, xCBL, and CIDX.

The invoicing party may use two different messages to map a B2B invoicing process: (1) the invoicing party sends the message type InvoiceRequest to the invoice recipient to start a new invoicing process; and (2) the invoice recipient sends the message type InvoiceConfirmation to the invoicing party to confirm or reject an entire invoice or to temporarily assign it the status "pending."

An InvoiceRequest is a legally binding notification of claims or liabilities for delivered goods and rendered services—usually, a payment request for the particular goods and services. The message type InvoiceRequest is based on the message data type InvoiceMessage. The InvoiceRequest message (as defined) transfers invoices in the broader sense. This includes the specific invoice (request to settle a liability), the debit memo, and the credit memo.

InvoiceConfirmation is a response sent by the recipient to the invoicing party confirming or rejecting the entire invoice received or stating that it has been assigned temporarily the status “pending.” The message type InvoiceConfirmation is based on the message data type InvoiceMessage. An InvoiceConfirmation is not mandatory in a B2B invoicing process, however, it automates collaborative processes and dispute management.

Usually, the invoice is created after it has been confirmed that the goods were delivered or the service was provided. The invoicing party (such as the seller) starts the invoicing process by sending an InvoiceRequest message. Upon receiving the InvoiceRequest message, the invoice recipient (for instance, the buyer) can use the InvoiceConfirmation message to completely accept or reject the invoice received or to temporarily assign it the status “pending.” The InvoiceConfirmation is not a negotiation tool (as is the case in order management), since the options available are either to accept or reject the entire invoice. The invoice data in the InvoiceConfirmation message merely confirms that the invoice has been forwarded correctly and does not communicate any desired changes to the invoice. Therefore, the InvoiceConfirmation includes the precise invoice data that the invoice recipient received and checked. If the invoice recipient rejects an invoice, the invoicing party can send a new invoice after checking the reason for rejection (AcceptanceStatus and ConfirmationDescription at Invoice and InvoiceItem level). If the invoice recipient does not respond, the invoice is generally regarded as being accepted and the invoicing party can expect payment.

FIGS. 22A-F depict a flow diagram of the steps performed by methods and systems consistent with the subject matter described herein to generate an interface from the business object model. Although described as being performed by a computer, these steps may alternatively be performed manually, or using any combination thereof. The process begins when the system receives an indication of a package template from the designer, i.e., the designer provides a package template to the system (step 2200).

Package templates specify the arrangement of packages within a business transaction document. Package templates are used to define the overall structure of the messages sent between business entities. Methods and systems consistent with the subject matter described herein use package templates in conjunction with the business object model to derive the interfaces.

The system also receives an indication of the message type from the designer (step 2202). The system selects a package from the package template (step 2204), and receives an indication from the designer whether the package is required for the interface (step 2206). If the package is not required for the interface, the system removes the package from the package template (step 2208). The system then continues this analysis for the remaining packages within the package template (step 2210).

Figure 22A:
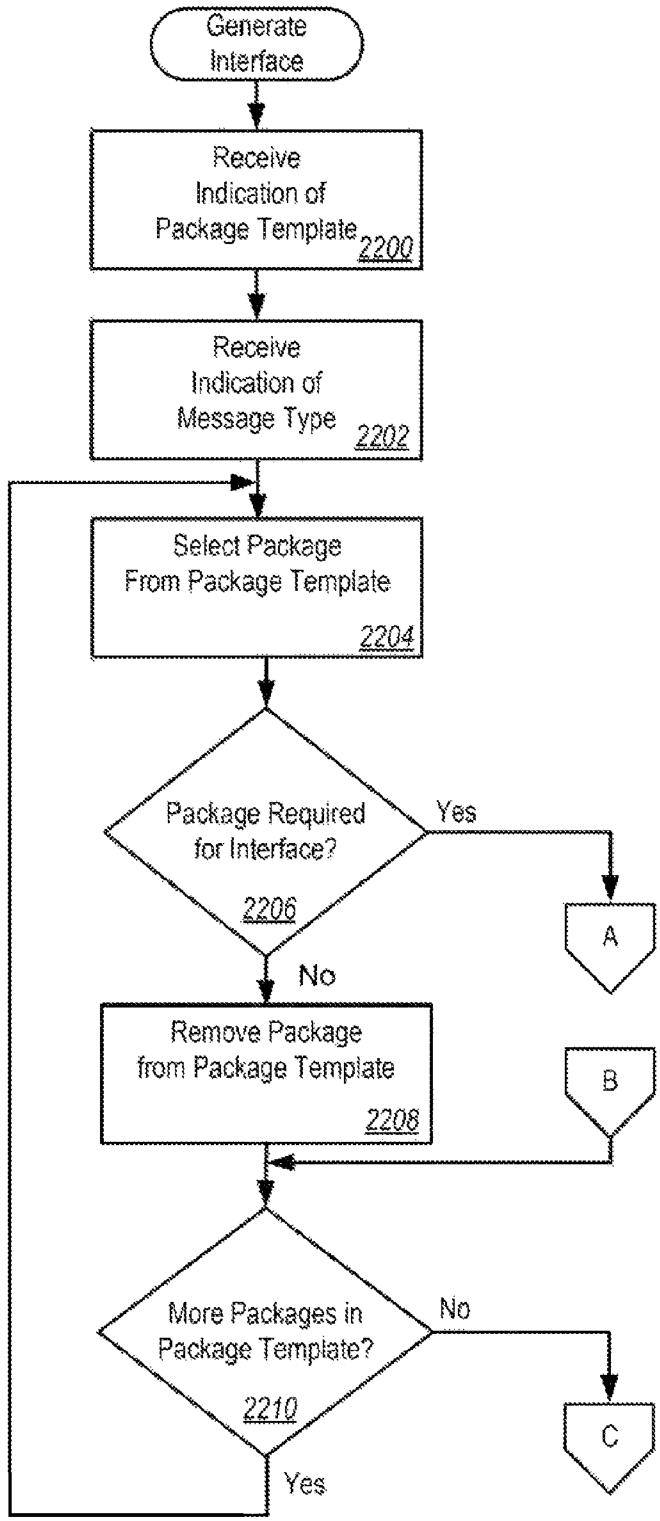
FIGS. 22A-F depict a flow diagram of the steps performed to generate an interface from the business object model in accordance with methods and systems consistent with the subject matter described herein.
Figure 22B:
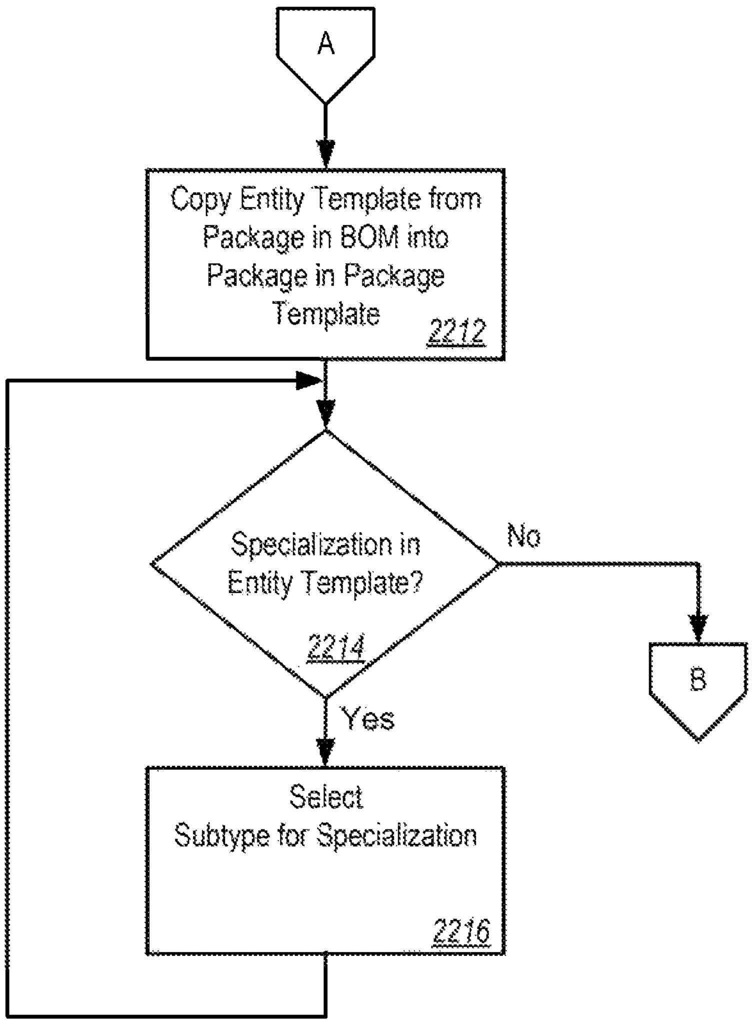
Figure 22C:
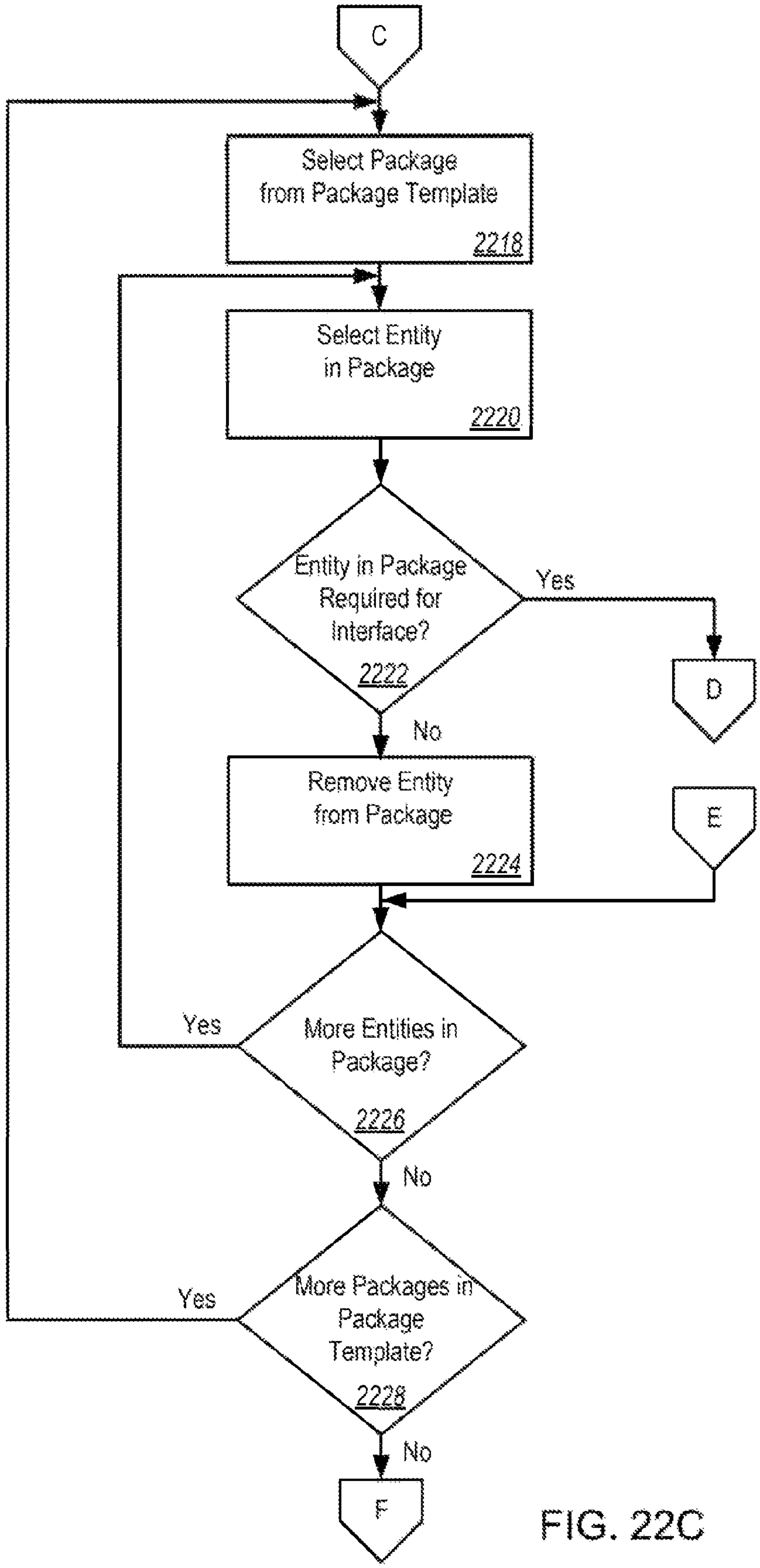

If, at step 2206, the package is required for the interface, the system copies the entity template from the package in the business object model into the package in the package template (step 2212, FIG. 22B). The system determines whether there is a specialization in the entity template (step 2214). If the system determines that there is a specialization in the entity template, the system selects a subtype for the specialization (step 2216). The system may either select the subtype for the specialization based on the message type, or it may receive this information from the designer. The system then determines whether there are any other specializations in the entity template (step 2214). When the system determines that there are no specializations in the entity template, the system continues this analysis for the remaining packages within the package template (step 2210, FIG. 22A).

At step 2210, after the system completes its analysis for the packages within the package template, the system selects one of the packages remaining in the package template (step 2218, FIG. 22C), and selects an entity from the package (step 2220). The system receives an indication from the designer whether the entity is required for the interface (step 2222). If the entity is not required for the interface, the system removes the entity from the package template (step 2224). The system then continues this analysis for the remaining entities within the package (step 2226), and for the remaining packages within the package template (step 2228).

Figure 22D:
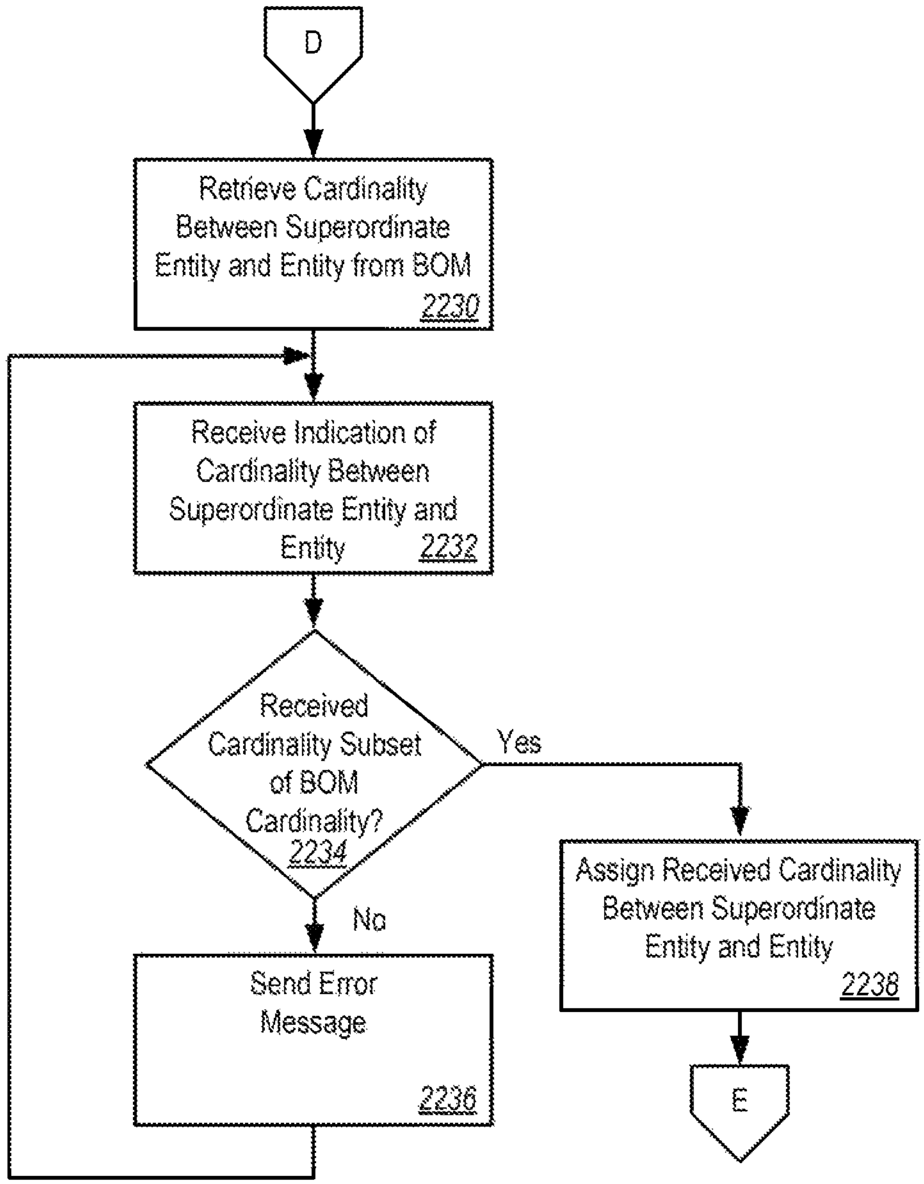

If, at step 2222, the entity is required for the interface, the system retrieves the cardinality between a superordinate entity and the entity from the business object model (step 2230, FIG. 22D). The system also receives an indication of the cardinality between the superordinate entity and the entity from the designer (step 2232). The system then determines whether the received cardinality is a subset of the business object model cardinality (step 2234). If the received cardinality is not a subset of the business object model cardinality, the system sends an error message to the designer (step 2236). If the received cardinality is a subset of the business object model cardinality, the system assigns the received cardinality as the cardinality between the superordinate entity and the entity (step 2238). The system then continues this analysis for the remaining entities within the package (step 2226, FIG. 22C), and for the remaining packages within the package template (step 2228).

Figure 22E:
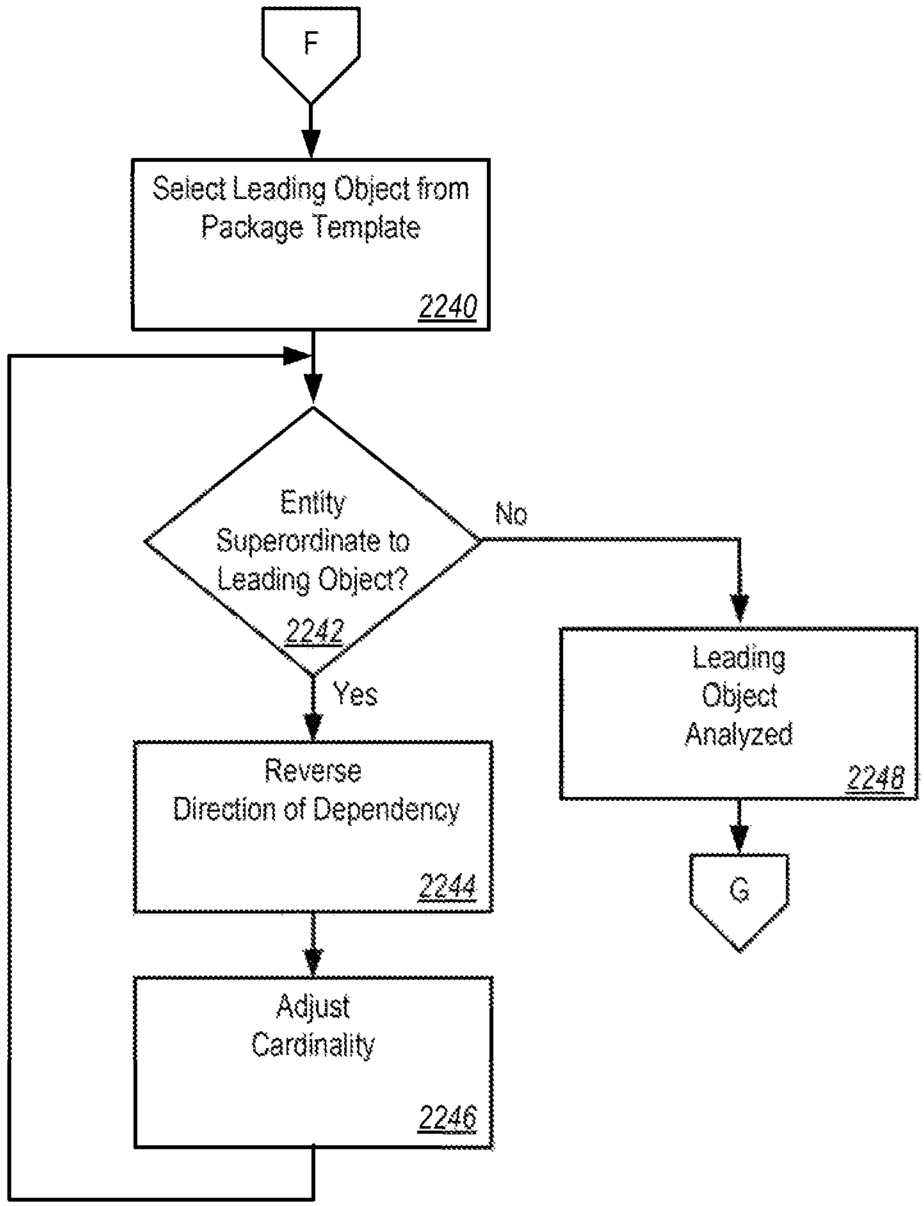

The system then selects a leading object from the package template (step 2240, FIG. 22E). The system determines whether there is an entity superordinate to the leading object (step 2242). If the system determines that there is an entity superordinate to the leading object, the system reverses the direction of the dependency (step 2244) and adjusts the cardinality between the leading object and the entity (step 2246). The system performs this analysis for entities that are superordinate to the leading object (step 2242). If the system determines that there are no entities superordinate to the leading object, the system identifies the leading object as analyzed (step 2248).

Figure 22F:
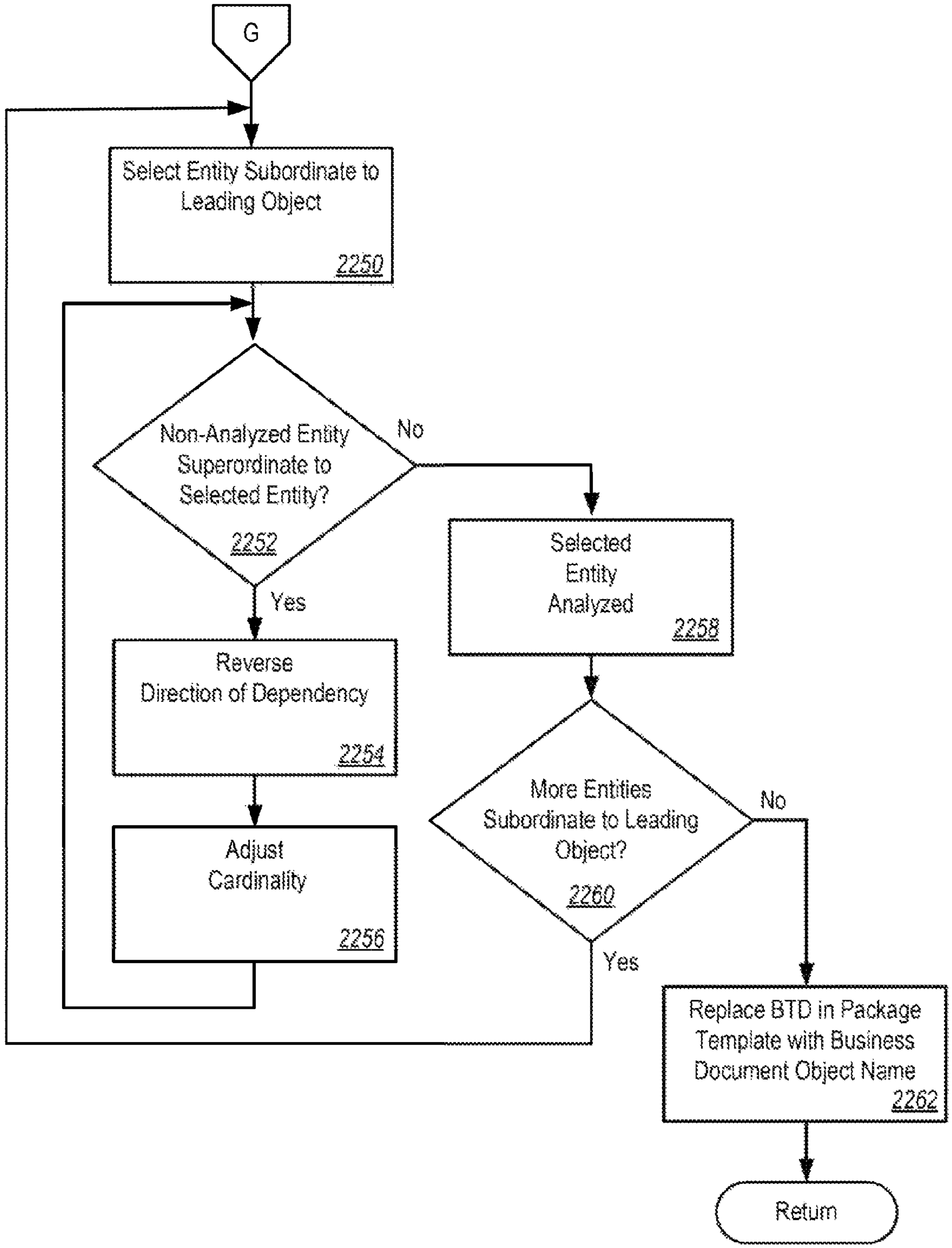

The system then selects an entity that is subordinate to the leading object (step 2250, FIG. 22F). The system determines whether any non-analyzed entities are superordinate to the selected entity (step 2252). If a non-analyzed entity is superordinate to the selected entity, the system reverses the direction of the dependency (step 2254) and adjusts the cardinality between the selected entity and the non-analyzed entity (step 2256). The system performs this analysis for non-analyzed entities that are superordinate to the selected entity (step 2252). If the system determines that there are no non-analyzed entities superordinate to the selected entity, the system identifies the selected entity as analyzed (step 2258), and continues this analysis for entities that are subordinate to the leading object (step 2260). After the packages have been analyzed, the system substitutes the BusinessTransactionDocument (“BTD”) in the package template with the name of the interface (step 2262). This includes the “BTD” in the BTDItem package and the “BTD” in the BTDItemScheduleLine package.

6. Use of an Interface

Figure 23:
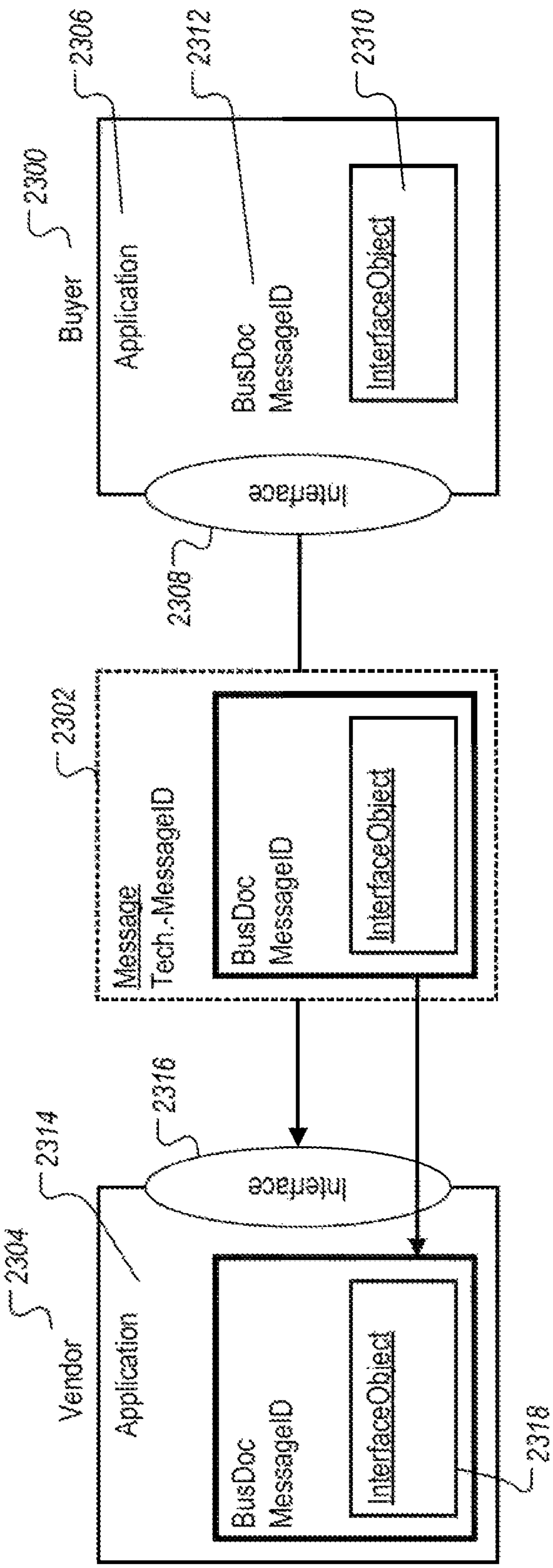
FIG. 23 depicts an example illustrating the transmittal of a business document in accordance with methods and systems consistent with the subject matter described herein.

The XI stores the interfaces (as an interface type). At runtime, the sending party’s program instantiates the interface to create a business document, and sends the business document in a message to the recipient. The messages are preferably defined using XML. In the example depicted in FIG. 23, the Buyer 2300 uses an application 2306 in its system to instantiate an interface 2308 and create an interface object or business document object 2310. The Buyer's application 2306 uses data that is in the sender's component-specific structure and fills the business document object 2310 with the data. The Buyer's application 2306 then adds message identification 2312 to the business document and places the business document into a message 2302. The Buyer's application 2306 sends the message 2302 to the Vendor 2304. The Vendor 2304 uses an application 2314 in its system to receive the message 2302 and store the business document into its own memory. The Vendor's application 2314 unpacks the message 2302 using the corresponding interface 2316 stored in its XI to obtain the relevant data from the interface object or business document object 2318.

Figure 24:
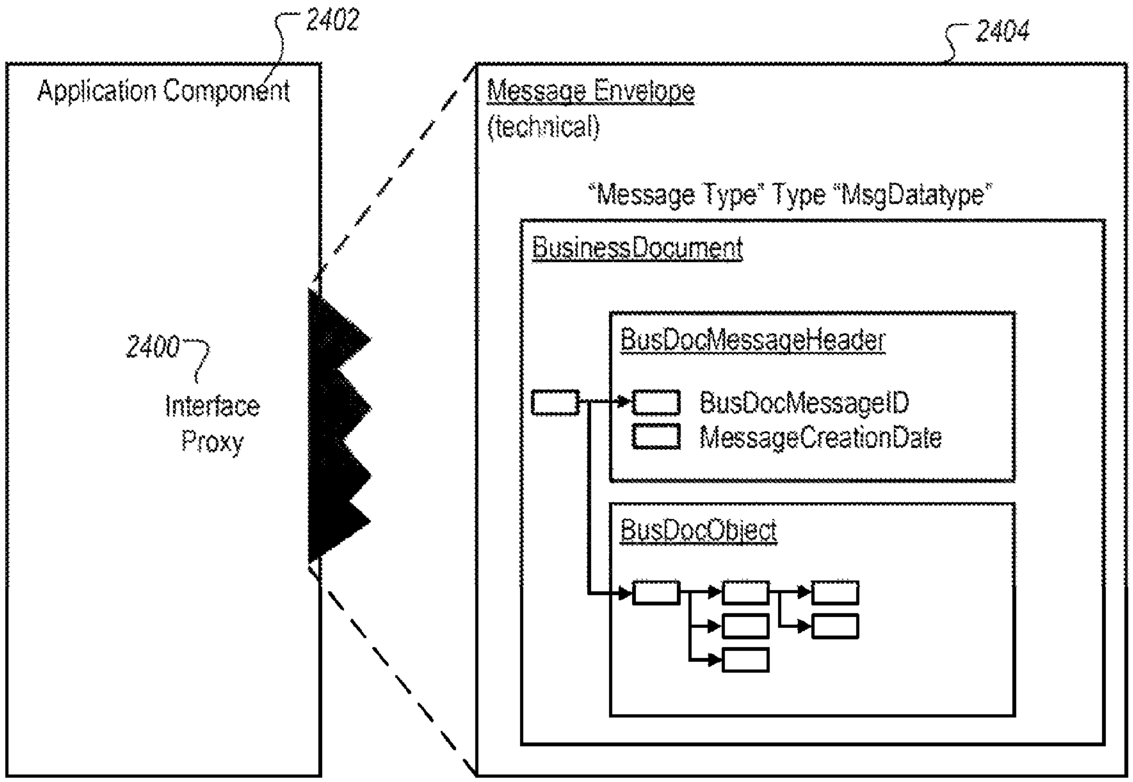
FIG. 24 depicts an interface proxy in accordance with methods and systems consistent with the subject matter described herein.
Figure 25:
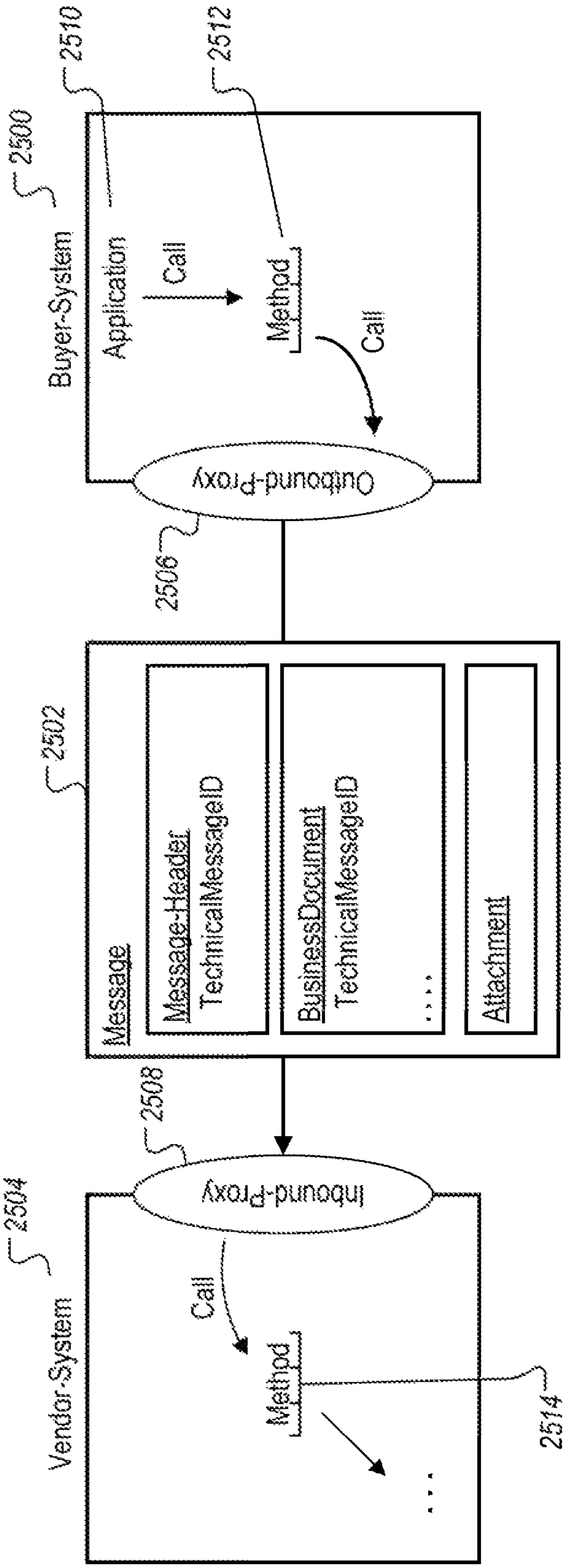
FIG. 25 depicts an example illustrating the transmittal of a message using proxies in accordance with methods and systems consistent with the subject matter described herein.

From the component's perspective, the interface is represented by an interface proxy 2400, as depicted in FIG. 24. The proxies 2400 shield the components 2402 of the sender and recipient from the technical details of sending messages 2404 via XI. In particular, as depicted in FIG. 25, at the sending end, the Buyer 2500 uses an application 2510 in its system to call an implemented method 2512, which generates the outbound proxy 2506. The outbound proxy 2506 parses the internal data structure of the components and converts them to the XML structure in accordance with the business document object. The outbound proxy 2506 packs the document into a message 2502. Transport, routing and mapping the XML message to the recipient 28304 is done by the routing system (XI, modeling environment 516, etc.).

When the message arrives, the recipient's inbound proxy 2508 calls its component-specific method 2514 for creating a document. The proxy 2508 at the receiving end downloads the data and converts the XML structure into the internal data structure of the recipient component 2504 for further processing.

Figure 26A:
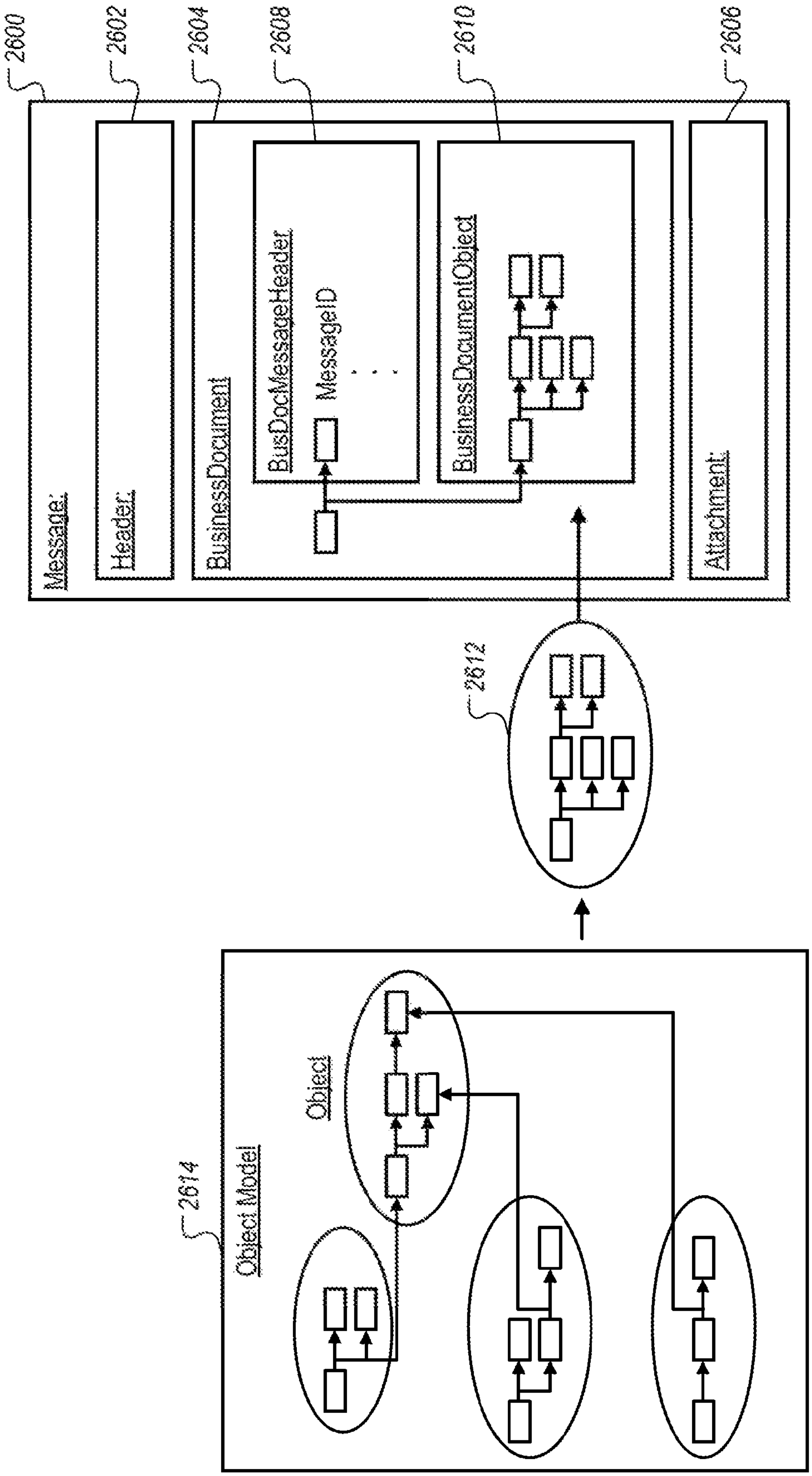
FIG. 26A depicts components of a message in accordance with methods and systems consistent with the subject matter described herein.

As depicted in FIG. 26A, a message 2600 includes a message header 2602 and a business document 2604. The message 2600 also may include an attachment 2606. For example, the sender may attach technical drawings, detailed specifications or pictures of a product to a purchase order for the product. The business document 2604 includes a business document message header 2608 and the business document object 2610. The business document message header 2608 includes administrative data, such as the message ID and a message description. As discussed above, the structure 2612 of the business document object 2610 is derived from the business object model 2614. Thus, there is a strong correlation between the structure of the business document object and the structure of the business object model. The business document object 2610 forms the core of the message 2600.

In collaborative processes as well as Q&A processes, messages should refer to documents from previous messages. A simple business document object ID or object ID is insufficient to identify individual messages uniquely because several versions of the same business document object can be sent during a transaction. A business document object ID with a version number also is insufficient because the same version of a business document object can be sent several times. Thus, messages require several identifiers during the course of a transaction.

Figure 26B:
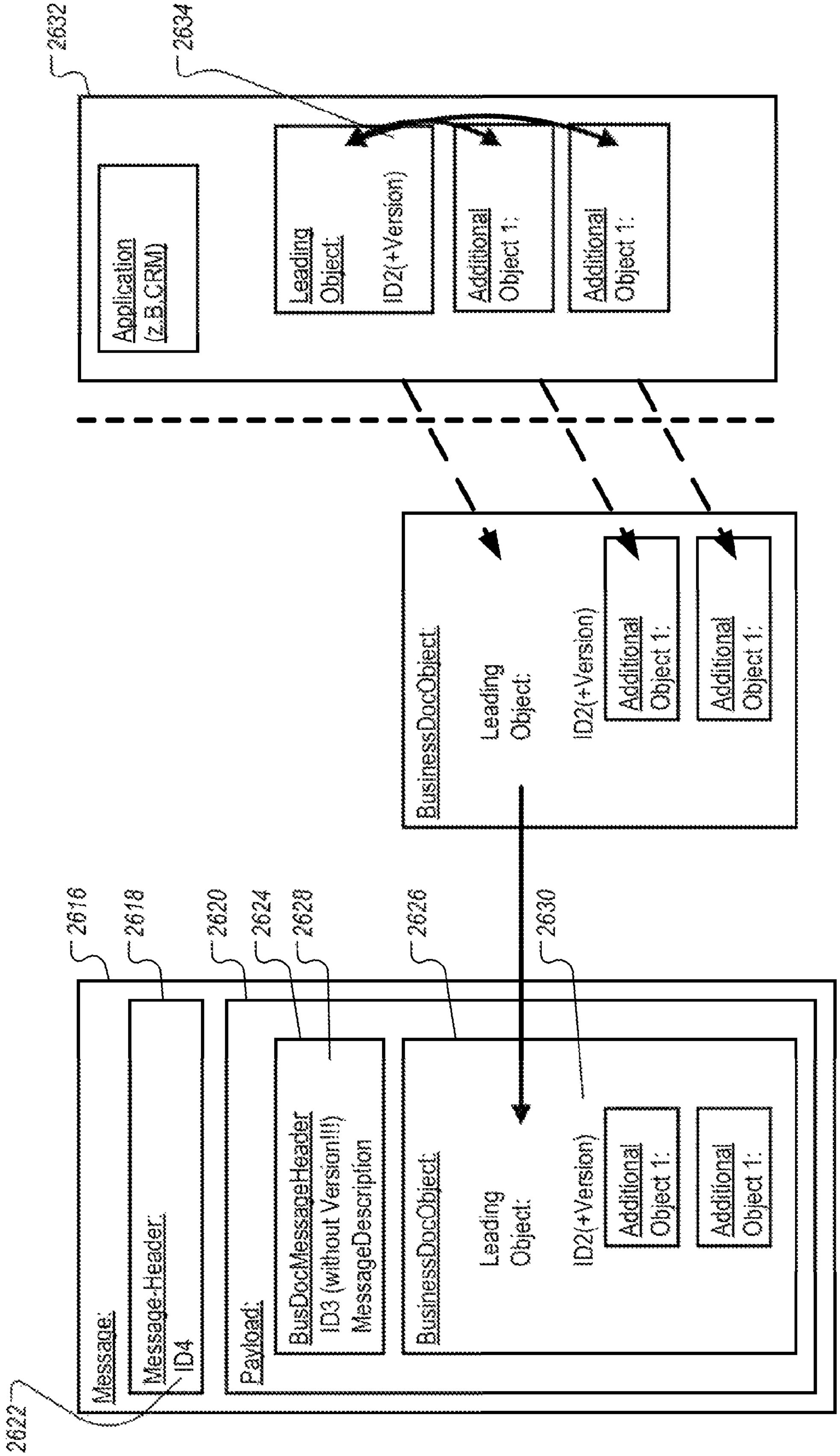
FIG. 26B depicts IDs used in a message in accordance with methods and systems consistent with the subject matter described herein.

As depicted in FIG. 26B, the message header 2618 in message 2616 includes a technical ID ("ID4") 2622 that identifies the address for a computer to route the message. The sender's system manages the technical ID 2622.

The administrative information in the business document message header 2624 of the payload or business document 2620 includes a BusinessDocumentMessageID ("ID3") 2628. The business entity or component 2632 of the business entity manages and sets the BusinessDocumentMessageID 2628. The business entity or component 2632 also can refer to other business documents using the BusinessDocumentMessageID 2628. The receiving component 2632 requires no knowledge regarding the structure of this ID. The BusinessDocumentMessageID 2628 is, as an ID, unique. Creation of a message refers to a point in time. No versioning is typically expressed by the ID. Besides the BusinessDocumentMessageID 2628, there also is a business document object ID 2630, which may include versions.

The component 2632 also adds its own component object ID 2634 when the business document object is stored in the component. The component object ID 2634 identifies the business document object when it is stored within the component. However, not all communication partners may be aware of the internal structure of the component object ID 2634. Some components also may include a versioning in their ID 2634.

7. Use of Interfaces Across Industries

Methods and systems consistent with the subject matter described herein provide interfaces that may be used across different business areas for different industries. Indeed, the interfaces derived using methods and systems consistent with the subject matter described herein may be mapped onto the interfaces of different industry standards. Unlike the interfaces provided by any given standard that do not include the interfaces required by other standards, methods and systems consistent with the subject matter described herein provide a set of consistent interfaces that correspond to the interfaces provided by different industry standards. Due to the different fields provided by each standard, the interface from one standard does not easily map onto another standard. By comparison, to map onto the different industry standards, the interfaces derived using methods and systems consistent with the subject matter described herein include most of the fields provided by the interfaces of different industry standards. Missing fields may easily be included into the business object model. Thus, by derivation, the interfaces can be extended consistently by these fields. Thus, methods and systems consistent with the subject matter described herein provide consistent interfaces or services that can be used across different industry standards.

Figure 28:
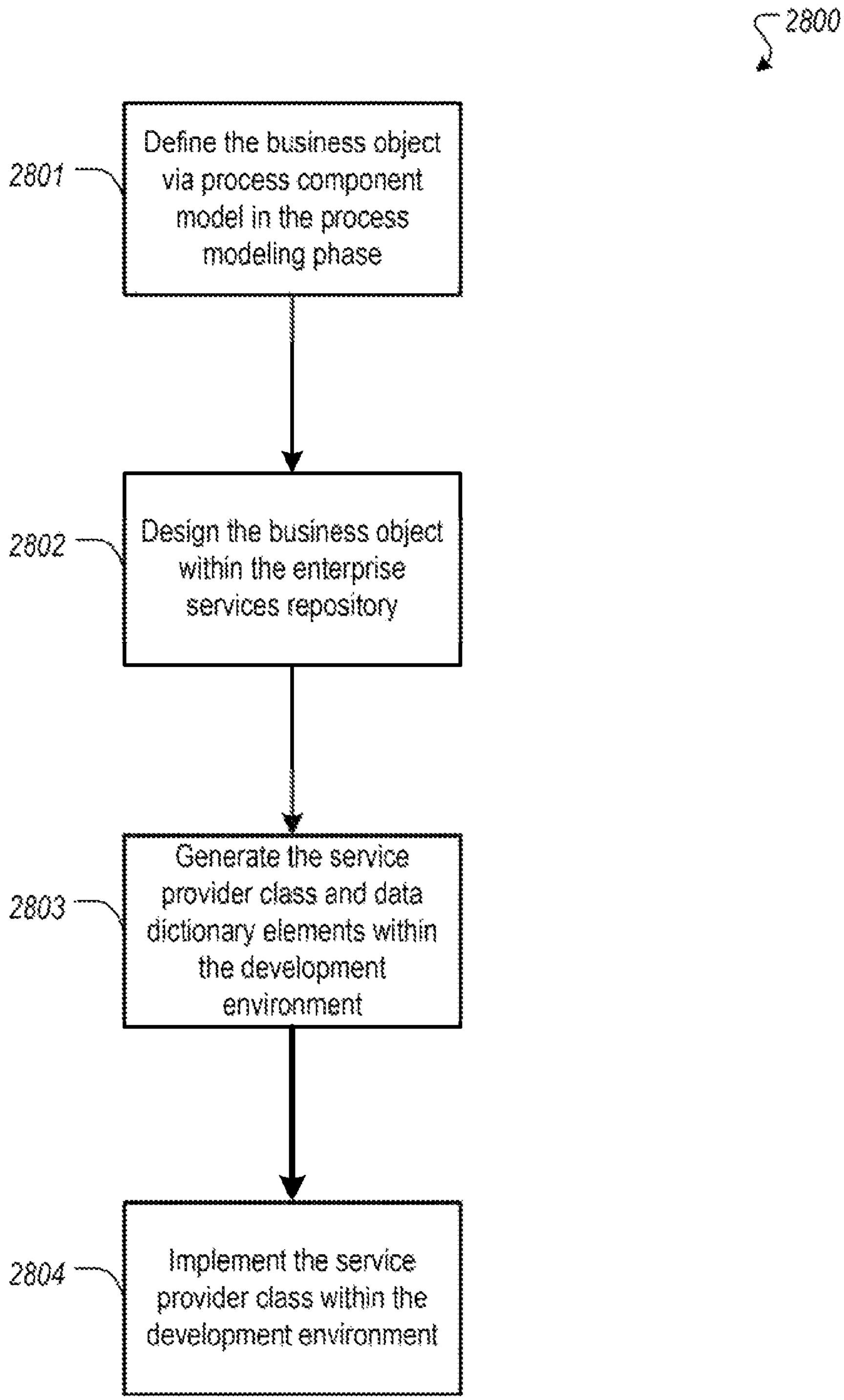
FIG. 28 illustrates an example method for service enabling in accordance with one embodiment of the present disclosure.
Figure 29:
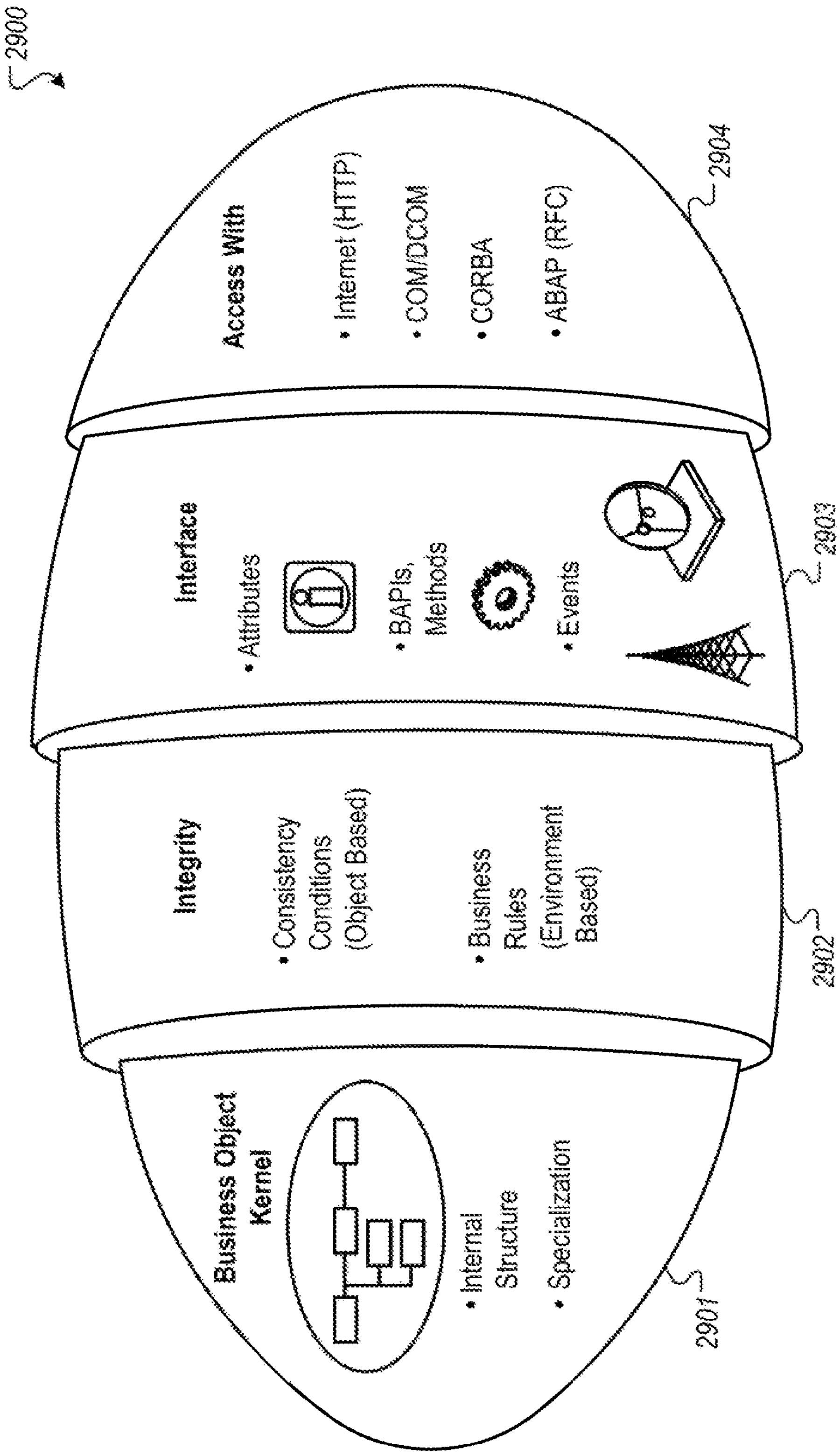
FIG. 29 is a graphical illustration of an example business object and associated components as may be used in the enterprise service infrastructure system of the present disclosure.

For example, FIG. 28 illustrates an example method 2800 for service enabling. In this example, the enterprise services infrastructure may offer one common and standard-based service infrastructure. Further, one central enterprise services repository may support uniform service definition, implementation and usage of services for user interface, and cross-application communication. In step 2801, a business object is defined via a process component model in a process modeling phase. Next, in step 2802, the business object is designed within an enterprise services repository. For example, FIG. 29 provides a graphical representation of one of the business objects 2900. As shown, an innermost layer or kernel 2901 of the business object may represent the business object's inherent data. Inherent data may include, for example, an employee's name, age, status, position, address, etc. A second layer 2902 may be considered the business object's logic. Thus, the layer 2902 includes the rules for consistently embedding the business object in a system environment as well as constraints defining values and domains applicable to the business object. For example, one such constraint may limit sale of an item only to a customer with whom a company has a business relationship. A third layer 2903 includes validation options for accessing the business object. For example, the third layer 2903 defines the business object's interface that may be interfaced by other business objects or applications. A fourth layer 2904 is the access layer that defines technologies that may externally access the business object.

Accordingly, the third layer 2903 separates the inherent data of the first layer 2901 and the technologies used to access the inherent data. As a result of the described structure, the business object reveals only an interface that includes a set of clearly defined methods. Thus, applications access the business object via those defined methods. An application wanting access to the business object and the data associated therewith usually includes the information or data to execute the clearly defined methods of the business object's interface. Such clearly defined methods of the business object's interface represent the business object's behavior. That is, when the methods are executed, the methods may change the business object's data. Therefore, an application may utilize any business object by providing the information or data without having any concern for the details related to the internal operation of the business object. Returning to method 2800, a service provider class and data dictionary elements are generated within a development environment at step 2803. In step 2804, the service provider class is implemented within the development environment.

Figure 30:
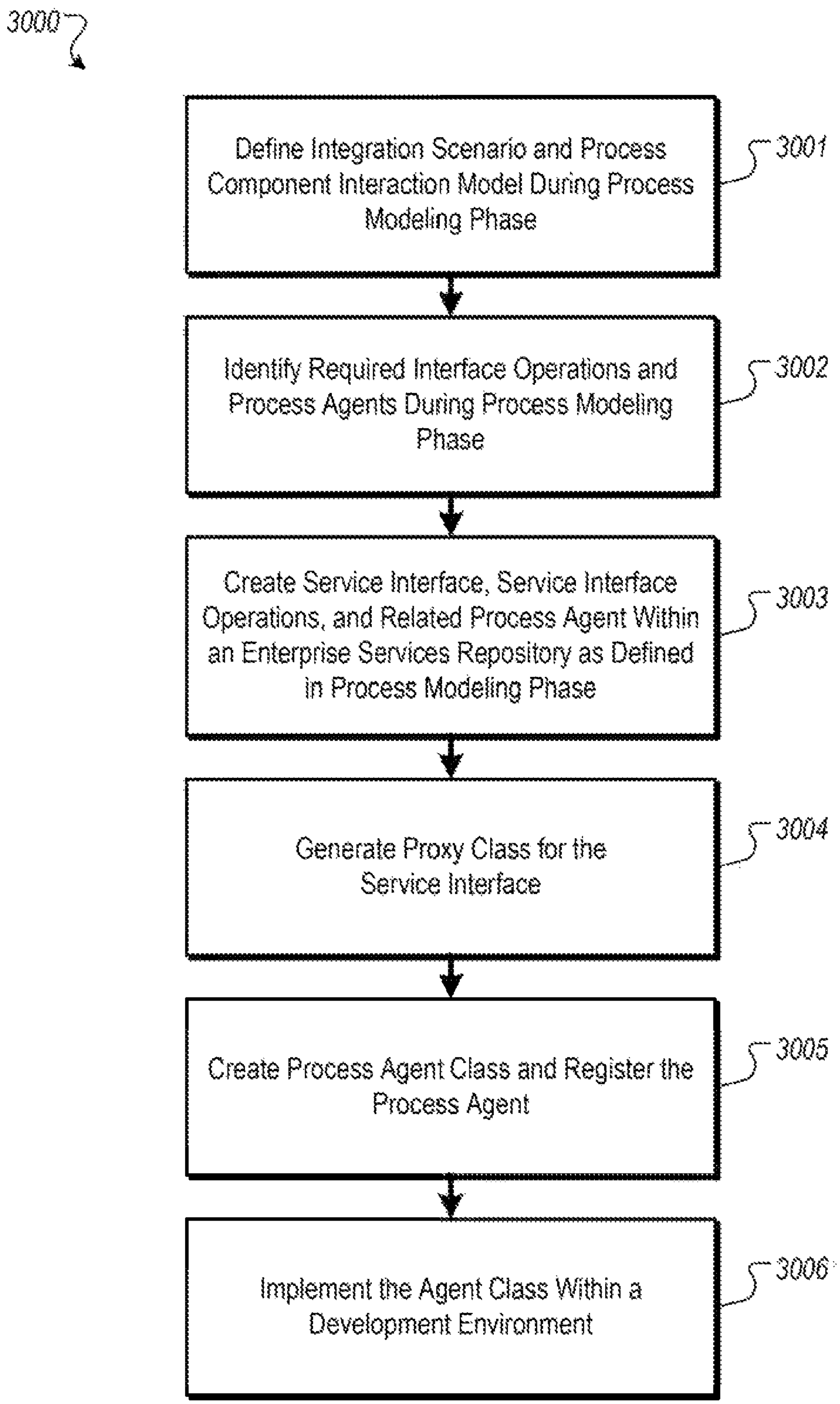
FIG. 30 illustrates an example method for managing a process agent framework in accordance with one embodiment of the present disclosure.

FIG. 30 illustrates an example method 3000 for a process agent framework. For example, the process agent framework may be the basic infrastructure to integrate business processes located in different deployment units. It may support a loose coupling of these processes by message based integration. A process agent may encapsulate the process integration logic and separate it from business logic of business objects. As shown in FIG. 30, an integration scenario and a process component interaction model are defined during a process modeling phase in step 3001. In step 3002, required interface operations and process agents are identified during the process modeling phase also. Next, in step 3003, a service interface, service interface operations, and the related process agent are created within an enterprise services repository as defined in the process modeling phase. In step 3004, a proxy class for the service interface is generated. Next, in step 3005, a process agent class is created and the process agent is registered. In step 3006, the agent class is implemented within a development environment.

Figure 31:
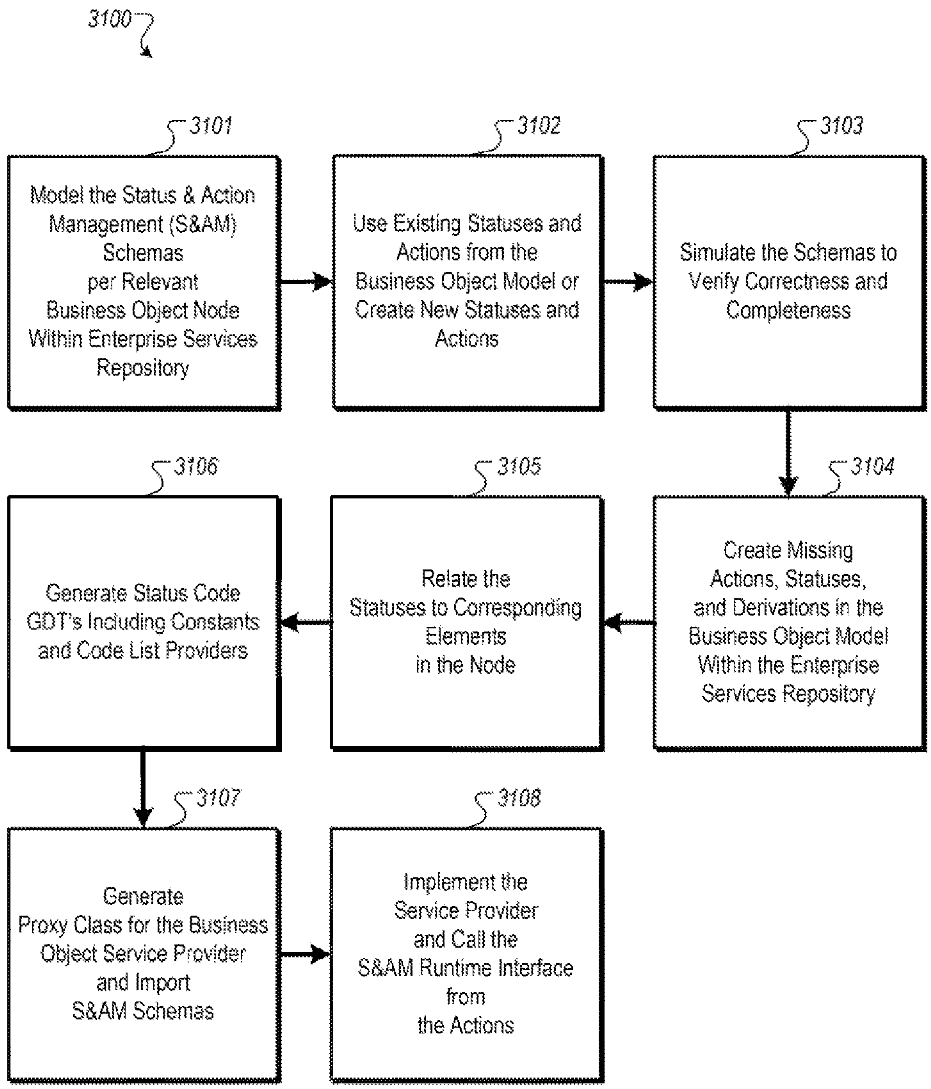
FIG. 31 illustrates an example method for status and action management in accordance with one embodiment of the present disclosure.

FIG. 31 illustrates an example method 3100 for status and action management (S&AM). For example, status and action management may describe the life cycle of a business object (node) by defining actions and statuses (as their result) of the business object (node), as well as, the constraints that the statuses put on the actions. In step 3101, the status and action management schemas are modeled per a relevant business object node within an enterprise services repository. In step 3102, existing statuses and actions from the business object model are used or new statuses and actions are created. Next, in step 3103, the schemas are simulated to verify correctness and completeness. In step 3104, missing actions, statuses, and derivations are created in the business object model with the enterprise services repository. Continuing with method 3100, the statuses are related to corresponding elements in the node in step 3105. In step 3106, status code GDT's are generated, including constants and code list providers. Next, in step 3107, a proxy class for a business object service provider is generated and the proxy class S&AM schemas are imported. In step 3108, the service provider is implemented and the status and action management runtime interface is called from the actions.

Regardless of the particular hardware or software architecture used, the disclosed systems or software are generally capable of implementing business objects and deriving (or otherwise utilizing) consistent interfaces that are suitable for use across industries, across businesses, and across different departments within a business in accordance with some or all of the following description. In short, system 100 contemplates using any appropriate combination and arrangement of logical elements to implement some or all of the described functionality.

Moreover, the preceding flowcharts and accompanying description illustrate example methods. The present services environment contemplates using or implementing any suitable technique for performing these and other tasks. It will be understood that these methods are for illustration purposes only and that the described or similar techniques may be performed at any appropriate time, including concurrently, individually, or in combination. In addition, many of the steps in these flowcharts may take place simultaneously and/or in different orders than as shown. Moreover, the services environment may use methods with additional steps, fewer steps, and/or different steps, so long as the methods remain appropriate.

Figure 32:
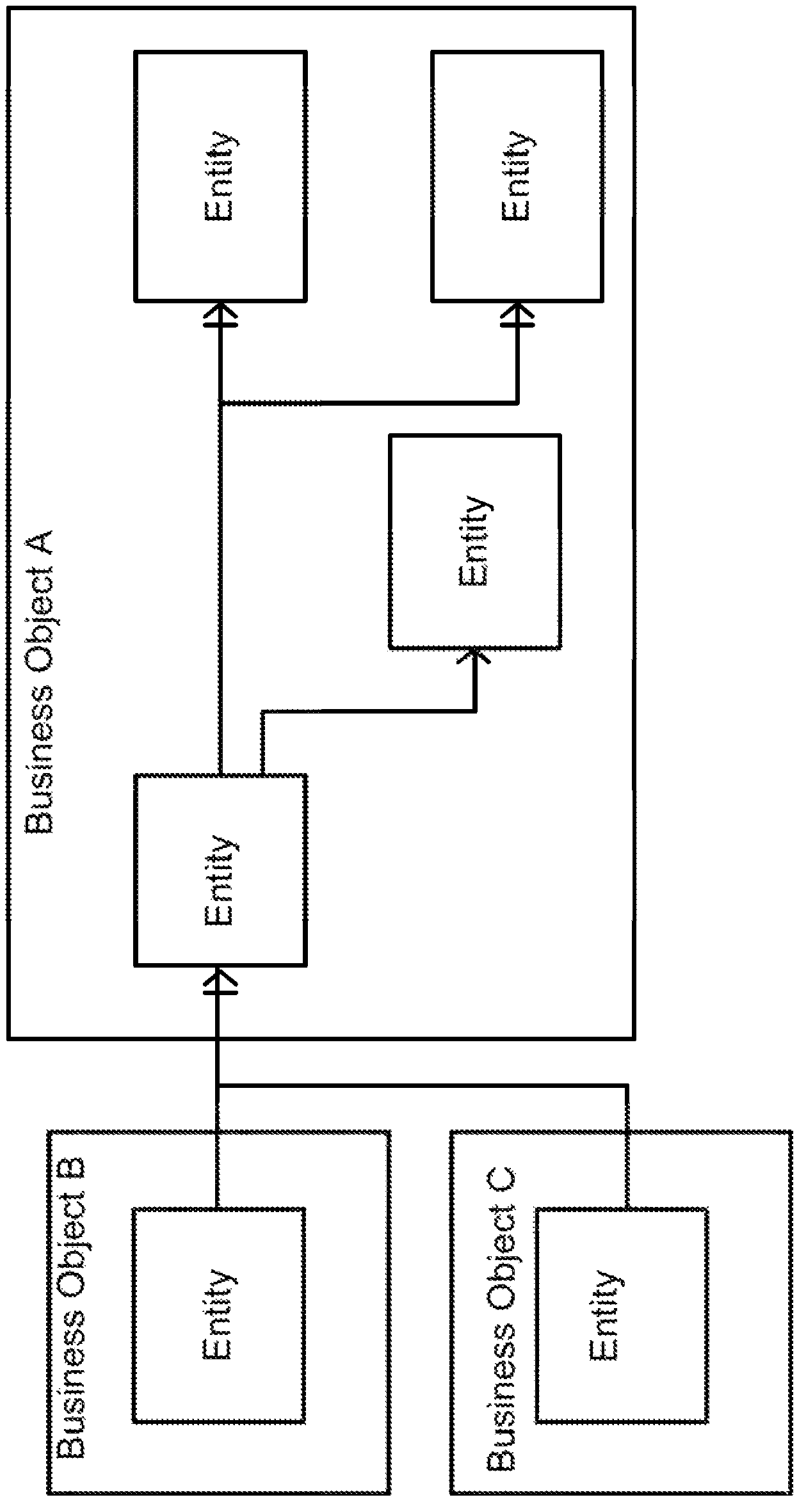
FIG. 32 illustrates an example sample object model diagram.

FIG. 32 illustrates an example sample object model diagram. Business objects are depicted as outer boxes, each containing nodes that are related hierarchically. Associations between nodes in the objects are shown using arrows, having relationships indicated by arrowheads as described above.

Figure 33:
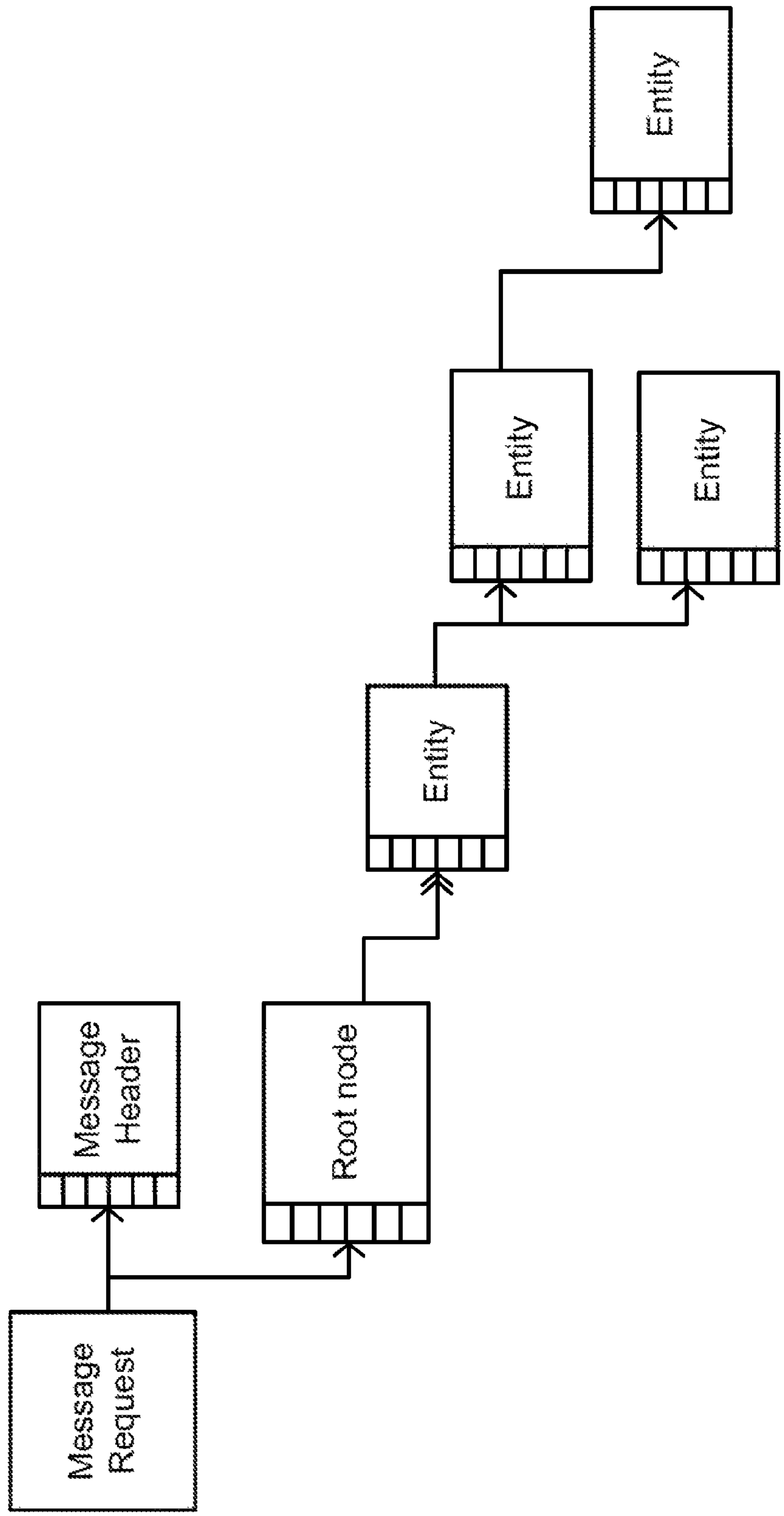
FIG. 33 illustrates an example sample message data type diagram.

FIG. 33 illustrates an example sample message data type diagram. The entities or nodes of a message data type are depicted as boxes, having relationships indicated by arrowheads as described above. Entities, for example, can be contained in packages, the structures of which are described in element structure tables below, when appropriate. The message data type can include, for example, a message request entity, a message header entity, a root node, and any number of entities or nodes that are hierarchically under the root node.

Figure 34:
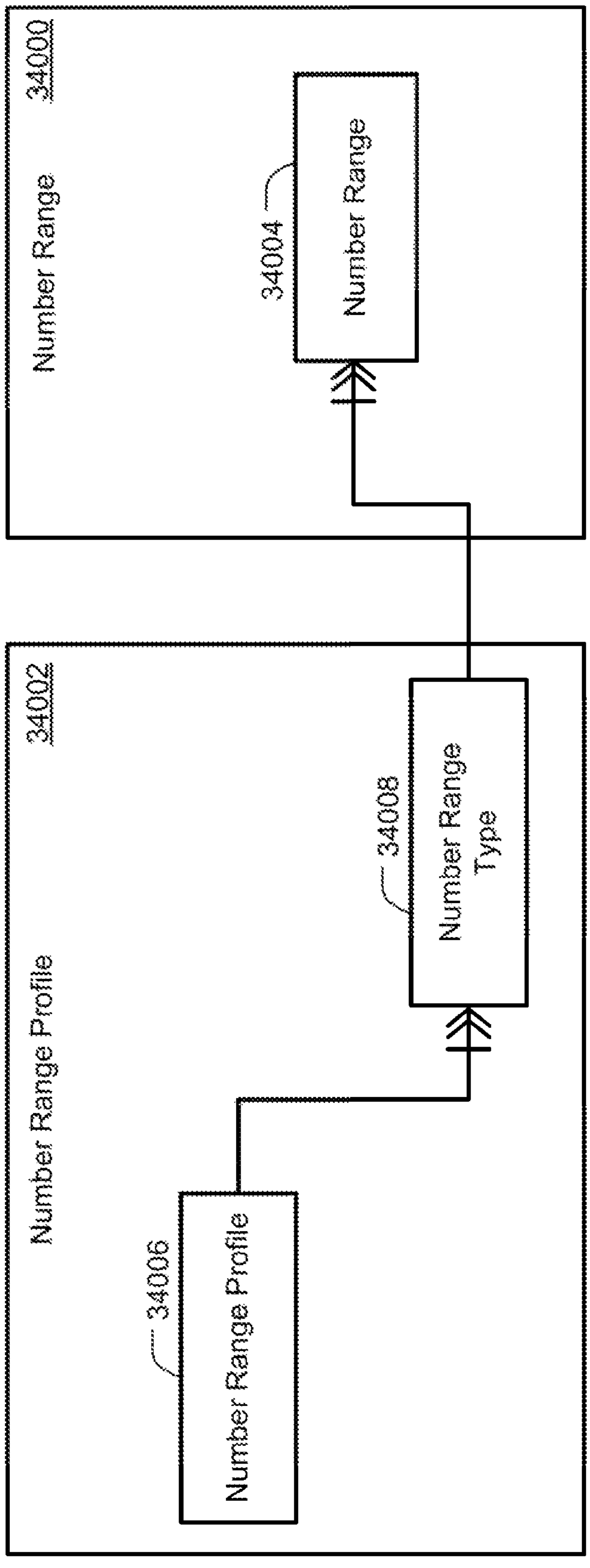
FIG. 34 depicts an example object model for a business object Number Range.

FIG. 34 depicts an example object model for a business object Number Range 34000. The business object 34000 has relationships with a Number Range Profile object 34002, as shown with lines and arrows. The business object 34000 hierarchically comprises a Number Range element 34004. The Number Range Profile object 34002 includes respective elements 34006-34008 as shown.

The business object Number Range is a range of numbers used for identification, delimited by an upper and lower boundary. The business object Number Range belongs to the process component Number Range and may specify attribute values that control the generation or validation of numbers. The attributes can include a reference to a number range type that determines attributes which are common to number ranges for that particular number range type. Number ranges can be automatic or manual. Automatic number ranges are used to generate numbers in consecutive order. Manual number ranges are used to define ranges for the validation of manually-entered numbers. For example, number ranges can be used for invoices for a specific company and year. In addition to a number range interval, a number range can be specific to a calendar/fiscal year and/or a company dependent characteristic. A number range can belong to a number range type and its number range profile.

Structurally, a Number Range can be a transient root node. The elements located at the node Number Range are defined by a data type: NumberRangeElements, and may include IntervalCode, ProfileCode, TypeCode, Year, CharacteristicText, IntervalLowerBoundaryText, IntervalUpperBoundaryText, CurrentOrdinalNumberValue, and AutomaticIndicator.

IntervalCode is a coded representation for a number range interval, and may be based on datatype GDT: NumberRangeIntervalCode. ProfileCode is a coded representation of a number range profile of a number range type for a number range, and may be based on datatype GDT: NumberRangeProfileCode. TypeCode is a coded representation of a number range type of a number range, and may be based on datatype GDT: NumberRangeTypeCode. Year may be optional, represents a year on which a number range is dependent, and may be based on datatype GDT: Year. CharacteristicText may be optional, represents a human-readable description of a characteristic of a number range, and may be based on datatype GDT: LANGUAGEINDEPENDENT_EXTENDED_Text, with a qualifier of NumberRangeCharacteristic. IntervalLowerBoundaryText is a start number of a number range interval, and may be based on datatype GDT: NumberRangeIntervalLowerBoundaryText. IntervalUpperBoundaryText is an end number of a number range interval, and may be based on datatype GDT: NumberRangeIntervalUpperBoundaryText. CurrentOrdinalNumberValue may be optional, represents a position of a current number in a number range, and may be based on datatype GDT: OrdinalNumberValue_V1, with a qualifier of Current. AutomaticIndicator may be optional, indicates whether a number range interval is automatic or not, and may be based on datatype GDT: Indicator, with a qualifier of Automatic. Automatic number ranges can be used to generate numbers in consecutive order. Manual number ranges can be used to define ranges for the validation of manually entered numbers.

From the business object Number Range Profile/node Number Range Type, a NumberRangeProfileNumberRangeType inbound aggregation relationship may exist, with a cardinality of 1:CN. To a business object Number Range Profile/node Number Range Profile, an association with a Number Range Profile of a Number Range Type may exist for which a Number Range exists. In some implementations, a current ordinal number value may be set for number ranges where numbers are created automatically. In general, the LowerBoundaryText is less than or equal to UpperBoundaryText. If both values are numeric, numeric comparison is used. Otherwise, lexical comparison is used.

To return a list of all number ranges that are available for a number range profile, a Query By Elements may be performed. The query elements are defined by a data type: NumberRangeElementsQueryElements, and may include ProfileCode, TypeCode, and IntervalCode. ProfileCode may be optional, is a coded representation of a number range profile, and may be based on datatype GDT: NumberRangeProfileCode. TypeCode may be may be optional, is a coded representation of a number range type, and may be based on datatype GDT: NumberRangeTypeCode. IntervalCode may be may be optional, is a coded representation of a number range interval, and may be based on datatype GDT: NumberRangeIntervalCode.

Figure 35:
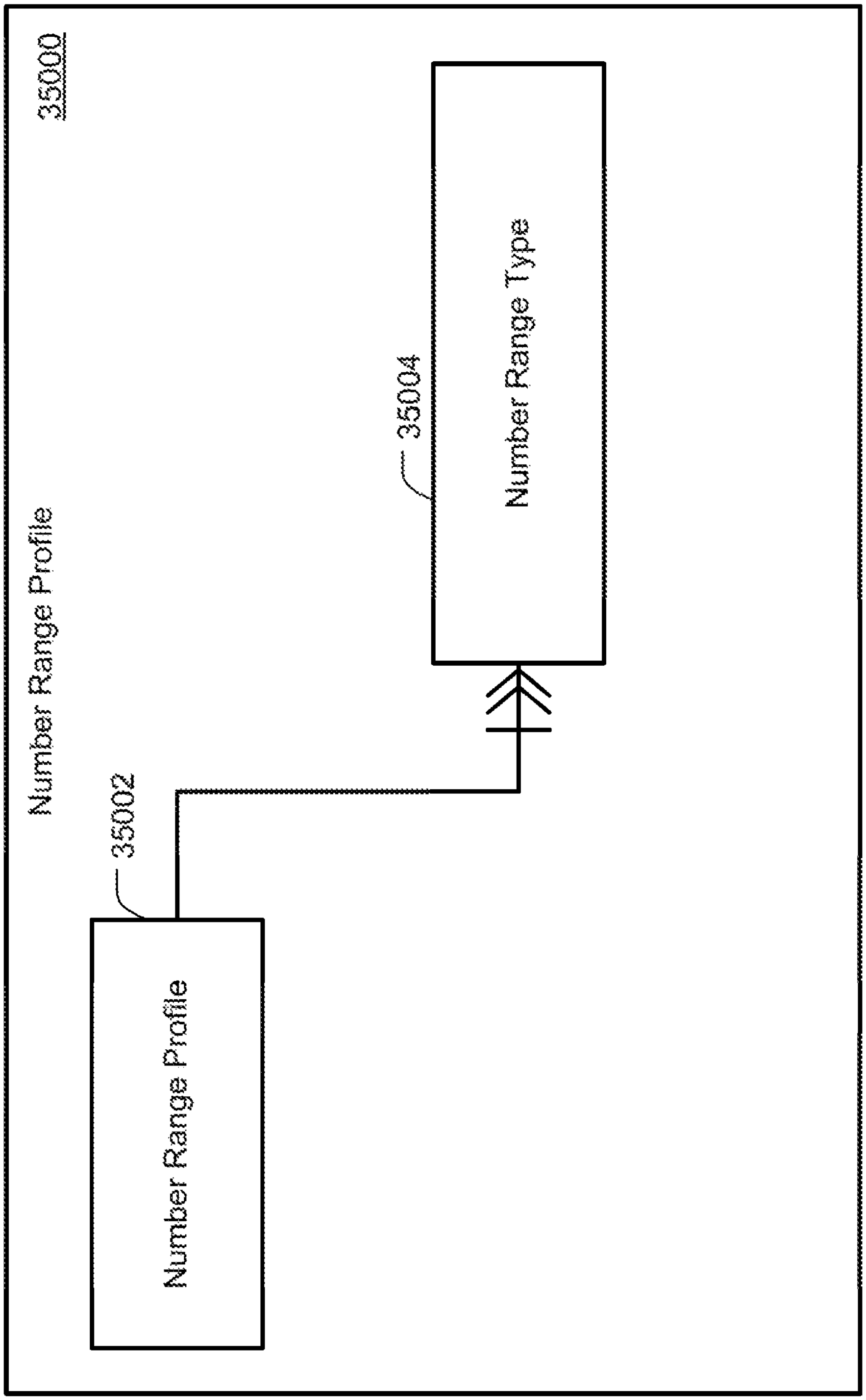
FIG. 35 depicts an example object model for a business object Number Range Profile.

FIG. 35 depicts an example object model for a business object Number Range Profile 35000. The business object 35000 hierarchically comprises a Number Range Profile element 35002 and a Number Range Type element 35004, as shown.

The business object Number Range Profile is a profile that includes a number of predefined attributes that characterize one or more number ranges of an application. The business object Number Range Profile belongs to the process component Number Range. A number range is a range of numbers that can be delimited by an upper and lower boundary and generated in a consecutive order. A number range can belong to a number range profile. The number range profile defines attributes such as a type of number range, maximum length of a number, and other application-specific configurations. Applications that use number ranges can create a profile with settings that are valid for the number ranges of a profile. For example, for an internal counter, a number range profile would specify that there is a number range that generates numbers and that settings may not be changed by business configuration. Number range profiles include technical information on the basis of which different number ranges can be determined, and can define the capabilities of the number ranges of an application. For example, a number range profile can exist for a number range type.

Structurally, a Number Range Profile can be a transient root node. The elements located at the node Number Range Profile are defined by a data type: NumberRangeProfileElements, and may include Code. Code is a coded representation of a number range profile, may be an alternative key, and may be based on datatype GDT: NumberRangeProfileCode. The following composition relationships to subordinate nodes may exist: NumberRangeType, with a cardinality of 1:CN. A Select All query can provide NodeIDs with instances of a node. For example, the query may be used to enable an initial load of data for a Fast Search Infrastructure.

A Number Range Type specifies the preset attributes of a number range type which is configured according to a profile. NumberRangeType can be a transient node. NumberRangeType specifies a type of number range which can be a single, simple, automatic, or an external ID type. NumberRangeType can determine a total length without a prefix, fiscal or calendar time dependency, and a prefix code or prefix value. NumberRangeType can be used for defining the settings that determine how a number should be generated. For example, a year-independent number range "APHCF_INTERNAL_EMPLOYEE" can be associated with an internal employee starting with prefix "I."

The elements located at the node Number Range Type are defined by the data type: NumberRangeProfileNumberRangeTypeElements, and may include Code, TotalDigitsNumberValue, NumberPrefixText, PrefixDeterminationMethodCode, YearDependencyCode, and CharacteristicDeterminationMethodCode. Code is a coded representation of a number range type, may be an alternative key, and may be based on datatype GDT: NumberRangeTypeCode. TotalDigitsNumberValue represents the total number of digits of a number, and may be based on datatype GDT: NumberValue, with a qualifier of TotalDigits. NumberPrefixText may be optional, represents a human-readable prefix of a number range profile, and may be based on datatype GDT: LANGUAGEINDEPENDENT_MEDIUM_Text, with a qualifier of NumberRangeNumberPrefix. PrefixDeterminationMethodCode may be optional, is a coded representation of a method for determining a number range prefix, and may be based on datatype GDT: NumberRangePrefixDeterminationMethodCode. YearDependencyCode is a coded representation of a year dependency of a number range type, and may be based on datatype GDT: NumberRangeYearDependencyCode. For example, if a number range type is year dependent then individual number ranges may be created for each year. CharacteristicDeterminationMethodCode may be optional, and is a coded representation of a characteristic that is assigned to a number range type, and may be based on datatype GDT: NumberRangeCharacteristicDeterminationMethodCode. The characteristic determination code can specify which characteristic text is used. For example, individual number ranges may be created for each combination of a characteristic determination code and characteristic text.

To a business object NumberRange/node Number Range, an association with a NumberRange may exist, with a cardinality of 0:N. For retrieving number range types that belong to a number range profile code, a Query By Profile Code may be performed. The query elements are defined by the data type: NumberRangeProfileNumberRangeTypeProfileCodeQueryElements, and may include ProfileCode. ProfileCode is a coded representation of a number range profile, and may be based on datatype GDT: NumberRangeProfileCode.

Figures 1, 36:
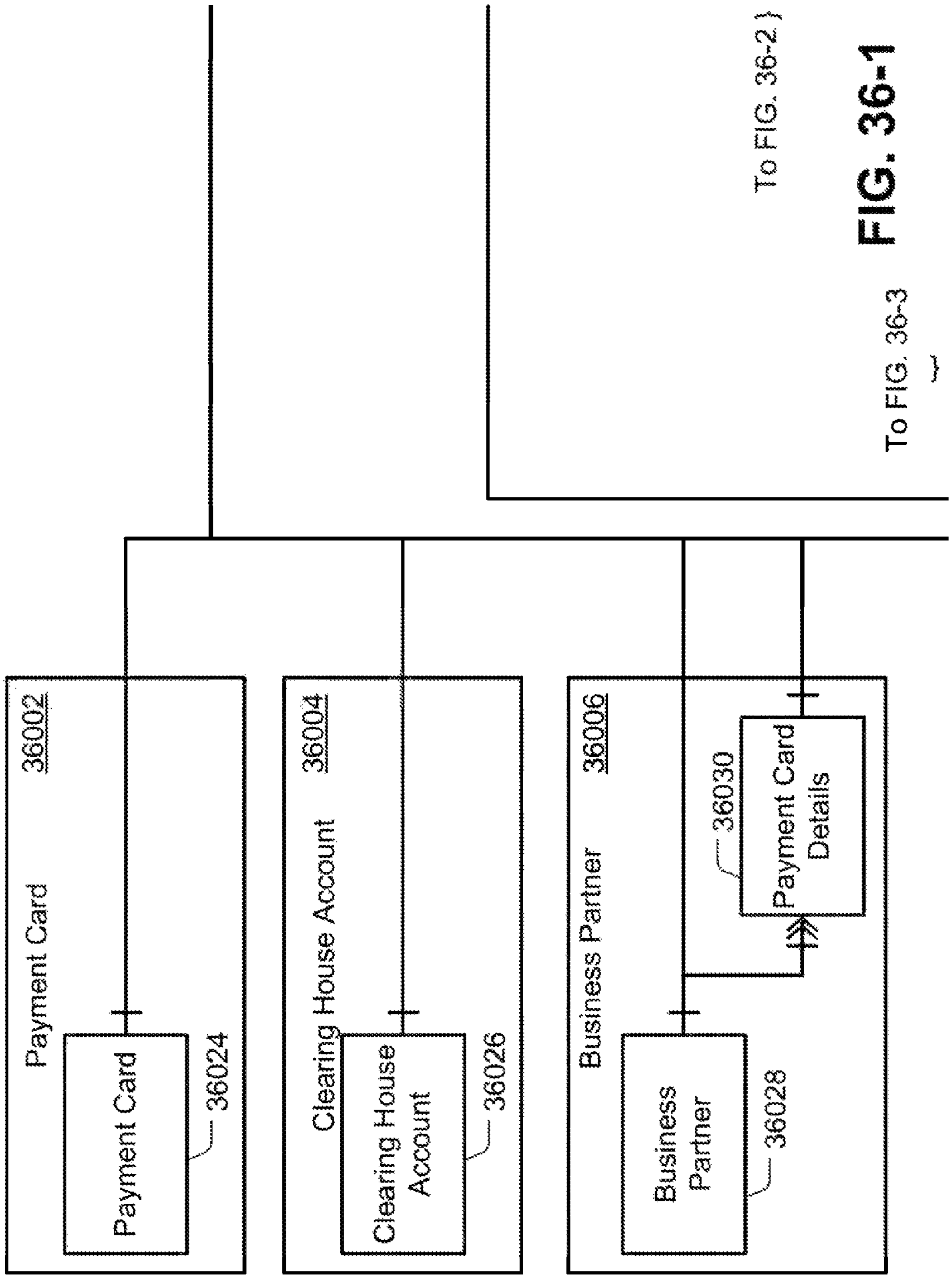
Figures 2, 36:
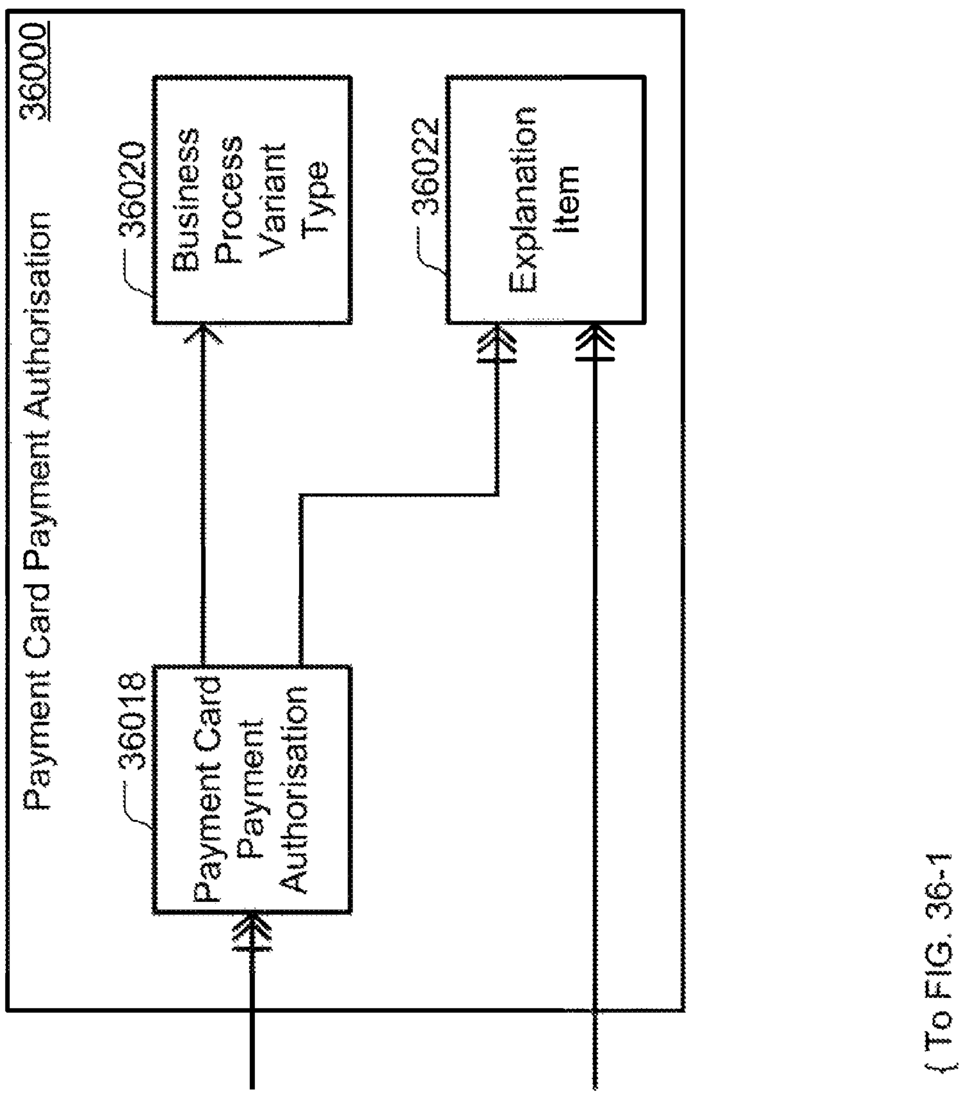

FIGS. 36-1 through 36-4 depict an example object model for a business object Payment Card Payment Authorisation 36000. The business object 36000 has relationships with other objects 36002-36016, as shown with lines and arrows. The business object 36000 hierarchically comprises elements 36018-36022. The other objects 36002-36016 include respective elements 36024-36040 as shown.

The business object Payment Card Payment Authorisation is an authorisation for a payment made using a payment card which includes payment information including a description of goods/services purchased, an authorisation request, and a result of the authorisation request based on a response from a clearing house. The business object Payment Card Payment Authorisation belongs to the process component Payment Authorisation. After a payment authorisation request is made, the PaymentCardPaymentAuthorisation transformed object triggers a synchronous outbound process agent RequestPaymentCardPaymentAuthorization, which in turn communicates with a clearing house. PaymentCardPaymentAuthorisation includes a payment authorisation request, a response from a clearing house, and details about goods/services purchased using a payment card. The business object Payment Card Payment Authorisation is involved in the following Process Component Interaction Models: Payment Authorisation_Settlement Processing at Clearing House. A service interface Payment Authorisation Requesting Out may have a technical name of PaymentAuthorisationPaymentCardPaymentAuthorisationOut. The Service Interface Payment Authorisation Requesting Out is part of the following Process Component Interaction Models: Payment Authorisation_Settlement Processing at Clearing House. The service interface PaymentAuthorisationPaymentCardPaymentAuthorisationOut is an interface to request authorization for a payment made using a payment card. The service interface PaymentAuthorisationPaymentCardPaymentAuthorisationOut may include a Request Payment Authorisation operation, which may have a technical name of PaymentAuthorisationPaymentCardPaymentAuthorisationOut.AuthorisePayment, may be used to request authorization for a payment made using a payment card, and may be based on a message type Payment Card Payment Authorisation Confirmation derived from business object Payment Card Payment Authorisation.

The business object Payment Card Payment Authorisation includes a Payment Card Payment Authorisation root node which is a container for header data of a payment authorization request and a response from a clearing house. The root node includes information such as payment card number and card verification value. The root node may be a transient node. The elements located directly at the node Payment Card Payment Authorisation are defined by the data type PaymentCardPaymentAuthorisationElements. These elements include: BusinessTransactionDocumentID, DeviceID, PaymentCardHolderAuthenticationID, PaymentCardHolderAuthenticationResultCode, PaymentCardHolderAuthenticationTokenText, PaymentCardDataOriginTypeCode, PaymentCardVerificationValueAvailabilityCode, PaymentCardVerificationValueCheckRequiredIndicator, PaymentCardVerificationValueText, PaymentAmount, PaymentCardUUID, HouseBankAccountUUID, LocationID, BusinessPartnerPaymentCardDetailsKey, BusinessPartnerUUID, BusinessPartnerPaymentCardDetailsID, CompanyUUID, ClearingHouseAccountUUID, RequestorID, ProviderID, ClearingHouseID, AuthorisationResultCode, PaymentCardVerificationResultCode, PaymentCardVerificationValueVerificationResultCode, PaymentCardAddressVerificationResultCode, PaymentAuthorisationDateTime, AuthorisedPaymentAmount, ResultDescription, ExpirationDateTime, and TestDataIndicator. BusinessTransactionDocumentID is a unique identifier of a Payment Card Payment Authorisation and may be based on datatype GDT BusinessTransactionDocumentID. DeviceID may be optional, is an identifier for an input or output device used in payment transactions, and may be based on datatype GDT DeviceID. PaymentCardHolderAuthenticationID may be optional, is an identifier for a payment card holder authentication, and may be based on datatype GDT PaymentCardHolderAuthenticationID. PaymentCardHolderAuthenticationResultCode may be optional, is a coded representation of a result of a card holder authentication, and may be based on datatype GDT PaymentCardHolderAuthenticationResultCode. PaymentCardHolderAuthenticationTokenText may be optional and is an encrypted token concerning an authentication check of a payment card holder that is transferred from an Interoperability Domain to a clearing house or bank. PaymentCardHolderAuthenticationResultCode may be based on datatype GDT PaymentCardHolderAuthenticationTokenText. PaymentCardDataOriginTypeCode may be optional, is a coded representation of an origin type of payment card data, and may be based on datatype GDT PaymentCardDataOriginTypeCode. PaymentCardVerificationValueAvailabilityCode may be optional, is a coded representation of the availability of a verification code on a payment card, and may be based on datatype GDT PaymentCardVerificationValueAvailabilityCode. PaymentCardVerificationValueCheckRequiredIndicator indicates whether a payment card verification value check is required, and may be based on datatype GDT Indicator, with a qualifier of Required. PaymentCardVerificationValueText may be optional, is a verification code of a payment card, and may be based on datatype GDT PaymentCardVerificationValueText. PaymentAmount is an amount to be authorized for a current payment transaction made using a payment card, and may be based on datatype GDT Amount, with a qualifier of Payment. PaymentCardUUID may be optional, is a universal unique identifier of a Payment Card, and may be based on datatype GDT UUID. HouseBankAccountUUID may be optional, is a universal unique identifier of a bank account, may be used to retrieve details of a Bank account from which a payment is made, and may be based on datatype GDT UUID. LocationID may be optional, is an identifier of a Location where a payment transaction is performed, and may be based on datatype GDT LocationID. BusinessPartnerPaymentCardDetailsKey may be optional, is a key of a payment card of a business partner, and may be based on datatype KDT BusinessPartnerPaymentCardDetailsKey. BusinessPartnerUUID is an identifier of a business partner that is involved in a payment, and may be based on datatype GDT UUID.

The business partner may be referenced from a root node, meaning that only payment cards of the business partner involved can be used. BusinessPartnerPaymentCardDetailsID is a unique identifier for a payment card of a business partner, and may be based on datatype GDT BusinessPartnerPaymentCardDetailsID. CompanyUUID may be optional, is a universally unique identifier of a company whose clearing house account is used for a payment transaction, and may be based on datatype GDT UUID. ClearingHouseAccountUUID may be optional, is a universally unique identifier of a clearing house account from which a payment is authorized, and may be based on datatype GDT UUID. RequestorID may be optional, is an identifier for authorisation of a payment made using a payment card that is assigned by a company that requests for payment authorisation, and may be based on datatype GDT PaymentCardPaymentAuthorisationPartyID_V1. ProviderID may be optional, is an identifier for authorisation of a payment made using a payment card that is assigned by a service provider that provides a payment authorisation, and may be based on datatype GDT PaymentCardPaymentAuthorisationPartyID_V1. ClearingHouseID may be optional, is an identifier of a clearing house that is involved in a payment authorization, and may be based on datatype GDT PaymentCardPaymentAuthorisationPartyID_V1. AuthorisationResultCode may be optional, is a coded representation of a result of a payment authorization at a clearing house, and may be based on datatype GDT AuthorisationResultCode. PaymentCardVerificationResultCode may be optional, is a coded representation of a result of a verification of a payment card at a clearing house, and may be based on datatype GDT PaymentCardVerificationResultCode. PaymentCardVerificationValueVerificationResultCode may be optional, is a coded representation of a result of a validation of a Card Verification Value at a clearing house, and may be based on datatype GDT PaymentCardVerificationValueVerificationResultCode. PaymentCardAddressVerificationResultCode may be optional, is a coded representation of a result of verification of an address of a payer party using an address verification system, and may be based on datatype GDT PaymentCardAddressVerificationResultCode. PaymentAuthorisationDateTime may be optional, is a date and time at which a payment authorization is performed at a clearing house, and may be based on datatype GDT GLOBAL_DateTime, with a qualifier of Authorisation. AuthorisedPaymentAmount may be optional, is a monetary amount authorized by a clearing house, and may be based on datatype GDT Amount, with a qualifier of Payment. ResultDescription may be optional, includes text that holds a result of payment authorization, and may be based on datatype GDT SHORT_Description, with a qualifier of Result. ExpirationDateTime may be optional, is an expiration date and time of a payment authorization, and may be based on datatype GDT GLOBAL_DateTime, with a qualifier of Expiration. TestDataIndicator indicates whether business data included in a message is test data. TestDataIndicator may be optional, may have a default value of "false", and may be based on datatype GDT Indicator, with a qualifier of TestData.

The following composition relationships to subordinate nodes may exist: Business Process Variant Type with a cardinality of 1:1 and ExplanationItem with a cardinality of 1:CN. A Business Partner inbound aggregation relationship may exist from the business object Business Partner/node Business Partner, with a cardinality of C:CN, which represents details of a payment card owner. A Payment Card Details inbound aggregation relationship may exist from the business object Business Partner/node Payment Card Details, with a cardinality of C:CN, which represents details of a payment card for which a payment authorization is requested. A ClearingHouseAccount inbound aggregation relationship may exist from the business object Clearing House Account/node Clearing House Account, with a cardinality of C:CN, which represents details of a clearing house account from which a payment authorization is requested. A Company inbound aggregation relationship may exist from the business object Company/node Company, with a cardinality of C:CN, which represents details of a company selling goods or services. A CoreViewOfHouseBankAccount inbound aggregation relationship may exist from the business object Core View Of House Bank Account/node Core View Of House Bank Account, with a cardinality of C:CN, which represents details of a house bank account to which card payments are transferred. A Location inbound aggregation relationship may exist from the business object Location/node Location, with a cardinality of C:CN, which represents details of a location of where a business transaction takes place. A PaymentCard inbound aggregation relationship may exist from the business object Payment Card/node Payment Card, with a cardinality of C:CN, which represents details of a payment card for which a payment authorization is requested.

The business object Payment Card Payment Authorisation may be associated with the PaymentAuthorise enterprise service infrastructure action. The PaymentAuthorise action authorizes information pertaining to a payment transaction by triggering a RequestPaymentCardPaymentAuthorisation process agent.

A BusinessProcessVariantType defines a character of a business process variant of a Payment Card Payment Authorisation. BusinessProcessVariantType represents a typical way of processing a Payment Card Payment Authorisation within a process component from a business point of view. BusinessProcessVariantType may be a transient node. A Business Process Variant is a configuration of a Process Component. A Business Process Variant may belong to exactly one process component. A process component is a software package that realizes a business process and exposes its functionality as services. The functionality may include business transactions. A process component includes one or more semantically related business objects. A business object may belong to exactly one process component. The elements located at the node Business Process Variant Type are defined by the data type PaymentCardPaymentAuthorisationBusinessProcessVariantTypeElements. These elements include: BusinessProcessVariantTypeCode and MainIndicator. BusinessProcessVariantTypeCode is a coded representation of a business process variant type of a BusinessProcessVariantType and may be based on datatype GDT: BusinessProcessVariantTypeCode. MainIndicator is an indicator that specifies whether the current BusinessProcessVariantTypeCode is a main BusinessProcessVariantTypeCode, and may be based on datatype GDT: Indicator, with a qualifier of Main.

Explanation Item is a description of goods or services that are purchased using a payment card. Explanation Item can include information such as type of product and/or quantity of product for which a sales order or invoice is created. Explanation Item may be a transient node. The elements located at the node Explanation Item are defined by the data type PaymentCardPaymentAuthorisationExplanationItemElements. These elements include: BusinessTransactionDocumentReference, CreationDateTime, RequestedQuantity, ProductTypeCode, ProductUUID, ProductStandardID, ProductBuyerID, ProductSellerID, ProductRecipientID, ProductVendorID, ProductManufacturerID, ProductBillToID, ProductBillFromID, ProductBidderID, ProductNote, ProductChangeID, ProductDiscontinuationIndicator, ProductpackageQuantity, and ProductpackageQuantityTypeCode. BusinessTransactionDocumentReference is a unique reference to goods or services purchased during a business transaction using a payment card, and may be based on datatype GDT BusinessTransactionDocumentReference. CreationDateTime may be optional, is a date at which a sales order or an invoice is created for goods or services purchased using a payment card, and may be based on datatype GDT GLOBAL_DateTime, with a qualifier of Creation. RequestedQuantity may be optional, is a quantity of goods or service purchased using a payment card, and may be based on datatype GDT Quantity, with a qualifier of Requested. ProductTypeCode may be optional and is a coded representation of a product type. A product type describes the nature of products and establishes basic properties for products of the type. ProductTypeCode may be based on datatype GDT ProductTypeCode. ProductUUID may be optional, is a unique identifier of a product, may be used to retrieve an internal identifier and type code of a product, and may be based on datatype GDT QUID. ProductStandardID may be optional and is a standardized identifier for a product. An identification scheme may be managed by an agency from a code list "DE 30". ProductStandardID may be based on datatype GDT ProductStandardID. ProductBuyerID may be optional, is an identifier of a buyer of a product, and may be based on datatype GDT ProductPartyID. ProductSellerID may be optional, is an identifier of a seller of a product, and may be based on datatype GDT ProductPartyID. ProductRecipientID may be optional, is an identifier of a recipient of a product, and may be based on datatype GDT ProductPartyID. ProductVendorID may be optional, is an identifier of a vendor of a product, and may be based on datatype GDT ProductPartyID. ProductManufacturerID may be optional, is an identifier of a manufacturer of a product, and may be based on datatype GDT ProductPartyID. ProductBillToID may be optional, is an identifier of a party to whom a payment amount of a product is billed, and may be based on datatype GDT ProductPartyID. ProductBillFromID may be optional, is an identifier of a party from whom a payment amount of a product is billed, and may be based on datatype GDT ProductPartyID. ProductBidderID may be optional, is an identifier of a bidder party of a product, and may be based on datatype GDT ProductPartyID. ProductNote may be optional, is a description of a product, and may be based on datatype GDT Note. ProductChangeID may be optional, is a unique identifier for a change to a product which leaves the product unchanged in terms of its properties that are relevant for the user, and may be based on datatype GDT ProductChangeID. ProductDiscontinuationIndicator indicates whether the sale of a product is to be discontinued, and may be based on datatype GDT Indicator, with a qualifier of ProductDiscontinuation. ProductPackageQuantity may be optional, is a quantity of a product, and may be based on datatype GDT Quantity, with a qualifier of Package. ProductPackageQuantity may be used, for example, if different package quantities are relevant for a product. ProductPackageQuantity may include movement data variable at the time of a message. ProductpackageQuantityTypeCode may be optional, is a quantity type of a product, and may be based on datatype GDT QuantityTypeCode, with a qualifier of Productpackage. A Material inbound aggregation relationship may exist from the business object Material/node Material, with a cardinality of C:CN, which represents details of a material for which a payment authorization is requested. A ServiceProduct inbound aggregation relationship may exist from the business object Service Product/node Service Product, with a cardinality of C:CN, which represents details of a service product for which a payment authorization is requested.

Figure 37:
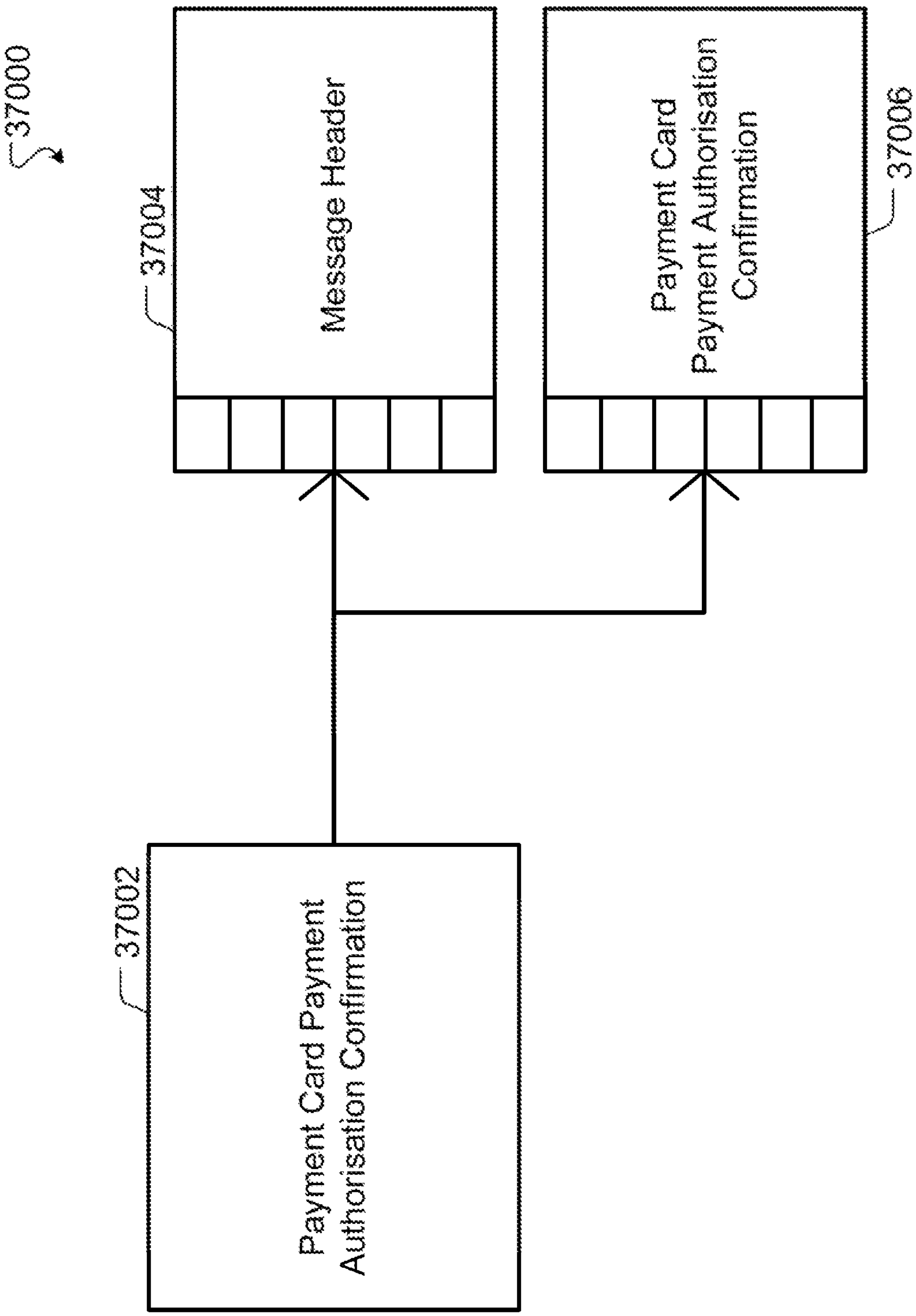
FIG. 37 depicts an example Payment Card Payment Authorisation Confirmation Message Data Type.

FIG. 37 depicts an example Payment Card Payment Authorisation Confirmation Message Data Type 37000, which comprises elements 37002-37006, hierarchically related as shown. For example, the Payment Card Payment Authorisation Confirmation 37002 includes a Message Header 37004.

The message type Payment Card Payment Authorisation Confirmation is derived from the business object Payment Card Payment Authorisation as a leading object together with its operation signature. The message type Payment Card Payment Authorisation Confirmation is a confirmation indicating the success or failure of a payment authorization request. The structure of the message type Payment Card Payment Authorisation Confirmation is determined by the message data type PaymentCardPaymentAuthorisationConfirmationMessage. The message data type PaymentCardPaymentAuthorisationConfirmationMessage includes the object PaymentCardPaymentAuthorisationConfirmation which is included in the business document, business information that is relevant for sending a business document in a message, the MessageHeader package, and the PaymentCardPaymentAuthorisationConfirmation package. The message data type PaymentCardPaymentAuthorisationConfirmationMessage provides a structure for the Payment Card Payment Authorisation Confirmation message type and for associated operations.

The MessageHeader package is a grouping of business information that is relevant for sending a business document in a message. The MessageHeader package includes the MessageHeader node. The MessageHeader node is a grouping of business information from the perspective of a sending application, such as information to identify the business document in a message, information about the sender, and optionally information about the recipient. The MessageHeader includes SenderParty and RecipientParty. MessageHeader may be based on the datatype GDT:BusinessDocumentMessageHeader.

The following elements of the GDT may be used: RecipientParty, BusinessScope, SenderParty, SenderBusinessSystemID, TestDataIndicator, RecipientBusinessSystemID, ReferenceID, ReferenceUUID, ReconciliationIndicator, ID, UUID, and CreationDateTime.

SenderParty is the partner responsible for sending a business document at a business application level. The SenderParty is of the type GDT:BusinessDocumentMessageHeaderParty. RecipientParty is of the type GDT: BusinessDocumentMessageHeaderParty. RecipientParty is the partner responsible for receiving a business document at a business application level.

The PaymentCardPaymentAuthorisationConfirmation package is a grouping of PaymentCardPaymentAuthorisationConfirmation with its packages and with the PaymentCardPaymentAuthorisationConfirmation entity. PaymentCardPaymentAuthorisationConfirmation is a message indicating the success or failure of a payment authorization for a payment made using a payment card. PaymentCardPaymentAuthorisationConfirmation includes the following non-node elements: ID, PaymentCardPaymentAuthorisationRequestorID, PaymentCardPaymentAuthorisationProviderID, PaymentCardPaymentAuthorisationClearingHouseID, AuthorisationResultCode, PaymentCardVerificationResultCode, PaymentCardVerificationValueVerificationResultCode, PaymentCardAddressVerificationResultCode, PaymentAuthorisationDateTime, AuthorisedPaymentAmount, AuthorisationResultDescription, and AuthorisationExpirationDateTime. ID is an identifier of a business document for which a Payment authorization is requested (e.g., sales order identifier of a of sales order), and may be based on datatype GDT:BusinessTransactionDocumentID. PaymentCardPaymentAuthorisationRequestorID may be optional, is an identifier for authorization of a card payment that is assigned by a company which requests for Payment authorization, and may be based on datatype GDT:PaymentCardPaymentAuthorisationPartyID_V1. PaymentCardPaymentAuthorisationProviderID may be optional, is an identifier for authorization of a card payment that is assigned by a service provider which provides a payment authorisation, and may be based on datatype GDT:PaymentCardPaymentAuthorisationPartyID_V1. PaymentCardPaymentAuthorisationClearingHouseID may be optional, is an identifier of a clearing house that is involved in a payment authorization, and may be based on datatype GDT:PaymentCardPaymentAuthorisationPartyID_V1. AuthorisationResultCode is a result of the success of an authorization at a clearing house, and may be based on datatype GDT:AuthorisationResultCode. PaymentCardVerificationResultCode is a result of the success of a payment card check at a clearing house, and may be based on datatype GDT:PaymentCardVerificationResultCode with a qualifier of Authorisation. PaymentCardVerificationValueVerificationResultCode may be optional, is a result of the success of a check of a card verification value at a clearing house, and may be based on datatype GDT:PaymentCardVerificationValueVerificationResultCode. PaymentCardAddressVerificationResultCode may be optional is a coded representation of a verification result of a postal address of a payment card using an address verification system, and may be based on datatype GDT:PaymentCardAddressVerificationResultCode. PaymentAuthorisationDateTime is a date on which a payment authorization check was performed, and may be based on datatype CDT:GLOBAL_DateTime with a qualifier of Authorisation. AuthorisedPaymentAmount may be optional, is a payment amount in transaction currency, and may be based on datatype CDT: Amount with a qualifier of Payment. AuthorisationResultDescription may be optional, is result text of a payment authorization, and may be based on datatype GDT: SHORT_Description with a qualifier of PaymentAuthorisationResult. AuthorisationExpirationDateTime may be optional, is an expiration date of a payment authorization, and may be based on datatype CDT:GLOBAL_DateTime with a qualifier of Expiration.

FIGS. 38-1 through 38-9 show an example configuration of an Element Structure that includes a PaymentCardPaymentAuthorisationConfirmation 38000 package. Specifically, these figures depict the arrangement and hierarchy of various components such as one or more levels of packages, entities, and datatypes, shown here as 38000 through 38276. As described above, packages may be used to represent hierarchy levels. Entities are discrete business elements that are used during a business transaction. Data types are used to type object entities and interfaces with a structure. For example, the PaymentCardPaymentAuthorisationConfirmation 38000 includes, among other things, a PaymentCardPaymentAuthorisationConfirmation 38002. Accordingly, heterogeneous applications may communicate using this consistent message configured as such.

Figures 3, 36:
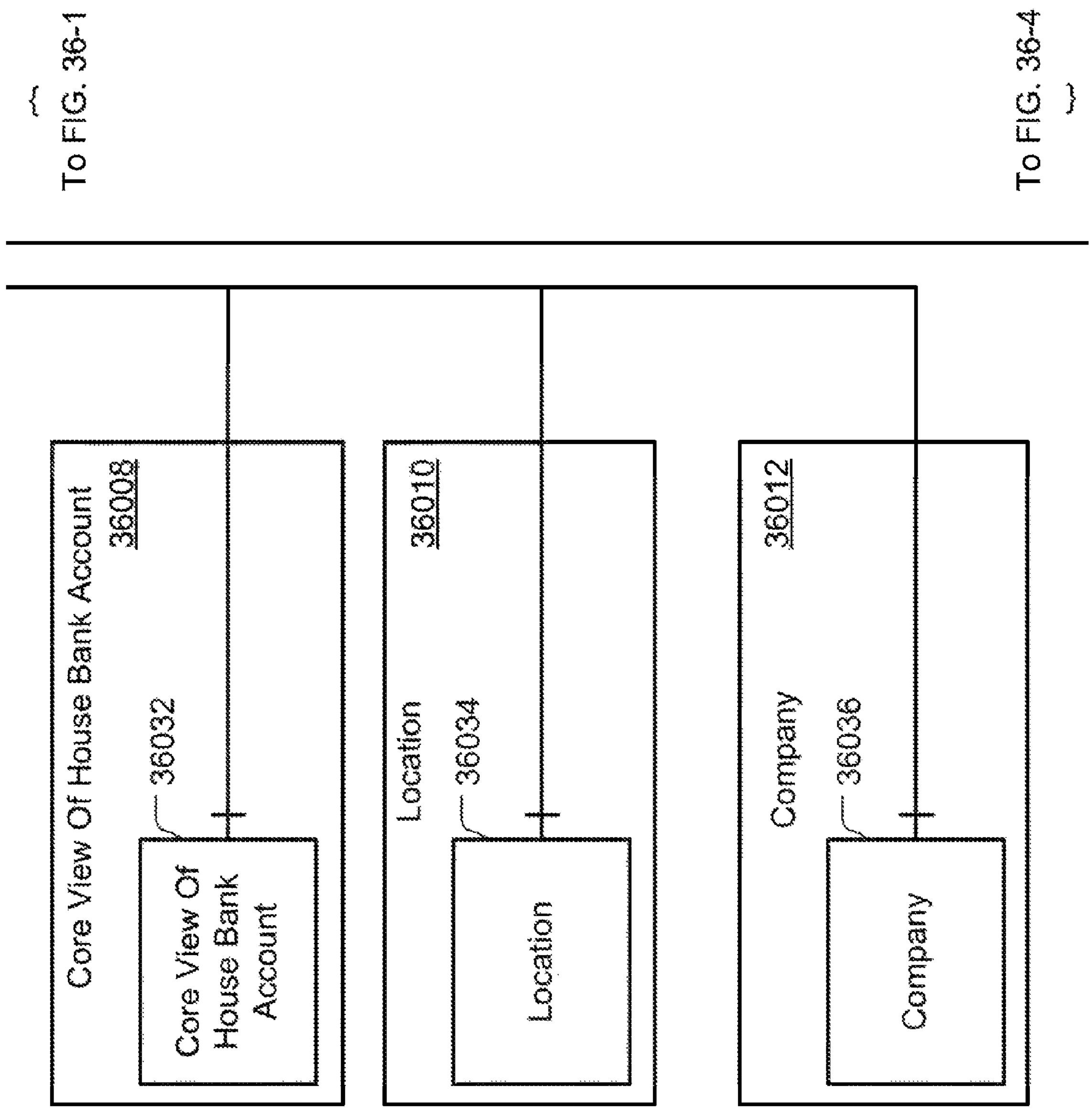
Figures 4, 36:
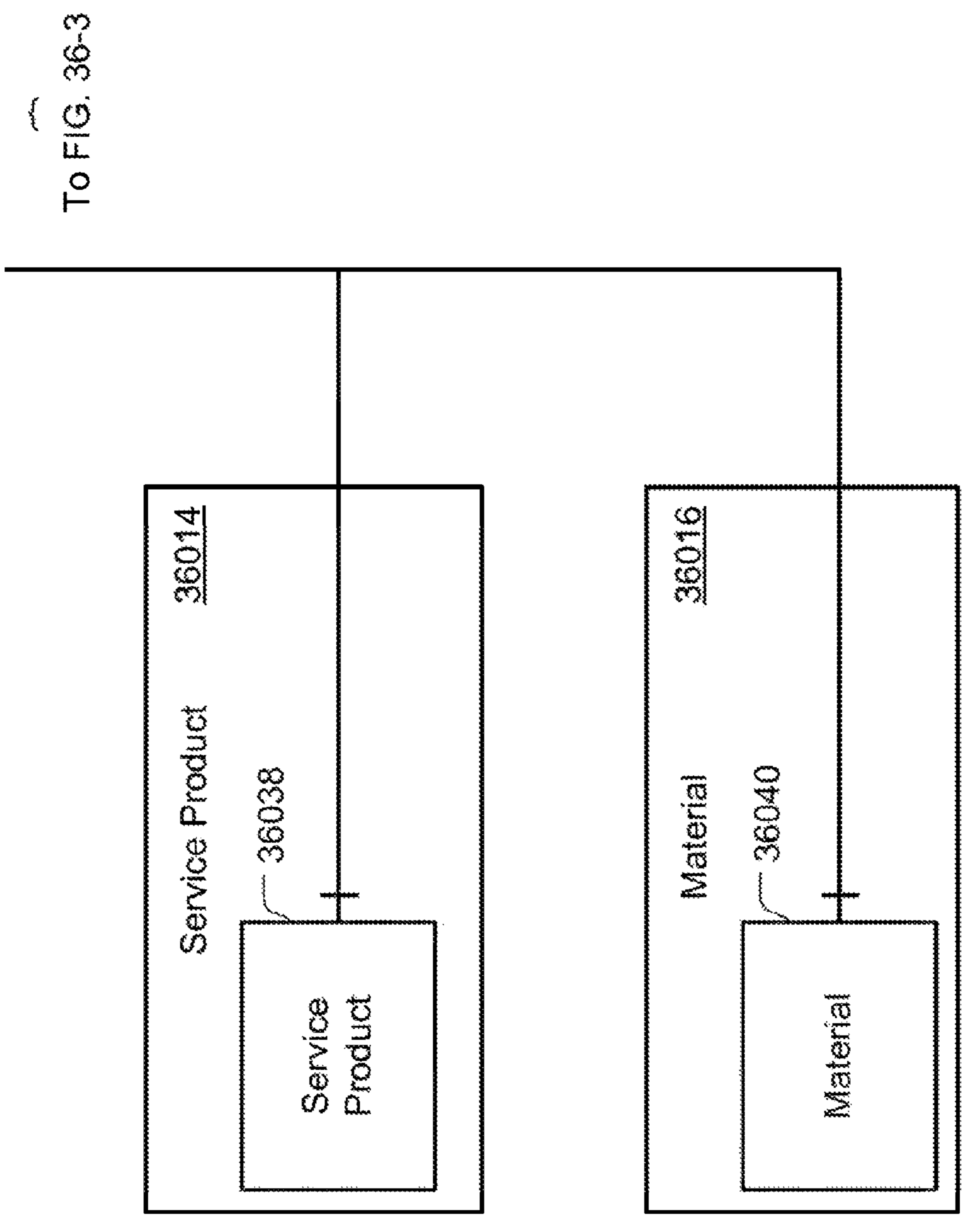

FIGS. 39-1 through 39-3 show an example configuration of an Element Structure that includes a PaymentCardPaymentAuthorisationConfirmationMessage 39000 package. Specifically, these figures depict the arrangement and hierarchy of various components such as one or more levels of packages, entities, and datatypes, shown here as 39000 through 39084. As described above, packages may be used to represent hierarchy levels. Entities are discrete business elements that are used during a business transaction. Data types are used to type object entities and interfaces with a structure. For example, the PaymentCardPaymentAuthorisationConfirmationMessage 39000 includes, among other things, a PaymentCardPaymentAuthorisationConfirmation 39002. Accordingly, heterogeneous applications may communicate using this consistent message configured as such.

Figure 40:
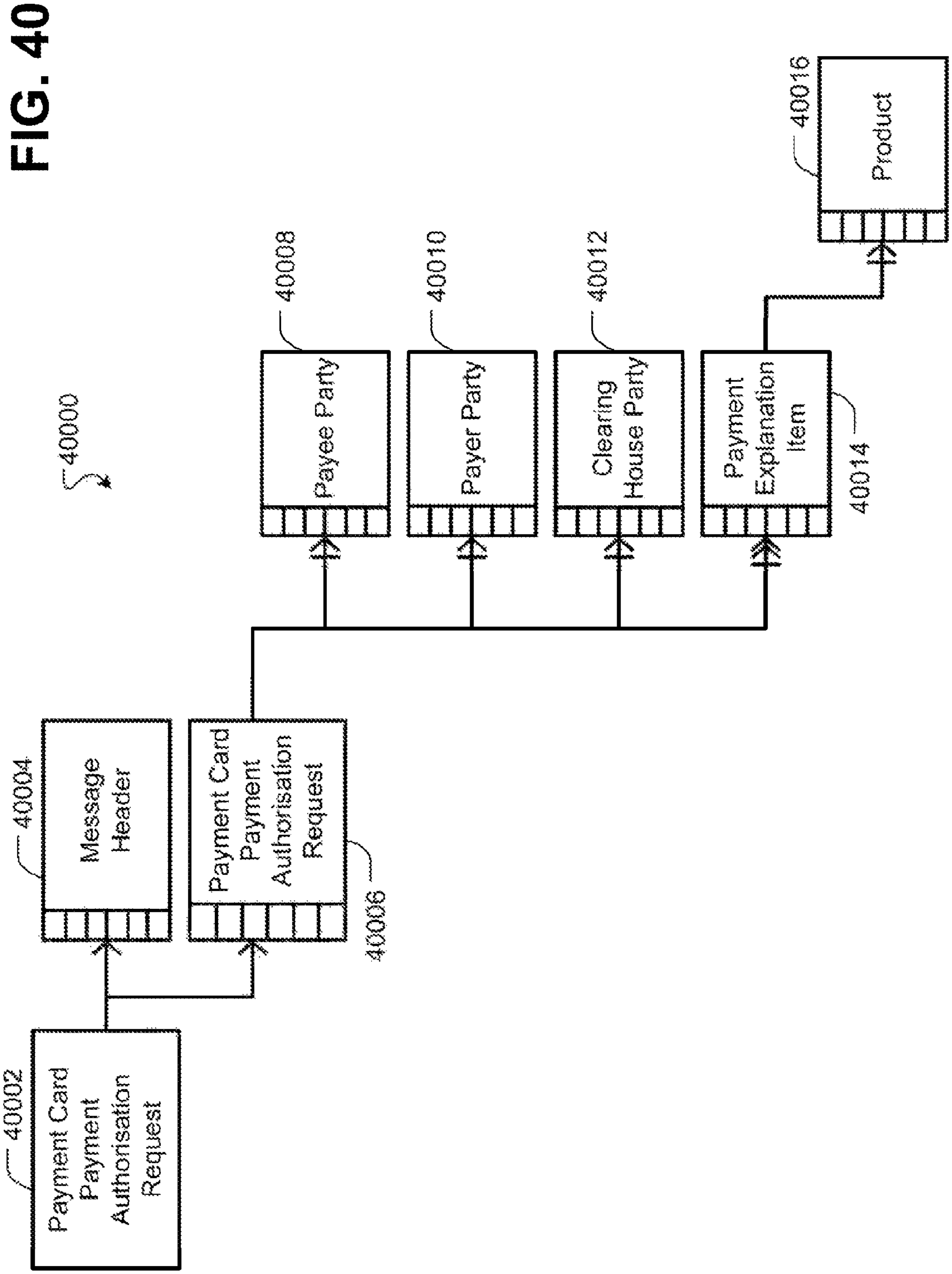
FIG. 40 depicts an example Payment Card Payment Authorisation Request Message Data Type.

FIG. 40 depicts an example Payment Card Payment Authorisation Request Message Data Type 40000, which comprises elements 40002-40016, hierarchically related as shown. For example, the Payment Card Payment Authorisation Request 40002 includes a Message Header 40004.

The message type Payment Card Payment Authorisation Request is derived from the business object Payment Card Payment Authorisation as a leading object together with its operation signature. The message type Payment Card Payment Authorisation Request is a request for authorization of a payment made using a payment card. The structure of the message type Payment Card Payment Authorisation Request is determined by the message data type PaymentCardPaymentAuthorisationRequestMessage. The message data type PaymentCardPaymentAuthorisationRequestMessage includes the object PaymentCardPaymentAuthorisationRequest which is included in a business document, business information that is relevant for sending a business document in a message, the MessageHeader package, and the PaymentCardPaymentAuthorisationRequest package. The message data type PaymentCardPaymentAuthorisationRequestMessage provides a structure for the Payment Card Payment Authorisation Request message type and for associated operations.

The MessageHeader package is a grouping of business information that is relevant for sending a business document in a message. The MessageHeader package includes the MessageHeader node. The MessageHeader node is a grouping of business information from the perspective of a sending application, such as information to identify the business document in a message, information about the sender, and optionally information about the recipient. The MessageHeader includes SenderParty and RecipientParty. MessageHeader may be based on the datatype GDT:BusinessDocumentMessageHeader.

The following elements of the GDT may be used: RecipientParty, BusinessScope, SenderParty, SenderBusinessSystemID, TestDataIndicator, RecipientBusinessSystemID, ReferenceID, ReferenceUUID, ReconciliationIndicator, ID, UUID, and CreationDateTime.

SenderParty is the partner responsible for sending a business document at a business application level. The SenderParty is of the type GDT:BusinessDocumentMessageHeaderParty. RecipientParty is of the type GDT: BusinessDocumentMessageHeaderParty. RecipientParty is the partner responsible for receiving a business document at a business application level.

The PaymentCardPaymentAuthorisationRequest package is a grouping of PaymentCardPaymentAuthorisationRequest with its Party and PaymentExplanationItem packages and with the PaymentCardPaymentAuthorisationRequest entity. PaymentCardPaymentAuthorisationRequest is a request for authorization of a payment using payment a card, from a payee to a clearing house. PaymentCardPaymentAuthorisationRequest includes the following non-node elements: ID, DeviceID, PaymentCardHolderAuthenticationID, PaymentCardHolderAuthenticationResultCode, PaymentCardHolderAuthenticationTokenText, PaymentCardDataOriginTypeCode, PaymentCardVerificationValueAvailabilityCode, PaymentCardVerificationValueCheckRequiredIndicator, PaymentCardVerificationValueText, PaymentAmount, PaymentCard, PaymentCardChargedBusinessTransactionDocumentBankAccount, Location, and RequestorID. ID is an identifier of a business document for which a Payment authorization is requested (e.g., sales order), and may be based on datatype GDT:BusinessTransactionDocumentID. DeviceID may be optional, is an identifier for an input or output device in computing (e.g., IP (Internet Protocol) address), and may be based on datatype GDT:DeviceID. PaymentCardHolderAuthenticationID may be optional, is an identifier for a payment card holder authentication, and may be based on datatype GDT:PaymentCardHolderAuthenticationID. PaymentCardHolderAuthenticationResultCode may be optional, is a coded representation of a result of authentication of a card holder, and may be based on datatype GDT: PaymentCardHolderAuthenticationResultCode. PaymentCardHolderAuthenticationTokenText may be optional, is a value of a result of a payment card holder authentication check performed by an Interoperability Domain, and may be based on datatype GDT:PaymentCardHolderAuthenticationTokenText. PaymentCardDataOriginTypeCode may be optional, is a payment card data origin code type code (e.g. Internet), and may be based on datatype GDT:PaymentCardDataOriginTypeCode. PaymentCardVerificationValueAvailabilityCode may be optional, includes information regarding the availability of a verification code on a payment card, and may be based on datatype GDT:PaymentCardVerificationValueAvailabilityCode. PaymentCardVerificationValueCheckRequiredIndicator indicates if a Card Verification Value (CVV) is to be verified, and may be based on datatype CDT:Indicator with a qualifier of Required. PaymentCardVerificationValueText may be optional, is a verification code of a payment card, and may be based on datatype GDT: PaymentCardVerificationValueText. PaymentAmount is a payment amount in transaction currency and may be based on datatype CDT:Amount with a qualifier of Payment. PaymentCard is an identification card that authorizes the holder to settle invoices without cash with contract companies connected to a payment system, and may be based on datatype GDT:PaymentCard. PaymentCardChargedBusinessTransactionDocumentBankAccount may be optional, is a bank account from which a payment amount is debited, and may be based on datatype GDT:BusinessTransactionDocumentBankAccount. Location may be optional, is a place at which a payment transaction is performed, and may be based on datatype GDT:BusinessTransactionDocumentLocation. RequestorID may be optional, is an identifier for authorization of payment made using a payment card that is assigned by a company that requests for payment authorization, and may be based on datatype GDT:PaymentCardPaymentAuthorisationPartyID_V1.

PaymentCardPaymentAuthorisationRequest includes the node element PayeeParty in a 1:C cardinality relationship, the node element PayerParty in a 1:C cardinality relationship, the node element ClearingHouseParty in a 1:C cardinality relationship, and the node element PaymentExplanationItem in a 1:CN cardinality relationship. The PaymentCardPaymentAuthorisationRequest package includes the authorisation request for a payment using a payment card and also includes other relevant information for processing, such as item information of a business transaction document reference. The PaymentCardPaymentAuthorisationRequestParty package includes the PayeeParty, PayerParty, and ClearingHouseParty packages. PayeeParty is a party that receives payment for goods or services sold. PayeeParty may be typed by BusinessTransactionDocumentParty. PayerParty is a party that pays for goods or services purchased. PayerParty may be typed by BusinessTransactionDocumentParty. ClearingHouseParty is a party that verifies a payment authorization. ClearingHouseParty may be typed by BusinessTransactionDocumentParty.

The PaymentCardPaymentAuthorisationRequestPaymentExplanationItem package includes the PaymentExplanationItem and PaymentExplanationItem entities. PaymentCardPaymentAuthorisationRequestPaymentExplanationItem includes a description of goods or services purchased using a payment card, including details about product and quantity in a related sales order or invoice. PaymentExplanationItem includes the following non-node elements: BusinessTransactionDocumentReference, CreationDateTime, and RequestedQuantity. BusinessTransactionDocumentReference is a unique reference to other business documents or business document items, and may be based on datatype GDT:BusinessTransactionDocumentReference. CreationDateTime may be optional, is a date at which a PaymentOrderPaymentAuthorisationItem was created, and may be based on datatype CDT:GLOBAL_DateTime with a qualifier of Creation. RequestedQuantity may be optional, is a quantity of goods or service requested during payment authorization, and may be based on datatype CDT:Quantity with a qualifier of Requested. PaymentExplanationItem includes the node element Product in a 1:C cardinality relationship. The PaymentCardPaymentAuthorisationRequestPaymentExplanationItemProduct package includes the Product entity. Product includes details of a product purchased using a payment card. Product includes the BusinessTransactionDocumentProduct element, which may be optional, includes information about a product that is available in business documents, and may be based on datatype GDT:BusinessTransactionDocumentProduct. A product is commodity that is the object of a business activity of a company and serves to generate value for the company. A product can be tangible or intangible. A product can have relationships to other products or objects. For example, there can be a service for a specially manufactured product.

FIGS. 41-1 through 41-146 show an example configuration of an Element Structure that includes a PaymentCardPaymentAuthorisationRequest 410000 package. Specifically, these figures depict the arrangement and hierarchy of various components such as one or more levels of packages, entities, and datatypes, shown here as 410000 through 414774. As described above, packages may be used to represent hierarchy levels. Entities are discrete business elements that are used during a business transaction. Data types are used to type object entities and interfaces with a structure. For example, the PaymentCardPaymentAuthorisationRequest 410000 includes, among other things, a PaymentCardPaymentAuthorisationRequest 410002. Accordingly, heterogeneous applications may communicate using this consistent message configured as such.

Figures 1, 42:
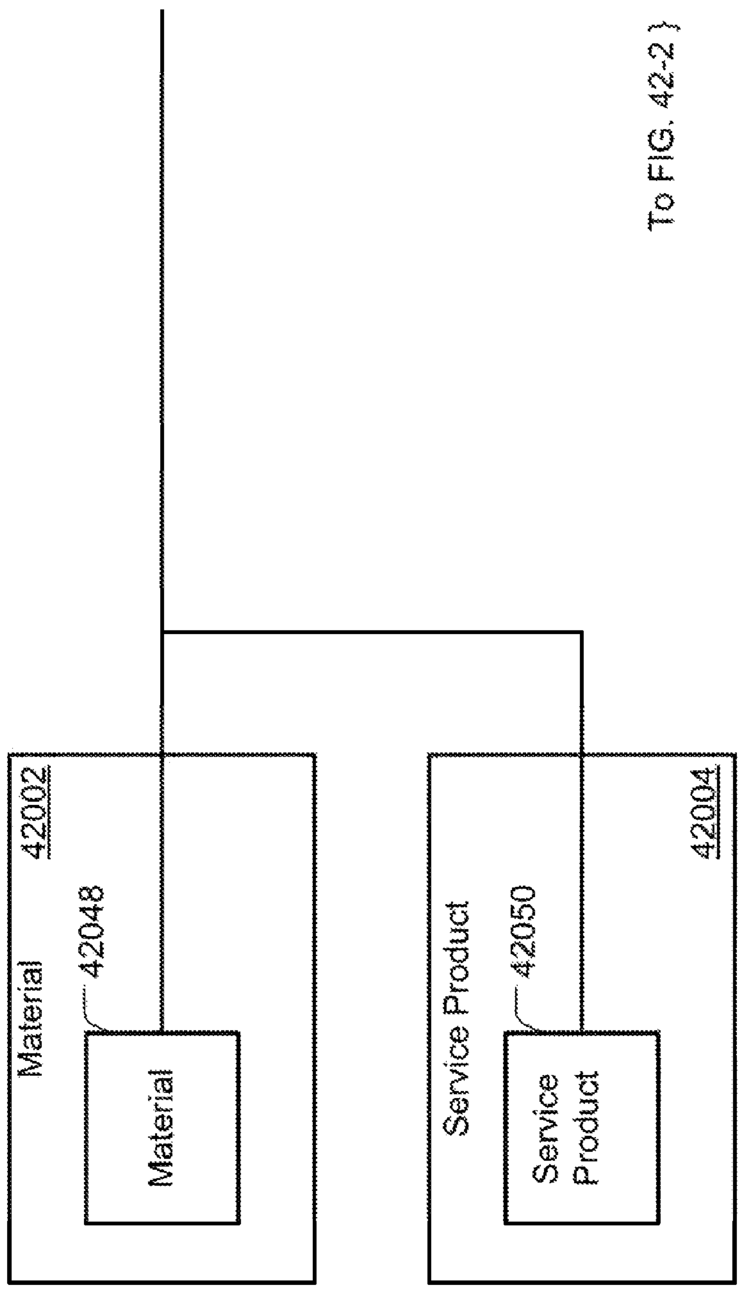
Figures 2, 42:
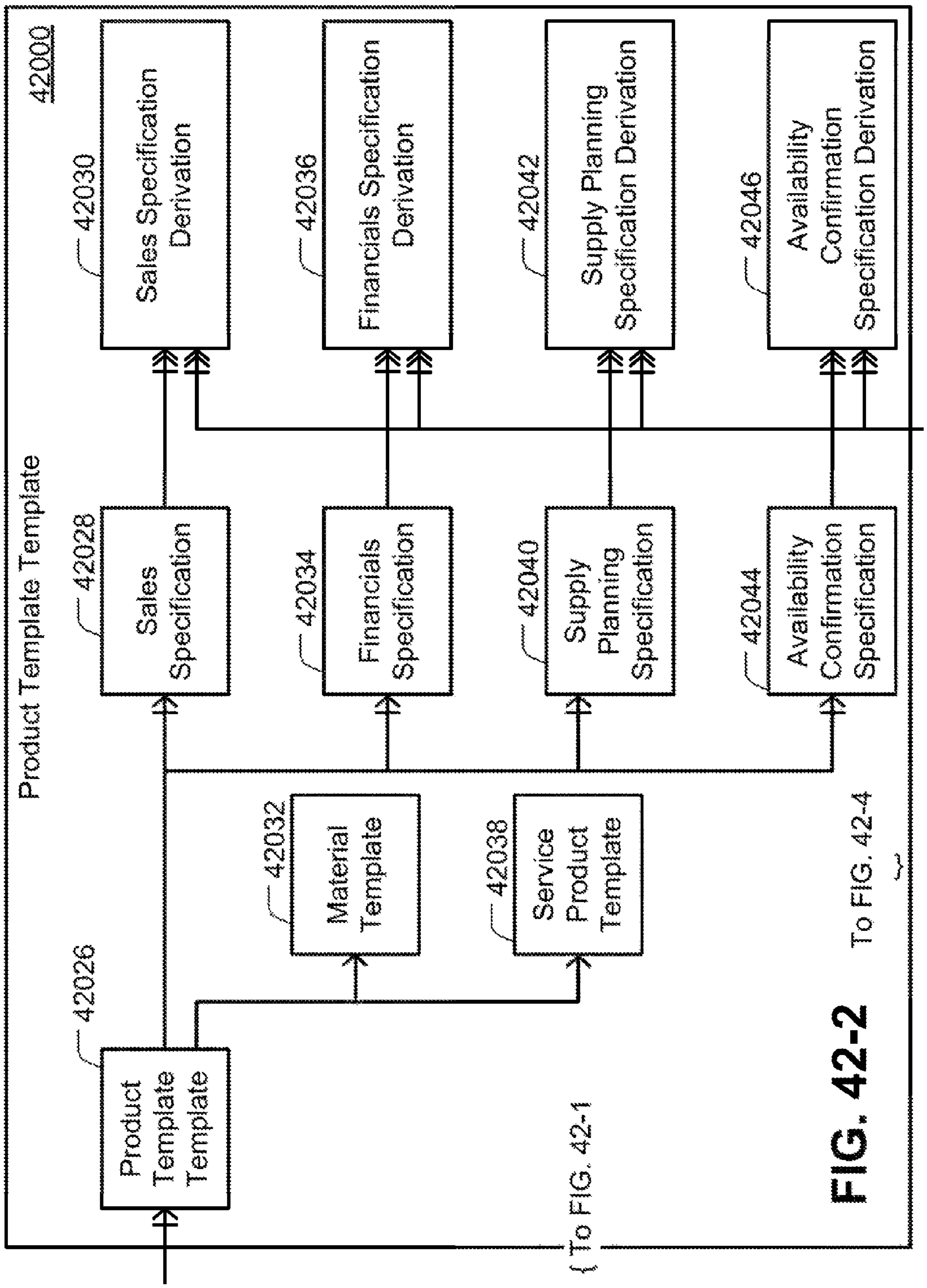
Figures 3, 42:
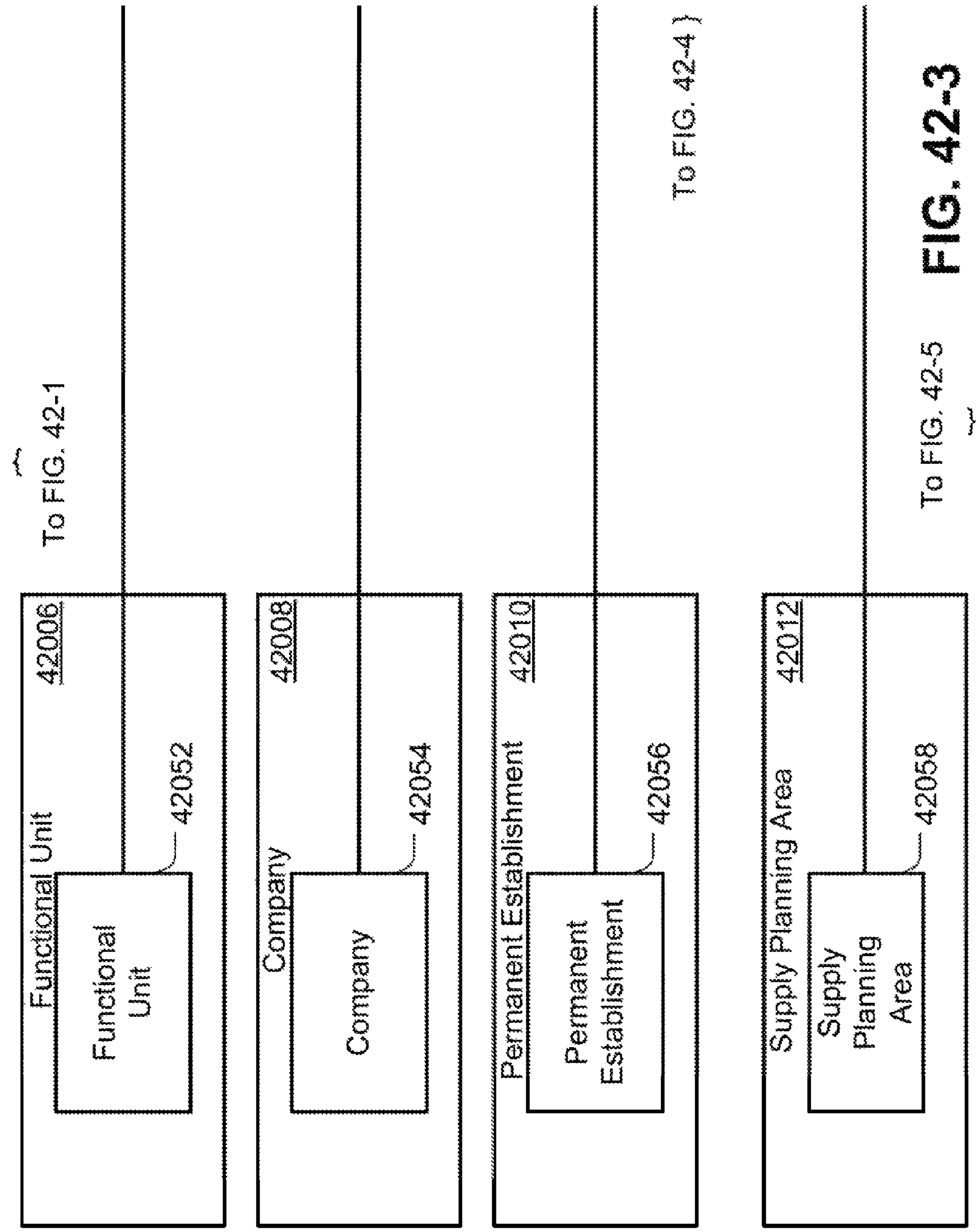
Figures 4, 42:
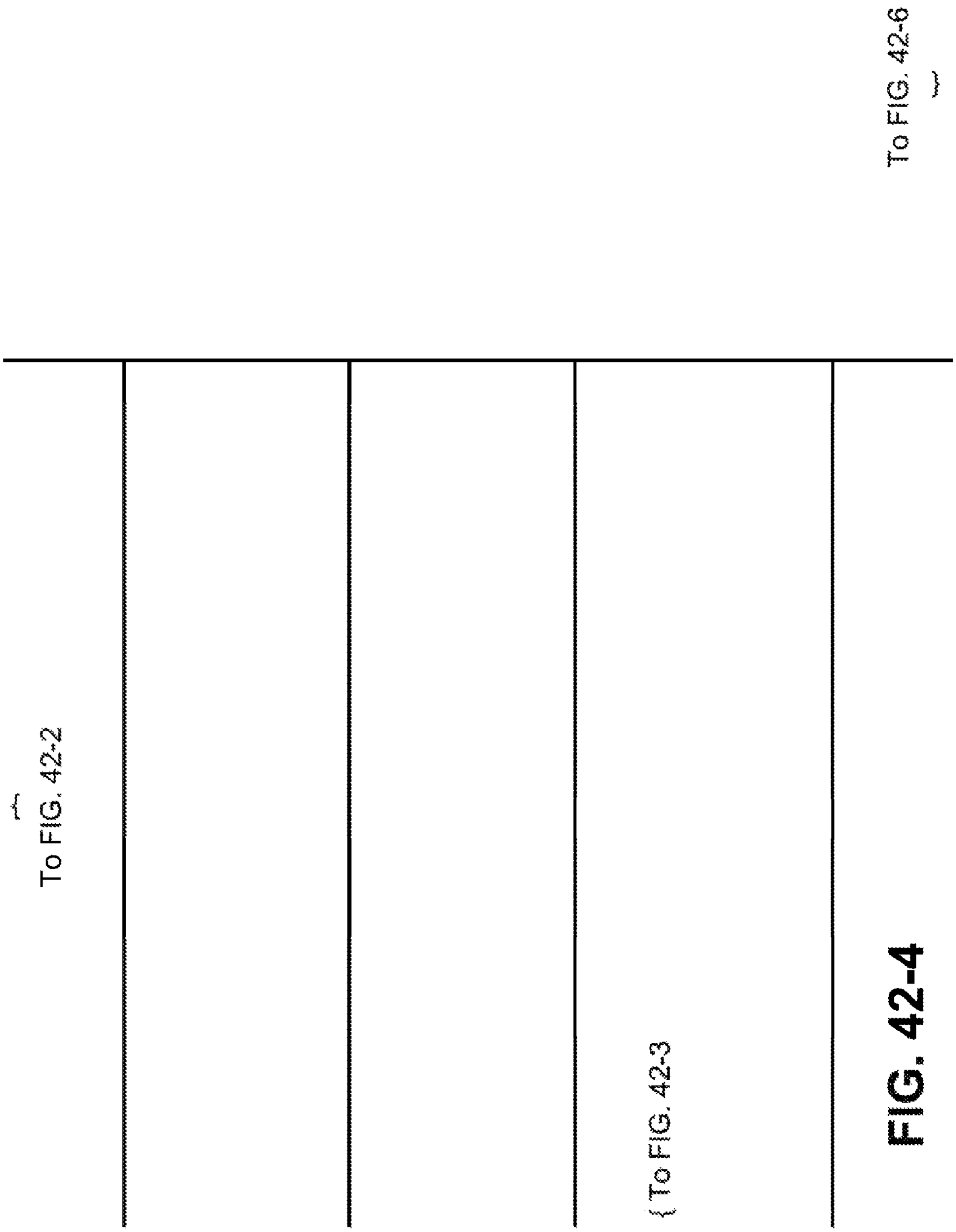
Figures 5, 42:
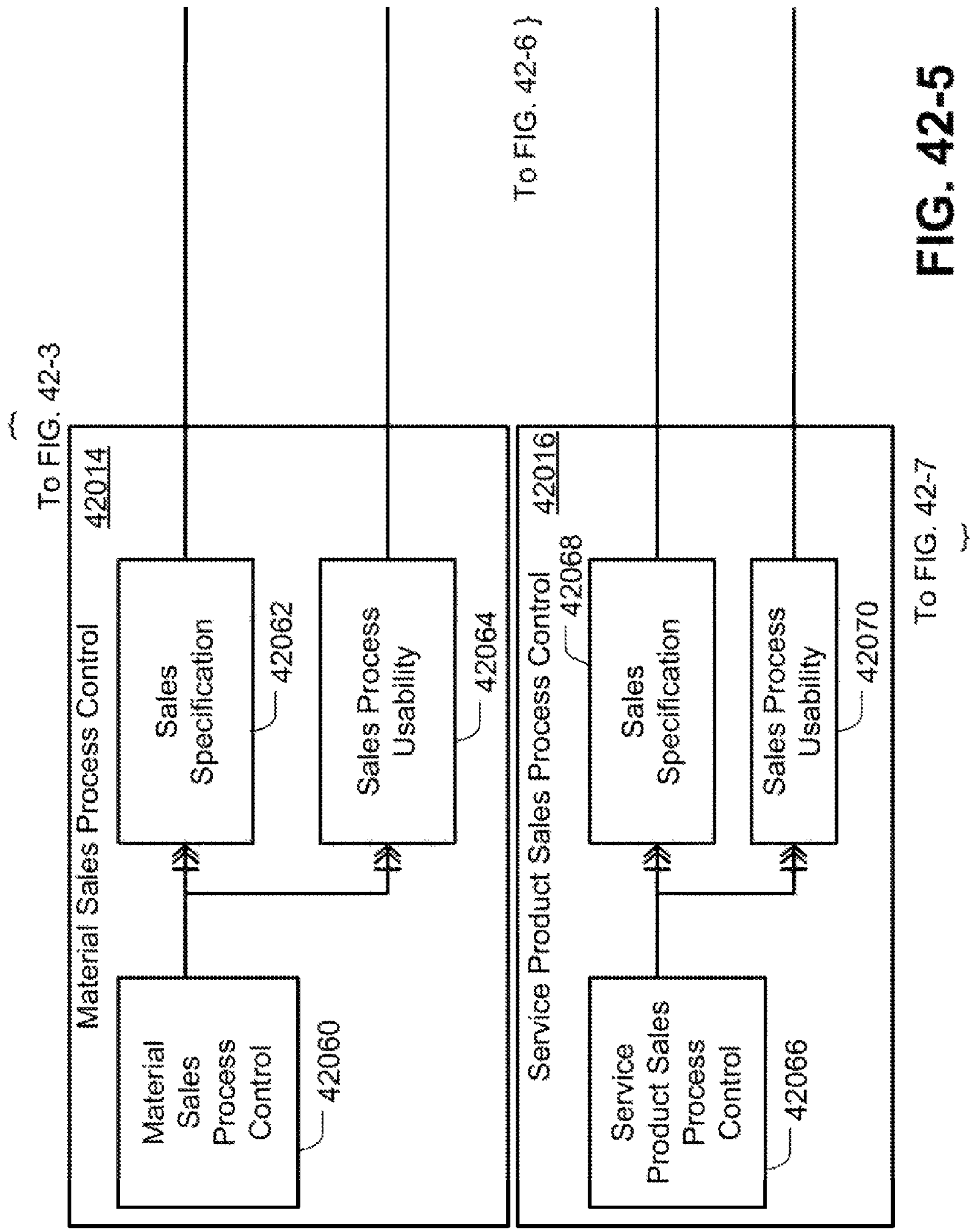
Figures 6, 42:
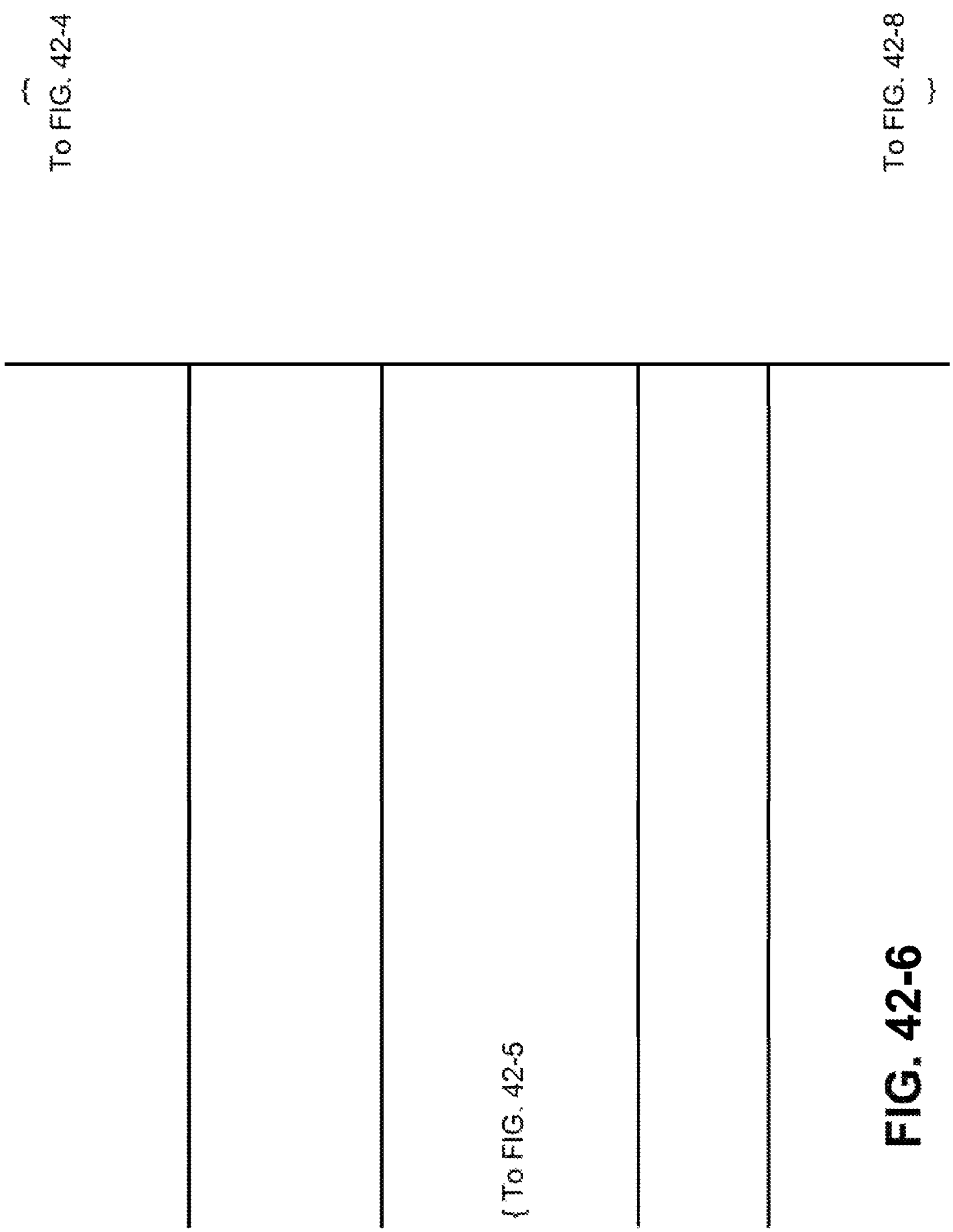
Figures 7, 42:
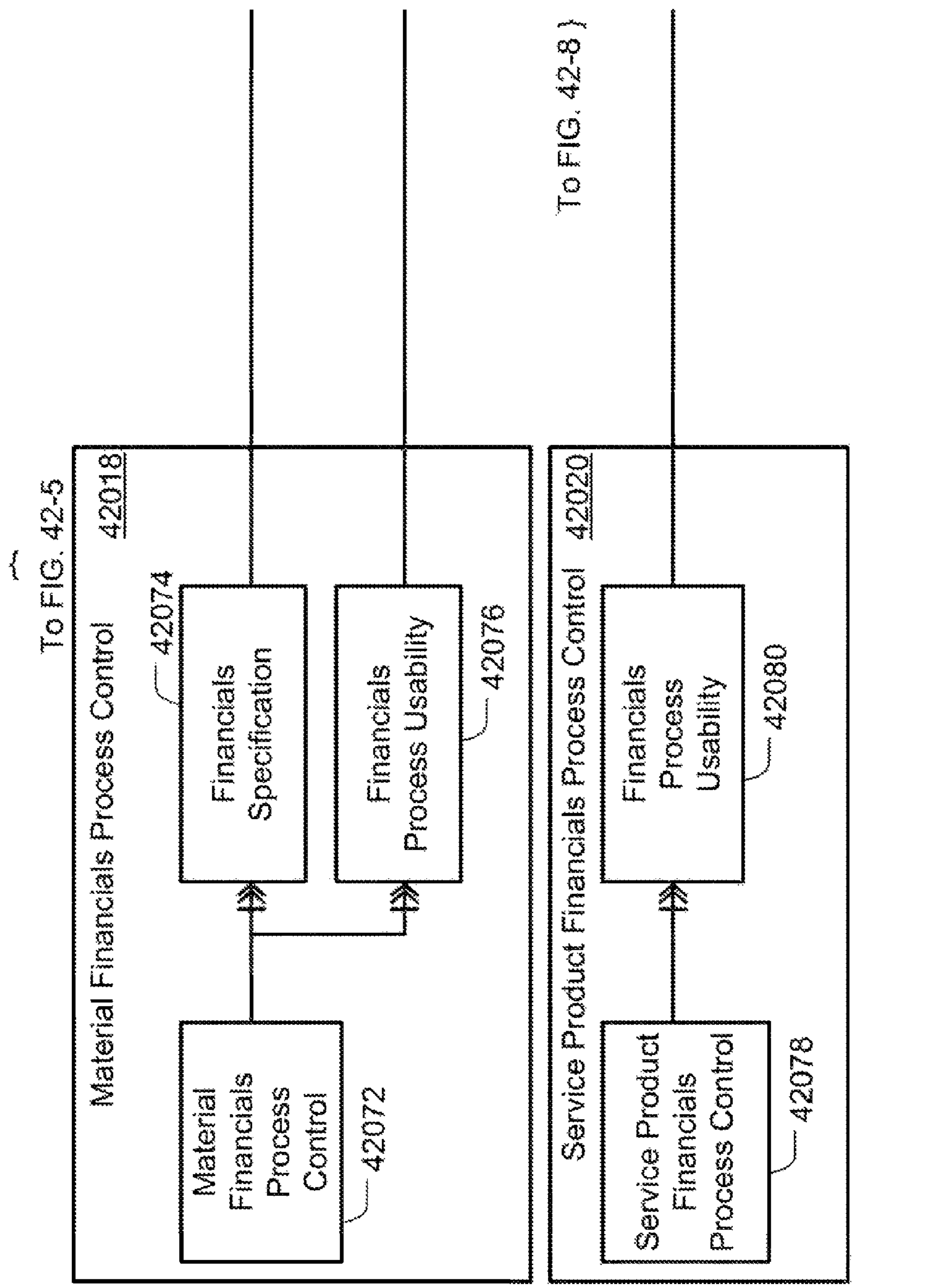
Figures 8, 42:
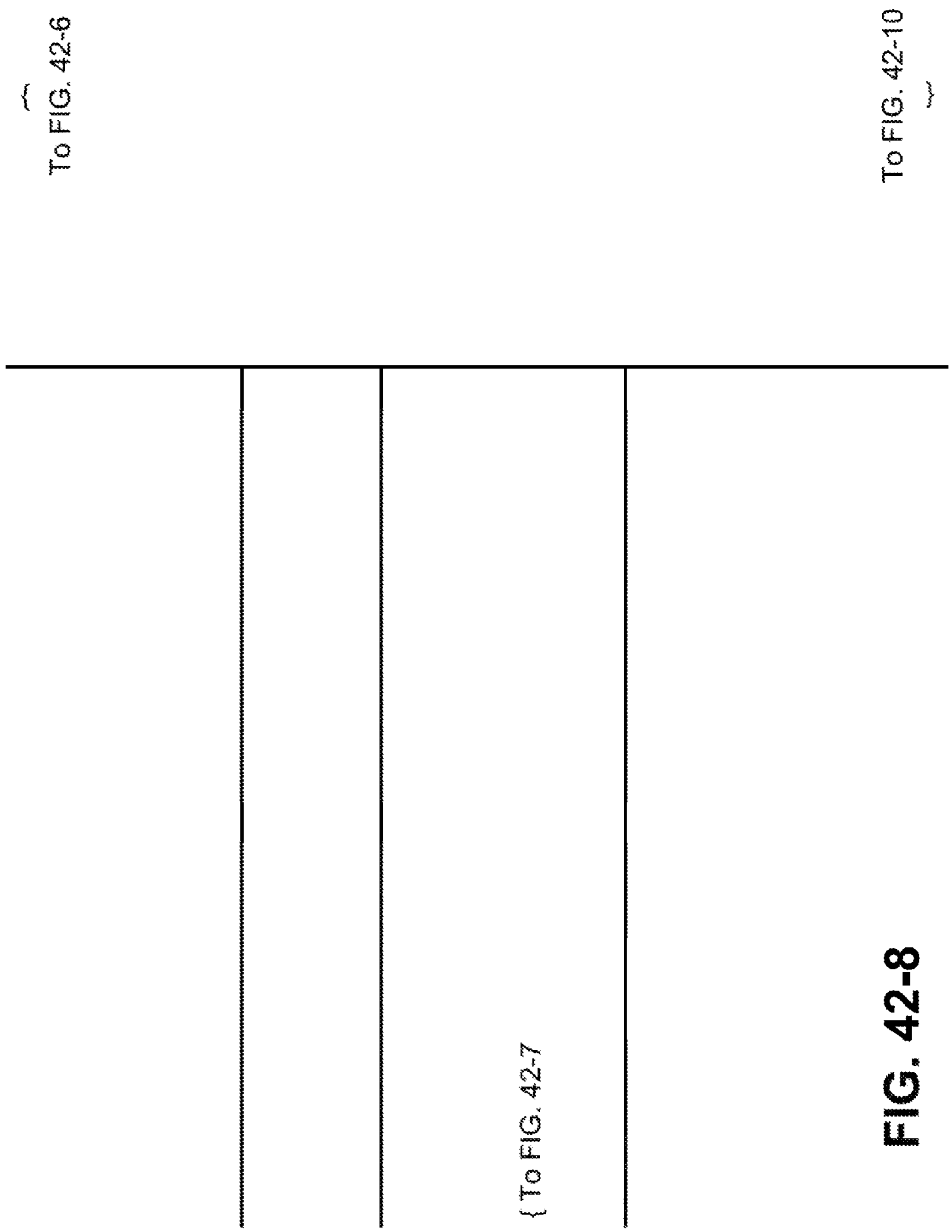
Figures 9, 42:
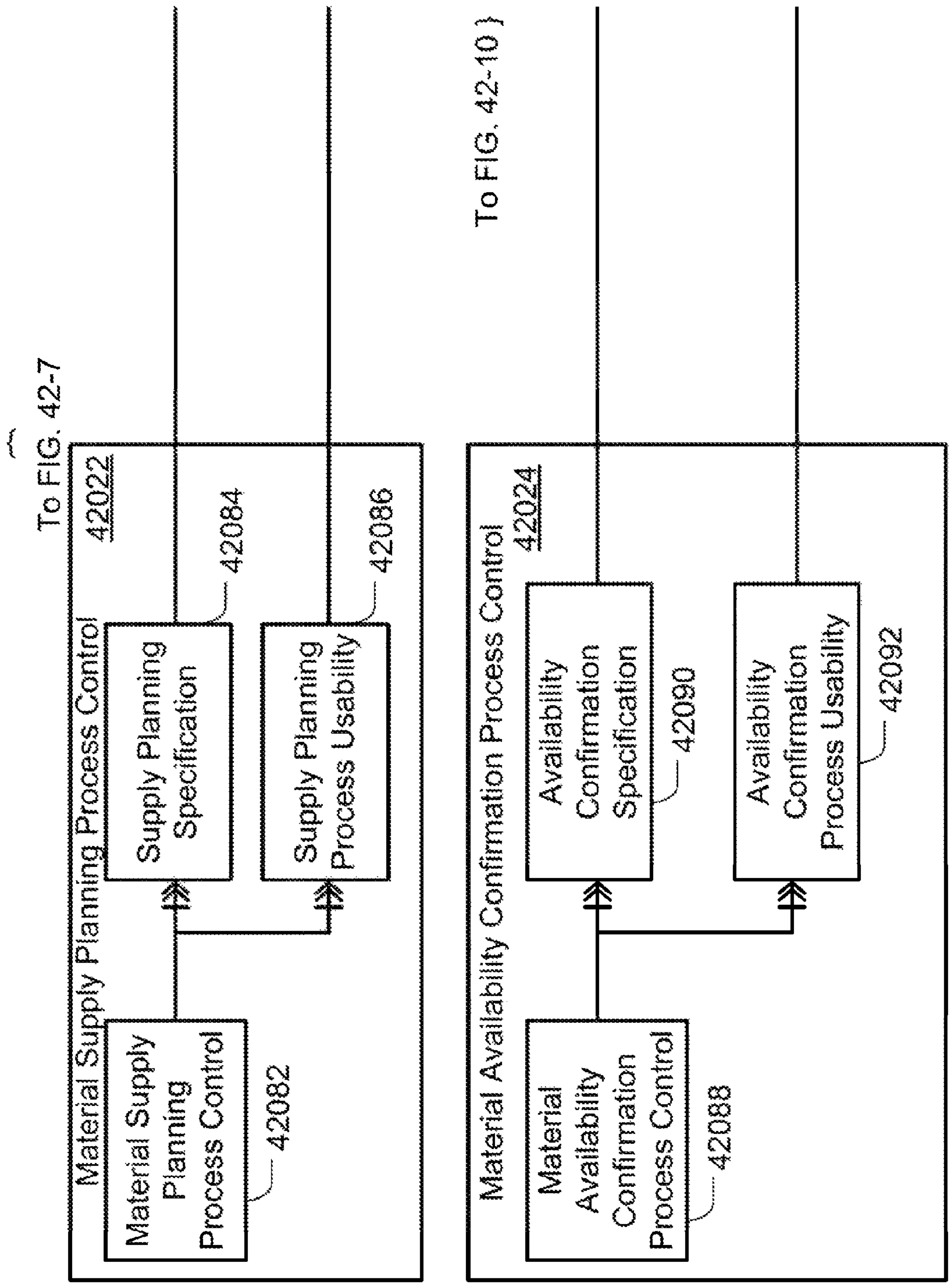
Figures 10, 42:
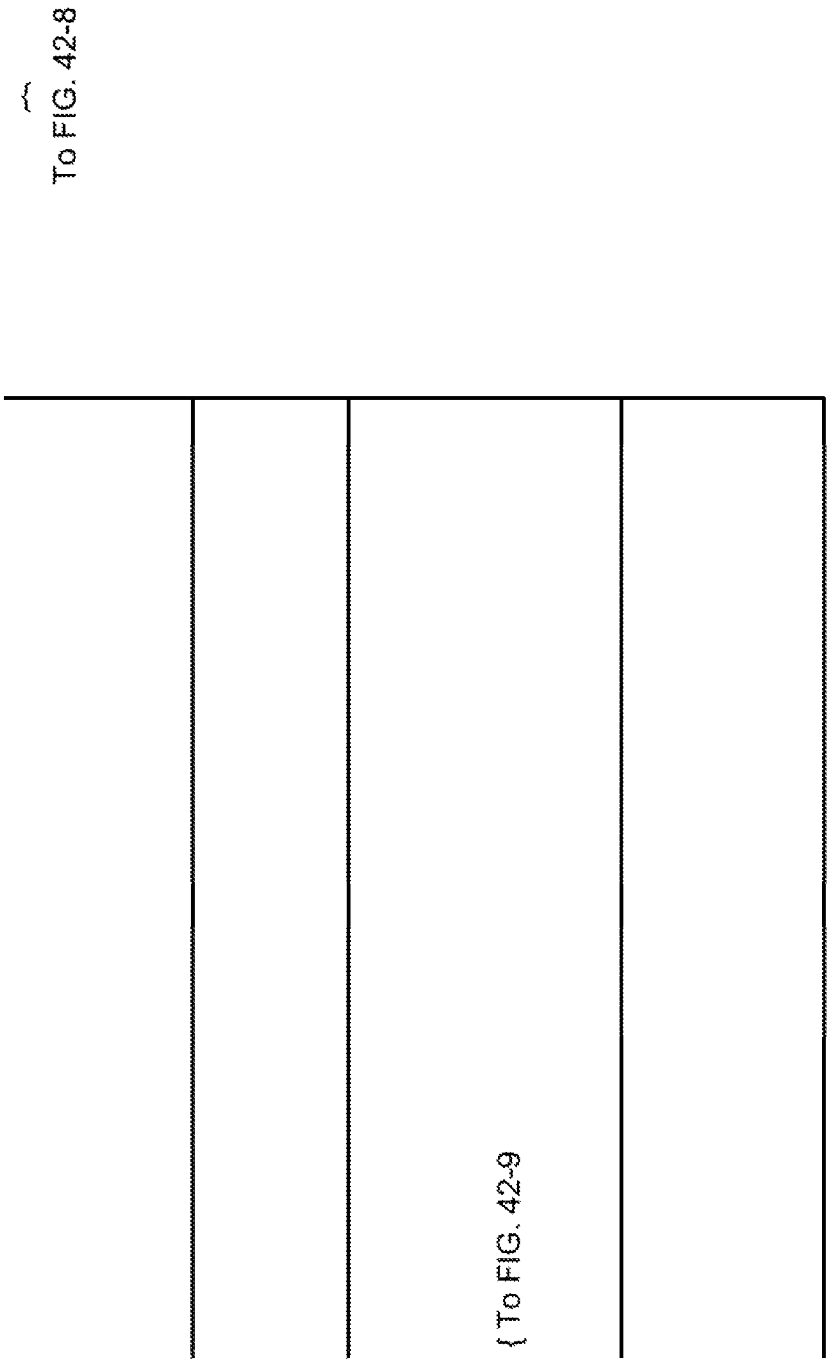

FIGS. 42-1 through 42-10 depict an example object model for a business object Product Template Template 42000. The business object 42000 has relationships with other objects 42002-42024, as shown with lines and arrows. The business object 42000 hierarchically comprises elements 42026-42046. The other objects 42002-42024 include respective elements 42048-42092 as shown.

The business object Product Template _Template is a template that includes a number of possible set of nodes, relationships, elements, and service operations for material templates or service product templates projected from the template. A material template belongs to a specific material and includes data relevant for presales, sales, financials, supply planning, and availability confirmation processes. A service product template belongs to a specific service product and includes data relevant for presales, sales, and financials processes. The Product Template business object template includes an association to a material or service product to which it belongs, and subordinate nodes include default data for corresponding nodes of a material or service product.

The business object Product Template _Template includes a root node. The elements located directly at the node Product Template _Template are defined by the data type Product-TemplateElements. These elements include ProductUUID. ProductUUID may be an alternative key, is a globally unique identifier for a product to which a material template or service product template is related, and may be based on datatype GDT: UUID. The following composition relationships to subordinate nodes may exist: SalesSpecification with a cardinality of 1:C, FinancialsSpecification with a cardinality of 1:C, SupplyPlanningSpecification with a cardinality of 1:C, and AvailabilityConfirmationSpecification with a cardinality of 1:C.

A Material inbound aggregation relationship may exist from the business object Material/node Material, with a cardinality of 1:C, which is an association from the material to which a material template belongs. A Service Product inbound aggregation relationship may exist from the business object Service Product/node Service Product, with a cardinality of Service Product 1:C, which is an association from the service product to which a service product template belongs. In some implementations, ProductUUID may refer to an existing Product business object that does not have a CompetitorProductIndicator set at a root node.

A Transfer Template of Master Copy enterprise service infrastructure action may be used, if the material or service product to which this template belongs was created from a master copy and if a product template belongs to that master copy, to transfer all nodes belonging to the product template of that master copy. The master copy is a product that has the MasterCopyUseIndicator set for a given product category. A product template may belong to a master copy. The Transfer Template of Master Copy action may include parameter elements defined by the data type ProductTemplateTransfer-TemplateOfMasterCopyActionElements. These elements include ProductCategoryIDKey, which may be based on datatype KDT: ProductCategoryHierarchyProd-uctCategoryIDKey. ProductCategoryIDKey may include the elements ProductCategoryHierarchyID and ProductCatego-ryInternalID. ProductCategoryHierarchyID is an identifier for a product category hierarchy, and may be based on datatype GDT: ProductCategoryHierarchyID. ProductCat-egoryInternalID is an identifier for a product category, and may be based on datatype GDT: ProductCategoryInternalID. The action parameters may be used in every derived business object. A Create With Reference action creates a copy of a template for a specified material or service product. The new template may be created for a specific material or service product, which is specified as a parameter of the action. In response to the action, the status of each Specification node may be set to “InPreparation”. When a product is copied, if a template belongs to the product, the Create With Reference action is used to copy the template as well.

A Select All query may be used to provide a list of all product templates and may be used to enable an initial load of data for a fast search infrastructure. The actions and queries of the Product Template _Template node may be used in every derived business object.

Sales Specification is a specification regarding the selling of a product. The elements located directly at the node Sales Specification are defined by the data type ProductTemplate-SalesSpecificationElements. These elements include: CustomerTransactionDocumentItemProcessingTypeDetermina-tionProductGroupCode, CashDiscountDeductibleIndicator, and Status. CustomerTransactionDocumentItemPro-cessingTypeDeterminationProductGroupCode may be optional, is a grouping of products used by a system to determine item categories when processing customer transactions, and may be based on datatype GDT: CustomerTransac-tionDocumentItemProcessingTypeDeterminationProd-uctGroupCode. CashDiscountDeductibleIndicator is an indication that a cash discount can be given for a product, and may be based on datatype GDT: Indicator, with a qualifier of Deductible. Status is a current step in a life cycle of the usability of a product to which a template belongs, for a sales process. Status may be based on datatype BOIDT: Product-ProcessControlStatus. Status may include LifeCycleStatus-Code, which is a status defining a state of data during a current process, and may be based on datatype GDT: ProductProces-sUsabilityLifeCycleStatusCode. The elements of Sales Specification may be used in derived business objects. A composition relationship to the subordinate node SalesSpeci-ficationDerivation may exist, with a cardinality of 1:CN. Sales Specification may include the following enterprise service infrastructure actions: Activate, Block, and Unblock. The Activate action activates the usability for a sales process. The Activate action may have a precondition that the LifeCy-cleStatusCode has a value of “InPreparation”. The Block action temporarily prevents the use of the sales specification in a sales process. The Block action may have a precondition that the LifeCycleStatusCode has a value of “Active”. The Unblock action re-activates the usability for a sales process. The Unblock action may have a precondition that the Life-CycleStatusCode has a value of “Blocked”. The Activate, Block, and Unblock actions may be used in derived business objects.

Sales Specification Derivation is a derivation of a sales specification of a product from a sales specification of a template. A Copy Sales Specification to Product action copies the content of a Sales Specification node of a template to a corresponding sales nodes of a product. Thus, the data is derived from a template to a product in response to the action. The elements located directly at the node Sales Specification Derivation are defined by the data type ProductTemplateSa-lesSpecificationDerivationElements. These elements include: SalesOrganisationUUID, SalesOrganisationID, Dis-tributionChannelCode, and Key. SalesOrganisationUUID is a globally unique identifier for a sales organization, and may be based on datatype GDT UUID. SalesOrganisationID is an identifier for a sales organization, and may be based on datatype GDT OrganisationalCentreID. DistributionChan-nelCode is a coded representation of a distribution channel, and may be based on datatype GDT DistributionChannel-Code. Key is an alternative key for a Sales Specification Derivation node. Key may include ProductUUID, SalesOr-ganisationUUID, and DistributionChannelCode, and may be based on datatype KDT ProductTemplateSalesSpecifi-cationDerivationKey. ProductUUID is a globally unique identifier for a material, and may be based on datatype GDT UUID. SalesOrganisationUUID is a globally unique identi-fier for a supply planning area, and may be based on datatype GDT UUID. DistributionChannelCode is a code of a distri-bution channel, and may be based on datatype GDT Distri-butionChannelCode. A FunctionalUnit inbound aggregation relationship may exist from the business object Functional Unit/node Functional Unit, with a cardinality of 1:CN, which is an association from a functional unit. The functional unit carries a business character for SalesUnit. This association defines a sales organization for which template data is used in a product master. A DerivedMaterialSalesProcessUsability inbound aggregation relationship may exist from the business object Material Sales Process Control/node Sales Process Usability, with a cardinality of 1:CN, which is a derived sales process usability of a material. A DerivedMaterialSalesSpecification inbound aggregation relationship may exist from the business object Material Sales Process Control/node Sales Specification, with a cardinality of 1:CN, which is a derived sales specification of a material. A DerivedServiceProductSalesProcessUsability inbound aggregation relationship may exist from the business object Service Product Sales Process Control/node Sales Process Usability, with a cardinality of 1:CN, which is a derived sales process usability of a service product. A DerivedServiceProductSalesSpecification inbound aggregation relationship may exist from the business object Service Product Sales Process Control/node Sales Specification, with a cardinality of 1:CN, which is a derived sales specification of a service product.

A Copy Sales Specification to Product enterprise service infrastructure action may be associated with Sales Specification Derivation. The Copy Sales Specification to Product action copies content of a Sales Specification node of a template to a corresponding sales node of a product. The distribution chain for which the data is copied is specified at a Sales Specification Derivation node.

Financials Specification is a specification regarding a financials process. The elements located directly at the node Financials Specification are defined by the data type ProductTemplateFinancialsSpecificationElements. These elements include: InventoryValuationLevelCode and Status. InventoryValuationLevelCode is a coded representation of an inventory valuation which defines characteristics used in financials for valuating stocks, and may be based on datatype GDT: InventoryValuationLevelCode. Status is a current step in a life cycle of the usability of a product to which a template belongs for a financials process. Status may be based on datatype BOIDT: ProductProcessControlStatus and may include LifeCycleStatusCode. LifeCycleStatusCode is a status defining a state of data during a current process, and may be based on datatype GDT: ProductProcessUsabilityLifeCycleStatusCode. InventoryValuationLevelCode may be used in a derived business object Material Template. Status may be used in derived business objects Material Template and Service Product Template. A composition relationship to subordinate node FinancialsSpecificationDerivation may exist, with a cardinality of 1:CN. In some implementations, InventoryValuationLevelCode may be set to “1”. An Activate enterprise service infrastructure action may be used to activate the usability for a financials process. The status may be changed only a template. The Activate action may have a precondition that the LifeCycleStatusCode has a value of “InPreparation.”

Financials Specification Derivation is a derivation of a financials specification of a product from a financials specification of a template. The Copy Financials Specification to Product action copies the content of a Financials Specification node of a template to a corresponding financials node of a product. Thus, the data is derived from a template to a product only once this action is performed. The elements located directly at the node Financials Specification Derivation are defined by the data type ProductTemplateFinancialsSpecificationDerivationElements. These elements include: CompanyUUID, CompanyID, PermanentEstablishmentUUID, PermanentEstablishmentID, Key, ProductUUID, CompanyUUID, and PermanentEstablishmentUUID. CompanyUUID is a globally unique identifier for a company, and may be based on datatype GDT: UUID. CompanyID is an identifier for a company, and may be based on datatype GDT: OrganisationalCentreID. PermanentEstablishmentUUID is a globally unique identifier for a permanent establishment, and may be based on datatype GDT: UUID. PermanentEstablishmentID is an identifier for a permanent establishment, and may be based on datatype GDT: OrganisationalCentreID. Key is an alternative key for a Financials Specification Derivation node, and may be based on datatype KDT: ProductTemplateFinancialsSpecificationDerivationKey. ProductUUID is a globally unique identifier for a product, and may be based on datatype GDT: UUID. CompanyUUID is a globally unique identifier for a company, and may be based on datatype GDT: UUID. PermanentEstablishmentUUID may be optional, is a globally unique identifier for a permanent establishment, and may be based on datatype GDT: UUID. CompanyID, CompanyUUID, Key, PermanentEstablishmentID, and PermanentEstablishmentUUID may be used in a derived Material Template business object. CompanyUUID and Key may be used in a derived Service Product Template business object.

A Company inbound aggregation relationship may exist from the business object Company/node Company, with a cardinality of 1:CN, which is an association from a company. This association defines a company for which template data is used in a product master. A DerivedMaterialFinancialsProcessUsability inbound aggregation relationship may exist from the business object Material Financials Process Control/node Financials Process Usability, with a cardinality of 1:CN, which represents a derived financials process usability of a material. A DerivedMaterialFinancialsSpecification inbound aggregation relationship may exist from the business object Material Financials Process Control/node Financials Specification, with a cardinality of 1:CN, which represents a derived financials specification of a material. A PermanentEstablishment inbound aggregation relationship may exist from the business object Permanent Establishment/node Permanent Establishment, with a cardinality of 1:CN, which is an association from a permanent establishment. This association defines a permanent establishment for which template data is used in a product master. A DerivedServiceProductFinancialsProcessUsability inbound aggregation relationship may exist from the business object Service Product Financials Process Control/node Financials Process Usability, with a cardinality of 1:CN, which represents a derived financials usability of a service product. A Copy Financials Specification to Product enterprise service infrastructure action may be used to copy content of a Financials Specification node of a template to corresponding financials nodes of a product. The company/permanent establishment for which the data is copied is specified at a Financials Specification Derivation node.

Supply Planning Specification is a specification regarding a supply planning process. The elements located directly at the node Supply Planning Specification are defined by the data type ProductTemplateSupplyPlanningSpecificationElements. These elements include: SupplyPlanningProcedureCode, ProductPlanningTimeFenceDuration, DemandForecastRequirementProfileCode, LotSizeProcedureCode, FixedLotSizeQuantityTypeCode, FixedLotSizeQuantity, CalenderUnitCode, ReOrderQuantityTypeCode, ReOrderQuantity, TargetStockQuantityTypeCode, TargetStockQuantity, TargetDaysOfSupplyDuration, SafetyStockQuantityTypeCode, SafetyStockQuantity, SafetyDaysOfSupplyDuration, LotSizeRoundingQuantityTypeCode, LotSizeRoundingQuantity, MinimumLotSizeQuantityTypeCode, MinimumLotSizeQuantity, MaximumLotSizeQuantityTypeCode, MaximumLotSizeQuantity, DefaultProcurementMethodCode, PlannedDeliveryDuration, GoodsReceiptProcessingDuration, MinimumDaysOfSupplyDuration, MinimumReceiptDaysOfSupplyDuration, Status, and LifeCycleStatusCode. SupplyPlanningProcedureCode may be optional and is a coded representation of a planning procedure. A planning procedure is a collection of parameters that control the actions used in production and detail planning SupplyPlanningProcedureCode may be based on datatype GDT: SupplyPlanningProcedureCode. ProductPlanningTimeFenceDuration may be optional, is a span of time, specified in days, during which the planning for a product is protected from changes caused by procurement planning functions and planning algorithms, and may be based on datatype GDT: DAY_Duration, with a qualifier of PlanningTimeFence. DemandForecastRequirementProfileCode may be optional and is a coded representation of a forecast profile. A demand forecast profile is a collection of parameters that control the creation and planning usage of forecast demands. DemandForecastRequirementProfileCode may be based on datatype GDT: DemandForecastRequirementProfileCode. LotSizeProcedureCode may be optional, is a coded representation of a lot-size procedure, and may be based on datatype GDT: LotSizeProcedureCode. FixedLotSizeQuantityTypeCode may be optional, is a coded representation of a type of quantity for a fixed lot size in a planning unit of measure, and may be based on datatype GDT: QuantityTypeCode, with a qualifier of LotSize. FixedLotSizeQuantity may be optional and is a number of planning units of measure that represents a fixed lot size which is used in a lot size calculation. If a material shortage amount is smaller than a fixed lot size quantity, this fixed lot size quantity is ordered or produced. FixedLotSizeQuantity may be based on datatype GDT: Quantity, with a qualifier of LotSize. CalenderUnitCode may be optional, is a coded representation of a unit that relates to a calendar (e.g., a day, a week, a month), and may be based on datatype GDT: CalendarUnitCode. ReOrderQuantityTypeCode may be optional, is a coded representation of a type of quantity for a stock quantity in a planning unit of measure, and may be based on datatype GDT: QuantityTypeCode, with a qualifier of ReOrder. ReOrderQuantity may be optional, is a number of planning units of measure below which a stock level may fall to trigger a creation of procurement elements in planning, and may be based on datatype GDT: Quantity, with a qualifier of ReOrder. TargetStockQuantityTypeCode may be optional, is a coded representation of a type of quantity for a target stock in the planning unit of measure, and may be based on datatype GDT: QuantityTypeCode, with a qualifier of Stock. TargetStockQuantity may be optional, is a number of planning units of measure that represents a target stock, and may be based on datatype GDT: Quantity. TargetDaysOfSupplyDuration may be optional, is a span of time, specified in days, that represents a target day's supply, and may be based on datatype GDT: DAY_Duration. SafetyStockQuantityTypeCode may be optional, is a coded representation of a type of quantity for a safety stock in a planning unit of measure, and may be based on datatype GDT: QuantityTypeCode, with a qualifier of Stock. SafetyStockQuantity may be optional, is a number of planning units of measure that represents a safety stock, and may be based on datatype GDT: Quantity. SafetyDaysOfSupplyDuration may be optional, is a span of time, specified in days, that represents a safety day's supply, and may be based on datatype GDT: DAY_Duration. LotSizeRoundingQuantityTypeCode may be optional, is a coded representation of a type of quantity for a lot size in the planning unit of measure, and may be based on datatype GDT: QuantityTypeCode, with a qualifier of LotSizeRounding. LotSizeRoundingQuantity may be optional, is a number of planning units of measure to which a procurement quantity is rounded up in manifolds, and may be based on datatype GDT: Quantity. MinimumLotSizeQuantityTypeCode may be optional, is a coded representation of a type of quantity for a lot size in a planning unit of measure, and may be based on datatype GDT: QuantityTypeCode, with a qualifier of LotSize. MinimumLotSizeQuantity may be optional, is a number of planning units of measure that is a minimum for procurement, and may be based on datatype GDT: Quantity. MaximumLotSizeQuantityTypeCode may be optional, is a coded representation of a type of quantity for a lot size in the planning unit of measure, and may be based on datatype GDT: QuantityTypeCode, with a qualifier of LotSize. MaximumLotSizeQuantity may be optional, is a number of planning units of measure that may not be exceeded in procurement, and may be based on datatype GDT: Quantity. DefaultProcurementMethodCode may be optional, is a coded representation of a method with which a product is procured, and may be based on datatype GDT: ProcurementMethodCode. PlannedDeliveryDuration may be optional, is a span of time used to deliver a material or a service via external procurement, and may be based on datatype GDT: DAY_Duration. GoodsReceiptProcessingDuration may be optional, is a span of time between which goods are received and become available for planning, and may be based on datatype GDT: TIME_Duration. MinimumDaysOfSupplyDuration may be optional and is a span of time, specified in days, during which a stock of a material in a supply planning area may cover requirements. If the requirements are not fulfilled within this period, the system triggers an exception. Customer-specific settings can be used to define which stocks are taken into account. MinimumDaysOfSupplyDuration may be based on datatype GDT: DAY_Duration. MinimumReceiptDaysOfSupplyDuration may be optional and is a span of time, specified in days, during which a stock and receipt of a material in a supply planning area may cover requirements. If the requirements are not fulfilled within this period of time, the system triggers an exception. Customer-specific settings can be used to define which stocks and material receipts are taken into account. MinimumReceiptDaysOfSupplyDuration may be based on datatype GDT: DAY_Duration. Status is a current step in a life cycle of the usability of a product to which a template belongs for a supply planning process, and may be based on datatype BOIDT: ProductProcessControlStatus. LifeCycleStatusCode is a status defining a state of data during a current process, and may be based on datatype GDT: ProductProcessUsabilityLifeCycleStatusCode.

The following elements may be used in a derived business object Material Template: CalenderUnitCode, DefaultProcurementMethodCode, DemandForecastRequirementProfileCode, FixedLotSizeQuantity, FixedLotSizeQuantityTypeCode, GoodsReceiptProcessingDuration, LotSizeProcedureCode, LotSizeRoundingQuantity, LotSizeRoundingQuantityTypeCode, MaximumLotSizeQuantity, MaximumLotSizeQuantityTypeCode, MinimumDaysOfSupplyDuration, MinimumLotSizeQuantity, MinimumLotSizeQuantityTypeCode, MinimumReceiptDaysOfSupplyDuration, PlannedDeliveryDuration, ProductPlanningTimeFenceDuration, ReOrderQuantity, ReOrderQuantityTypeCode, SafetyDaysOfSupplyDuration, SafetyStockQuantity, SafetyStockQuantityTypeCode, Status, SupplyPlanningProcedureCode, TargetDaysOfSupplyDuration, TargetStockQuantity, and TargetStockQuantityTypeCode.

A composition relationship to the subordinate node SupplyPlanningSpecificationDerivation may exist, with a cardinality of 1:CN. In some implementations, all QuantityTypeCodes and MeasureUnitCodes at this node may be read-only. In some implementations, DefaultProcurementMethodCode is maintained if the SupplyPlanningProcedureCode is "Demand Driven Planning" or "Consumption Based Planning". For all other supply planning procedure codes, the DefaultProcurementMethodCode may be may be optional. In some implementations, LotSizeProcedureCode may be maintained if the SupplyPlanningProcedureCode is "DemandDrivenPlanning" or "Consumption Based Planning" In some implementations, the allowed LotSizeProcedureCode values may include the values "Lot-for-Lot," "Fixed Lot Size," and "Replenish to Target Stock Level" if the SupplyPlanningProcedureCode is "Consumption Based Planning". In some implementations, CalendarUnitCode may be maintained if the LotSizeProcedureCode is "PeriodicLots". In some implementations, TargetDaysOfSupplyDuration may be maintained if the LotSizeProcedureCode is "Replenish to Target Days Supply". In some implementations, FixedLotSizeQuantity may be maintained if the LotSizeProcedureCode is "FixedLotSize". In some implementations, ReOrderQuantity may be maintained if the SupplyPlanningProcedureCode is "Consumption Based Planning". In some implementations, TargetStockQuantity be maintained if the LotSizeProcedureCode is "Replenish to Target Stock Level". In some implementations, if TargetStockQuantity and ReOrderQuantity are maintained, TargetStockQuantity may not be less than ReOrderQuantity. In some implementations, if TargetStockQuantity and SafetyStockQuantity are maintained, TargetStockQuantity may not be less than SafetyStockQuantity. In some implementations, if TargetDaysOfSupplyDuration and SafetyDaysOfSupplyDuration are maintained, TargetDaysOfSupplyDuration may not be less than SafetyDaysOfSupplyDuration. In some implementations, if FixedLotSizeQuantity and MinimumLotSizeQuantity are maintained, FixedLotSizeQuantity may be equal to MinimumLotSizeQuantity. In some implementations, if FixedLotSizeQuantity and MaximumLotSizeQuantity are maintained, FixedLotSizeQuantity may be equal to the MaximumLotSizeQuantity. In some implementations, if FixedLotSizeQuantity and LotSizeRoundingQuantity are maintained, FixedLotSizeQuantity may be equal to the LotSizeRoundingQuantity. In some implementations, if MinimumLotSizeQuantity and MaximumLotSizeQuantity are maintained, MinimumLotSizeQuantity may not be greater than the MaximumLotSizeQuantity. In some implementations, if MinimumLotSizeQuantity and LotSizeRoundingQuantity are maintained, MinimumLotSizeQuantity may be an integral multiple of the LotSizeRoundingQuantity. In some implementations, if MaximumLotSizeQuantity and LotSizeRoundingQuantity are maintained, MaximumLotSizeQuantity may be an integral multiple of the LotSizeRoundingQuantity. An Activate enterprise service infrastructure action activates the usability for a supply planning process. The Activate action may have a precondition that LifeCycleStatusCode has a value of "InPreparation". The Activate action may be used in a derived business object Material Template.

Supply Planning Specification Derivation is a derivation of a financials specification of a product from a financials specification of a template. The Copy Supply Planning Specification to Product action copies the content of a Supply Planning Specification node of the template to a corresponding supply planning nodes of a product. Thus, data may be derived from a template to a product after the action is performed. The elements located directly at the node Supply Planning Specification Derivation are defined by the data type ProductTemplateSupplyPlanningSpecificationDerivationElements. These elements include: SupplyPlanningAreaUUID, SupplyPlanningAreaID, Key, and MaterialUUID. SupplyPlanningAreaUUID is a globally unique identifier for a supply planning area, and may be based on datatype GDT: UUID. SupplyPlanningAreaUUID is a globally unique identifier for a supply planning area, and may be based on datatype GDT: UUID. SupplyPlanningAreaID is an identifier for a supply planning area, and may be based on datatype GDT: SupplyPlanningAreaID. Key may be an alternative key for a Supply Planning Specification Derivation node, and may be based on datatype KDT: ProductTemplateSupplyPlanningSpecificationDerivationKey. MaterialUUID is a globally unique identifier for a material, and may be based on datatype GDT: UUID. SupplyPlanningAreaUUID is a globally unique identifier for a supply planning area, and may be based on datatype GDT: UUID. The Key, SupplyPlanningAreaID, and SupplyPlanningAreaUUID elements may be used in a derived business object Material Template.

A DerivedMaterialSupplyPlanningProcessUsability inbound aggregation relationship may exist from the business object Material Supply Planning Process Control/node Supply Planning Process Usability, with a cardinality of 1:CN, which represents a derived supply planning process usability of a material. A DerivedMaterialSupplyPlanningSpecification inbound aggregation relationship may exist from the business object Material Supply Planning Process Control/node Supply Planning Specification, with a cardinality of 1:CN, which represents a derived supply planning specification of a material. A SupplyPlanningArea inbound aggregation relationship may exist from the business object Supply Planning Area/node Supply Planning Area, with a cardinality of 1:CN, which represents an association from a supply planning area. This association defines a supply planning area for which template data is used in a product master. A Copy Supply Planning Specification to Product enterprise service infrastructure action may be used to copy content of a Supply Planning Specification node of a template to corresponding supply planning nodes of a product. The supply planning area for which data is copied is specified at a Supply Planning Specification Derivation node. The Copy Supply Planning Specification to Product action may be used by a derived business object Material Template.

Availability Confirmation Specification is a specification regarding an availability confirmation process. The elements located directly at the node Availability Confirmation Specification are defined by the data type ProductTemplateAvailabilityConfirmationSpecificationElements. These elements include: AvailabilityCheckPeriodDuration, AvailabilityConfirmationModeCode, GoodsIssueProcessingDuration, ReplenishmentLeadTimeDuration, and Status. ReplenishmentLeadTimeDuration may be optional, is a span of time needed for replenishment, and may be based on datatype GDT: DAY_Duration. The ReplenishmentLeadTimeDuration is taken into consideration when checking availability. AvailabilityCheckPeriodDuration may be optional, is a span of time during which an availability confirmation mode is taken into consideration for checking availability the availability check horizon, and may be based on datatype GDT: DAY_Duration, with a qualifier of AvailabilityCheckPeriod. AvailabilityConfirmationModeCode may be optional, is a coded representation of a method for checking availability, may control a nature and scope of checks, and may be based on datatype GDT: AvailabilityConfirmationModeCode. GoodsIssueProcessingDuration may be optional, is an amount of time between when stock is withdrawn and when it leaves a closed area outside a storehouse in which vehicles are loaded and discharged, and may be based on datatype GDT: TIME_Duration. Status is a current step in a life cycle of the usability of a product to which a template belongs for the availability confirmation process, and may be based on datatype BOIDT: ProductProcessControlStatus. LifeCycleStatusCode is a status defining a state of the data during a current process, and may be based on datatype GDT: ProductProcessUsabilityLifeCycleStatusCode. The AvailabilityCheckPeriodDuration, AvailabilityConfirmationModeCode, GoodsIssueProcessingDuration, ReplenishmentLeadTimeDuration, and Status elements may be used by a derived business object Material Template. A composition relationship to subordinate node AvailabilityConfirmationSpecificationDerivation may exist, with a cardinality of 1:CN. In some implementations, only the following combinations of AvailabilityConfirmationModeCode, AvailabilityCheckDuration, and ReplenishmentLeadTimeDuration are permitted: None, —AvailabilityConfirmationModeCode, AvailabilityConfirmationModeCode and AvailabilityCheckDuration, AvailabilityConfirmationModeCode, AvailabilityCheckDuration, and ReplenishmentLeadTimeDuration, and ReplenishmentLeadTimeDuration. In some implementations, if ReplenishmentLeadTimeDuration and AvailabilityCheckDuration are maintained, and if AvailabilityConfirmationModeCode as well as the corresponding CONS_CHECK_HORIZON field in the PAC_C_CHECKPARAM configuration table are maintained, ReplenishmentLeadTimeDuration may be greater than AvailabilityCheckDuration. In some implementations, if AvailabilityConfirmationModeCode is maintained and a corresponding CONS_CHECK_HORIZON field in the PAC_C_CHECKPARAM configuration table is maintained, AvailabilityCheckDuration may be greater than zero. An Activate enterprise service infrastructure action activates the usability for the availability confirmation process. The Activate action may have a precondition that the LifeCycleStatusCode has a value of "InPreparation". The Activate action may be used by a derived business object Material Template.

Availability Confirmation Specification Derivation is a derivation of an availability confirmation specification of a product from an availability confirmation specification of a template. The Copy Availability Confirmation Specification to Product action copies the content of the Availability Confirmation Specification node of a template to a corresponding availability confirmation node of a product. Thus, data may be derived from a template to a product after the action is performed. The elements located directly at the node Availability Confirmation Specification Derivation are defined by the data type ProductTemplateAvailabilityConfirmationSpecificationDerivationElements. These elements include: SupplyPlanningAreaUUID, SupplyPlanningAreaID, Key, and MaterialUUID. SupplyPlanningAreaUUID is a globally unique identifier for a supply planning area, and may be based on datatype GDT: UUID. SupplyPlanningAreaUUID is a globally unique identifier for a supply planning area, and may be based on datatype GDT: UUID. SupplyPlanningAreaID is an identifier for a supply planning area, and may be based on datatype GDT: SupplyPlanningAreaID. Key is an alternative key for a Availability Confirmation Specification Derivation node, and may be based on datatype KDT: ProductTemplateAvailabilityConfirmationSpecificationDerivationKey. MaterialUUID is a globally unique identifier for a material, and may be based on datatype GDT: UUID. SupplyPlanningAreaUUID is a globally unique identifier for a supply planning area, and may be based on datatype GDT: UUID. The Key, SupplyPlanningAreaID, and SupplyPlanningAreaUUID elements may be used by a derived business object Material Template.

A DerivedMaterialAvailabilityConfirmationProcessUsability inbound aggregation relationship may exist from the business object Material Availability Confirmation Process Control/node Availability Confirmation Process Usability, with a cardinality of 1:CN, which represents a derived availability confirmation process usability of a material. A DerivedMaterialAvailabilityConfirmationSpecification inbound aggregation relationship may exist from the business object Material Availability Confirmation Process Control/node Availability Confirmation Specification, with a cardinality of 1:CN, which represents a derived availability confirmation specification of a material. A SupplyPlanningArea inbound aggregation relationship may exist from the business object Supply Planning Area/node Supply Planning Area, with a cardinality of 1:CN, which represents an association from a supply planning area. This association defines a supply planning area for which template data is used in a product master.

A Copy Availability Confirmation Specification to Product enterprise service infrastructure action may be used to copy content of an Availability Confirmation Specification node of a template to corresponding availability confirmation nodes of a product. The supply planning area for which data is copied is specified at the Availability Confirmation Specification Derivation node. The Copy Availability Confirmation Specification to Product enterprise service infrastructure action may be used in a derived business object Material Template.

The node Availability Confirmation Specification of a business object Product Template _Template may be used in derived business object Material Template. The node Availability Confirmation Specification Derivation of a business object Product Template _Template, may be used in derived business object Material Template. The node Financials Specification of business object Product Template _Template may be used in derived business objects Material Template and Service Product Template. The node Financials Specification Derivation of business object Product Template _Template may be used in derived business objects Material Template and Service Product Template. The node Product Template _Template of business object Product Template _ Template may be used in derived business objects Material Template and Service Product Template. The node Sales Specification of business object Product Template _Template may be used in derived business object Material Template and Service Product Template.

Sales Specification Derivation of business object Product Template _Template may be used in derived business object Material Template and Service Product Template. The node Supply Planning Specification of business object Product Template _Template may be used in derived business object Material Template. The node Supply Planning Specification Derivation of business object Product Template _Template may be used in derived business object Material Template. The node Company of business object Company may be used in derived business object Material Template and Service Product Template. The node Functional Unit of business object Functional Unit may be used in derived business object Material Template and Service Product Template. The node Availability Confirmation Process Usability of business object Material Availability Confirmation Process Control may be used in derived business object Material Template. The node Availability Confirmation Specification of business object Material Availability Confirmation Process Control may be used in derived business object Material Template. The node Material Availability Confirmation Process Control of business object Material Availability Confirmation Process Control may be used in derived business object Material Template. The node Financials Process Usability of business object Material Financials Process Control may be used in derived business object Material Template. The node Financials Specification of business object Material Financials Process Control may be used in derived business object Material Template. The node Material Financials Process Control of business object Material Financials Process Control may be used in derived business object Material Template. The node Material Sales Process Control of business object Material Sales Process Control may be used in derived business object Material Template. The node Sales Process Usability of business object Material Sales Process Control may be used in derived business object Material Template. The node Sales Specification of business object Material Sales Process Control may be used in derived business object Material Template. The node Material Supply Planning Process Control of business object Material Supply Planning Process Control may be used in derived business object Material Template. The node Supply Planning Process Usability of business object Material Supply Planning Process Control may be used in derived business object Material Template. The node Supply Planning Specification of business object Material Supply Planning Process Control may be used in derived business object Material Template. The node Material of business object Material may be used in derived business object Material Template. The node Permanent Establishment of business object Permanent Establishment may be used in derived business object Material Template. The node Financials Process Usability of business object Service Product Financials Process Control may be used in derived business object Material Template. The node Service Product Financials Process Control of business object Service Product Financials Process Control may be used in derived business object Material Template. The node Sales Process Usability of business object Service Product Sales Process Control may be used in derived business object Material Template. The node Sales Specification of business object Service Product Sales Process Control may be used in derived business object Material Template. The node Service Product Sales Process Control of business object Service Product Sales Process Control may be used in derived business object Service Product Template. The node Service Product of business object Service Product may be used in derived business object Service Product Template.

The business object Material Template is a collection of predefined values for attributes of a material. The business object Material Template belongs to the process component Product Data Maintenance.

A material template may include data relevant for organizationally-dependent and supply planning area-dependent processes such as presales, sales, financials, supply planning, and availability confirmation. A material template may be used to simplify the maintenance of a material. The Product Template business object template includes an association to a material or service product to which it belongs, and subordinate nodes may include default data for corresponding nodes of that material or service product.

The business object Service Product Template is a collection of predefined values for attributes of a service. The business object Service Product Template belongs to the process component Product Data Maintenance. A service product template includes data relevant for organizationally-dependent processes such as presales, sales, and financials. A service product template may be used to simplify the maintenance of a service product. A Product Template business object template includes an association to a material or service product to which it belongs, and subordinate nodes include default data for corresponding nodes of that material or service product.

A number of implementations have been described. Nevertheless, it will be understood that various modifications may be made without departing from the spirit and scope of the disclosure. Accordingly, other implementations are within the scope of the following claims.

What is claimed is:

1. A non-transitory computer readable medium including program code for providing a message-based interface for providing confirmations that indicate the success or failure of payment authorization requests, the medium comprising:

program code for receiving via a message-based interface derived from a common business object model, where the common business object model includes business objects having relationships that enable derivation of message-based interfaces and message packages, the message-based interface exposing at least one service as defined in a service registry and from a heterogeneous application executing in an environment of computer systems providing message-based services, a first message for providing a confirmation indicating the success or failure of a payment authorization request, the first message including a first message package derived from the common business object model, the first message package hierarchically organized in memory based on the common business object model, the first message package including:

at a first hierarchical level in the first message package, a payment card payment authorization confirmation request message entity; and at the first hierarchical level in the first message package, a payment card payment authorization confirmation package comprising, at a second hierarchical level in the first message package, a payment card payment authorization confirmation entity, where the payment card payment authorization confirmation entity includes, at a third hierarchical level in the first message package, a payment card payment authorization requestor identifier, a payment card payment authorization clearing house identifier, a payment card verification result code, and a payment authorization date time;

program code for processing the first message based on the hierarchical organization of the first message package, where processing the first message includes unpacking the first message package based on the first message package's structure and the first message package's derivation from the common business object model, wherein the particular structure of the first message package is used at least in part to identify the purpose of the first message; and program code for sending a second message to the heterogeneous application responsive to the first message, where the second message includes a second message package derived from the common business object model to provide consistent semantics with the first message package.

2. The computer readable medium of claim 1, wherein the payment card payment authorization confirmation entity further comprises at least one of the following: an authorization result code, a payment card verification value verification result code and a payment card address verification result code, an authorized payment amount, an authorization result description, and an authorization expiration date time.

3. A distributed system operating in a landscape of computer systems providing message-based services defined in a service registry, the system comprising:

at least one processor operable to execute computer readable instructions embodied on non-transitory media;

a graphical user interface executable by the at least one processor and comprising computer readable instructions, embedded on non-transitory media, for providing confirmation indicating the success or failure of a payment authorization request, using a request;

a first memory storing a user interface controller executable by the at least one processor, the user interface controller for processing the request and involving a message including a message package derived from a common business object model, where the common business object model includes business objects having relationships that enable derivation of message-based service interfaces and message packages, the message package hierarchically organized based on the common business object model, the hierarchical organization of the message package including:

at a first hierarchical level in the first message package, a payment card payment authorization confirmation request message entity; and at the first hierarchical level in the first message package, a payment card payment authorization confirmation package comprising, at a second hierarchical level in the first message package, a payment card payment authorization confirmation entity, where the payment card payment authorization confirmation entity includes, at a third hierarchical level in the first message package, a payment card payment authorization requestor identifier, a payment card payment authorization clearing house identifier, a payment card verification result code, and a payment authorization date time; and a second memory, remote from the graphical user interface, storing a plurality of message-based service interfaces executable by the at least one processor and derived from the common business object model to provide consistent semantics with messages derived from the common business object model, where one of the message-based service interfaces processes the message based on the hierarchical organization of the message package, where processing the message includes unpacking the first message package based on the message package's structure and the message package's derivation from the common business object model, wherein the particular structure of the message package is used at least in part to identify the purpose of the message.

4. The distributed system of claim 3, wherein the first memory is remote from the graphical user interface.

5. The distributed system of claim 3, wherein the first memory is remote from the second memory.

* * * * *